US011153259B2

(12) United States Patent
Uhll

(10) Patent No.: US 11,153,259 B2
(45) Date of Patent: Oct. 19, 2021

(54) SYSTEM AND METHOD FOR CREATION AND SCHEDULING OF FUTURE COMMUNICATIONS AND GIFTS

(71) Applicant: Jennifer Uhll, Hermosa Beach, CA (US)

(72) Inventor: Jennifer Uhll, Hermosa Beach, CA (US)

( * ) Notice: Subject to any disclaimer, the term of this patent is extended or adjusted under 35 U.S.C. 154(b) by 0 days.

(21) Appl. No.: 16/009,167

(22) Filed: Jun. 14, 2018

(65) Prior Publication Data

US 2019/0386951 A1 Dec. 19, 2019

Related U.S. Application Data

(60) Provisional application No. 62/520,524, filed on Jun. 15, 2017.

(51) Int. Cl.
*H04L 12/58* (2006.01)
*G06F 3/048* (2013.01)

(52) U.S. Cl.
CPC .............. *H04L 51/38* (2013.01); *G06F 3/048* (2013.01)

(58) Field of Classification Search
CPC ................................. H04L 51/38; G06F 3/048
USPC ........................................................ 709/206
See application file for complete search history.

(56) References Cited

U.S. PATENT DOCUMENTS 5,555,496 A 9/1996 Tackbary et al.
5,983,200 A 11/1999 Slotznick
6,384,850 B1 * 5/2002 McNally ............. G06F 16/9577 715/810
6,965,912 B2 11/2005 Friedman et al.
7,127,841 B1 10/2006 Weber
7,237,199 B1 * 6/2007 Menhardt ................. G06F 8/20 709/217
7,702,542 B2 4/2010 Aslanian, Jr.
8,196,038 B2 6/2012 Berger et al.
8,577,735 B2 11/2013 Wilen et al.
9,077,823 B1 * 7/2015 Grosz ................ H04N 1/00196
9,264,849 B1 * 2/2016 Kahn ................ G06Q 10/1095
10,430,865 B2 * 10/2019 Glass ..................... G06Q 50/01
2002/0002558 A1 1/2002 Krause
2002/0103711 A1 8/2002 Karas et al.
2003/0158864 A1 * 8/2003 Samn ................... G06Q 10/107
2004/0010503 A1 * 1/2004 Williams ................ G06F 16/22
2007/0038495 A1 2/2007 Miner
2008/0290159 A1 * 11/2008 Bartley, Sr. ............ G06Q 10/00 235/380
2009/0070434 A1 * 3/2009 Himmelstein .......... H04L 51/38 709/217

(Continued)

OTHER PUBLICATIONS

John Walkenbach, Microsoft Excel 2003 BIBLE 43-58 (2003).*

(Continued)

*Primary Examiner* — David P Zarka
(74) *Attorney, Agent, or Firm* — Maceiko IP

(57) ABSTRACT

Systems, methods, and graphic user interfaces are provided for facilitating electronic sending and/or receiving of messages and/or gifts. In particular, systems, methods, and user interfaces are provided for facilitating electronic sending and/or receiving of messages and/or gifts scheduled for future delivery, creating, storing, scheduling, and sending time-locked messages and/or gifts, receiving time-locked messages and/or gifts, and sending and/or receiving messages and/or gifts posthumously.

15 Claims, 179 Drawing Sheets

(56) References Cited

U.S. PATENT DOCUMENTS

2009/0265382 A1 10/2009 Freiman et al.
2009/0327129 A1* 12/2009 Collas .................. G06Q 20/102 705/41
2010/0076833 A1* 3/2010 Nelsen ...................... G07F 7/10 705/14.25
2010/0100477 A1* 4/2010 Giammanco .......... G06Q 20/10 705/39
2010/0299192 A1* 11/2010 Aslanian, Jr. ........ G06Q 10/107 705/14.5
2011/0082817 A1 4/2011 Vandervort Stiles
2011/0141493 A1* 6/2011 Berger ............... G06Q 30/0282 358/1.6
2012/0011450 A1* 1/2012 To .......................... G06Q 10/10 715/752
2012/0276880 A1 11/2012 Angom et al.
2013/0097044 A1 4/2013 Cutler
2013/0144733 A1* 6/2013 Rothschild ......... G06Q 20/0457 705/17
2013/0159445 A1* 6/2013 Zonka .................... G06Q 30/06 709/206
2013/0268391 A1 10/2013 Esch et al.
2013/0297710 A1 11/2013 Luber
2013/0332307 A1* 12/2013 Linden .............. G06Q 30/0631 705/26.7
2014/0031084 A1* 1/2014 Johnson, Jr. ........... G06Q 30/00 455/564
2014/0122282 A1 5/2014 Orellana
2014/0244734 A1* 8/2014 Nutt ..................... G06Q 10/107 709/203
2015/0050987 A1* 2/2015 Huang ................. G06Q 20/065 463/25
2015/0154676 A1* 6/2015 Matousek .......... G06Q 30/0635 705/26.5
2015/0379567 A1* 12/2015 Leassear ............ G06Q 30/0255 705/14.53
2016/0162166 A1* 6/2016 Kleine-Horst ........ G06F 3/0482 715/703

OTHER PUBLICATIONS

Bill Dyszel, Microsoft Outlook 2013 for Dummies, John Wiley & Sons, Inc., 1-356 (2013) (Year: 2013).*
Diane Poremsky, To delay sending a message in Outlook, Slipstick Systems, Jun. 1-10, 2016 (Wayback Machine link available at https://web.archive.org/web/20161120071831/http://www.slipstick.com/outlook/email/delay-sending-a-message/) (Year: 2016).*
MSOutlook.info, Delete or mark an email automatically at a set date, Mar. 1-3, 2016 (Wayback Machine link available at https://web.archive.org/web/20160319002912/https://www.msoutlook.info/question/automatically-delete-message-at-set-date) (Year: 2016).*
WayBack Machine, Lifetime Wishes: Create, send and receive personalized wishes, ecards, greetings and gifts, https://www.lifetimewishes.com/, Oct. 21, 2016, available at https://web.archive.org/web/20161021153443/https://www.lifetimewishes.com/ (Year: 2016).*
Erin Doland, Never Forget to Send a Card with Jack Cards (/2010/11/18/never-forget-to-send-a-card-with-jack-cards/), Nov. 18, 2010, 18 pages, unclutterer.com/2010/11/18/never-forget-to-send-a-card-with-jack-cards/ Sep. 22, 2014.
www.thedigitalbeyond.com/online-services-list/the-voice-library/, The Digital Beyond, The Voice Library, Sep. 22, 2014, 3 pages.
www.thedigitalbeyond.com/online-services-list/thoughtsbeyond/, The Digital Beyond, Thoughts Beyond, Sep. 22, 2014, 3 pages.

* cited by examiner

FIG. 49
600
Send Free Wishes Invite Loved Ones >
Menu
LIFETIME wishes
Brandon
My Account
Orders
670
My Profile
Orders History
Important Contacts
Order Date: 10/20/2015
Order Number: 3910893837
Ordered By: Brandon Johnson
Plan Price: FREE
Wishes: Unlimited
Recipients: Unlimited
My Plan
Child Accounts
Email Notifications
Order Date: 10/20/2015
Order Number: 3910893837
Ordered By: Brandon Johnson
Plan Price: FREE
Wishes: Unlimited
Recipients: Unlimited
Payment Info
Orders
Social
Passwords
Order Date: 10/20/2015
Order Number: 3910893837
Ordered By: Brandon Johnson
Plan Price: FREE
Wishes: Unlimited
Recipients: Unlimited

App Data Flow

Lifetime Wishes Project Objectives

1. Provide a secure web/mobile messaging app to send/receive messages scheduled for future delivery.
2. Users create, store, schedule & send time-locked multimedia messages & gifts to loved ones.
3. Users receive time-locked multimedia messages & gifts from loved ones.
4. Messages & gifts are sent/received on specific datews, even if the sender has passed on.

PHASE 1: Create, store & auto-send Send/Receive time-locked digital messages.

Message Delivery: Text, app, email

*FIG. 54A*

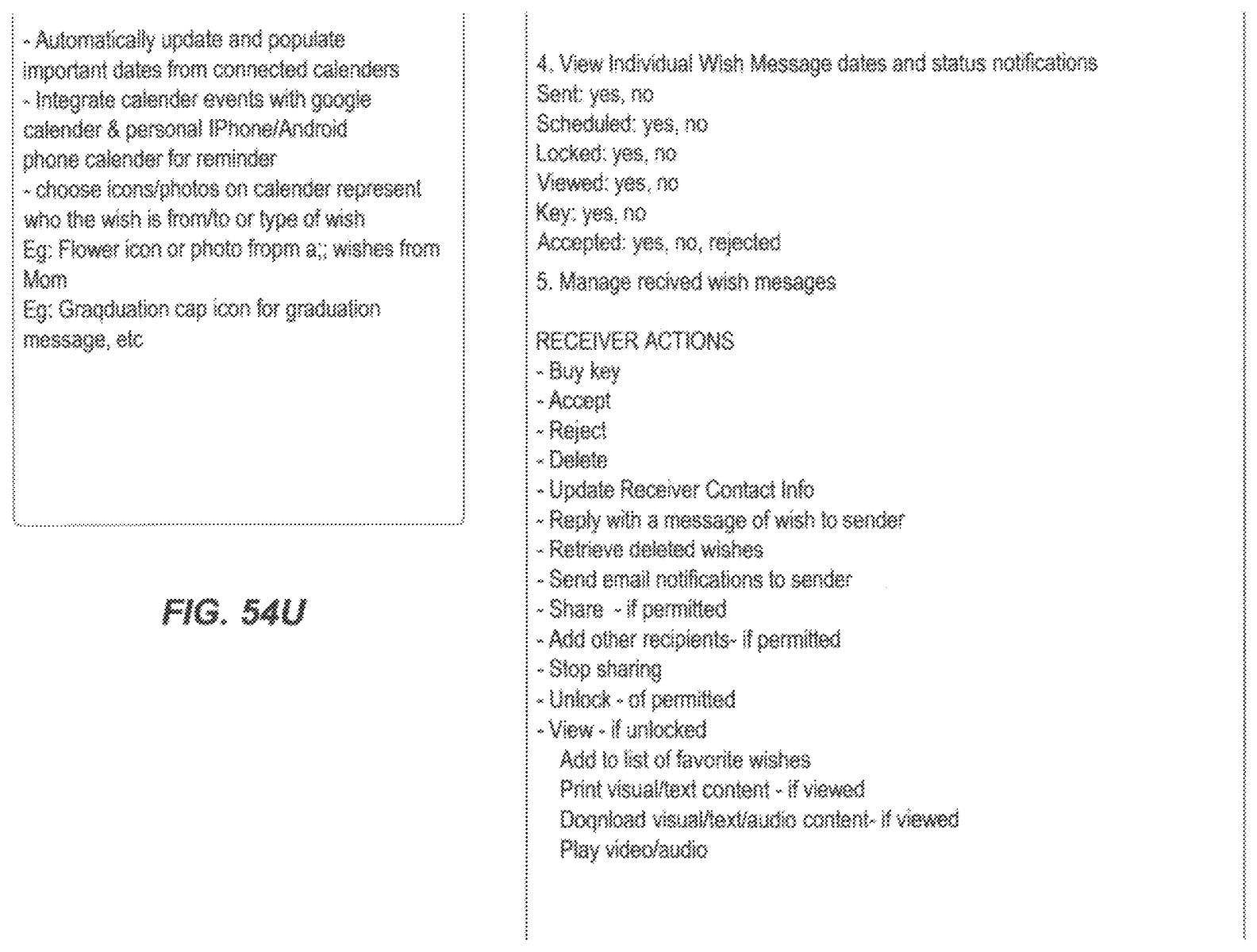

- Automatically update and populate important dates from connected calenders
- Integrate calender events with google calender & personal IPhone/Android phone calender for reminder
- choose icons/photos on calender represent who the wish is from/to or type of wish Eg: Flower icon or photo fropm a;; wishes from Mom Eg: Graqduation cap icon for graduation message, etc 4. View Individual Wish Message dates and status notifications Sent: yes, no Scheduled: yes, no Locked: yes, no Viewed: yes, no Key: yes, no Accepted: yes, no, rejected 5. Manage recived wish mesages

RECEIVER ACTIONS

- Buy key
- Accept
- Reject
- Delete
- Update Receiver Contact Info
- Reply with a message of wish to sender
- Retrieve deleted wishes
- Send email notifications to sender
- Share - if permitted
- Add other recipients- if permitted
- Stop sharing
- Unlock - of permitted
- View - if unlocked Add to list of favorite wishes Print visual/text content - if viewed Doqnload visual/text/audio content- if viewed Play video/audio

FIG. 54U

Account Types:

1. Standard Account - 13 years and over
2. Guardian Acount - this is exact same account as standard user, the only difference is the registration funnel skips email verification since they are coming from email link already.
3. Child Account - Under 13 years age. This "create child account" process requires guardian to add child email.

User Databases:

1. contact (non-member)
2. purgatory (email not yet verified)
3. standard user (members - guardian and non-guardians)
4. child user (child emails not able to login)

LTW/Adestra shared database fields: (draft)

1. Tokens - standard user activate account, guardian create child account w/ cookie eraser, child user activate account, password reset
2. optin - beta testing, newsletters
3. standard account status - active, inactive, cancelled
4. standard user info - uuid, email, DOB, gender, first name, last name, phone
5. standard user email status - unverified, verified
6. standard user alternate email status - unverified, verified
7. guardian status - active, inactive
8. child account status - active, inactive, cancelled
9. child user info - child uuid, child email, child DOB, child gender, child first name, child last name
10. child user email status - unverified, verified
11. child user alternate email status - unverified, verified
12. Referral Emails - invite emails
13. Plan ID - free, premium
14. Wish Info - wish title, recipient emails, recipient wish status, unlock date
15. Purchase confirmation - get from stripe
16. System - last login date, 13 year olds, 18 year olds

FIG. 56O
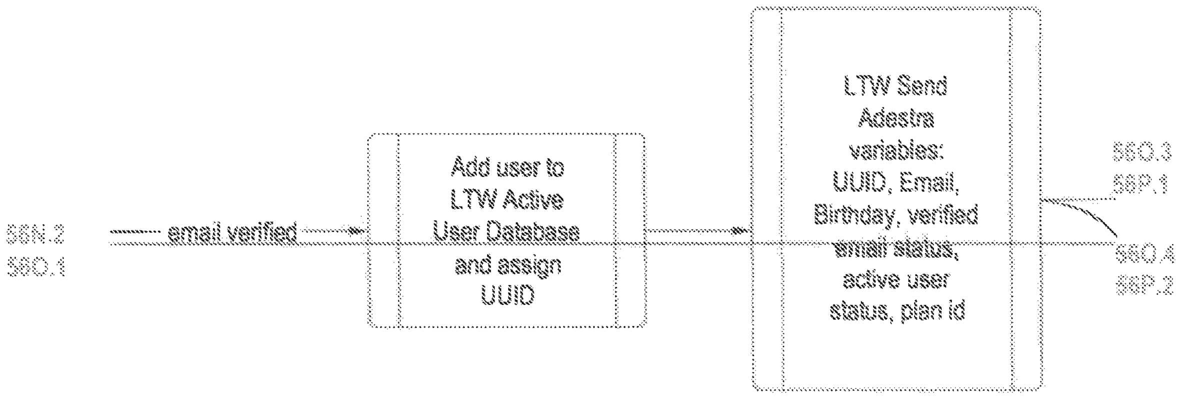
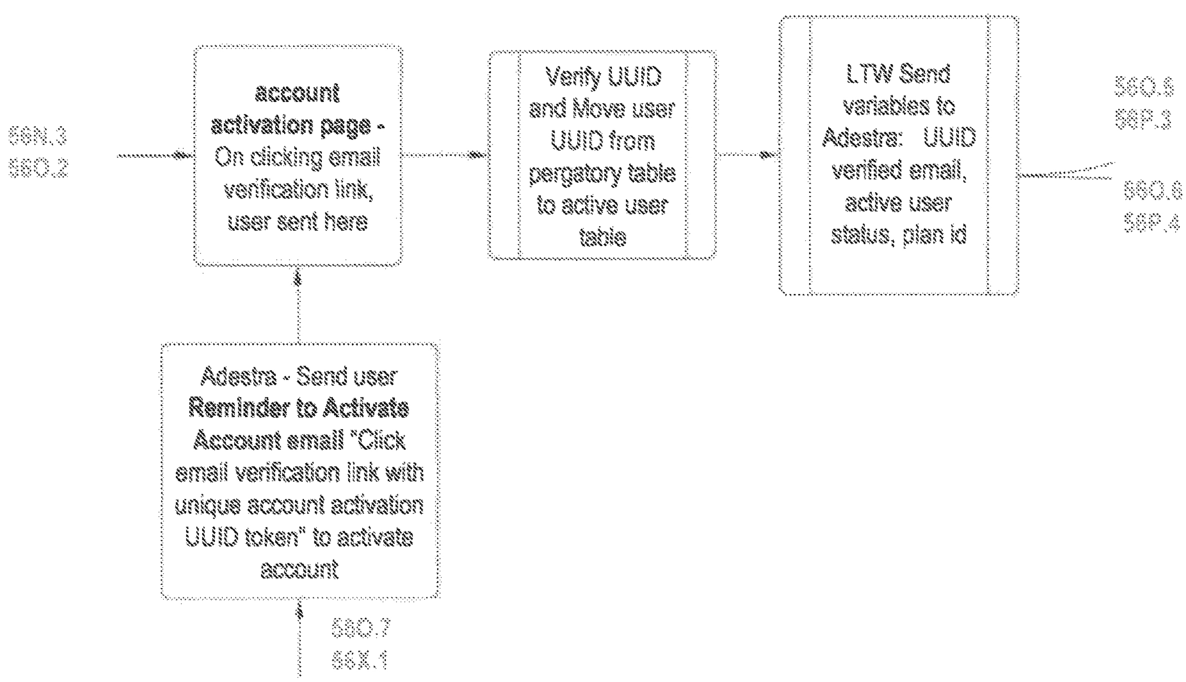

LIFETIME WISHES ANIMATED VIDEO INTRO PLAYS EVERYTIME CARD OPENS

VIDEO ENDS ON STILL SCREEN FOR USER TO PRESS ANY KEY

WHEN PRESSING < OR > NAVIGATE TO STILL SCREEN
OF EACH VIDEO

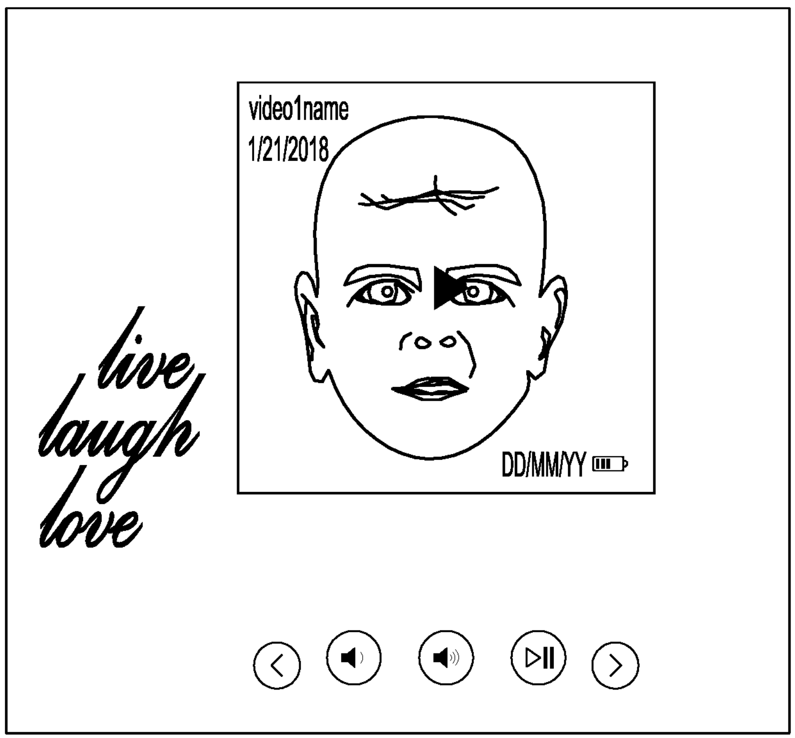

IF UNLOCK DATE IS PAST TODAY'S DATE:
SHOW THUMBNAIL, VIDEONAME, UNLOCK DATE, TODAY'S DATE AND BATTERY INDICATOR
PLAY VIDEO IF USER CLICKS PLAY

FIG. 62F

WHEN PRESSING PLAY SHOW WISH STAMP/
VIDEO/UNLOCK DATES

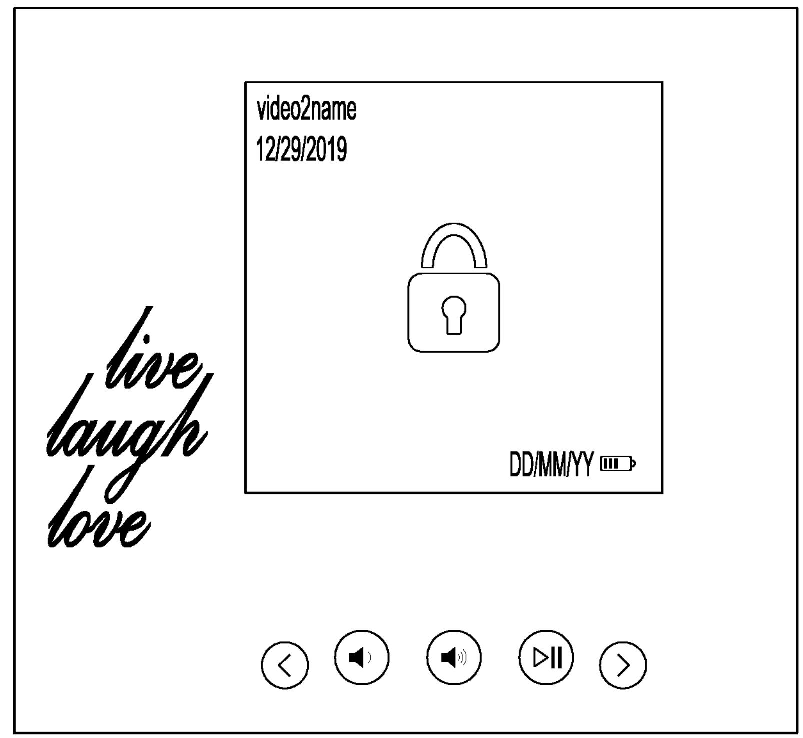

IF UNLOCK DATE IS NOT PAST TODAY'S DATE:
SHOW LOCK ICON, VIDEO NAME, UNLOCK DATE, TODAY'S DATE AND BATTERY INDICATOR
DO NOT ALLOW PLAY VIDEO IF USER CLICKS PLAY

FIG. 62G

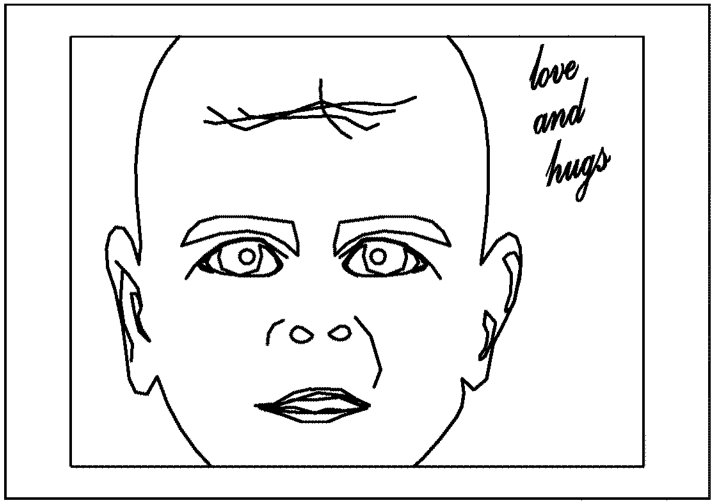

COVER
Customizable Item/s:
- Front Cover Image
Required Specs for Customizable Item/s
- Suggested 200x300, min 150dpi for cover image
Printing: TBD
Packaging/shipping; Juhll

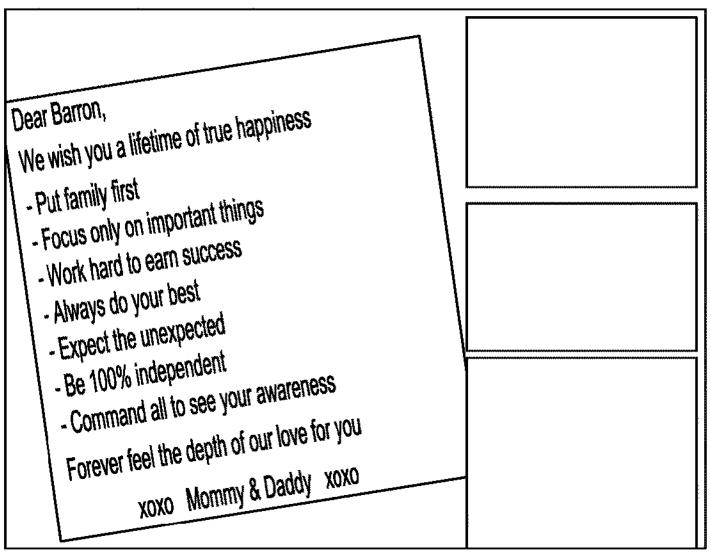

TOP INSIDE
Customizable Item/s:
- Message
- Side Image 1
- Side Image 2
- Side Image 3
Required Specs for Customizable Item/s
- Suggested 200x300, min 150dpi for all side images
- Maximum number of characters:XX
Printing: TBD
Packaging/shipping; Juhll

FIG. 63A

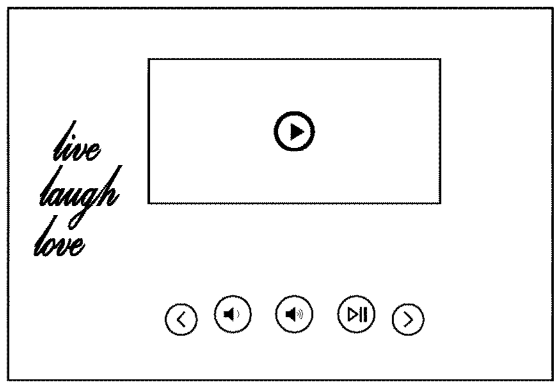

BOTTOM INSIDE

Customizable Item/s:
- Time-Locked Video/s to Show in video screen

Required Specs
- Maximum videos according to storage in product purchased

Screen will show:

If Battery Available
- Video Intro (LTW animated Logo/Tag Lione
- Still Screen with Press and key to start
- Dashboard: Today's date/Adjust Today's Date Instructions/BatteryIndicator
- Press Play to Show Wish Stamp/Videos/Unlock Dates
- Press Next/Previous Buttons to navigate to Videos
  - If Video Unlock Date past today's date: Allow Play Video
  - If Video unlock date is NOT past today's date: Show Locked Video thumbnail + Do Not allow to play video
- Close cover to switch off Software to include in the video to lock videos: TBD
Packaging/shipping; Juhll

BACK COVER

Customizable Item/s:
- Wish Stamp:
  - To
  - From
  - Created
  - Title
  - Wish ID
- Order #

Required Specs for Customizable Item/s
- Maximum number of characters for To, From: XX
- Maximum number of characters for To, From: XX Printing: TBD
Packaging/shipping; Juhll

FIG. 63B

STEP 6

When Updating Video, give user option for Upgrade Memory, only if upgrade is available.

- Show Button ONLY bigger memory products are available
- Hide button if product with maximum memory product is selected If bigger memory selected at this point:

- Update Video Capacity Bar
- Allow user to add more video according to nw storage
- System to detect change of product to update price when moving into payment/order step
- Keep all work done on template for user at the point of upgrading

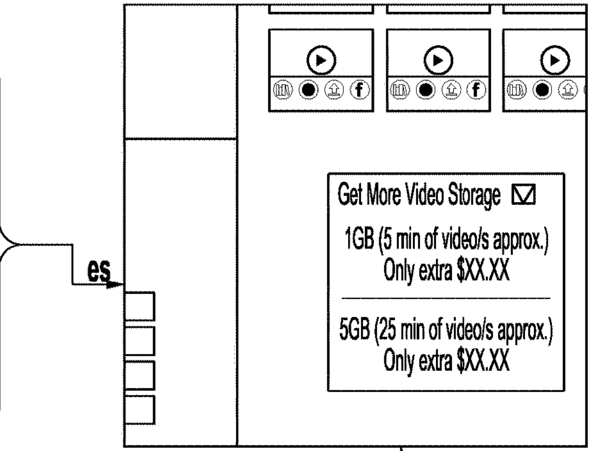

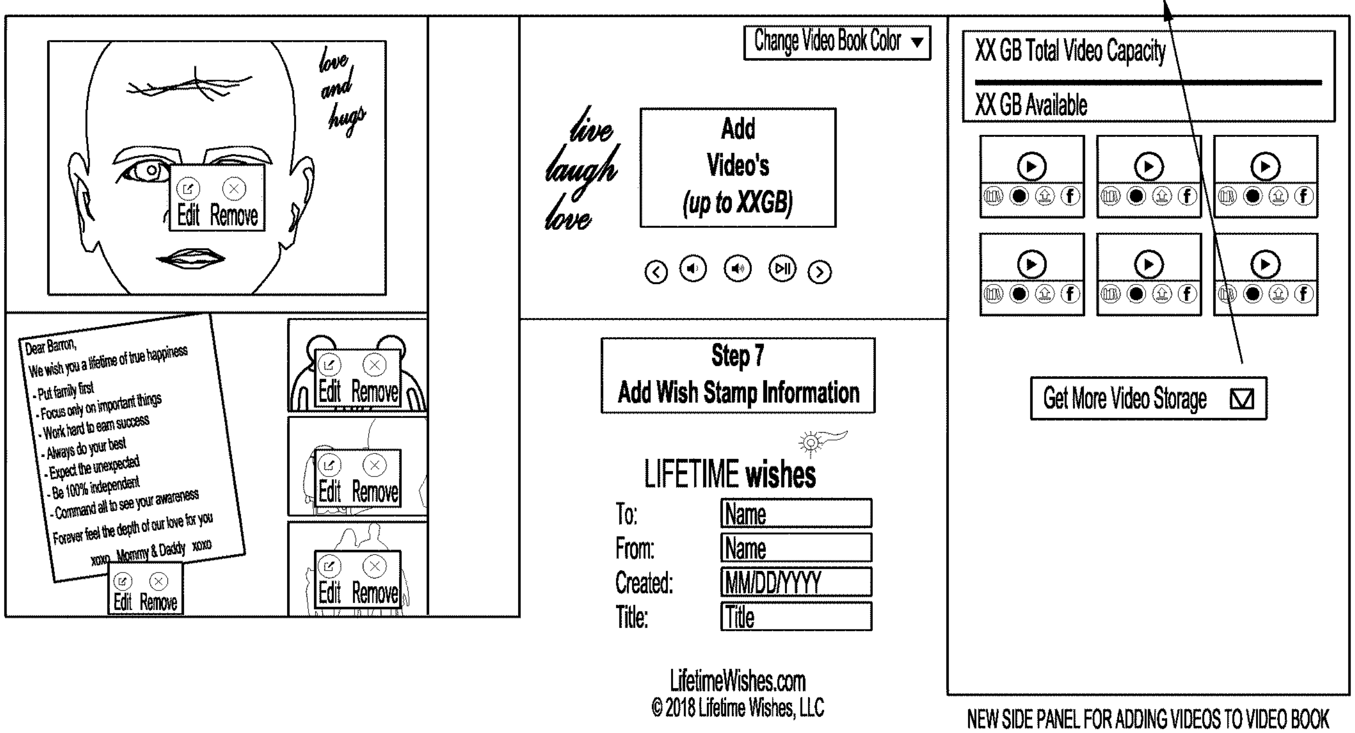

FIG. 65K

Upgrade Page for Bigger Video Screen

Show Page ONLY to Users meeting all the below condiditons:

- Wish for Video Book product does not have not a confirmed order yet
- Product selected is the one with smallest screen
- When clicking Schedule from Wish Template of Preview Page, or Wish in Outbox If user clicks on Upgrade to Bigger Screen, system will detect change of product and adjust price accordingly for Schedule Order Screen to show correct product price.
All design components should stay as they are

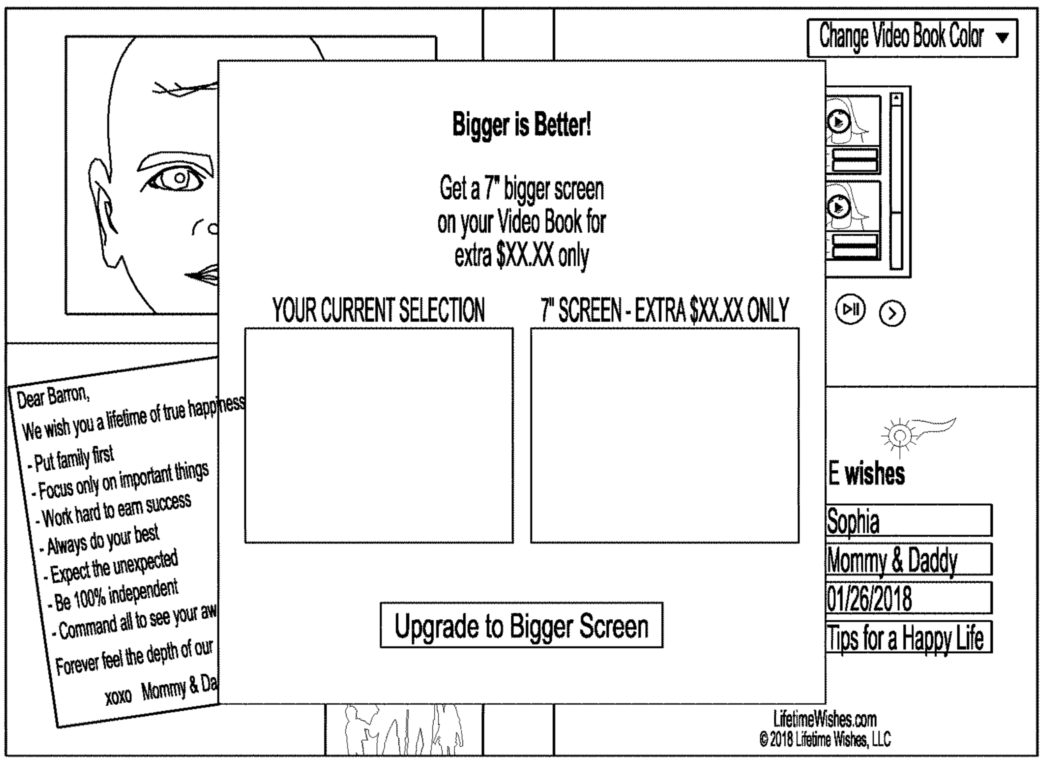

FIG. 65W

- Product ID - system auto-generates
- Product Category (dropdown menu from choices out from published categories on category page)
- Product Name
- Product Description
- Thumbnail Image
- Available Colors - to add choices of colors that populate different background colors on layouts
- Price
- Immediate Order Minimum Turn Around Days to have in consideration for Delivery Choices
- Show on Layouts: When Ticked display in layouts section - Prnted Wishes
- Show on Category Preview: When Ticked, Show product on Preview for its category. Allow for ONLY up tp XX products to be ticked as preview in category. Show Validation error - maximum number of products shown - maximum number should be determined on how many we can fit on screen preview
- Show on All Preview: When Ticked, Show product on Preview for All. Allow for ONLY up tp XX products to be ticked as preview . Show Validation error - maximum number of products shown - maximum number should be determined on how many we can fit on screen preview
- Out of Stock: When ticked, show product as Out of Stock - apply to layouts too if product is present on layout
- Published to Gifts: When Ticked - Show on Gifts
- Save Changes: Saves all changes to admin panel and populates product on application
- Sync product with Stripe: Creates OR updates new/existing product in Stripe

FIG. 67D

SYSTEM AND METHOD FOR CREATION AND SCHEDULING OF FUTURE COMMUNICATIONS AND GIFTS

CROSS REFERENCE TO RELATED APPLICATION

This application claims the benefit of U.S. Provisional Application No. 62/520,524, filed Jun. 15, 2017, the contents of which are incorporated herein by reference.

FIELD OF THE INVENTION

The current invention generally relates to systems, methods and user interfaces for sending and receiving messages and other items between individuals, as well as the creation, storage, scheduling and coordination of such messages and other items, including the sending of messages in the future. The current invention also relates to an electronic and physical infrastructure to provide such a system and the communication services thereof.

BACKGROUND OF THE INVENTION

The custom of sending personal messages or giving cards, presents and other mementos from one person to another has existed for centuries. More recently, with the advent of the Internet and other forms of electronic communication, sending electronic cards or other electronic messages has become popular. Gift giving also often takes place based on electronic orders.

However, current electronic delivery systems to send personal messages, cards and the like have significant drawbacks. For example, given the ease in which electronic messages may be created and sent, they are often too "instant" and inappropriate for certain circumstances. That is, senders may be apt to send a quick e-mail or message that is not personal and is inappropriate for certain situations. For example, a short e-mail saying "happy birthday" from one family member to another does not convey much emotion and may instead look thoughtless because it shows little effort. While photos may accompany such messages, they still may not convey the thoughtfulness that previously existed with the act of buying a physical card that itself has a certain message, writing a note in the card and then mailing it. Accordingly, there is a need for a system and method to electronically send thoughtful messages.

As another example, the sender or giver may have all the best intentions but may simply forget a birthday, holiday, graduation, anniversary or other event for which he or she had intended to send a card, e-mail or other type of message. Accordingly, there is a need for a system and method which automatically sends thoughtful messages and/or reminds the sender of the upcoming date.

Also, electronic messages which may be easily sent may not adequately account for issues that may arise for certain recipients. For example, certain messages and associated content involving children may not meet the Children's Online Privacy Protection Act ("COPPA"). Accordingly, there is a need for a system and method that accounts for COPPA or other pertinent regulations.

Also, current electronic message delivery systems typically do not provide a means for sending messages, cards or gifts after a person dies. This would allow a person who has passed away to more prominently remain in the memories of that person's loved ones. Accordingly, there is a need for a system and method that posthumously sends messages, or to otherwise send messages in the future.

Also, current electronic systems typically do not provide the infrastructure for a user to create, send or receive messages, gifts or other items. Furthermore, existing systems do not provide the capability to store, coordinate and otherwise communicate or manage the sending and receiving of messages or other items. Still further, existing systems do not have the capability to interface with other systems to physically send, receive and/or coordinate messages or other items in non-electronic fashion. Accordingly, there is a need for a system and method that addresses these and other shortcomings.

SUMMARY OF THE INVENTION

The current invention provides a secure messaging platform to send and receive messages, including message for delivery in the future. To this end, the current invention provides an improved and efficient manner in which a sender may communicate to his or her loved ones throughout the sender's life as well as after the sender's death. For example, the invention allows a sender to automatically send or have sent, messages, video books or other video materials, cards, gifts or other personal communications that preferably convey more effort and emotion than a short, impersonal e-mail or the like. The system of the current invention may also provide other communications and message-sending services such as providing documents at appropriate times, e.g., providing a will to the appropriate recipient's upon a sender's death.

In one aspect of the invention, the system may facilitate sending and/or receiving messages scheduled for delivery at a future date or time. This may include automatically sending and/or receiving messages at specified dates or times, or upon the occurrence of a particular event. For example, a message may be time-locked, until a certain date or event, at which time it becomes unlocked and is sent.

Messages may be sent via link(s), sent by e-mail, text message, mail, facsimile, telephone and/or other media or delivery methods that currently exist or that come into existence in the future. Messages may also include one or more gifts. Thus, the system may facilitate selecting, purchasing, storing and sending one or more gifts. In this aspect of the invention, holidays and other key dates that apply to most people may be stored in a database, along with information specific to a particular recipient, such as birthdays, anniversaries and/or other dates specific to that recipient.

In another aspect, the system may facilitate a sender posthumously sending wishes to one or more recipients. In one form, the sender may create wishes while he or she is alive in different media, e.g., writings, pictures, videos, audio recordings and/or combinations of the foregoing or other media. The time-locked nature of the system may then provide for the created wishes to be automatically sent on the scheduled dates throughout the recipients' lives.

In another aspect, the system may be advised of changes in a recipient's circumstances so that wishes which are no longer appropriate or desired would not be automatically sent. For example, the system may be informed of a recipient's death and information stored by the system may be changed accordingly. To this end, a "report deceased user" link appearing on a user interface may be used to lead a user to a "contact us" form. The contact form may include a subject field drop-down menu with options, including to select "report deceased user" value. Upon selection, the form may dynamically show the following fields for a user to fill out, e.g., deceased user e-mail, active user's e-mail, active user's phone number, etc. The system may include one or more database(s) to intake information on changes in circumstances so that its output of automatic messages would be likewise modified, or changed, for example, from a birthday greeting to a condolence card.

In another aspect, the system may provide the benefits of a recipient receiving messages and/or gifts as discussed above. This may include, for example, receiving one or more messages from a loved one throughout the recipient's lifetime, whether the sender is alive to enjoy the recipient's delight or lives only in the recipient's memories.

In another aspect, the system and method may be computer implemented, and includes the infrastructure for the system's operation. To this end, the system may reside on one or more servers and/or other platforms. The system infrastructure may also include databases that store desired information which may be retrieved by appropriate software at appropriate times during operation of the system. The system includes appropriate software to store, lookup and provide information in order to send or receive messages and other items. The system may also be accessed by graphical user interfaces (GUIs), pages or screens, via a website and/or mobile application. The infrastructure of the system may also be connected with other physical systems that provide physical results. For example, if the message to be sent includes a gift, the system of the current invention may interface with a store providing the gift so that the gift can be purchased, and may also interface with the delivery company to arrange delivery to the recipient.

In a preferred embodiment, a series of GUIs, pages or screens may be displayed to a user (for example, a message sender and/or recipient), to facilitate the use of the system and various components thereof. For example, a series of GUIs may instruct a message sender through the steps of creating/editing, storing, scheduling and/or sending a message. The GUIs may also facilitate a message recipient receiving his or her messages. It is preferred that the GUIs include physical and visual aspects that make the GUIs user friendly and efficient in the manner in which information is collected from the user.

The GUIs may appear on different types of devices such as desktop or laptop computers, tablets or smartphones. The current invention may be configured for use through a website or through an app.

BRIEF DESCRIPTION OF THE DRAWINGS

The following detailed description of the preferred embodiments may be better understood with references to the accompanying drawings, wherein:

FIGS. 2-6 show graphical user interfaces reflecting the manner in which a user may create a new account or log in.

FIGS. 62A-G show graphical user interfaces which may be accessed by the user to create a message in the form of a video book.

FIGS. 63A-B shows a depiction of a video book that may be created in accordance with a system as shown in FIGS. 61A-B.

FIGS. 67A-E show graphical user interfaces which may be accessed by the system administrator to facilitate the creation of a message in the form of a video book in accordance with the system shown in FIGS. 61A-B.

DETAILED DESCRIPTION OF THE PREFERRED EMBODIMENTS

In general, the invention includes a system and method by which a sender may communicate "wishes" (e.g., messages, gifts and/or other items) to one or more recipient(s), for example, individuals in the sender's family, friends, loved ones, etc. The term "wishes" is not limited to the foregoing example, but instead includes any type of communication that may be shared between individuals. It should also be noted, however, that the current invention is not limited to simply messages or wishes that may be emotional or personal in nature. Alternatively, the system may also be used to provide legal documents and other items. As such, the term "message" and "wish" may include such items. The terms wishes, messages and other terms for other types of communications are used interchangeably herein.

As used herein, "wishes" may include messages conveyed in any media, including for example, e-mail messages, e-cards, electronic documents, printed cards, letters, and/or documents, audio and/or audiovisual recordings, pictures, images, animations, videos, and the like in both electronic or physical form, and combinations thereof. Gifts may include any suitable gift. For example, a gift may include a gift card or gift certificate, such as a prepaid stored-value money card issued, for example, by a retailer or bank, which may be used as an alternative to cash. As another example, a gift may include a novelty item, a book, e.g., picture book, or other physical item.

The system may be used to automatically send messages throughout the sender's or recipients' lifetimes, whether the sender is still living or has passed away. Likewise, the invention includes a system and method for receiving such wishes at a future date, whether or not the sender is still living at the time.

The system of the invention also includes various databases, servers, connections and/or other infrastructure hardware to provide the appropriate platform from which to send messages and wishes. The system of the invention also includes software to provide the functionality of the invention, including the control of database calls and the flow, storage and control of data.

Figure 1:
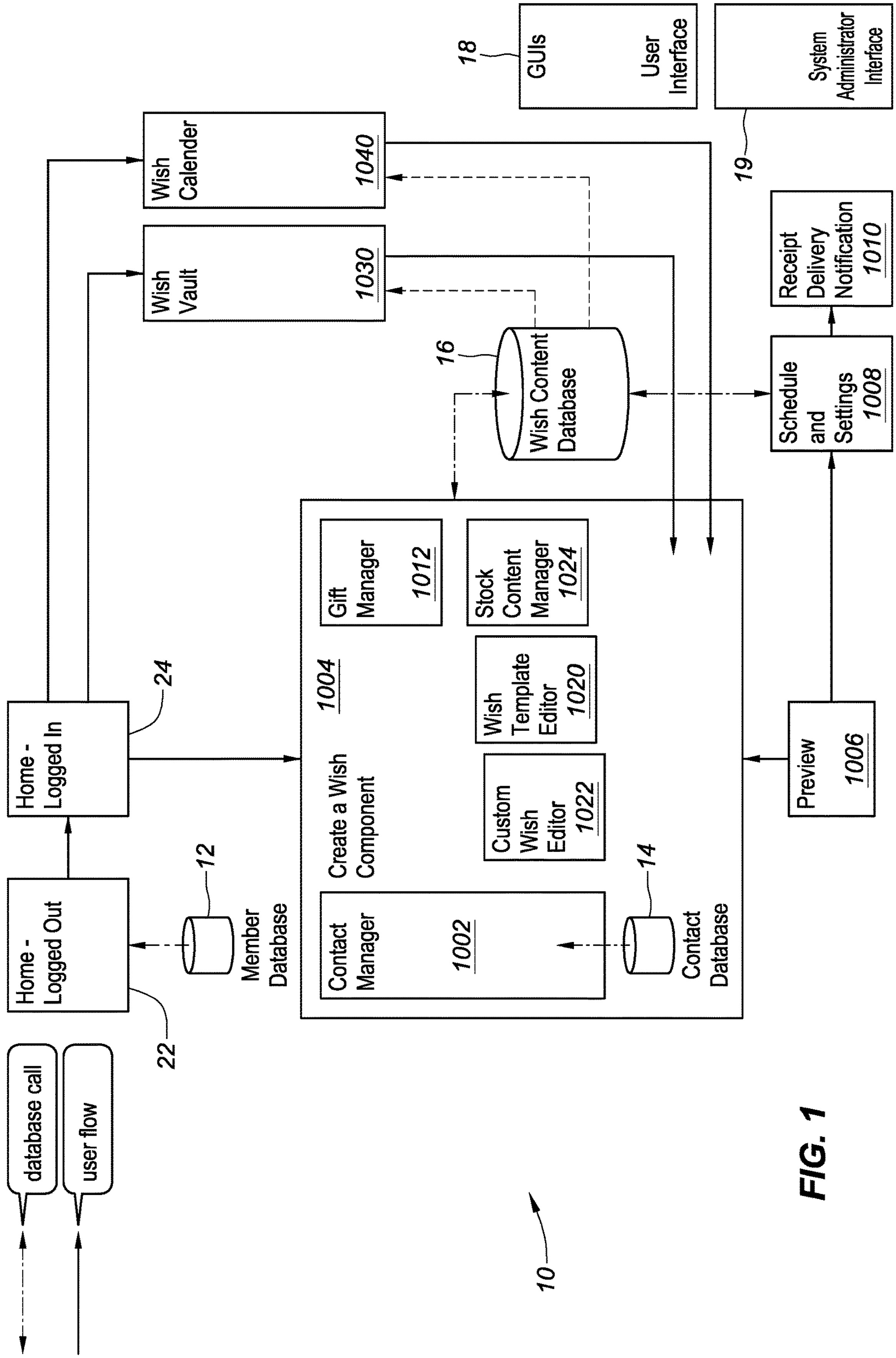
FIG. 1 shows a system diagram showing the various components or modules of the system, as well as illustrating a flow of data in a system. The embodiment shown in FIG. 1 may be suitable for use through a website.
Figure 2:
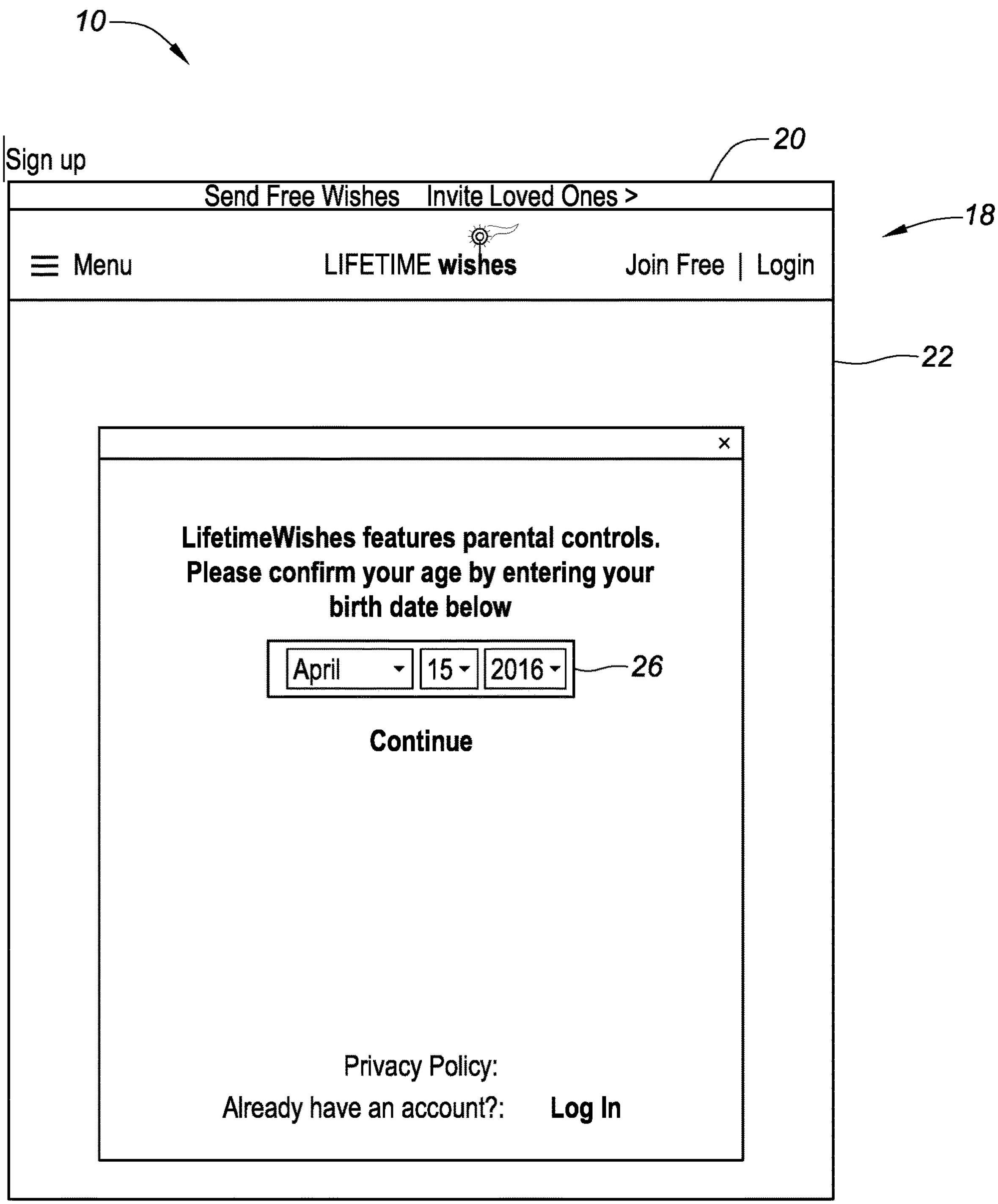

The present system and method are now described with reference to the figures, which represent examples and are not intended to be limiting. FIG. 1 is a system diagram illustrating the infrastructure of the system 10, as well as the storage and flow of data, according to a preferred embodiment. The diagram shown in FIG. 1 may reflect a website or other online platform.

As shown, system 10 may include member database 12, contact database 14 and wish content database 16. These databases may comprise relational databases or other suitable storage components. System 10 may also be accessed through user interface 18 which may comprise a series of GUIs as discussed herein. System 10 may also be accessed system administrator interface 19, which may comprise other GUIs to perform internal functions.

System 10 may also include other infrastructure hardware and software components or modules such as contact manager 1002, create a wish module or component 1004, custom wish editor, which may in turn operate with preview module 1006, schedule and settings module 1008 (which may in turn operate with gift manager 1012) and receipt delivery notification module 1010. System 10 may also include wish template editor 1020, custom wish editor 1022 and stock content manager 1024. System 10 may also include wish vault 1030 and wish calendar 1040. In FIG. 1, the dashed lines represent data going to or coming from a database, i.e., database calls, for a particular component to operate. The solid lines represent the path a user follows while using application. As shown, database calls may occur between the databases and other items shown in FIG. 1. The operation and functionality of the foregoing components and modules are further discussed below in connection with their associated GUIs.

As shown in FIG. 1, system 10 may be configured so that create a wish component 1004 includes contact manager 1002, contact database 14, gift manager 1012, wish template editor 1020, custom wish editor 1022 and stock content manager 1024. Alternatively, component or module 1004 may include fewer or additional items than those shown in FIG. 1.

System 10 may alternatively include other or additional databases, components and/or modules that may operate with each other. This may include, for example, a lead database, a template database, a wish story database, a products and offers database, a website content database, a settings manager, an account manager, an admin panel, a payment processing page, a wish calendar manager, a gift card manager, an interactive wisdom component, an interactive magic fate ball component and the like. Database calls other than those shown in FIG. 1 may also occur.

In a preferred embodiment, user interface 18 may include a series of graphical user interfaces (GUIs), such as those shown in FIGS. 2-52, arranged, for example, in a hierarchical format so that a particular aspect of sending or receiving a message may be completed before moving to the next aspect. Each GUI may be supported by and operate with certain modules and/or components in FIG. 1.

Each GUI may include a number of data fields for entering data information. They may also include a number of menus, tabs, buttons, boxes, links and the like, that a user may highlight, select, click and/or use to enter information, and to access a menu or submenu, perform a function and/or navigate forward or backward between the GUIs. The GUIs of user interface 18 may be configured to operate on a computer, tablet, smartphone or other device.

System administrator interface 19 may also include GUIs and the ability to generate reports regarding the user of system 10. Such reports may provide business analytics as described later in more detail.

The manner in which a user may access system 10 create an account and manage user information is now further described. Beyond the description below, this aspect of system 10 is further described in Section 1 of Appendix A.

A user may first access system 10 via one or more home page(s) 20. Home page(s) 20 may reflect the GUIs shown as logged-out home pages 22 (shown in FIGS. 2-5) and logged-in home page 24 (shown in FIG. 6). As their names imply, logged-out home pages 22 may be used for a user to log in to system 10, or to create a user account or initially register with system 10; while logged-in home page 24 may appear after the user has registered with and logged into system 10. Other GUIs and means may be used to register with and access system 10. As shown in FIG. 1, data may be sent to member database 12 when creating an account, and may be retrieved by a database call when an existing user logs in.

Logged-out home page 22 may include age gate 26 that may control the individuals who access system 10 and that may also provide compliance with COPPA or other regulations which protect children's online privacy. Age gate 26 may require a user to enter his or her birthdate in a birthdate field to continue, and may require that the user be at least a certain age to access system 10. For example, to comply with COPPA, age gate 26 may require a user to be at least 13 years of age to access the system 10 and start a session. When age information is entered via age gate 26, this data may be compared to data stored in system 10 to determine if the entered age data complies with the COPPA or other stored data. To this end, the stored COPPA or other qualifying data may be changed to reflect changes in regulations. System 10 may use cookies or other suitable means to prevent a user from navigating backward in system 10 during the same session to enter a different birthdate.

If the birthdate entered indicates that the user is a child or is otherwise younger than the required age, system 10 may display a page requesting the child to enter an e-mail address for the child's parent or guardian. System 10 may then e-mail the parent or guardian inviting them to create a child account on the child's behalf. Such child accounts may limit the manner in which the child user may use system 10, and may also allow parental supervision. After the child user enters the parent or guardian e-mail address, system 10 may display a confirmation page indicating that an e-mail will be and/or has been sent to the parent or guardian. Alternatively, system 10 may display an error page if the e-mail was not sent, for example, if the child entered the parent or guardian's e-mail address incorrectly.

Figure 3:
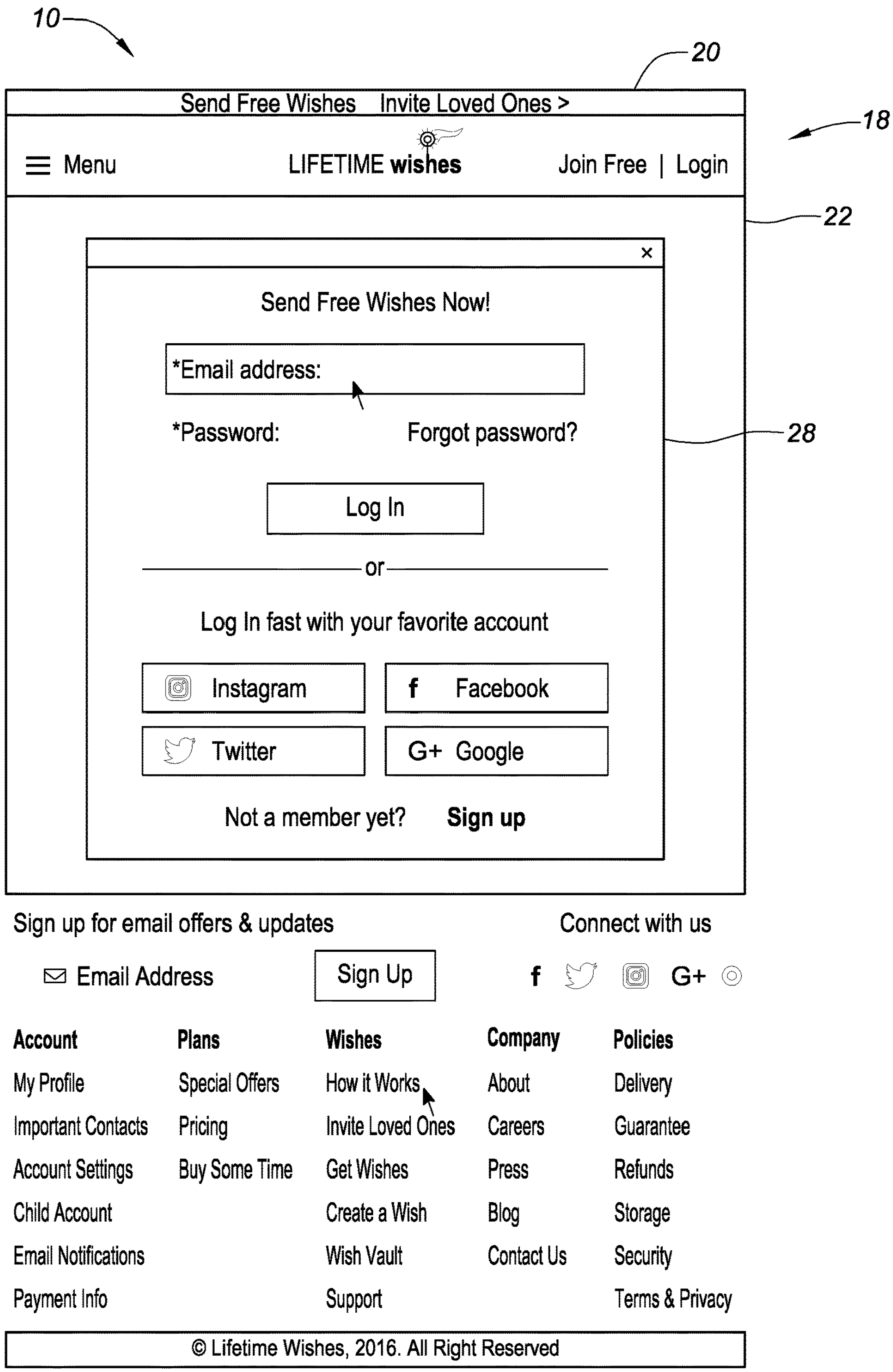
Figure 4:
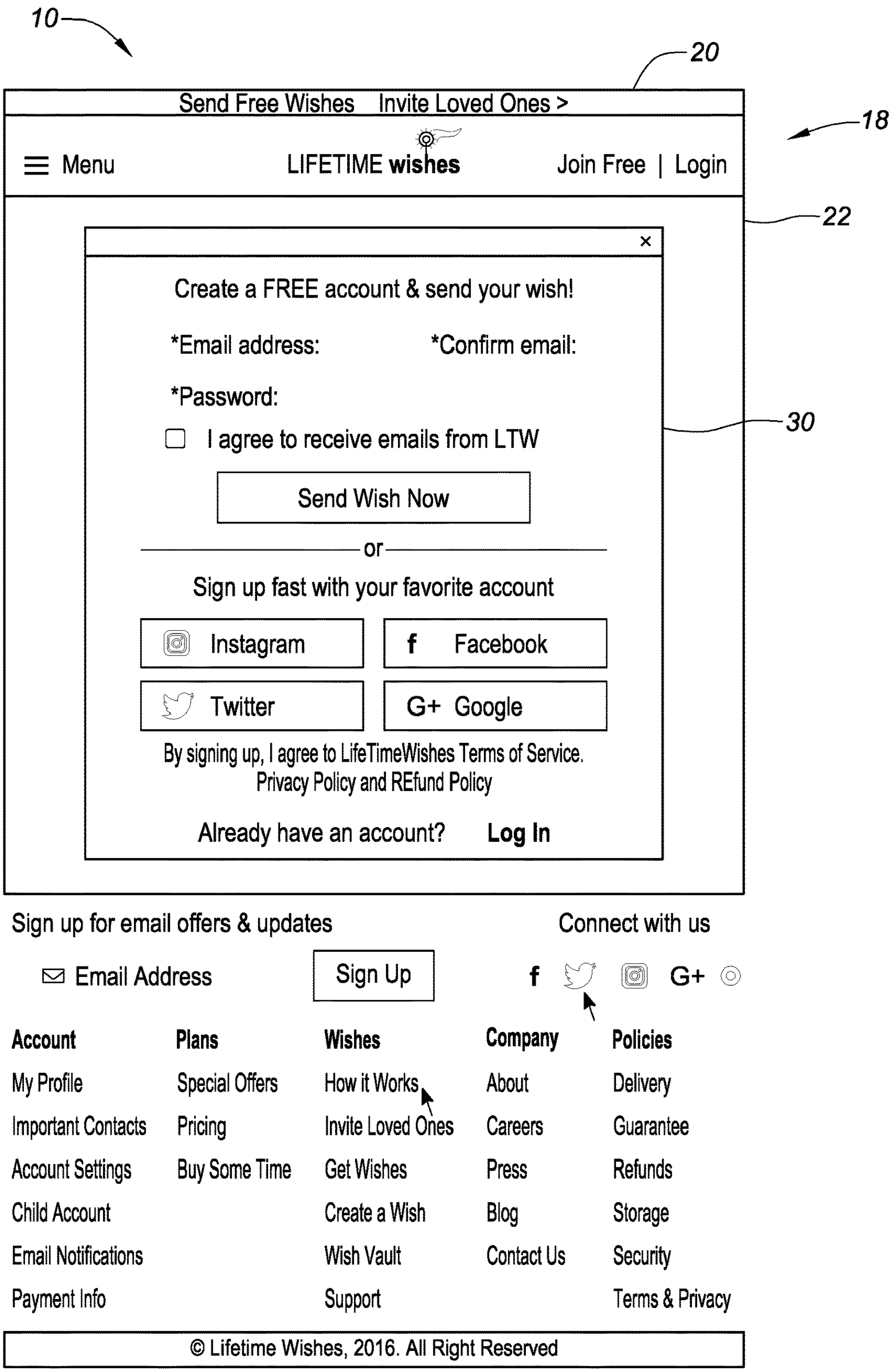

If the entered birthdate indicates that the user is over the required age, system 10 may permit the user to perform one or more of the following actions: create a new user account, i.e., become a registered member as shown in FIG. 4, log in to an existing user account as shown in FIG. 3, or share site information. These types of functions may occur in connection with data being provided by the user and stored in member database 12 as shown in FIG. 1. Similarly, database calls may be performed to retrieve data stored in database 12.

For registered users, the logged-out home page 22 may include "log in" box 28, in which the user may enter one or more identifiers, e.g., user name, e-mail address, password, etc. Alternatively, the user may log in via one of the user's other existing accounts, such as social media accounts, e-mail accounts and the like to log in and proceed to logged-in home page 24 of FIG. 6.

For new or unregistered users, logged-out home page 22 may also include a create account box 30 as shown in FIG. 4, which allows the new user to create an account by entering one or more user identifier data items in one or more user data fields. Alternatively, the new user may sign up through one of the user's existing accounts, such as social media accounts, e-mail accounts and the like. The create account box 30 may also allow a user to add a child account (i.e., create a child account on a child's behalf) by entering certain child identifier data items.

The user data items and/or child data items entered into the log in box 28 and/or the create account box 30 may be stored and/or retrieved from the member database 12, e.g., through database calls. This information may be used by users when creating or receiving messages, and may also be used by the system administrator to generate reports, e.g., showing the demographics of the users for business or marketing purposes.

This logged-out page 22 may include one or more disclaimer statements indicating that by creating a user account the user agrees to terms of service, a privacy policy, a refund policy and the like. Links to each policy may also be provided, and to complete the account creation process, the user may be required to click on each link, read the contents provided, and click an "I Agree" button after having read the pertinent terms and conditions for accessing and using system 10. The date and time when the new user agreed to any terms or conditions may also be stored by the system 10.

Figure 5:
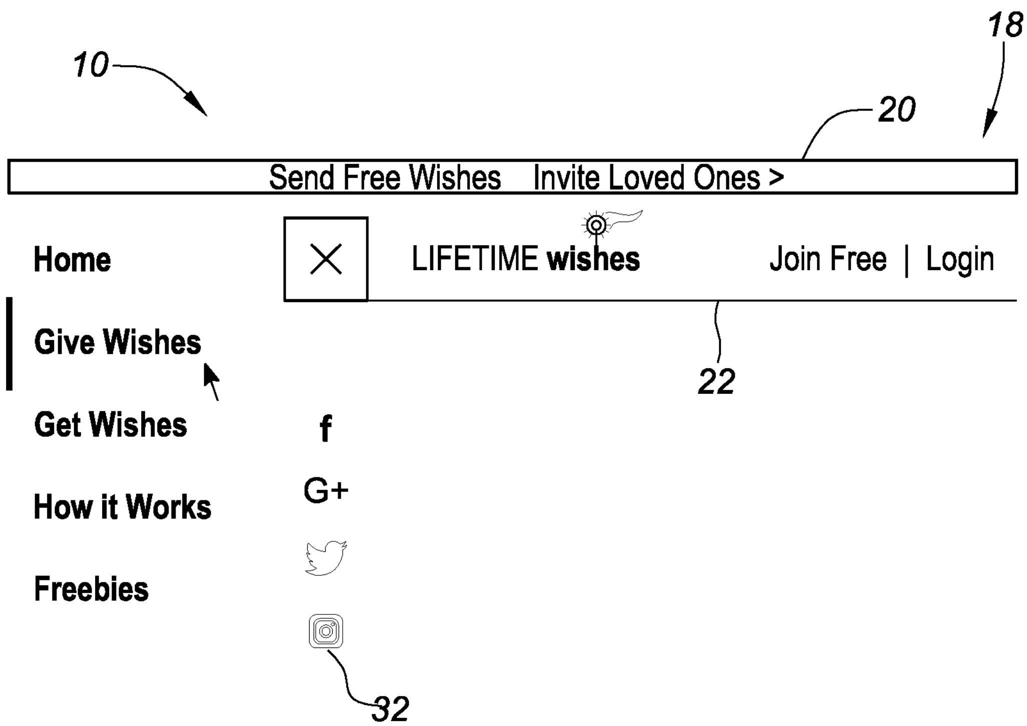

The logged-out home page 20 may include a home menu 32 as shown in FIG. 5, which may provide links to various aspects or components of the system 10. For example, home menu 32 may include links to the home page, to give wishes, to get wishes, to a how it works section and to a freebies section. Other links may be provided. The links in home menu 32 may take the user directly to the selected component upon log in, or, if the component/page requires an account for access, may redirect the user to log in to his or her account or create an account. The foregoing may occur through database calls and the flow of data as shown, for example, in FIG. 1.

As shown in FIGS. 3-4, the logged-out home pages 20 may also include a number of links for additional categories of information. The categories may include, for example, Account, Plan, Wishes, Company and Policies. The Account links may in turn include, the user's profile, contacts, plan, child accounts, e-mail notifications, payments, orders, linked social media accounts, passwords and the like. The Plan links may include links to special offers, plan pricing and the like. The Wishes links may include create a wish, how it works, invite others, wish vault, support and FAQ. The Company links may include about, careers, press, blog and contact us. The Policies links may include delivery, guarantee, refunds, storage, security, terms and conditions, privacy policy and the like. The home page 20 may also include options to enter an e-mail address to receive special offers and updates and/or to connect via social media accounts. The links may take the user directly to the selected component, or, if the component requires an account for access, may redirect the user to log in to his or her account or create an account.

Figure 6:
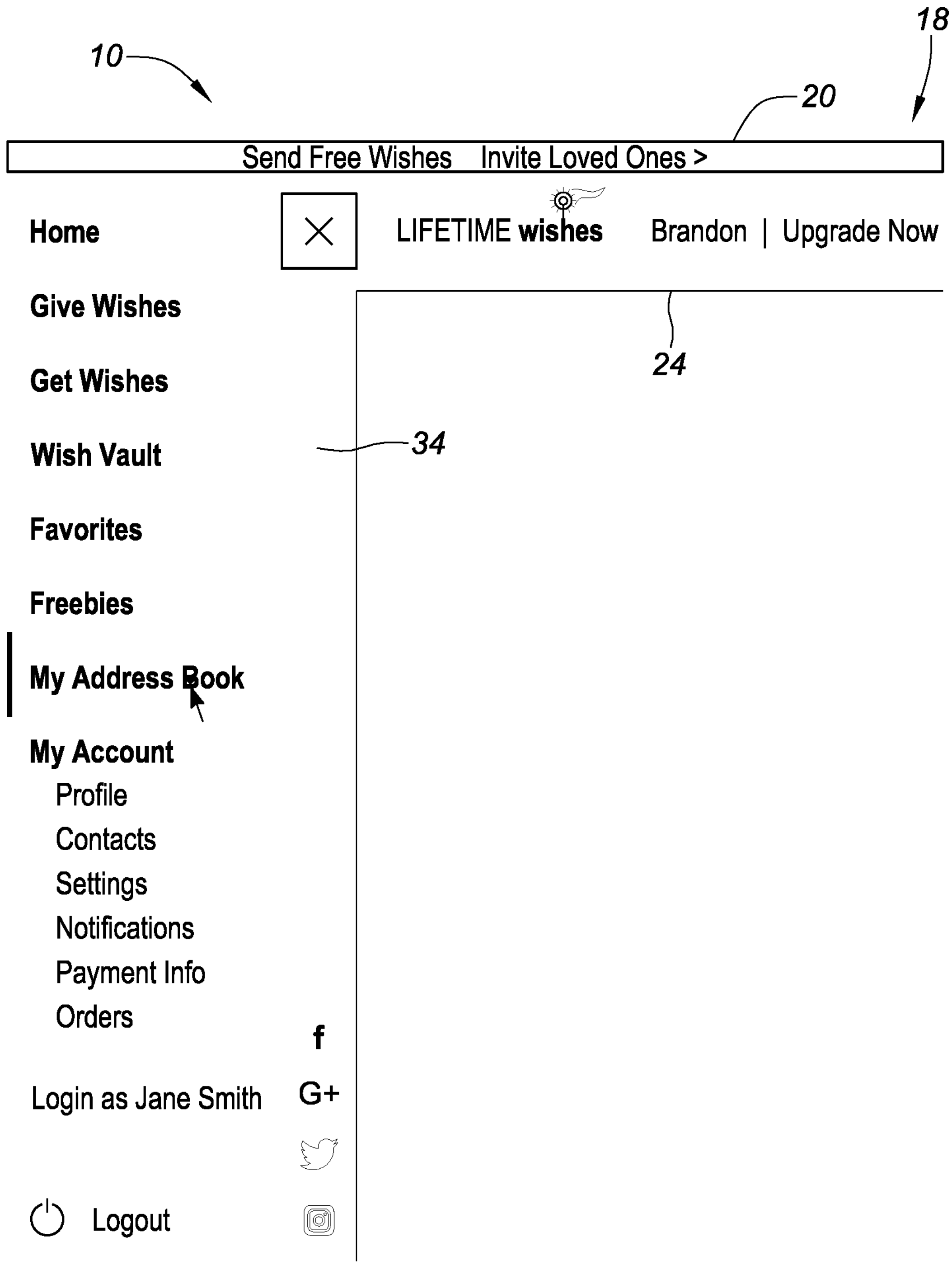

Upon creating a user account and/or logging in to an existing user account, system 10 may display the logged-in home page 24 as shown in FIG. 6. Though not shown in FIG. 6, the logged-in home page 24 may include content such as a welcome, one or more wish list dashboard(s), logo(s), a public wish newsfeed, a testimonials newsfeed, a blog newsfeed, special offers, user name and picture, wish message notifications and the like.

As illustrated in FIG. 6, the logged-in home page 24, as well as the other pages described herein, preferably include a navigation menu 34 with links to access various components and/or pages of the system 10. By clicking on one of the links, the user may access and/or retrieve information from one or more of the member database 12, the contact database 14, and the wish content database 16, and access the pertinent module or component in FIG. 1, in order to, for example, give wishes.

The navigation menu 34 may include the following tabs and/or or links: home, Give Wishes (i.e., create a wish or message), Get Wishes (i.e., receive messages or wishes), Wish Vault, Favorites, Freebies, My (user) Address Book, My (user) Account, Log in as an alternate user, Logout. Navigation menu 34 may also include links to other aspects of system 10. Logged-in page 24 may also includes links to Send Free Wishes and Invite Loved Ones, as well as an Upgrade Now link that may change the access and level of service available to the user. These links may be used for appropriate database calls and/or to control the data flow as shown in FIG. 1.

One or more of the links in navigation menu 34 may also include a submenu, such as a drop down menu with links to additional features. For example, as shown in FIG. 6, the My (user) Account tab may include a drop down submenu with links to the user profile, user contacts, user plan, user child account(s), e-mail notifications, payments, orders, social media, passwords and the like. These additional links may also involve database calls and data flow control as shown in FIG. 1.

Figure 53:
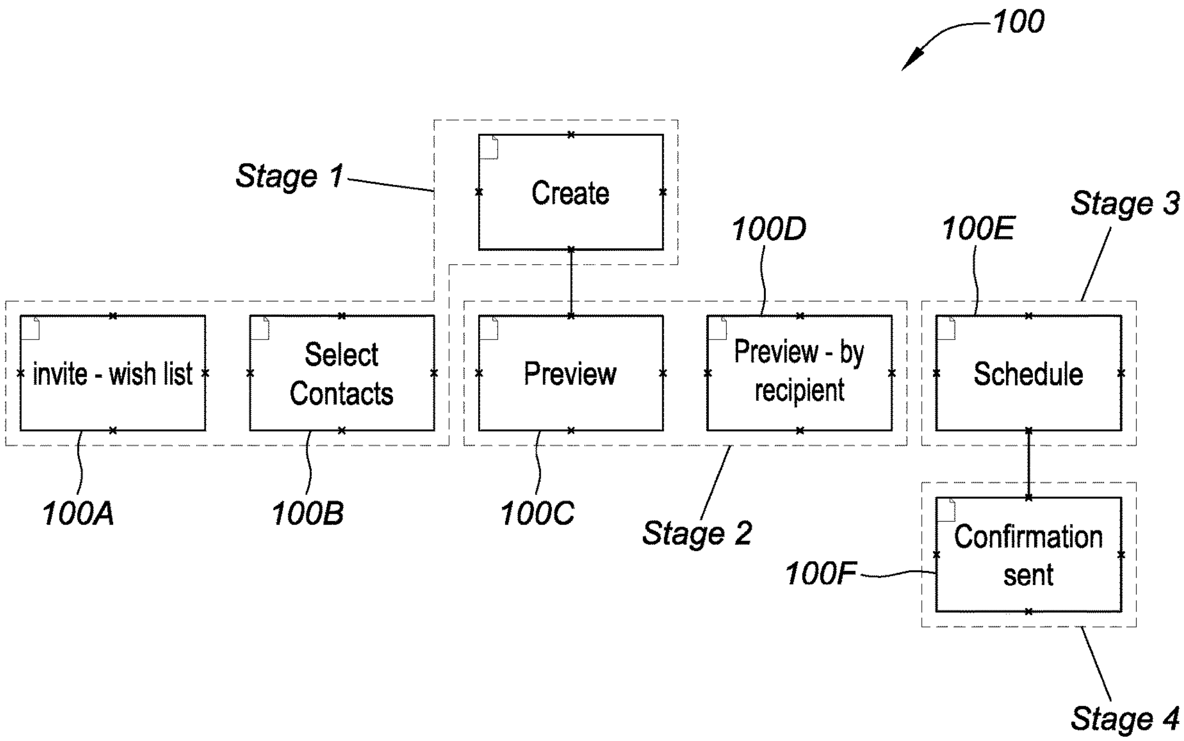
FIG. 53 shows a flowchart describing the message or wish creation process.

The manner in which a user may Give Wishes, or create a message or provide some other communication to one or more recipients, is now further described with reference to FIGS. 1, 7-38 and 53. FIG. 53 shows the overall process of message creation, scheduling and sending, while FIGS. 7-38 show GUIs that the user may access to perform this function. Beyond the description below, this aspect of system 10 is further described in Section 2 of Appendix A.

When a user selects Give Wishes from navigation menu 34, the user is taken to the create a wish module 1004 as shown in FIG. 1, so that he or she may perform the Give Wishes or message creation process. As shown, module 1004 may include contact manager 1002 and contact database 14, as well as wish template editor 1020, custom wish editor 1022 and stock content manager 1024 (and if desired gift manager 1012). As also shown, create a wish module 1004 may interface with preview module 1006, schedule and settings module 1008 and receipt delivery notification module 1010 during message creation. These components or modules may also interface with contact database 16 and wish content database 16 as shown.

Referring to FIG. 53, the overall messaging process 100 of creating, reviewing and sending a message, or wish, is now described. As shown, the message creation process 100 may include the following steps: invite-wish list 100A, select contacts 1006, preview 100C, preview-by recipient 100D, schedule 100E and confirmation sent 100F. The process of creating a message may include selecting content, editing and designing the wish, using a stock content application program interface (API), using wish templates and using other tools. Other steps may be used and the current invention is not limited to the above-listed steps. Message creation steps 100A-F may be performed by the user with the associated GUIs shown in FIGS. 7-38. These GUIs and the associated operation o system 10 are now further described.

As shown in the figures, the GUIs of message creation process 100 may allow a user to add/select wish recipients, view wish idea templates, record and/or upload pictures, videos, audio, search and select stock pictures, videos, audio, create and customize a wish content, preview a wish, save a wish to wish vault, schedule delivery and/or unlock date of a wish, add a gift, select collaborator and receiver permissions, select privacy and sharing settings, delete a wish and other steps.

To help the user gauge how far along he or she is in the overall messaging process 100, the GUIs discussed below may include a display highlighting the step being performed by the user. As shown in FIGS. 7-38, for example, the GUIs may include icons or other indications that the user is in the Create stage 1, the Preview stage 2, the Schedule stage 3 and the Send stage 4. It is preferred that the icon reflecting the stage of the process 100 in which the user is currently working is highlighted in relation to the other stages. This visual cue preferably increases efficiency and user satisfaction. The creation of a message or wish, the modules or components of system 10 that are involved with message creation and the associated GUIs of FIGS. 7-32 are now further described.

As detailed further below, the create a wish module or component 100 preferably allows the user to retrieve previously stored information and/or store new information in one or more of the member database 12, the contacts database 14, and/or the wish content database 16. In this manner, the stored information may be accessed when creating future wishes. For example, the data flow and database call may occur as shown in FIG. 1.

The system 10 may also evaluate the information stored by the users when creating wishes for analytics and marketing purposes. For example, the system 10 may prepare reports on the types of information stored by its users to identify trends regarding the manner in which the system 10 is being used. This information may be used by the system administrator to adjust aspects of system 10 to improve its performance and address user concerns. This information may also apprise the system administrator to the likes and dislikes of its users which may be used to direct marketing and advertising materials to the users of system 10. Such information may be accessed by system administrator interface 19 shown in FIG. 1.

Figure 7:
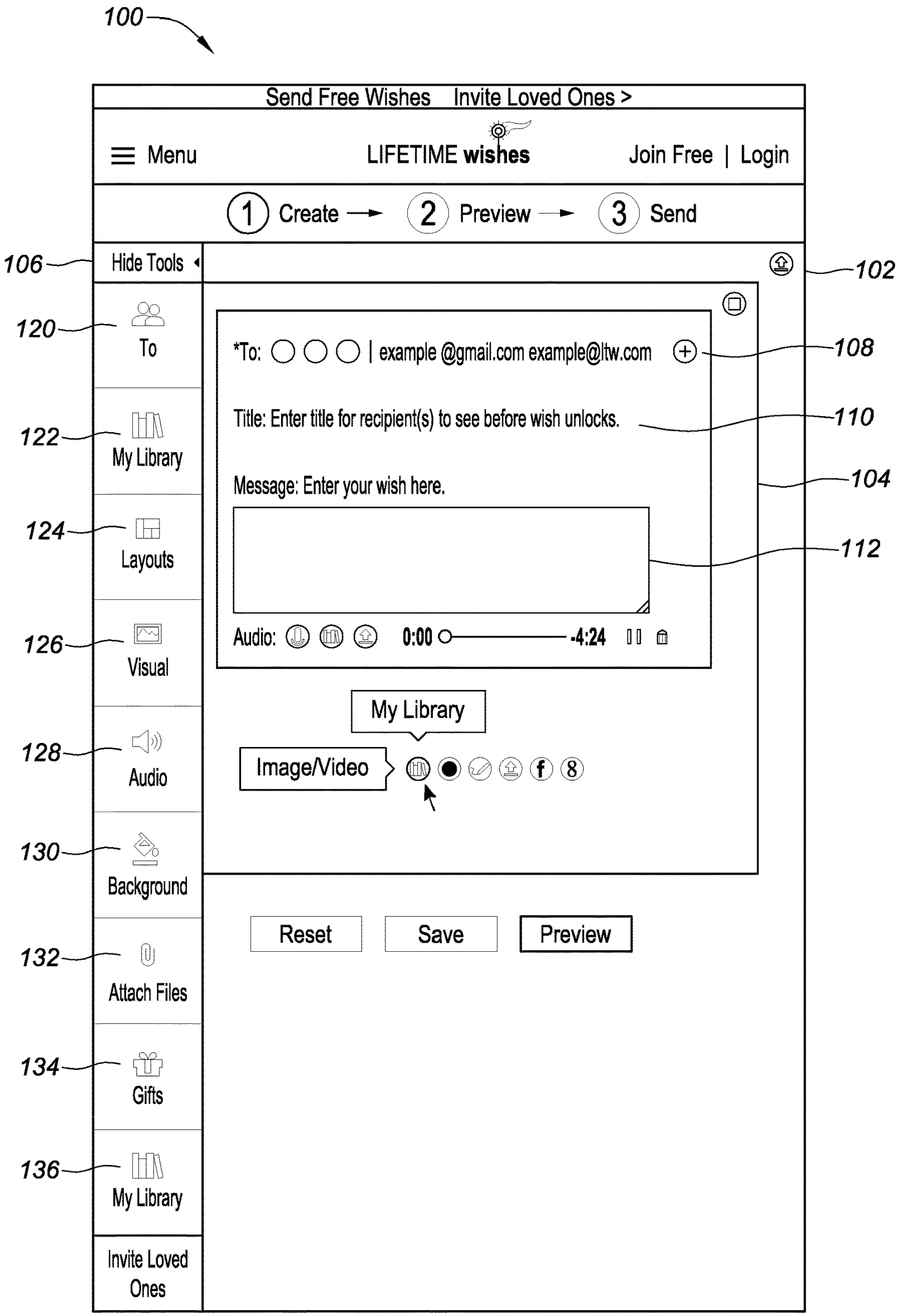
FIGS. 7-32 show graphical user interfaces which may be accessed by the user to create messages.
Figure 8:
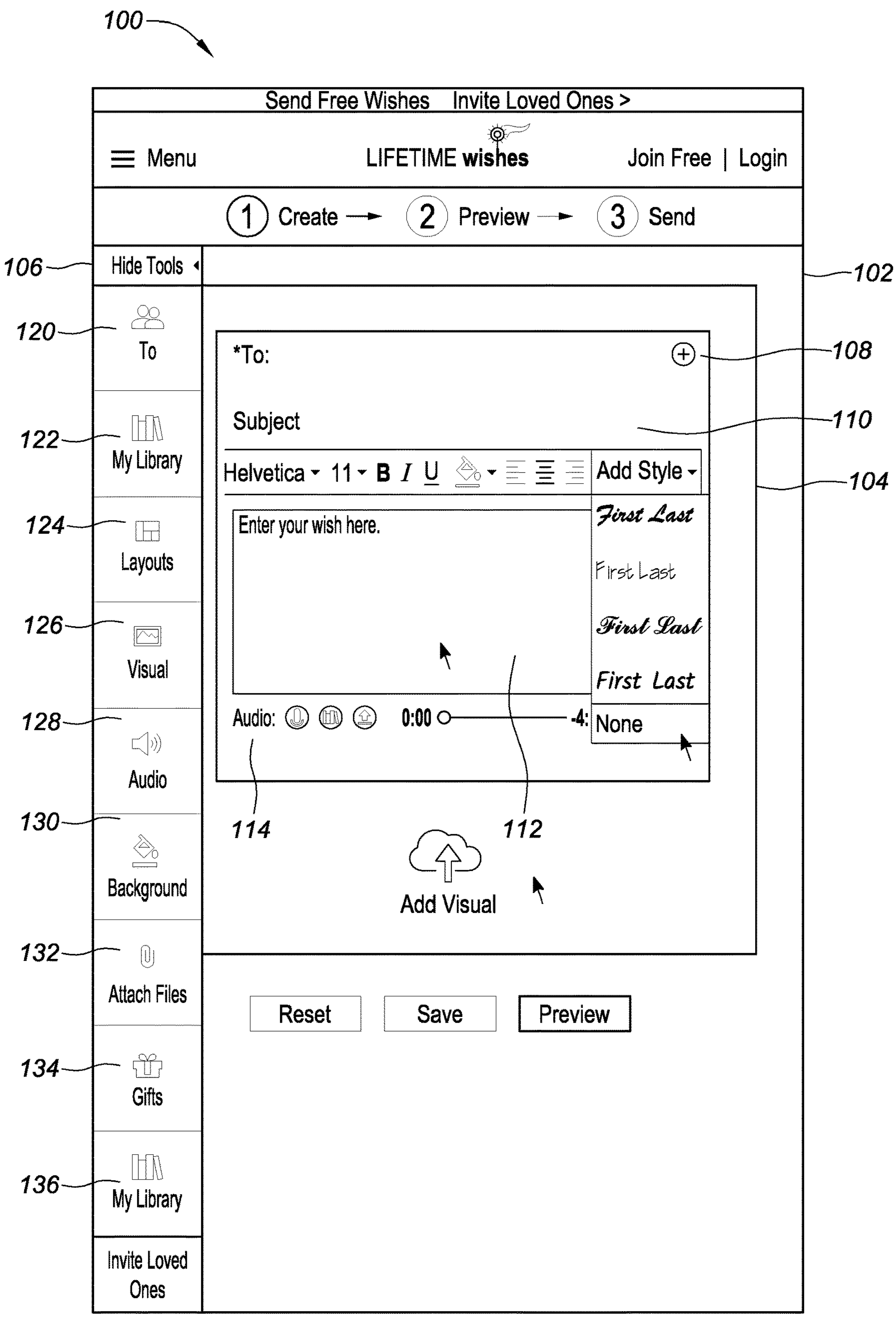

Referring again to the GUIs of message creation process 100, FIGS. 7-8 show a create a wish home page 102 through which the user may access various tools and features to create the wish. For example, the create a wish home page 102 may include a create a wish box 104 and a create a wish tool bar 106.

The create a wish box 104 may include one or more wish data fields in which the user may enter certain wish data items to create a wish. The create a wish box 104 may include, for example, a wish recipient data field 108, a wish subject or title data field 110 and a wish text data field 112. Other fields may also be available. The user may manually enter data items in the one or more data fields and/or may use one of the tools of the create a wish tool bar 106 to input data items in the one or more data fields.

For example, to add one or more recipient(s) to the wish, the user may enter one or more recipient e-mail addresses in wish recipient data field 108. Likewise, the user may enter a wish title or subject in wish title data field 110. The user may also type in the text of a message in wish text data field 108. The create a wish box 104 may also include a plurality of text style and size options to allow the user to customize the text of the message by selecting from various available fonts types, font sizes, paragraph formats and text styles.

The create a wish box 104 may also include an add audio field 114. The add audio field 114 may allow a user to record an audio message and attach the audio message directly to the wish. Alternatively, a prerecorded audio file may be attached to the wish. For example, prerecorded audio files may be stored in wish content database 16 and may be accessed by the user. Alternatively, system 10 may be connected to third party audio providers such as iTunes, which third party audio files may be provided to the user to attach to the message or wish.

Still referring to FIGS. 7-8, the create a wish home page 102 may also include a create a wish tool bar 106. Tool bar 106 may display various icons, each representing an additional tool or feature that the user may use to create and/or edit a wish. For example, tool bar 106 may include one or more of the following: contact manager icon 120, library icon 122, layout icon 124, add visual icon 126, add audio icon 128, add background icon 130, wish ideas icon 132, attach document(s) icon 134 and/or add gift icon 136. When an icon of tool bar 106 is selected, system 10 may display a submenu of additional related icons representing additional tools and features that the user may use to create and/or edit the wish.

Figure 9:
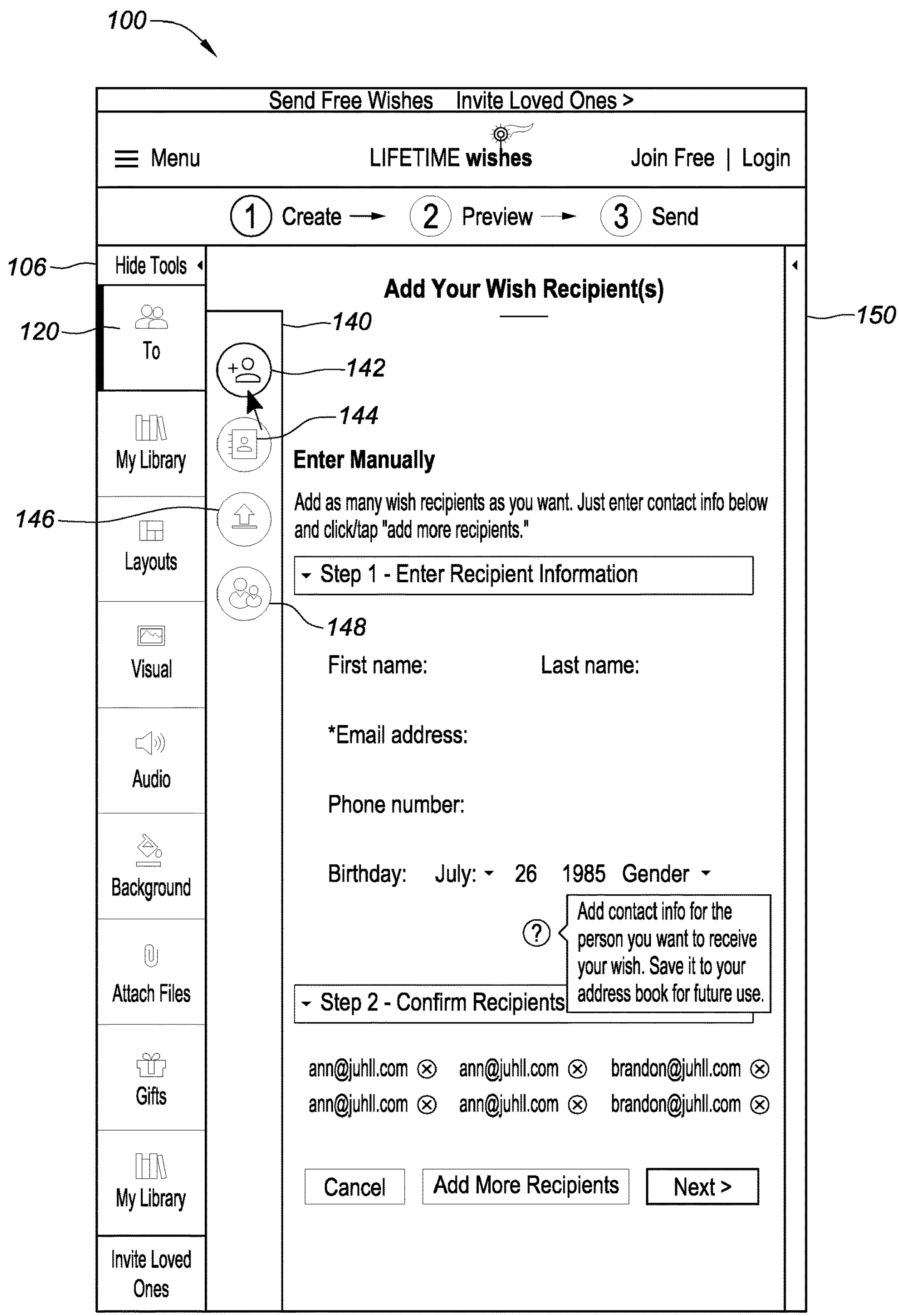

As shown in FIG. 9, for example, selecting contact manager icon 120 provides access to the contact manager submenu 140 provided by contact manager 1002 and contact database 14. With submenu 140, the user may perform one or more of the following actions: delete/edit contacts, manage contact groups, add life events to wish calendar, send e-mail invitation to join, add contacts manually, upload or import contacts (for example, from mobile apps, social apps, desktop apps, dependent contacts and the like), manage contact permissions (for example, legacy contacts, heir contacts, find me contacts, guardian contacts, dependent contacts, and the like), manage wish recipient groups (for example, family—immediate and/or extended, friends, custom, public), and/or select an existing contact from contact manager 1002.

Contact manager submenu 140 may also include one or more of the following icons representing various options: add contact(s) to user address book icon 142, access user address book icon 144, import contacts from another contact list icon 146, (such as an e-mail/webmail address book and/or social media address book), and add child account icon 148. When selecting any of these options, contact manager 1002 and contact database 14 may be accessed and/or updated as appropriate.

Figure 10:
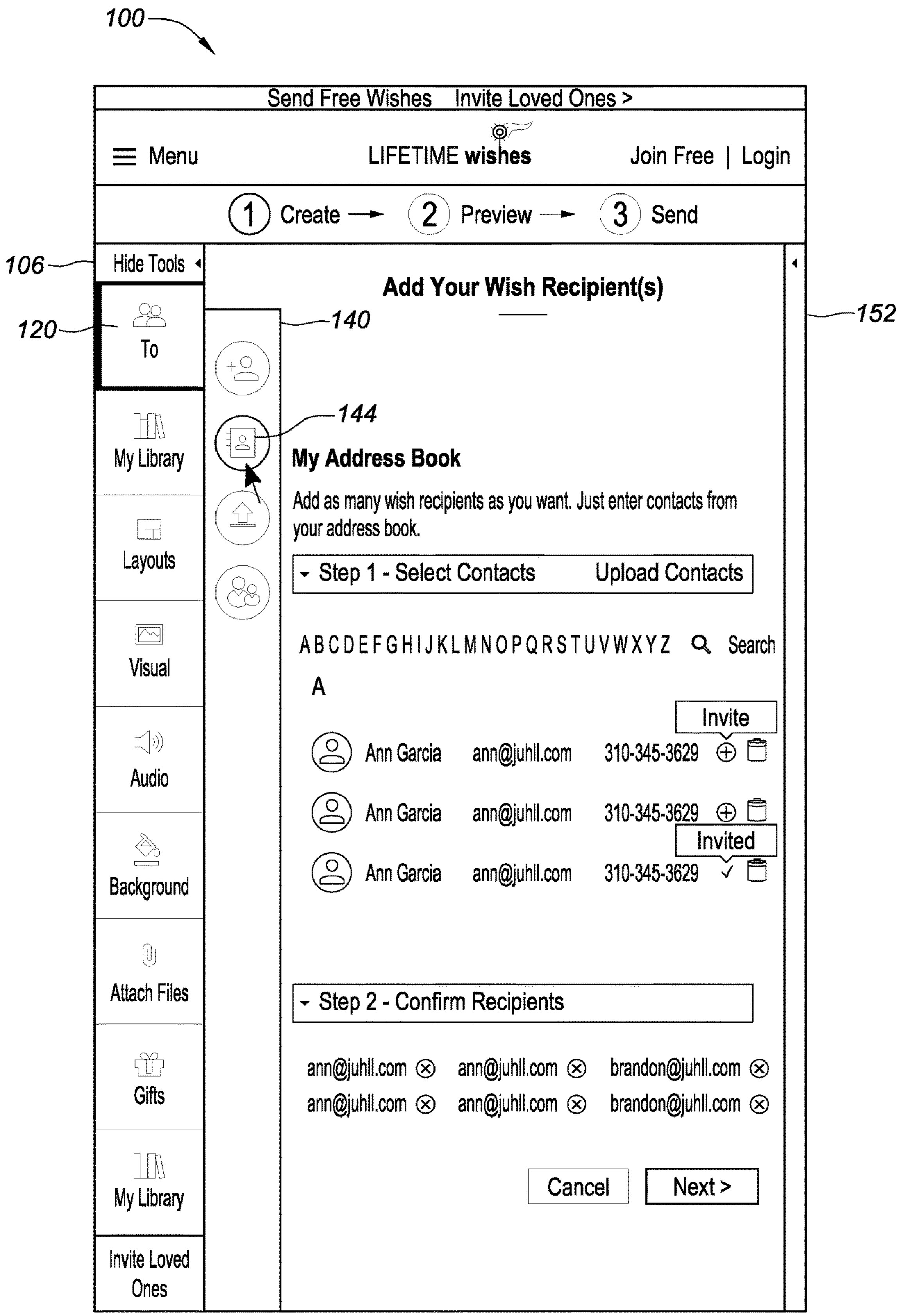

As shown in FIG. 9, the user may select the access user address book icon 142 and enter contacts to a user address book to be stored in contact database 14. As illustrated in FIG. 10, the user may also display a user address book page 152. From the user address book page 152, the user may select one or more wish recipient(s) from the user address book to add to the wish recipient data field 108.

Figure 11:
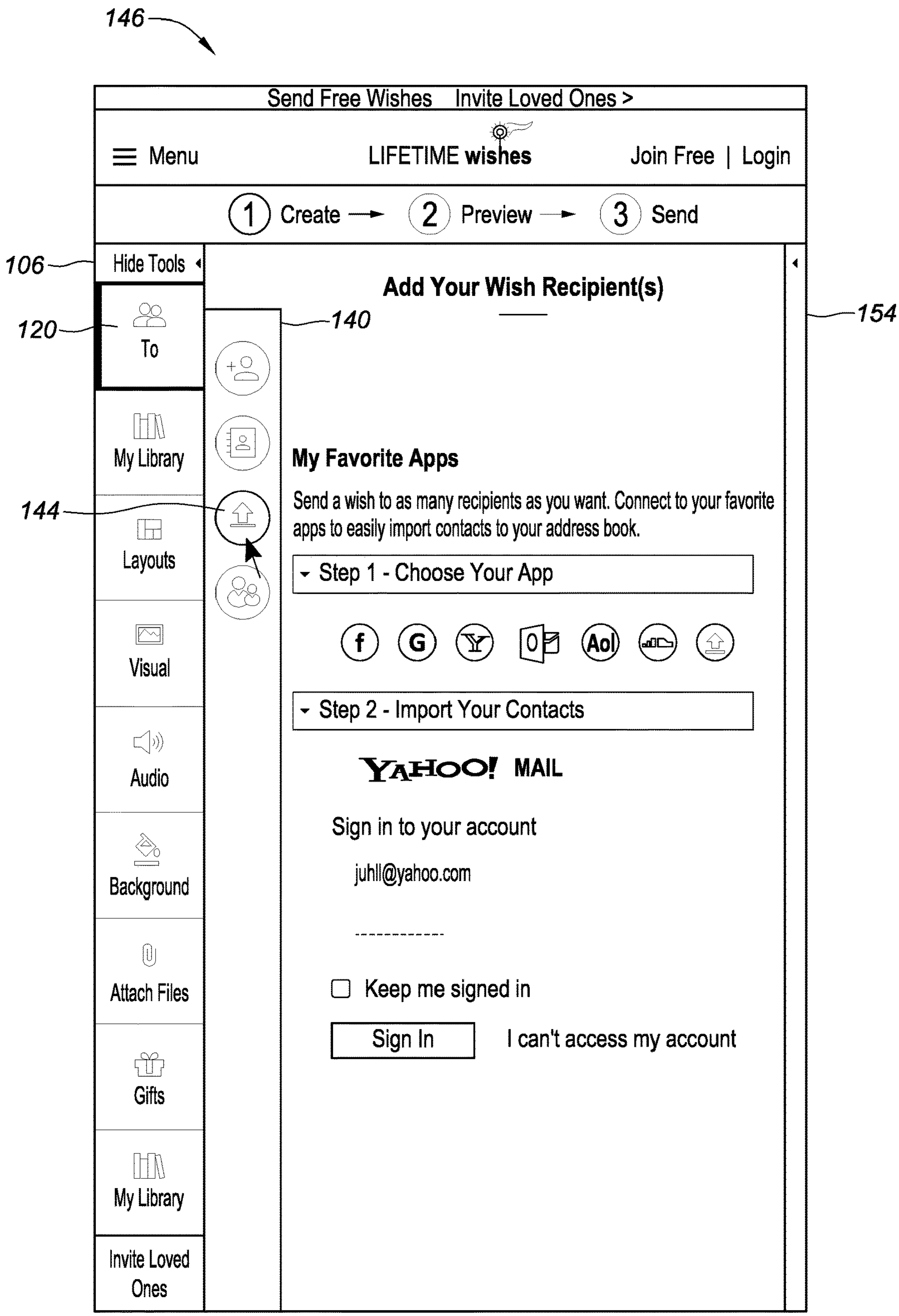

Alternatively, as shown in FIG. 11, the user may import contacts from the another contact list icon 146, which may cause the import contacts page 154 to be displayed. With the import contacts page 154, the user may import contacts from another contact application such as webmail and/or e-mail accounts, social media accounts, and the like, into the user's address book. Thereafter the user may select one or more imported contacts from the address book as wish recipients.

To this end, it is preferred that system 10 may interface with social media platforms that the user may already use. In this manner, contact and other information which the user has previously developed with other platforms may be imported and/or saved into system 10.

As noted previously, system 10 may allow a parent or guardian to create a child account. The manner in which a parent or guardian may create a child account is now discussed with reference to FIGS. 12A-12B. If the user selects the add a child account icon 146, the add child account page 156 may be displayed. With this GUI, the user may add an account on behalf of the user's child or other person for whom the user acts as guardian, so that the child or other person may receive wishes.

It is preferred that a child may send and receive wishes only while parent or other adult is logged in to both the parent and child accounts. While logged into a parent account, the parent may create a child account with a separate child e-mail. If the child does not have e-mail address, an e-mail address may be established during account creation. It is preferred that a child cannot log in to an account with only the child e-mail. To this end, system 10 may disable the password reset option for child e-mails. Instead, it is preferred that a child may send or receive wishes through the child account that is only accessible within the parent account.

To accomplish the foregoing, the parent may first log in to the parent account, then go to "my child accounts," then select a child, then click "login to child account." This will show the child's wish vault with a highly visible alert on top of the page, e.g., "you are logged into 'child's name' account." Click here to go back to your account.

If the user indicates that he/she is the child's parent or guardian, the add child account page 156 may allow the user to add an account by entering one or more child identifier data items in one or more child data fields. These may include the child's name, birthdate, gender and the like. The add a child page 156 may also contain a statement indicating that any wish notifications will be sent to the user as the child's parent or guardian.

Figure 12A:
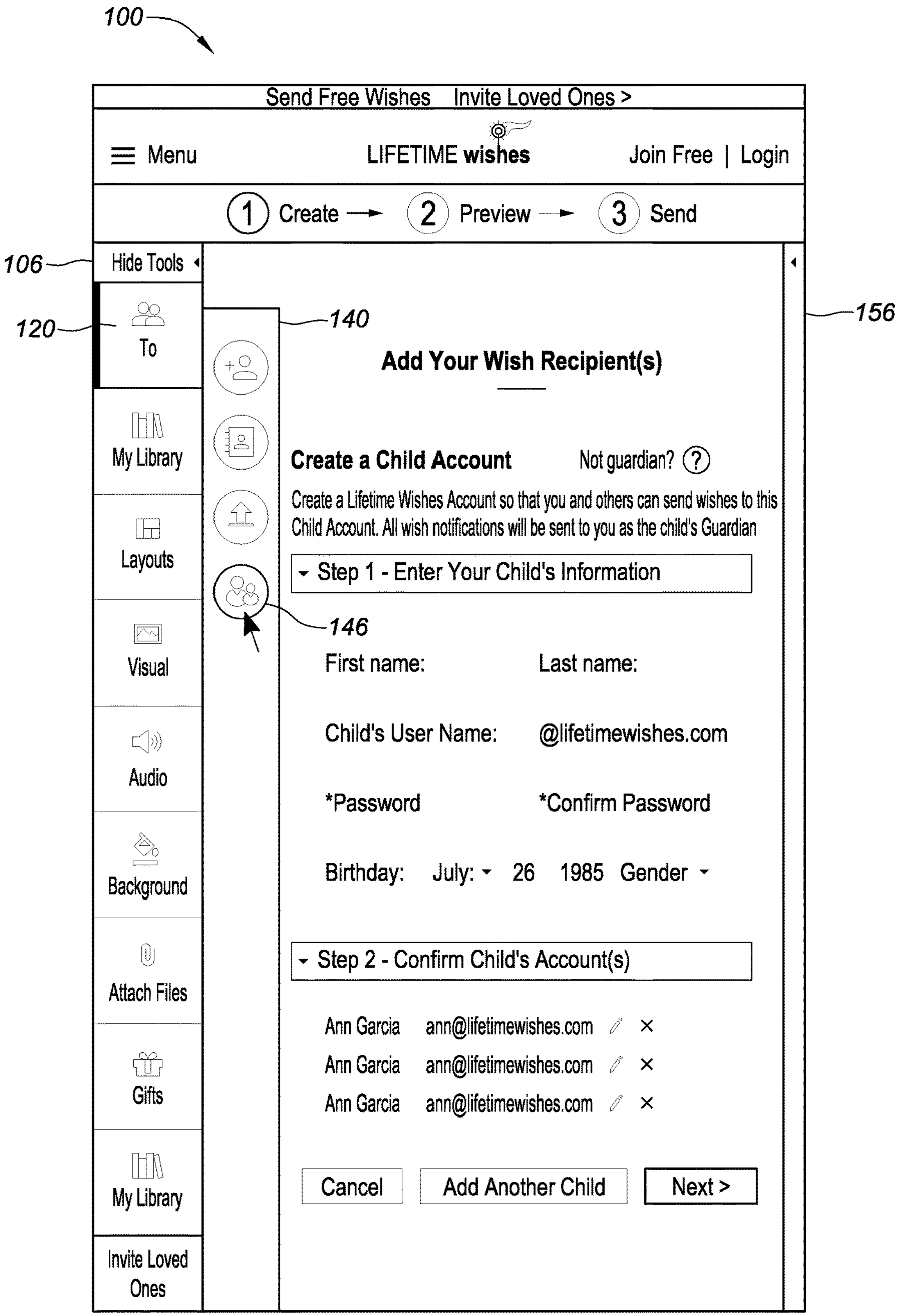
Figure 12B:
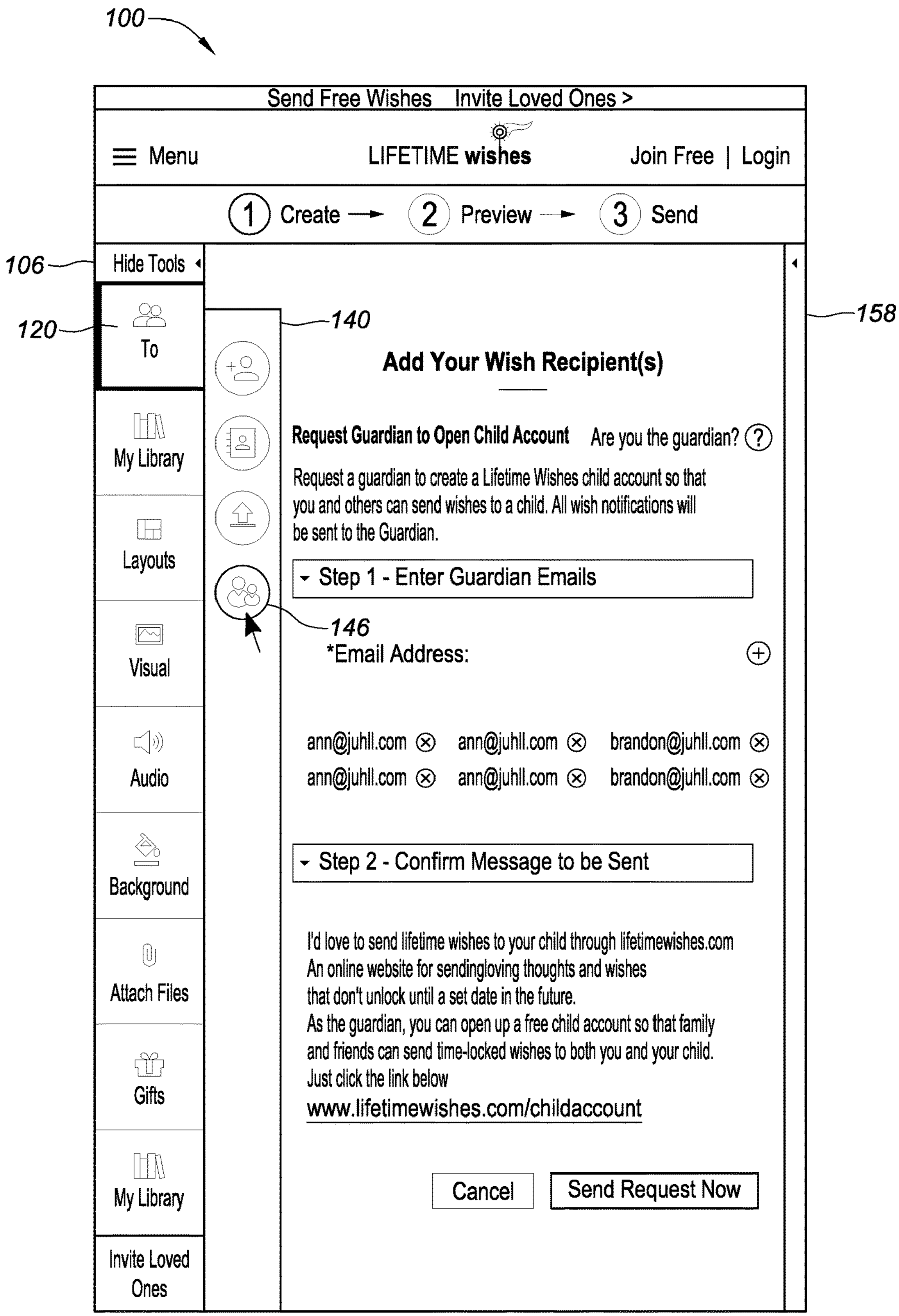

If the user is not the child's parent or guardian, the add a child account page 156 may also provide an option for the user to send a request to the parent or guardian, so that the parent or guardian may create a child account on the child's behalf. An exemplary request to guardian to open child account 158 is illustrated in FIG. 12B. As shown, the user may enter one or more parent/guardian e-mail addresses in the request to guardian to open child account page to initiate an e-mail message to the parent/guardian, requesting that the parent/guardian create an account on the child's behalf. The e-mail may include a link to the add a child account page 156 of system 10 to enable the parent/guardian to efficiently create an account on the child's behalf.

Upon entering an e-mail address for a child's parent or guardian, the add a child account component 156 may display a confirmation page indicating that an e-mail will be and/or has been sent to the parent/guardian. Alternatively, the system may display an error page if the e-mail was not sent for any reason, for example, if the parent/guardian's e-mail address was not entered correctly or was invalid.

After the wish or message recipient(s) have been identified, the user may then create the content of the wish. This may include choosing or preparing various aspects of the wish so that the message reflects the thought and desires of the sender. To this end, the user may, for example, choose templates, add textual, video or audio content, choose layouts, choose backgrounds, further personalize the wish, add documents, gifts or other items, coordinate the delivery of items and/or perform other functions.

Figure 13:
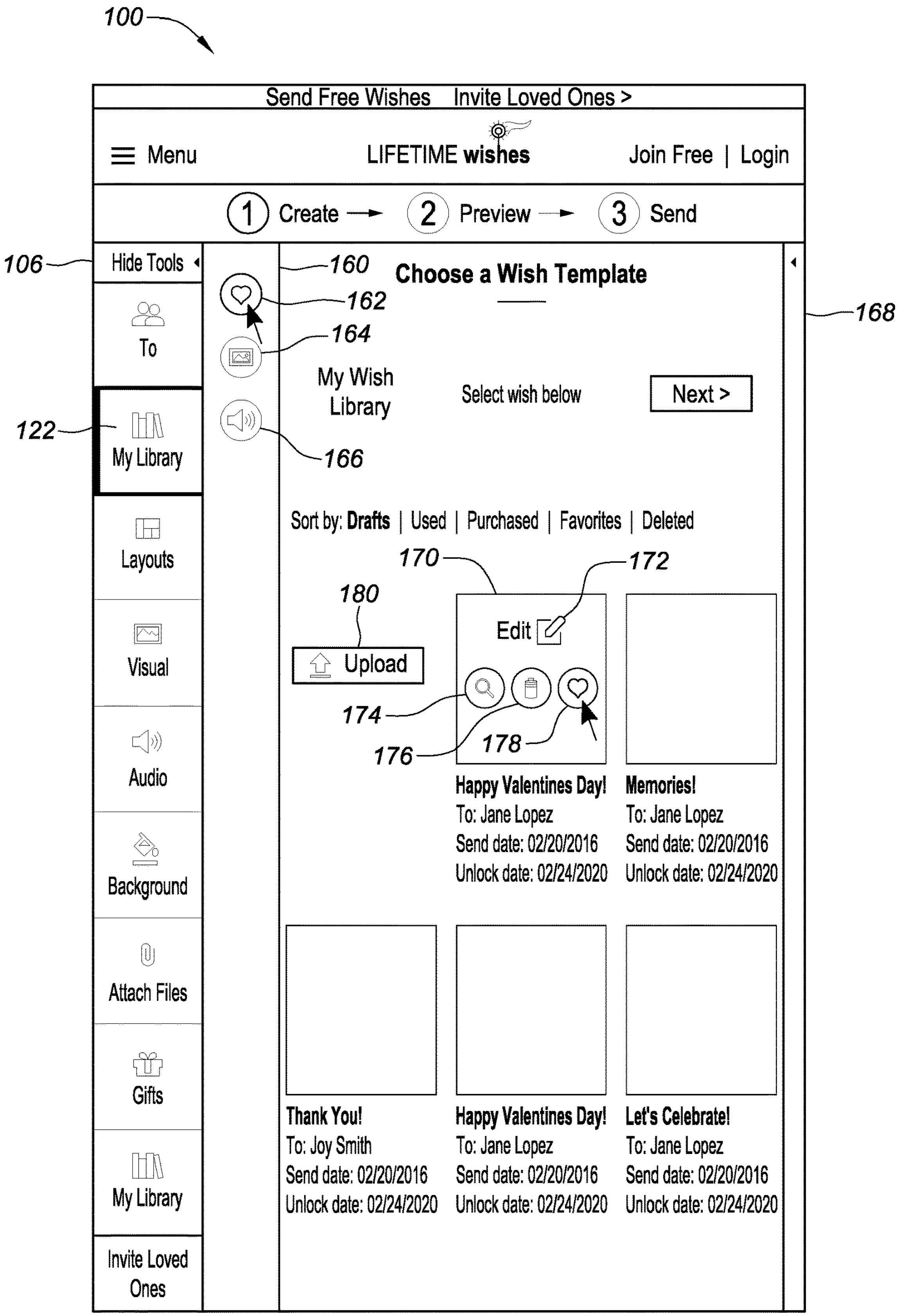

As an initial step in content creation, the user may choose a template for the wish. As illustrated in FIG. 13, highlighting or selecting the library icon 122 of the create a wish tool bar 106 may cause a library submenu 160 to be displayed. Library submenu 160 may include additional icons representing one or more of the following options: wish template editor 162, choose a visual 164 and add an audio 166.

By highlighting or selecting wish template editor 162 from the library submenu 160, the user may access various aspects or modules of system 10 as shown in FIG. 1, such as custom wish editor 1022, wish template editor 1020 and stock content manager 1024. As also shown in FIG. 1, these modules are connected to wish content database 16 in which various content materials may be stored. As such, the user has the choice to use stock content that may be provided by system 10, or to use his or her own customized content.

By choosing the wish template editor icon 162 shown in FIG. 13, the user may access wish template editor module 1020 (FIG. 1), which may allow the user to perform the following: sort and view wish message template options, for example, by design (i.e., wrappers), content (i.e., storybooks, thoughtful messages, online greeting cards, poems, quotes, interactive magic fate ball video app, interactive wisdom app and the like) and/or category (i.e., relationship type, special occasions, holidays, sender personality types and the like). The wish template editor module 1020 may also allow the user to dynamically the selected template with pertinent information, e.g., recipient name, etc. The wish template editor module 1020 may also allow the user to customize a template by adding copy, visuals, video and the like, preview, save, and/or delete wish content, add templates to the wish vault 1030 (FIG. 1) which may store the user's wishes and which may be customized later, and purchase premium templates. All created wishes may automatically become wish templates and may be stored in database 16. A user may purchase a wish template that the system administrator provides, which has stock content in it along with other content developed by the system administrator. The use may create a wish and purchase stock content to add to it—this then may become a user-generated wish template that the user may use again during a certain amount of time if stock license agreement applies. The user may also use just the stock content in another wish template if desired. The user may create a wish with their own content—this then becomes a user-generated wish template that they can use again for the life of their account. They can later purchase and add stock content to replace their own content.

By choosing the custom wish editor module 1022, the user may perform one or more of the following actions: upload his/her own content (image, video, audio), browse, search and sort custom content from a library of previously uploaded content, select desired uploaded content to dynamically populate a template, add copy/text to the wish, change font, font color, font size, background color, location of text and images, add/upload image of user's signature, preview, save and/or delete content in the wish. After a user adds content and selects a layout, the wish may be saved automatically as a wish template in database 16. The user may start first with a premade wish template and then edit the content.

By choosing the stock content manager 1024, the user may: sort and enter keywords to return stock content options (i.e., image, video, audio), select desired content to dynamically populate a wish, and/or preview, save and/or delete a wish, and generally add, e.g., content, to a template.

An example of a custom wish library 168 is shown in FIG. 13. The custom wish library 168 may include thumbnail images 170 of available custom wish templates that the user may select to edit/customize to create a wish. The custom wish library 168 may include wish templates from a number of sources. For example, the custom wish library 168 may include, draft wishes previously created and stored by the user but not sent, wishes previously sent by the user, stock wish templates, premium wish templates available for the user to purchase and combinations thereof.

Each thumbnail image 170 may include one or more template action icons 172 representing different actions to apply to the wish template. For example, the template action icons may include an edit icon 172, a view larger icon 174, a delete icon 176 and a designate as favorite icon 178. Other icons may be used for other functions.

The custom wish library 168 may be sorted and viewed by category, for example: all, drafts, used, purchased, favorites, deleted and the like. The wish templates may also be sorted by occasion similar to greeting cards, including for example: all, anniversary, birthdays, life events, relationships, wisdom and the like.

The user may select a wish template thumbnail (for example, by clicking on the edit icon) to add that template (including any text, visual component, audio component, layout, background, etc.) to the wish. In other words, the user may combine template creation and add content to the template. The user may then customize the wish template to suit their individual needs.

As shown, the custom wish library 168 may also include a create or upload button 180 allowing a user to create a new wish template from scratch, edit an existing wish template and/or upload a new wish template from another source.

After the template has been determined, the user may add content, such as visual or audio content. However, it should be noted that the user does not have to select a template before adding content, because system 10 may start the user off with a default wish template layout that they can customize, which then becomes a template. As such, the template selection and content addition steps may be intertwined.

Figure 14:
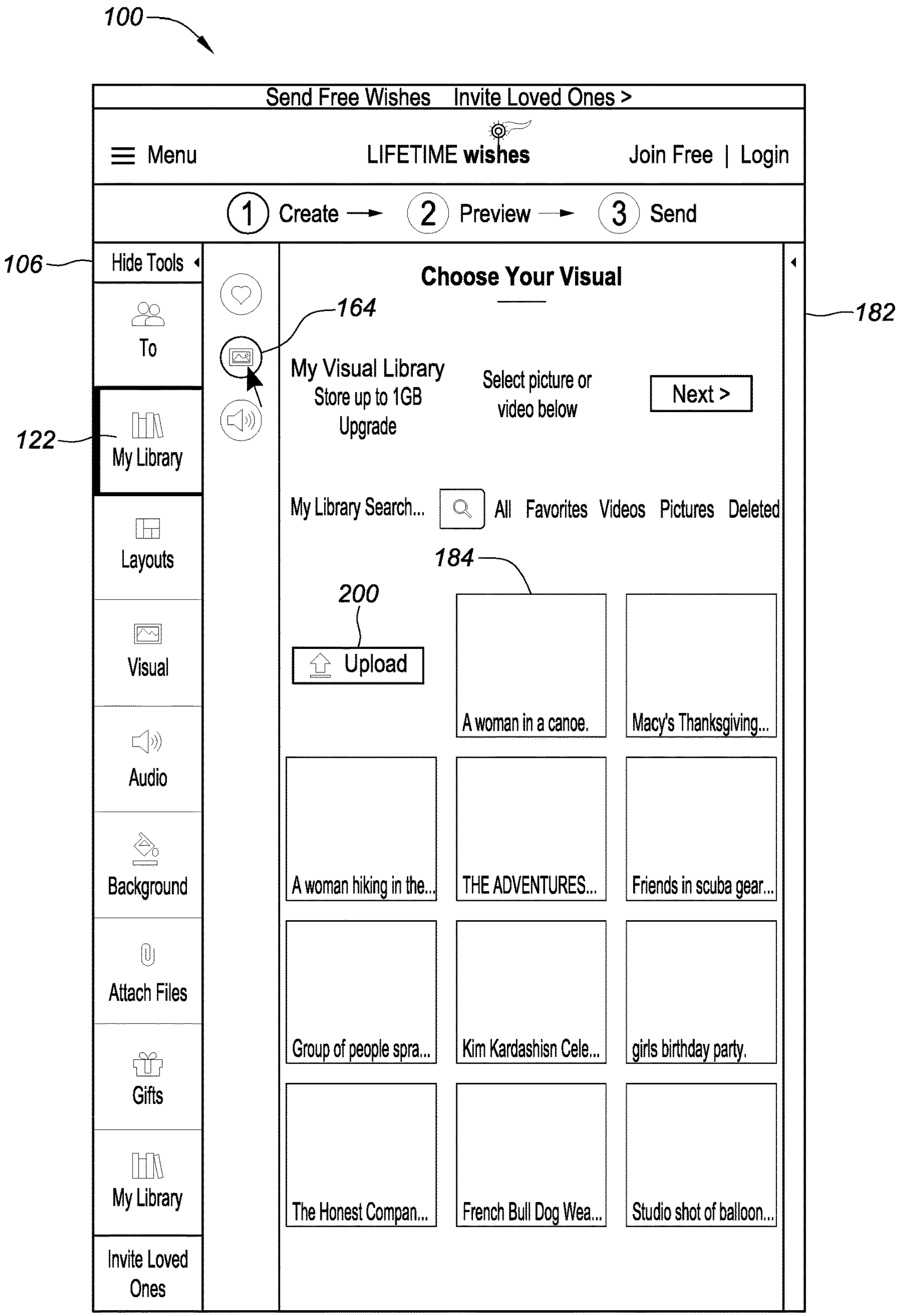

The addition of visual content to a wish is now further described with reference to FIGS. 14-22. As shown in FIG. 14, when the user selects the choose a visual icon 164, the user's visual library 182 may be displayed. The user's visual library 182 may include thumbnail images 184 of visuals (for example, graphics, images, drawings, photographs and videos) available for the user to add to a wish. The user's visual library 182 may include visuals from a number of sources. For example, the visual library 182 may include visuals previously uploaded and/or created and stored by the user, visuals previously purchased by the user, stock visuals, premium visuals available for the user to purchase and combinations thereof.

Figure 15:
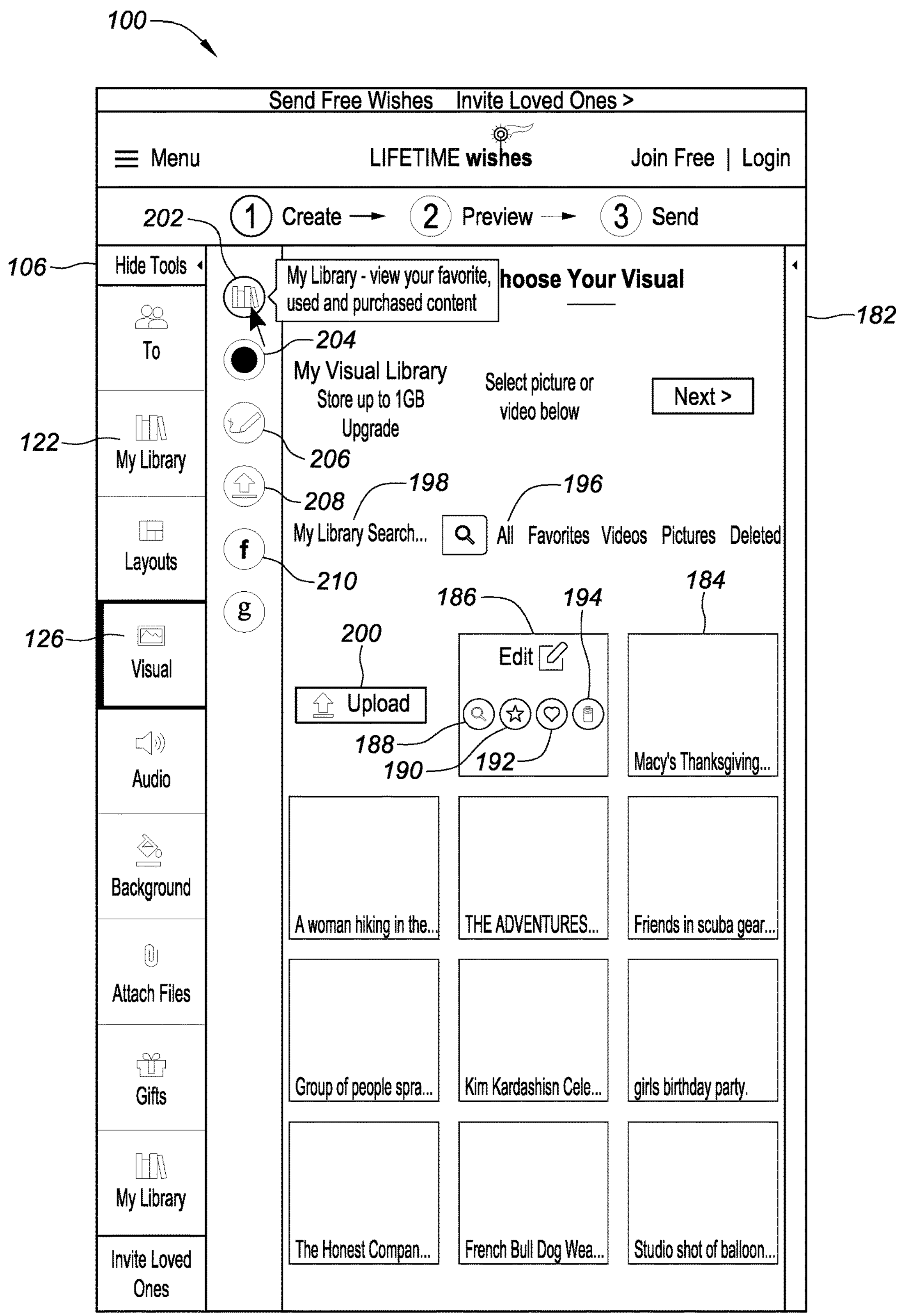

As shown in FIG. 15, each thumbnail image 184 of visuals in the user's visual library 182 may have displayed thereon one or more visual action icons representing one or more actions to apply to the visual. For example, each visual may include one or more of the following visual action icons: an edit icon 186, a view larger icon 188, an add to wish icon 190, a designate as favorite icon 192 and/or a delete icon 194.

The user may also sort the visuals for efficient viewing. For example, the visual library 182 may include one or more sort buttons 196 that allow the user to sort and view the user's visual library by category, for example: all, favorites, videos, pictures and deleted. The visual library 182 may also include a search field 198 allowing the user to search for visuals by key word, file name and the like. The visual library 182 may also include an upgrade link or button providing an option for a user to add/purchase additional storage space for his or her visual library and access premium templates, visuals, etc.

The user may select an existing visual in the visual library 182 to add the visual to a wish. Alternatively, the user may create a new visual. The user may create a new visual by clicking a create or upload button 200 of the visual library 182 or by selecting the add visual icon 126 from the create a wish tool bar 106, both of which may cause an add visual submenu 202 to be displayed.

Figure 16:
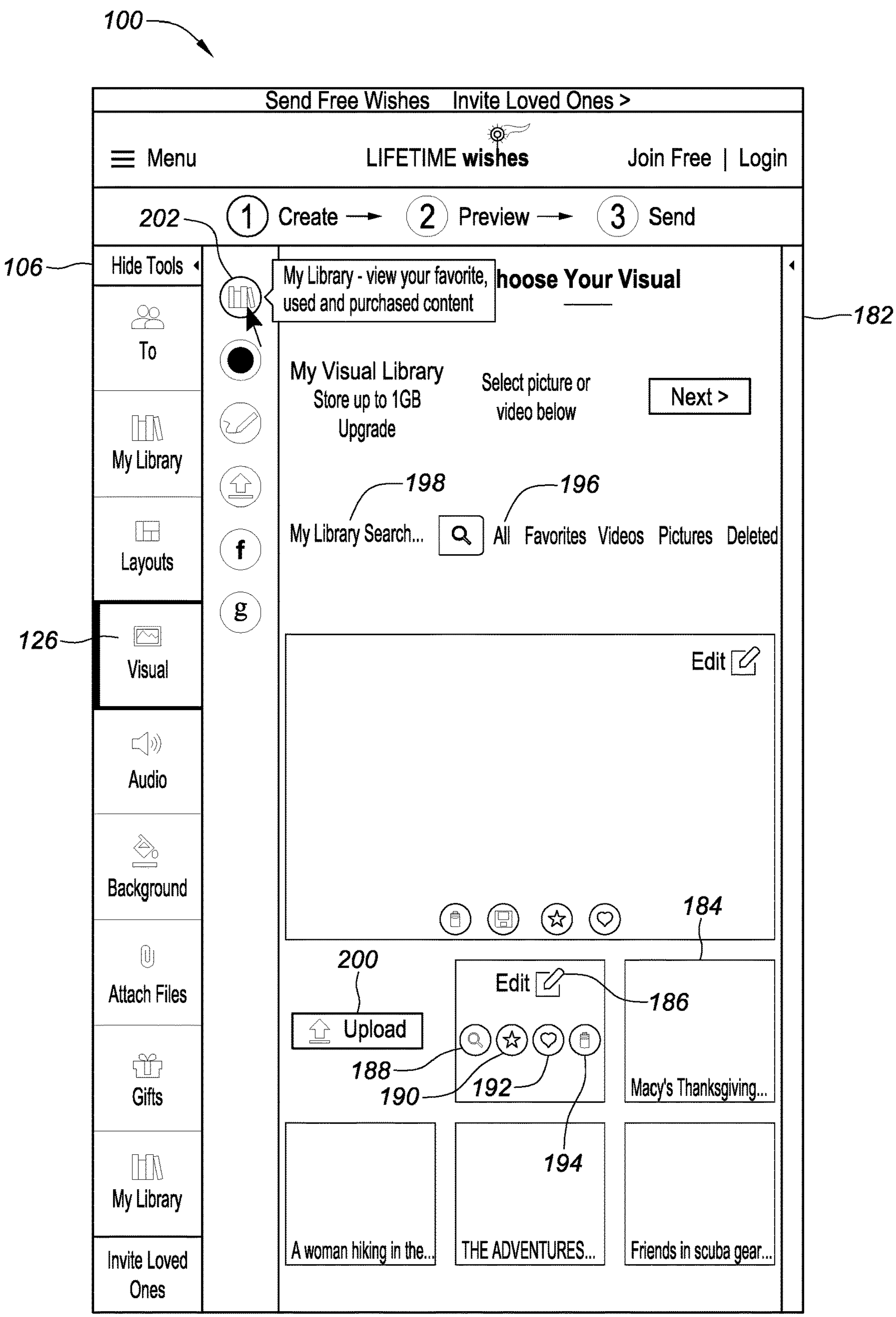

As illustrated in FIGS. 15-16, the add visual submenu 202 may include one or more additional icons allowing the user to create, upload and/or edit a visual. For example, the add visual submenu 202 may include one or more of the following icons: a record icon 204, a draw icon 206, an upload icon 208, and one or more import from other source icon(s) 210. The import from other source icon(s) 210 may include icons allowing the user to import from other e-mail/webmail accounts, social media accounts, file saving accounts, stock photo agencies, and the like, which may include for example but not be limited to Facebook, Google Photos, Instagram, Pinterest, Dropbox, Getty Images, etc. As illustrated in FIG. 16, selecting a thumbnail causes it to be displayed in an edit lightbox with options for editing, deleting, saving, adding to wish or designating as favorite.

Figure 17:
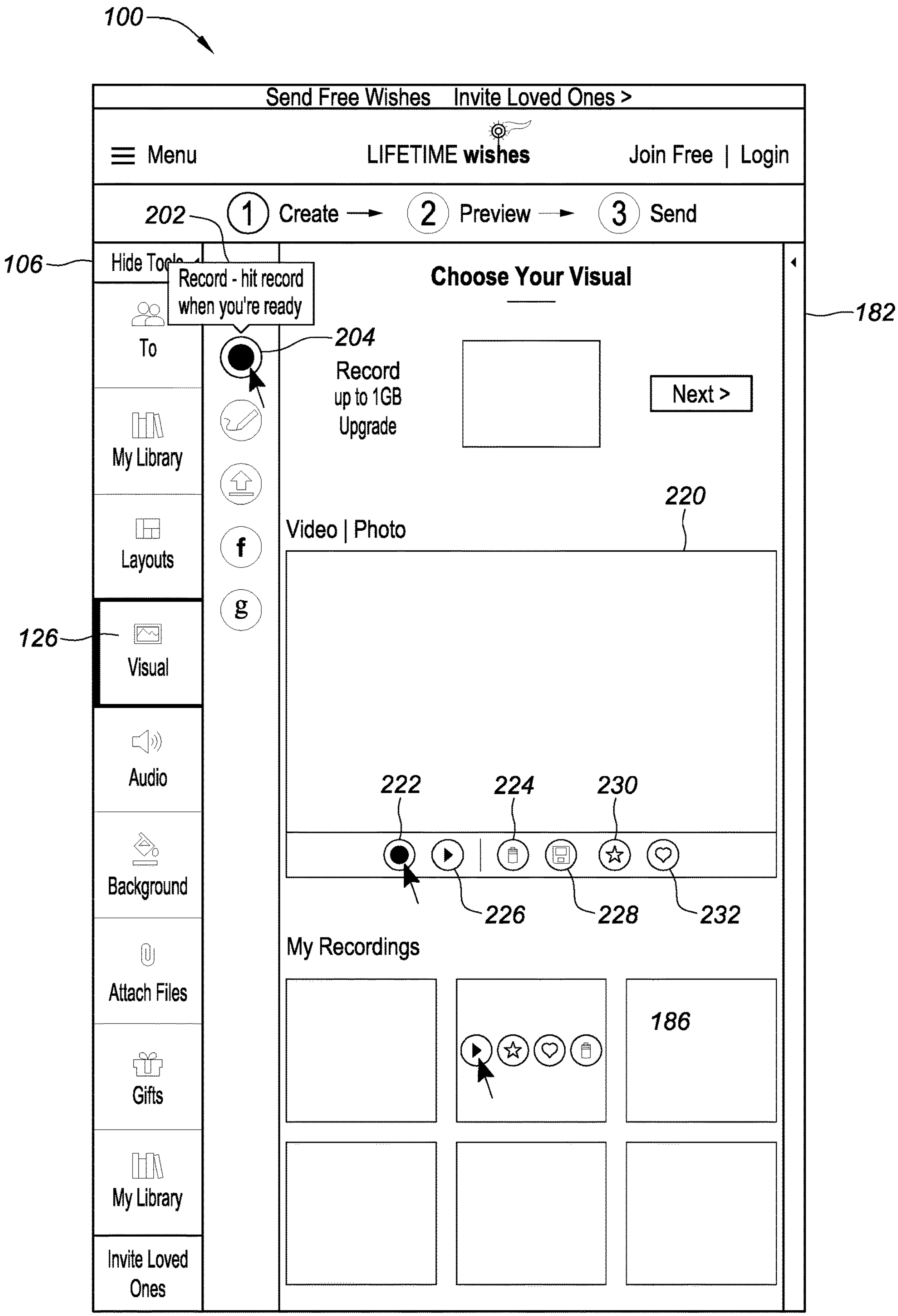

The addition of visual content may also include recording a photograph or other image, or recording a video. For example, as shown in FIG. 17, the user may click the record icon 204 to cause a recording stage 220 to be displayed. The recording stage 220 may include an option to record photo or video and one or more recording action icons. The recording action icons may include, for example, a record icon 222, a delete icon 224, a play icon 226, a save icon 228, an edit icon 230, an add to wish icon 230 and a designate as favorite icon 232. The user may select to record photo or video, then click a record icon 222 to record the photo or video. Once the new photo or video is recorded, the user may delete it, edit it, save it to the user's visual library and/or add it to a wish.

Figure 18:
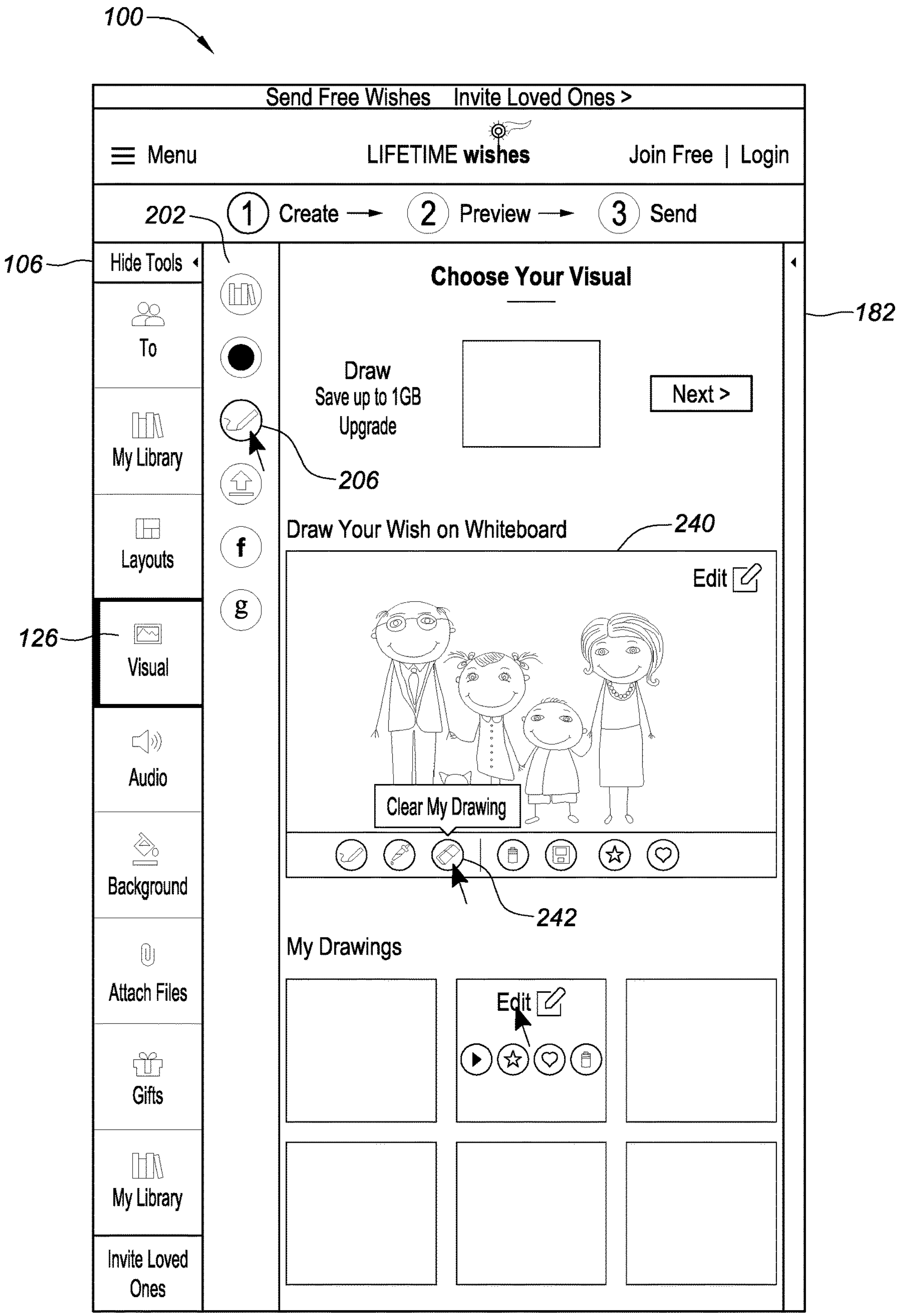

The visual content that may be added to the wish may also include drawings prepared by the user. As shown in FIG. 18, the user may click on the draw icon 206 which causes a draw your wish field 240 to be displayed. The draw your wish field 240 may include one or more drawing action icons 242 allowing the user to customize the drawing and/or apply various actions to the drawing. The drawing action icons 242 may allow the user to do one or more of the following: select line type, thickness and/or color, select fill type and/or color, clear the drawing, delete the drawing, save the drawing to the user's visual library, edit the drawing, and/or add the drawing to a wish.

Figure 19:
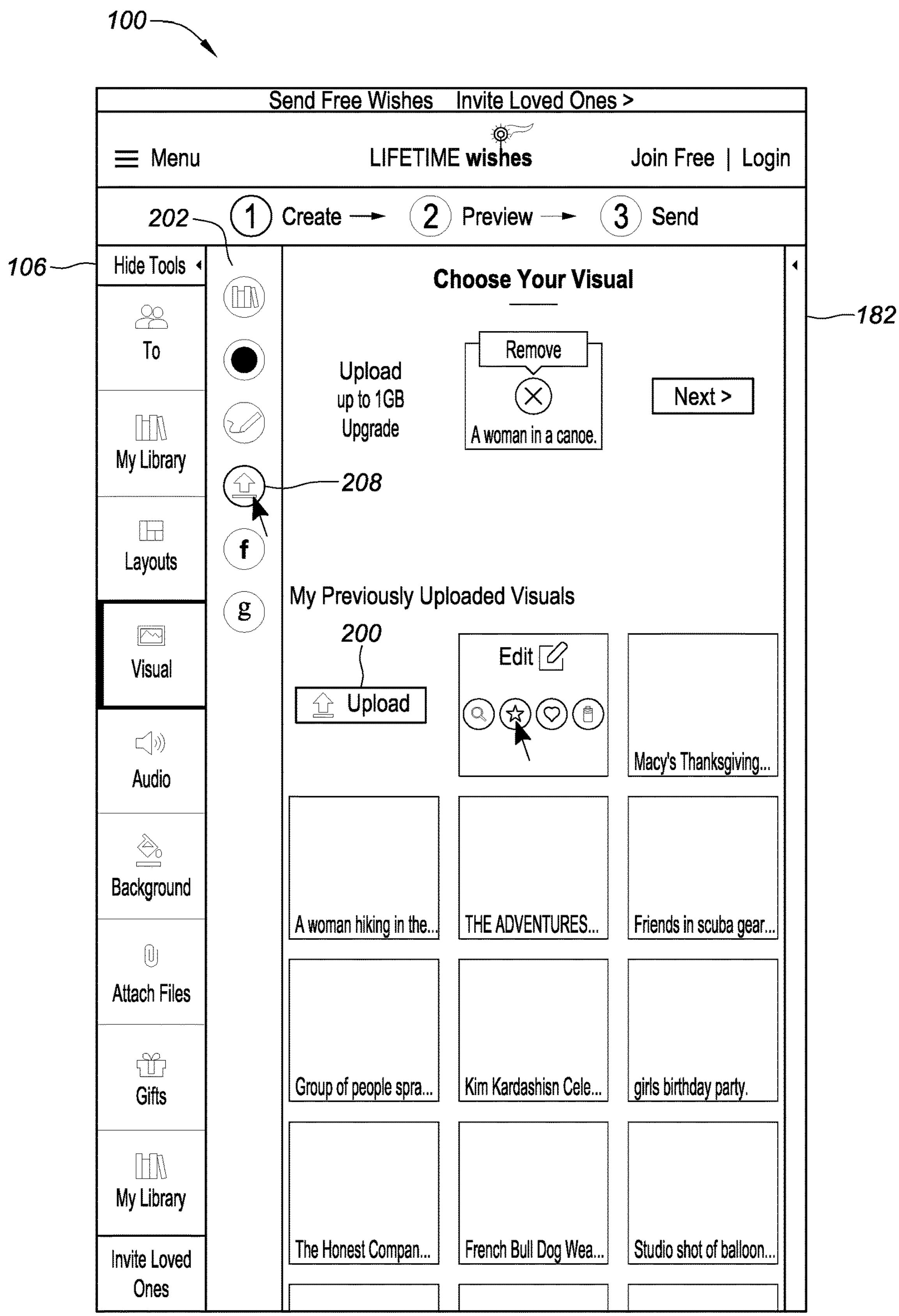
Figure 20:
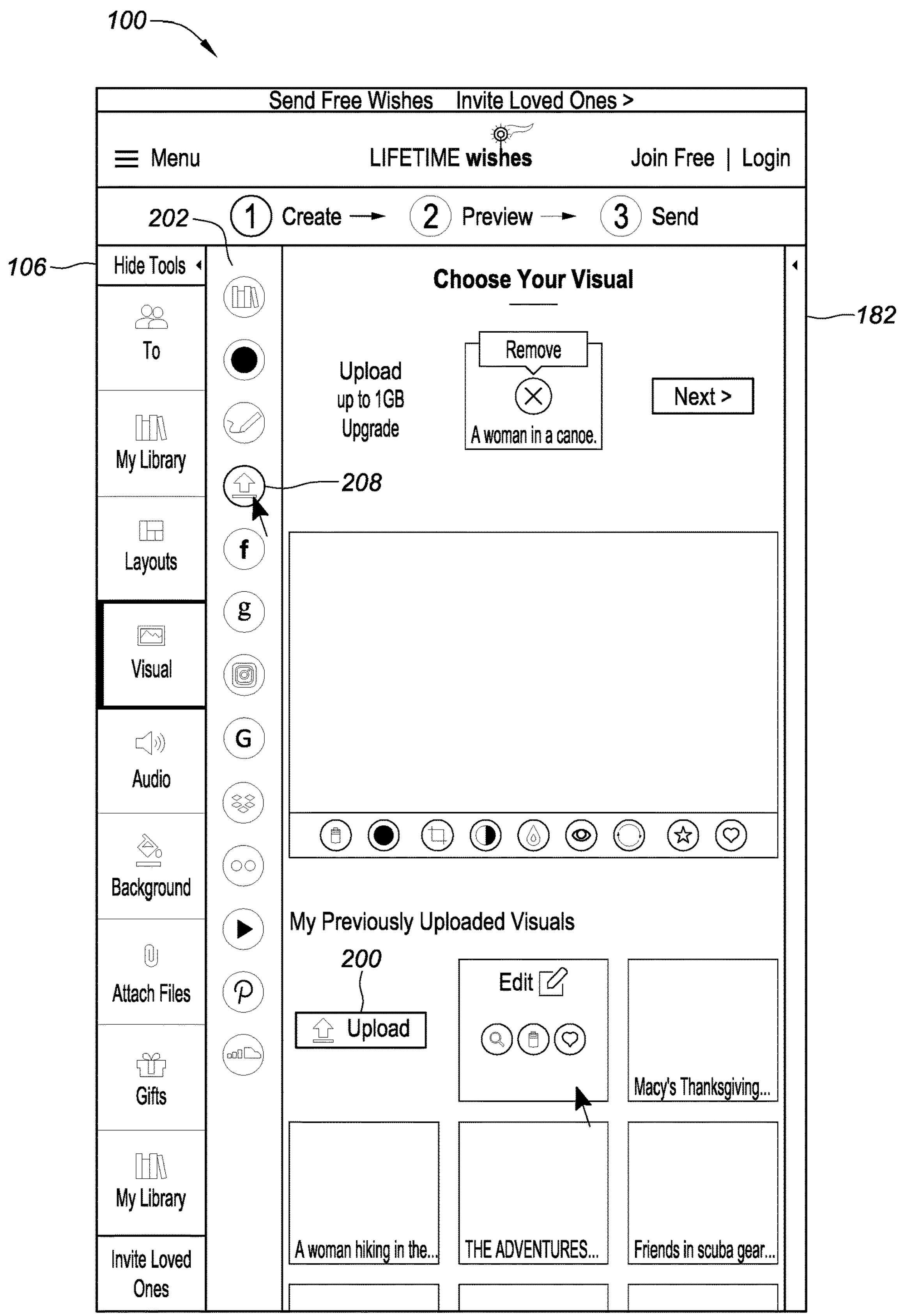

As shown in FIGS. 19-20, clicking on the upload icon 208 may cause the user's visual library 182 to be displayed with an upload button 200 allowing the user to upload a new visual to the visual library 182, for example, from a camera, phone, computer, tablet or other device. Once the new visual is uploaded to the visual library 182, it may be displayed as a thumbnail image with visual action icons allowing the user to view larger, edit, delete, designate as favorite, etc. Upon selecting a visual, it may be displayed in a photo edit light box with options to customize the visual for adding to a wish.

The visual content described above may be stored in database 16 and be accessed and manipulated by the appropriate editor and manager modules 1020, 1022, 1024.

Figure 21:
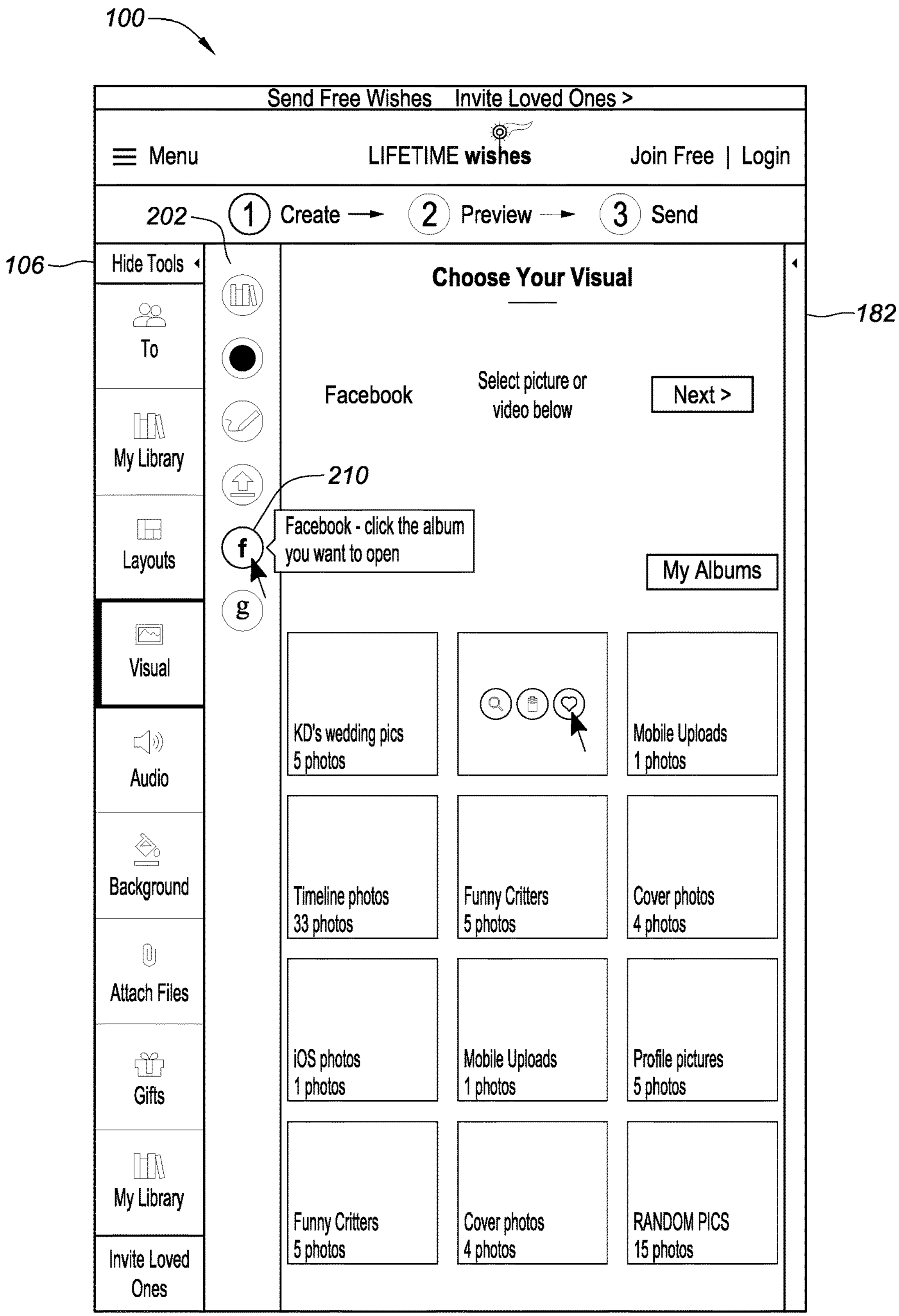

The visual content that may be added to the wish may also include visuals from sources outside of system 10 such as visuals that the user may have already stored in his or her social media accounts, e.g., Facebook. As shown in FIG. 21, for example, the visual library 182 may include a Facebook icon 210 so that the user may access and import visual content that the user has already stored on Facebook. Similar icons for other social media sites may be included in system 10. The user may save this visual content to the user's visual library 182 of system 10, and apply various actions to the visual similar to visual content uploaded from a camera, computer, etc. For example, the action icons displayed on a visual imported from another source may omit certain visual action icons (for example edit and/or delete) if the application program interface does not permit such an action.

Figure 22:
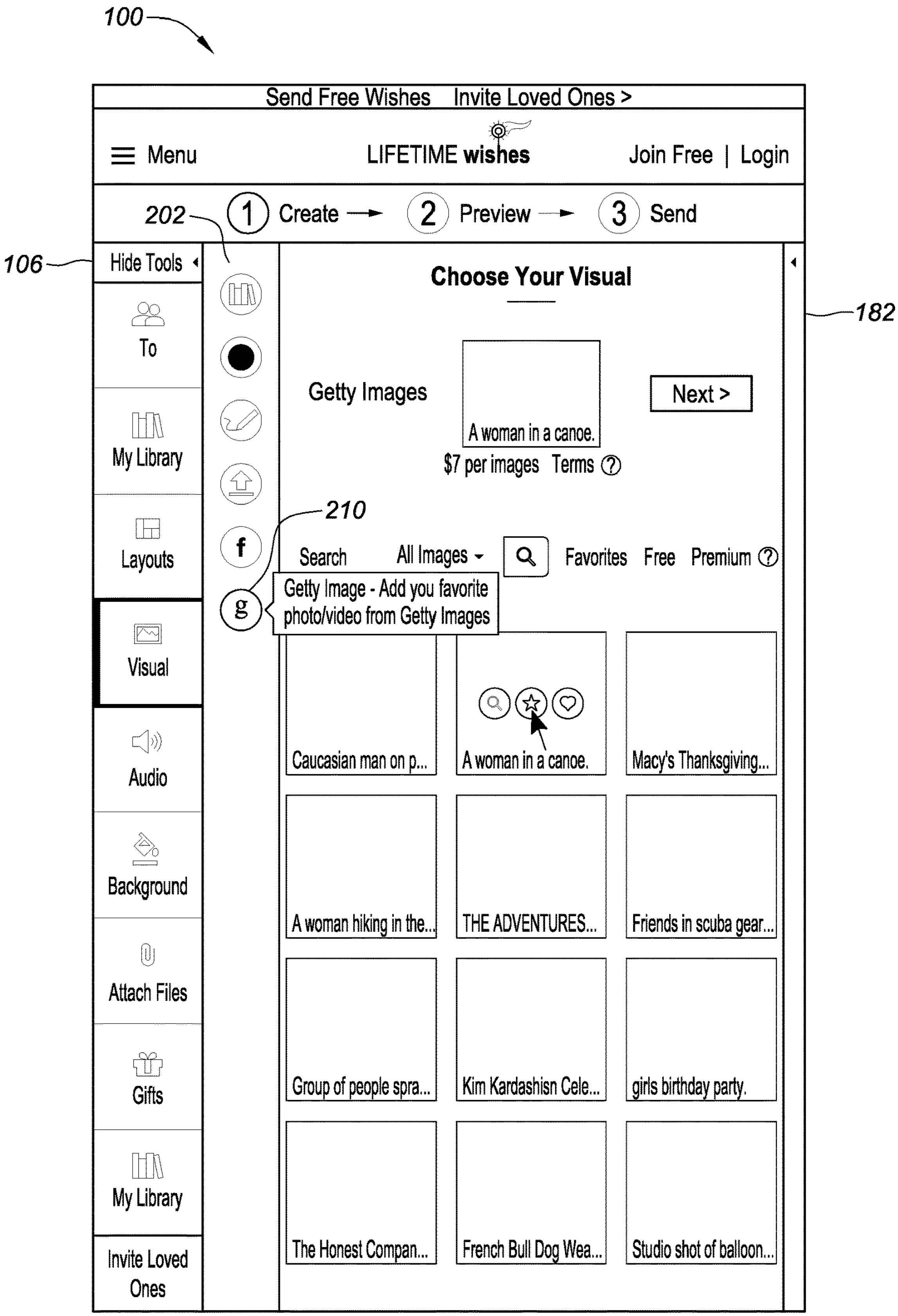

The visual content that may be added to the wish may also include visuals such as those provided by Getty Images or another third party source. As shown in FIG. 22, such images may be access by system 10, and may be stored to the user's visual library 182. There may be an additional cost for the user to access and use images from such third party sources.

Other types of visual content and their addition to a message or wish beyond those described above are also within the scope of the invention. For example, live video may be added to a wish, whereby the wish may contain a link that directs the recipient to a web cam or other source of real-time video.

It should be noted that different types of visual content may require different amounts of storage space and processing capability of system 10. As noted in the GUIs of FIGS. 14-22, the user may be presented with the option of upgrading to an increased amount of storage. This may involve an additional fee to users.

Figure 23:
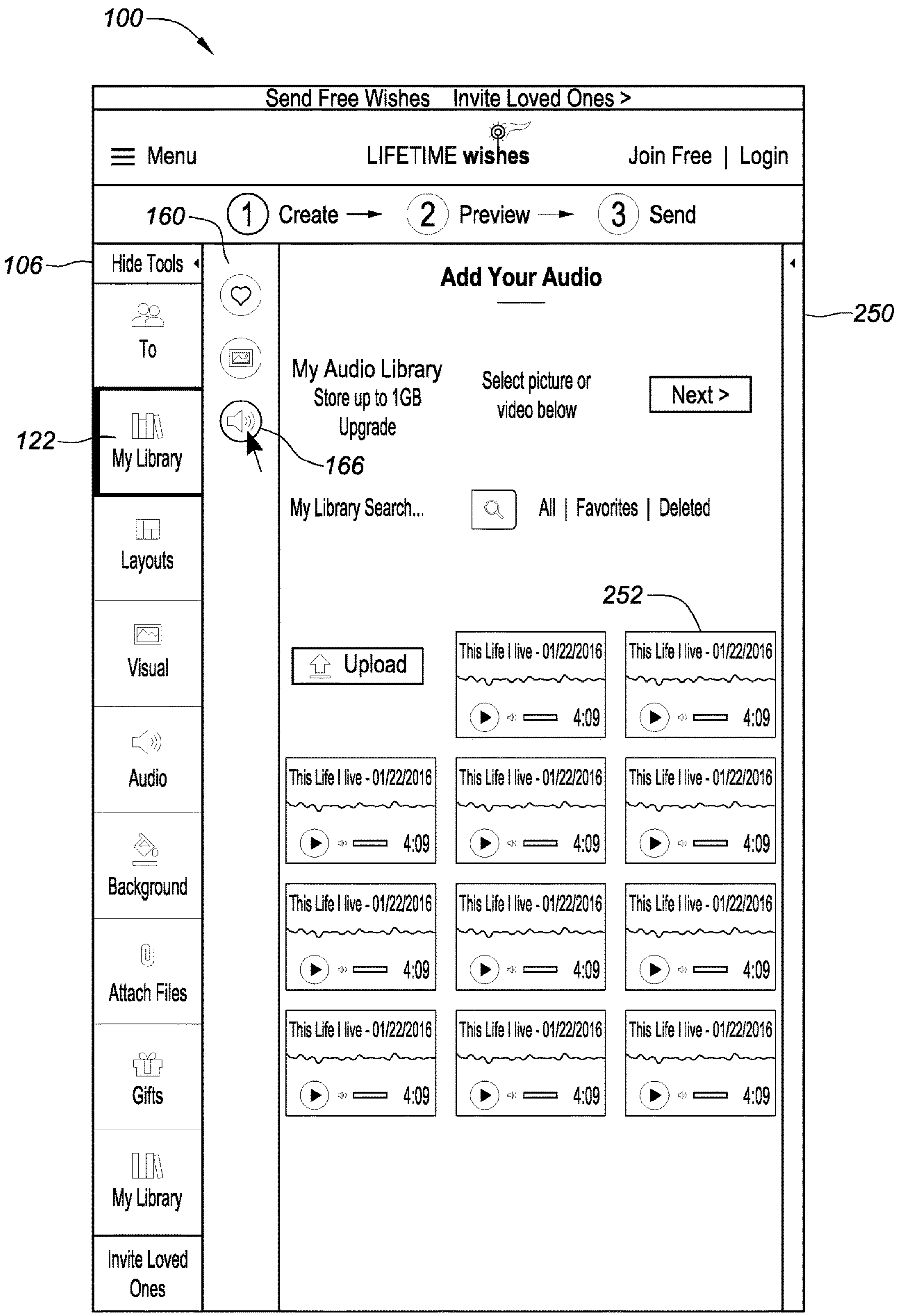

The addition of audio content to a wish is now further described with reference to FIGS. 23-25. As shown in FIG. 23, the library submenu 160 may also include an add audio icon 166. By selecting the add audio icon 166, the user's audio library 250 may be displayed. Similar to the visual library 182, the user's audio library 250 may include audio files from a number sources, including, for example, audio recordings previously uploaded and/or created and stored by the user, audio previously purchased by the user, stock audio, premium audio available for the user to purchase and/or combinations thereof.

Each of the audio files in the user's audio library 250 may be displayed as a thumbnail image 252. Each audio thumbnail image 252 may have displayed thereon one or more audio action icons representing one or more actions to apply to the audio file. For example, each audio thumbnail 252 may include one or more of the following audio action icons: play audio icon 254, add to wish icon 256, designate as favorite icon 258 and/or a delete icon 260.

The user's audio library 250 may be sorted and viewed by category, for example: all, favorites, deleted, etc. The user's audio library 250 may also include a search field to allow the user to search for audio by key word, file name and other search methods. The audio library 250 may also include an upgrade link or button providing an option for a user to add/purchase additional storage space for his or her audio and visual libraries and access premium templates, visuals, audios and the like.

The user may select or click on an existing audio file in the audio library to add the audio to a wish. Alternatively, the user may create a new audio. For example, the user may create a new audio by clicking a create button 262 of the audio library 250 or by selecting the add audio icon 166 from the create a wish tool bar 106, both of which may cause an add audio submenu 264 to be displayed.

Figure 24:
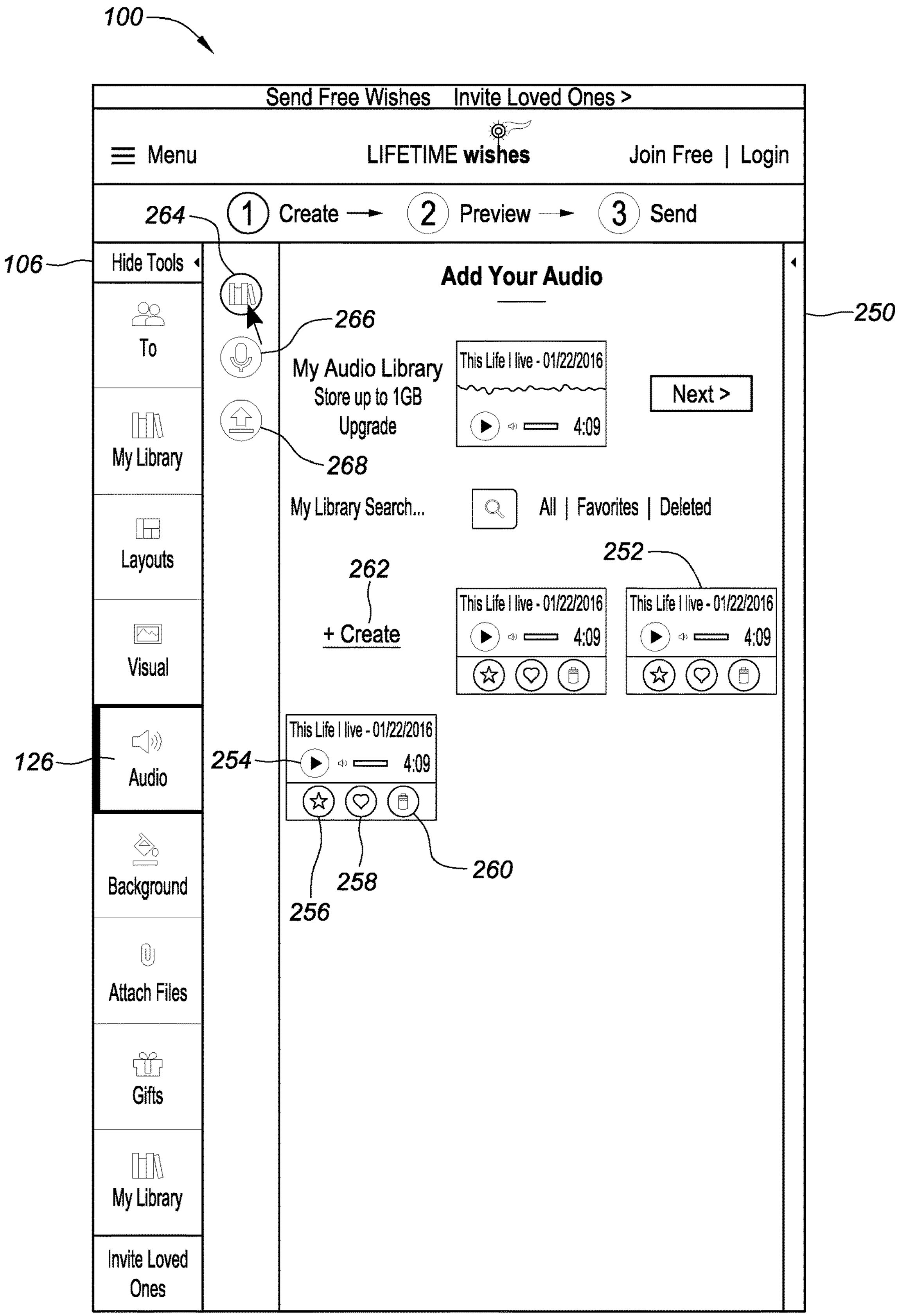

As shown in FIG. 24, the add audio submenu 264 may include one or more additional icons allowing the user to create and/or upload an audio. For example, in one form, the add audio submenu 264 may include a record audio icon 266 and an upload audio icon 268.

Figure 25:
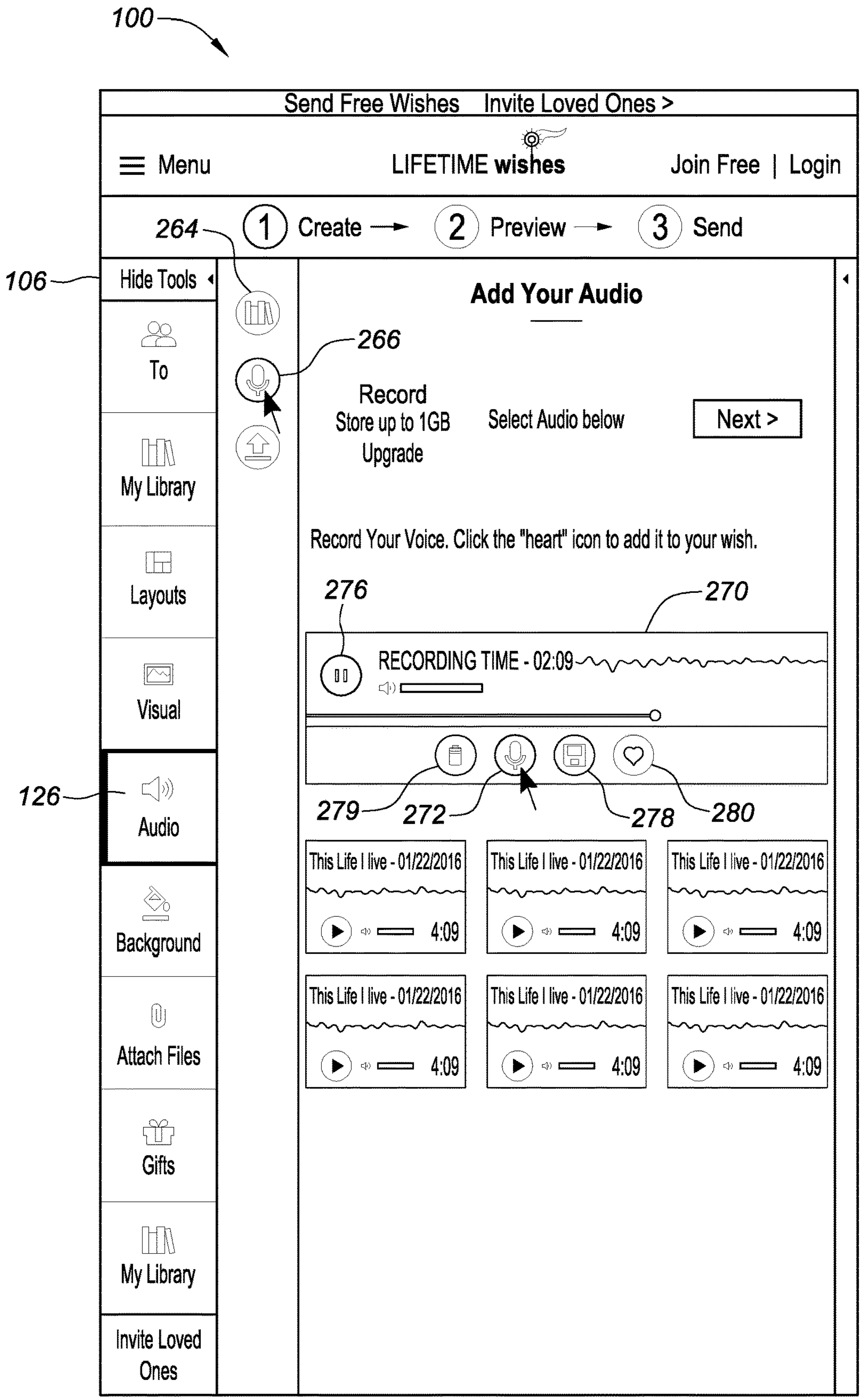

As shown in FIG. 25, clicking the record icon 266, may cause an audio recording stage 270 to be displayed. The audio recording stage 270 may include one or more audio recording action icons, for example, a record icon 272, a delete icon 274, a play/pause icon 276, a save icon 278 and an add to wish icon 280. Once the user records a new audio file, the user may play it back, delete it, save it to the user's audio library and/or add it to a wish.

The audio content described above may be stored in database 16, or come from a third party provider. The audio content may then be accessed and manipulated by the appropriate editor and manager modules 1020, 1022, 1024.

Figure 26:
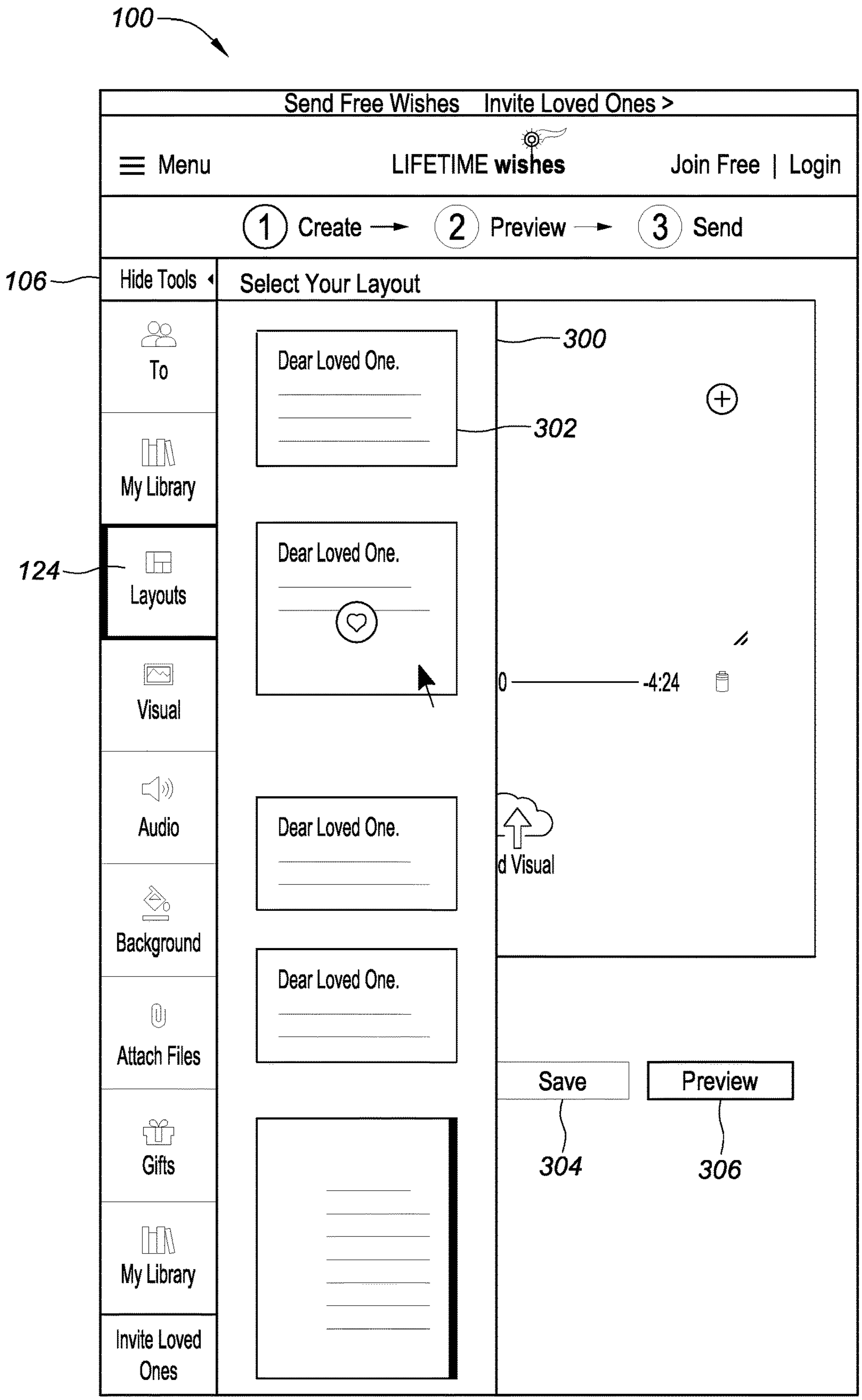

The selection of a layout for a wish or message is now described with reference to FIG. 26. As shown, the create a wish tool bar 106 may also include a layout icon 124. By highlighting/selecting the layout icon 124, a layout submenu 300 may be displayed. The layout submenu 300 may include a plurality of small squares or thumbnails 302 each showing a different available layout. As shown, the layouts may each be different in terms of the size and placement of the visual component and the text component of the wish.

The user may click on a layout thumbnail 302 to select a layout for his/her wish. Additionally, the layout thumbnail may include at least one action icon allowing the user to designate the template as a favorite. After selecting a layout, the user may click a save button 304 to save the layout or a preview button 306 to preview the wish with the selected layout.

Figure 27:
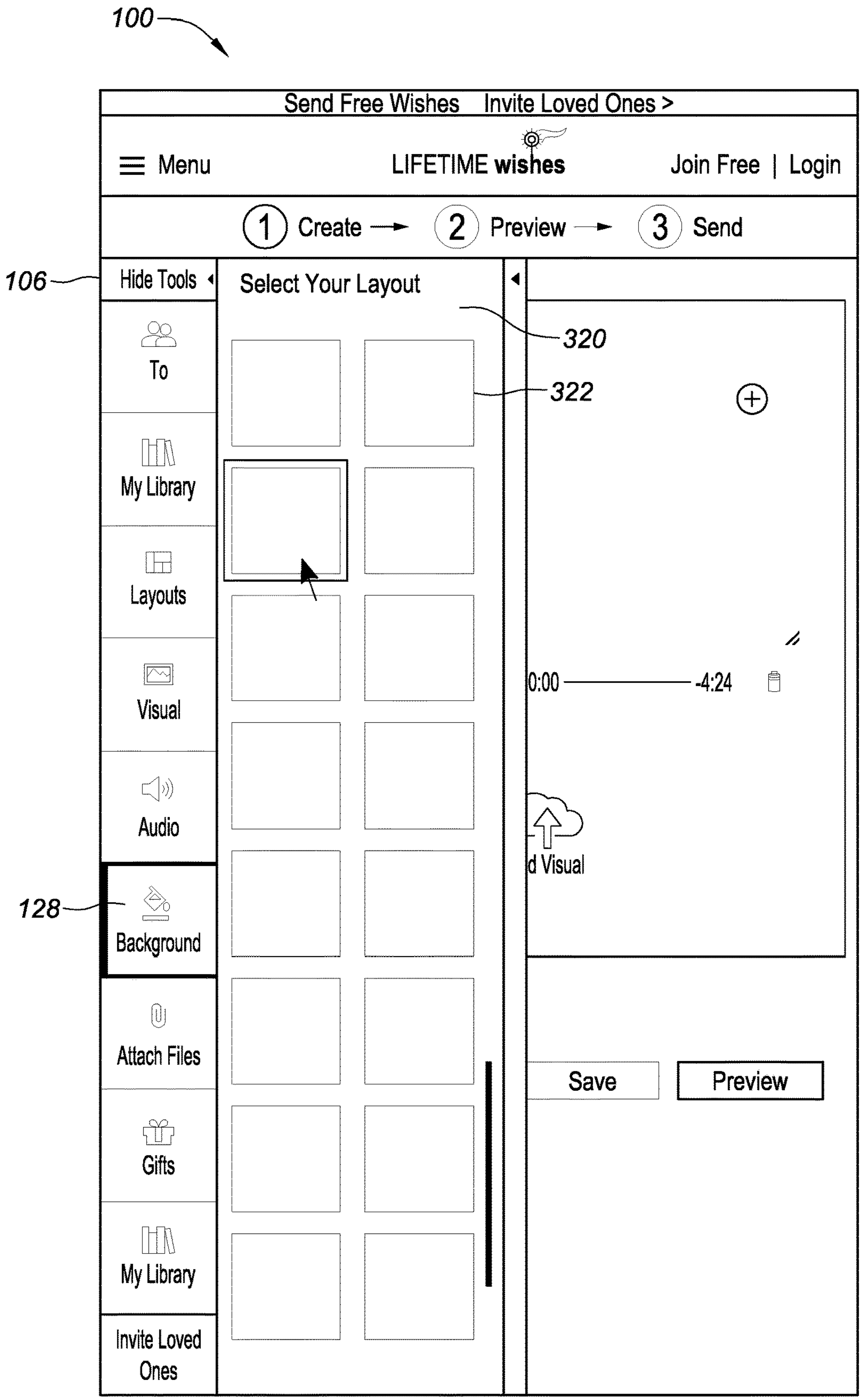
Figure 28:
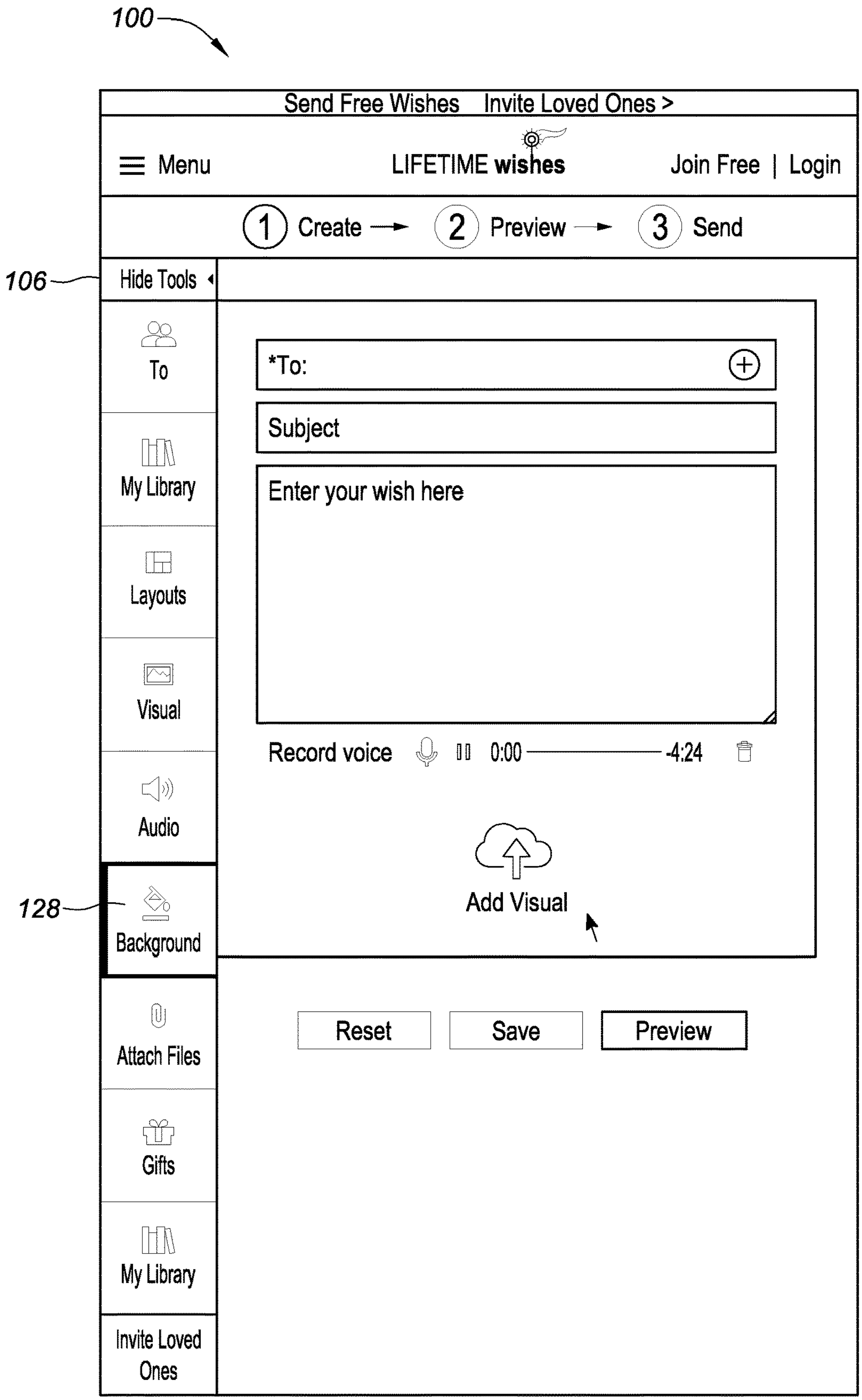

The selection of a background for a wish or message is now described with reference to FIGS. 27-28. As shown, the create a wish tool bar 106 may include an add background icon 128. Selecting the add background icon 128 may cause a background menu 320 to be displayed as shown in FIG. 27. The background menu 320 may display sample backgrounds 322 that may be added to a wish. The backgrounds may have any number of different colors and patterns that may be suitable for the emotions, content or them or the wish being created. The user may click on a sample background 322 which may then result in system 10 displaying a background preview page as shown in FIG. 28 so that the user may view may view how the wish may look with the selected background.

Layouts and backgrounds may be stored in database 16 and be accessed and manipulated by the pertinent editor and manager modules 1020, 1022, 1024.

Figure 29:
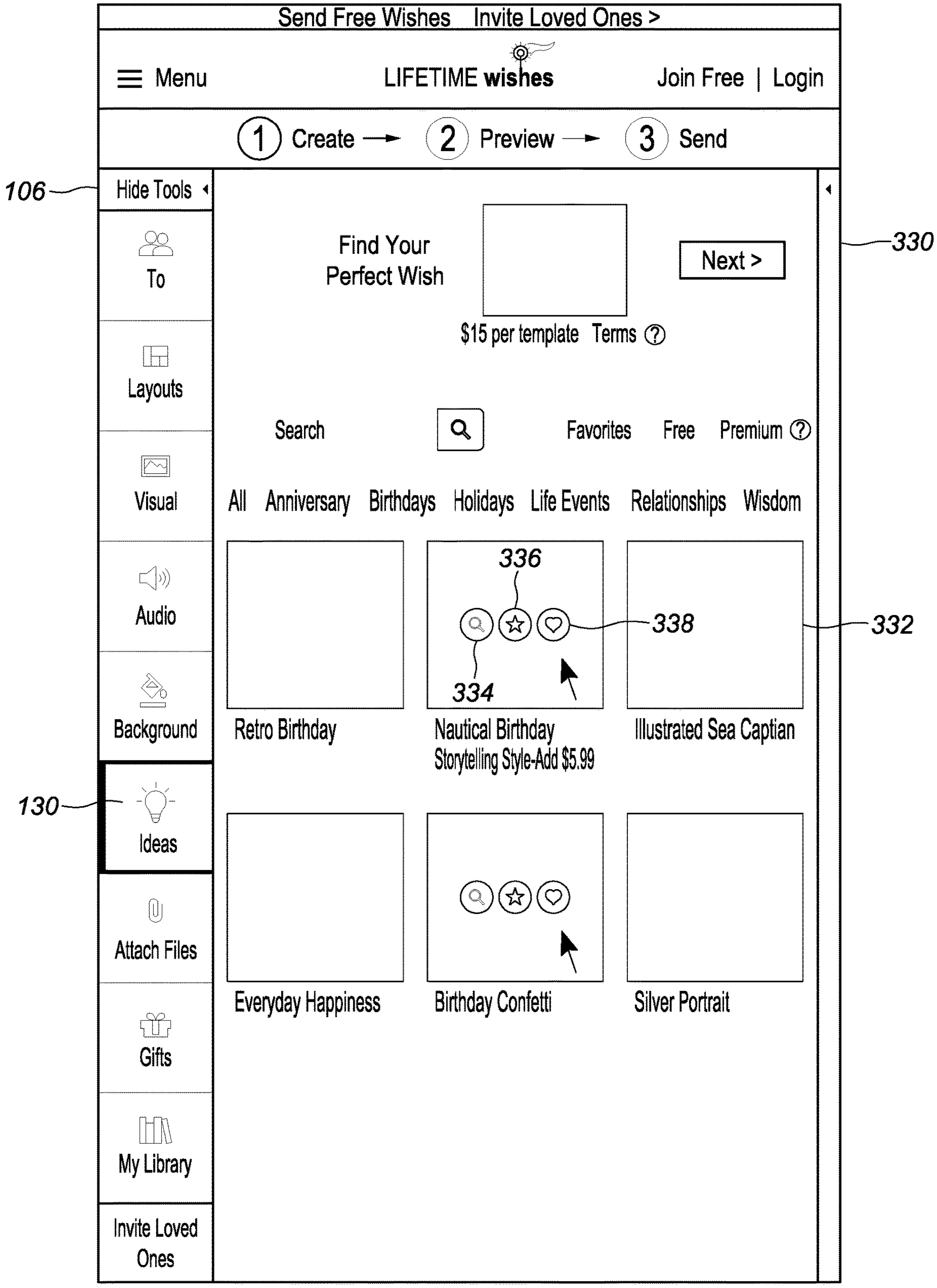

Additional features where the user's wish or message may be customized are now described with reference to FIG. 29. As shown, tool bar 106 may include a wish ideas icon 130. If selected, a wish ideas library 330 may be displayed and the wish template editor 1020 (FIG. 1) may be used. The wish ideas library 330 may include thumbnail images 332 of available wish templates that the user may select to edit/customize a wish. The wish idea library 330 may include the same wish templates as the custom template library 168 or it may include different wish templates. The wish idea library 330 may include stock wish templates and premium wish templates available for the user to purchase. The wish idea section may contain free and premium wish templates that the user may browse and select. The "wish template library" section may include wish templates that the user has already purchased and/or sent.

Each of the thumbnail images 332 may have displayed thereon one or more wish idea action icons representing different actions to apply to the wish template. For example, the wish idea action icons may include one or more of the following: a view larger icon 334, an add to wish icon 336 and a designate as favorite icon 338.

The wish idea library 330 may be sorted and viewed by category, for example: favorites, free wish templates, premium wish templates. In addition, the wish templates may also be sorted by occasion similar to greeting cards, including for example: all, anniversary, birthdays, life events, relationships, wisdom and the like.

Figure 30:
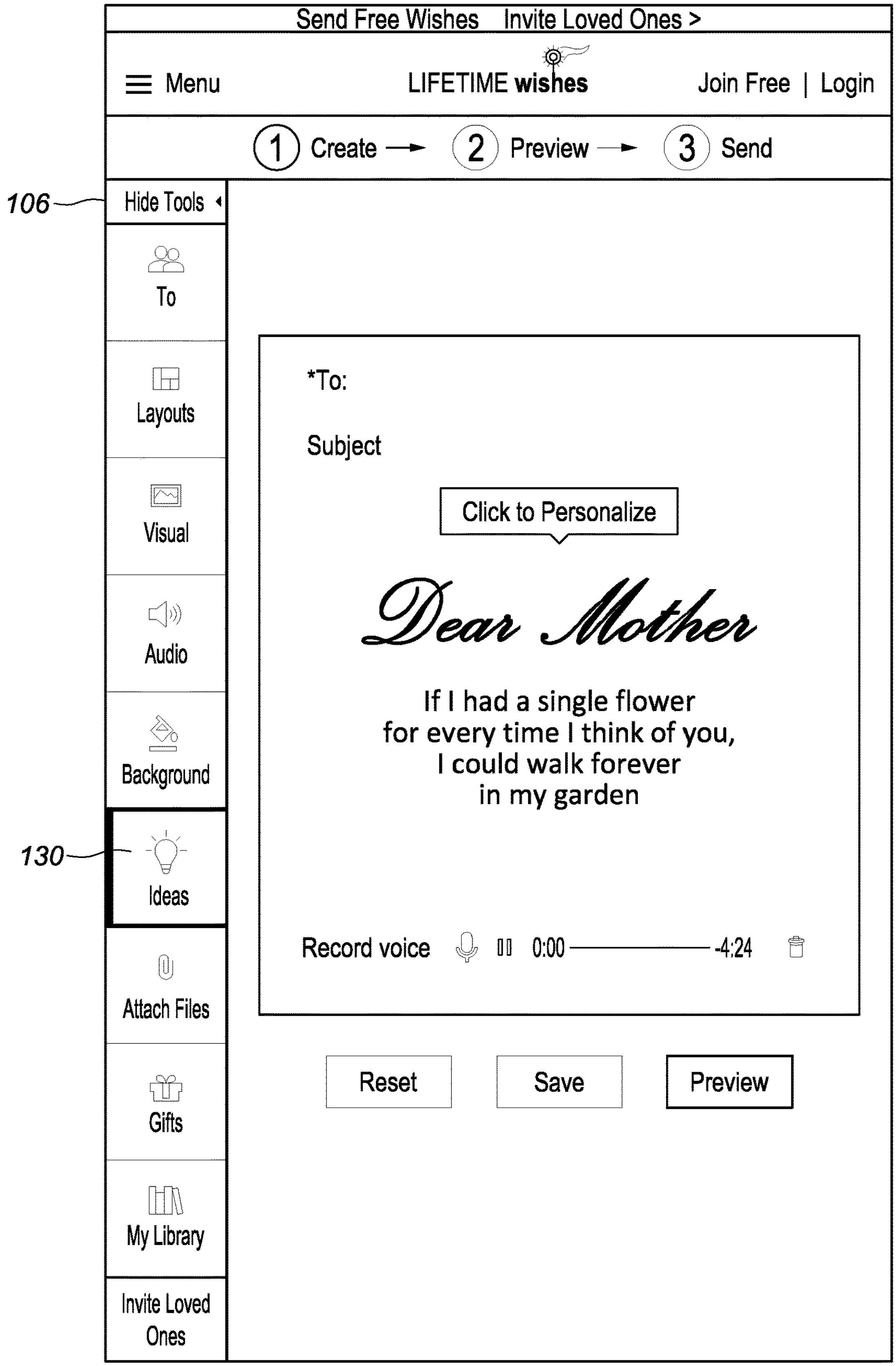

The user may select a wish template (for example, by clicking on the add to wish icon which may be a "star"; where the star icon may be located on top of the thumbnails, and may appear when user rolls mouse over the thumbnail) to add that template (including any text, visual component, audio component, layout, background, etc. that the user has already entered into system 10) to the wish. FIG. 30 illustrates a template preview page. The user may then customize the wish template to suit their individual needs (for example, by adding a personal photo, text and the like.

Figure 31:
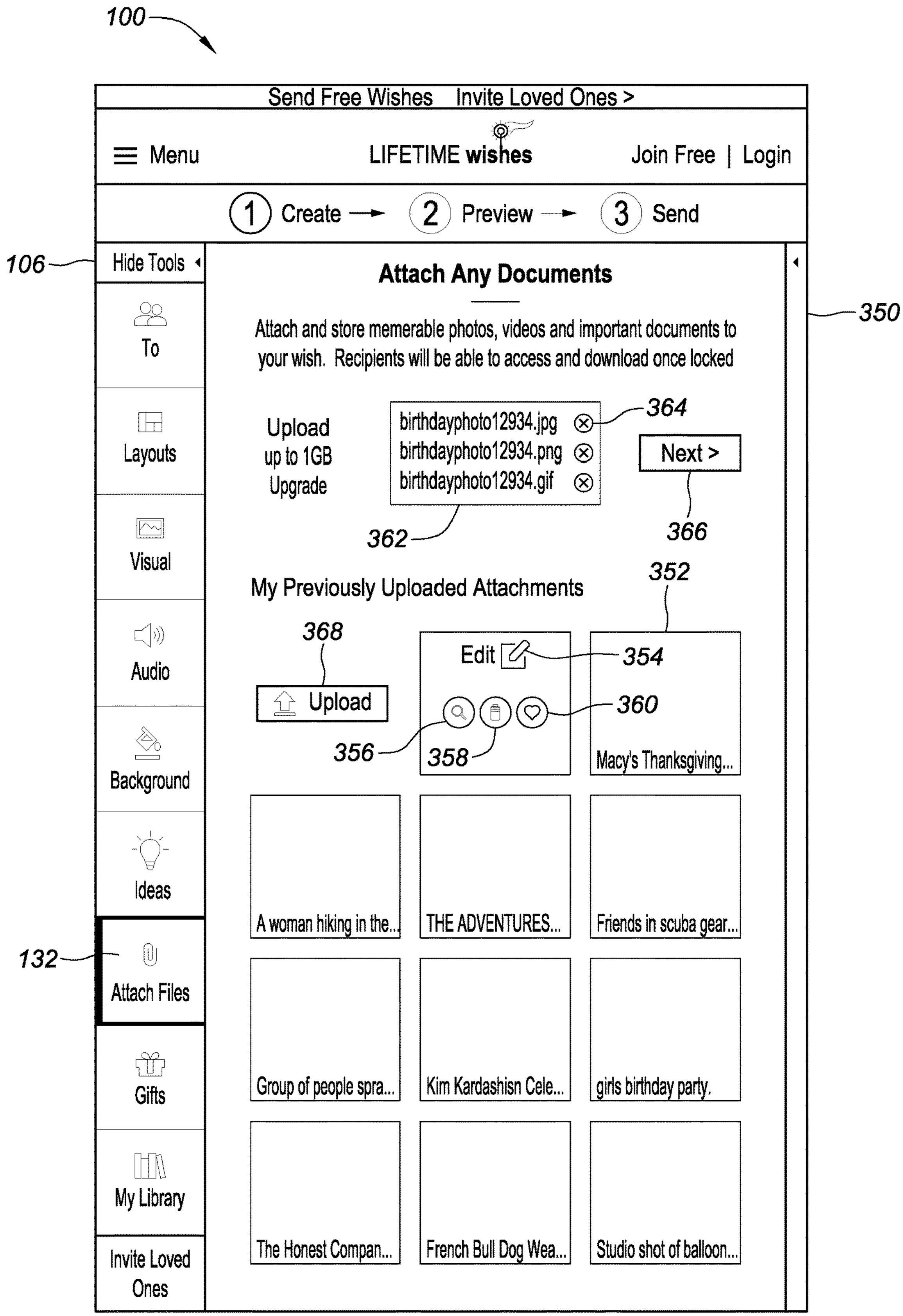

The manner in which documents may be attached to a wish or message is now described with reference to FIG. 31. As shown, the create a wish tool bar 106 may include an attach documents or attach files icon 132. By selecting this icon 132, a library 350 of documents or files may be displayed. The documents library 350 may include any documents 352 previously uploaded by the user, for example, photos, videos, and other types of documents such as legal documents, letters, notes and the like.

Documents in the documents library 350 may be displayed as thumbnails with document action icons displayed thereon. The document action icons may include, for example, an edit icon 354, a view larger icon 356, a delete icon 358 and an add to wish icon 360.

The user may select one or more documents to add to a wish. An attached document(s) box 362 may list the file name(s) of each document to be attached to the wish. The user may remove a document from the attached document(s) box 362 by clicking an x button 364 next to the document. The user may click a next button 366 to attach the documents or files. As shown in FIG. 31, the document library 350 may include an upload button 368 allowing the user to upload one or more additional documents or files to the document library 350 from, for example, a camera, phone, computer, tablet or other device.

It should be noted that the current invention may be used with various types of documents. Beyond documents and files that may relate to personal or family/friend-type pictures or materials, legal or other documents may also be contained in document library 350 and attached to a wish or message. For example, a user's will may be stored in document library 350 and attached to a message upon the user's death, where the message may be directed to particular individuals such as the executor and any beneficiary. In this example, the scheduling and time-based sending of messages, as described below, may be used to send documents at appropriate times. Beyond legal documents, other event and planning documents, files or other materials may be attached to messages that may be sent out at appropriate dates, e.g., in advance of an annual meeting or other event.

The manner in which other items such as gifts may be attached to a wish or message is now described with reference to FIG. 32. As shown, the create a wish tool bar 106 may include an attach gift icon 134. By selecting this icon 134, a gift library 380 may be displayed which allows the user to add a gift through the gift manager component 1012 (shown in FIG. 1). The types of gifts available may vary.

Figure 32:
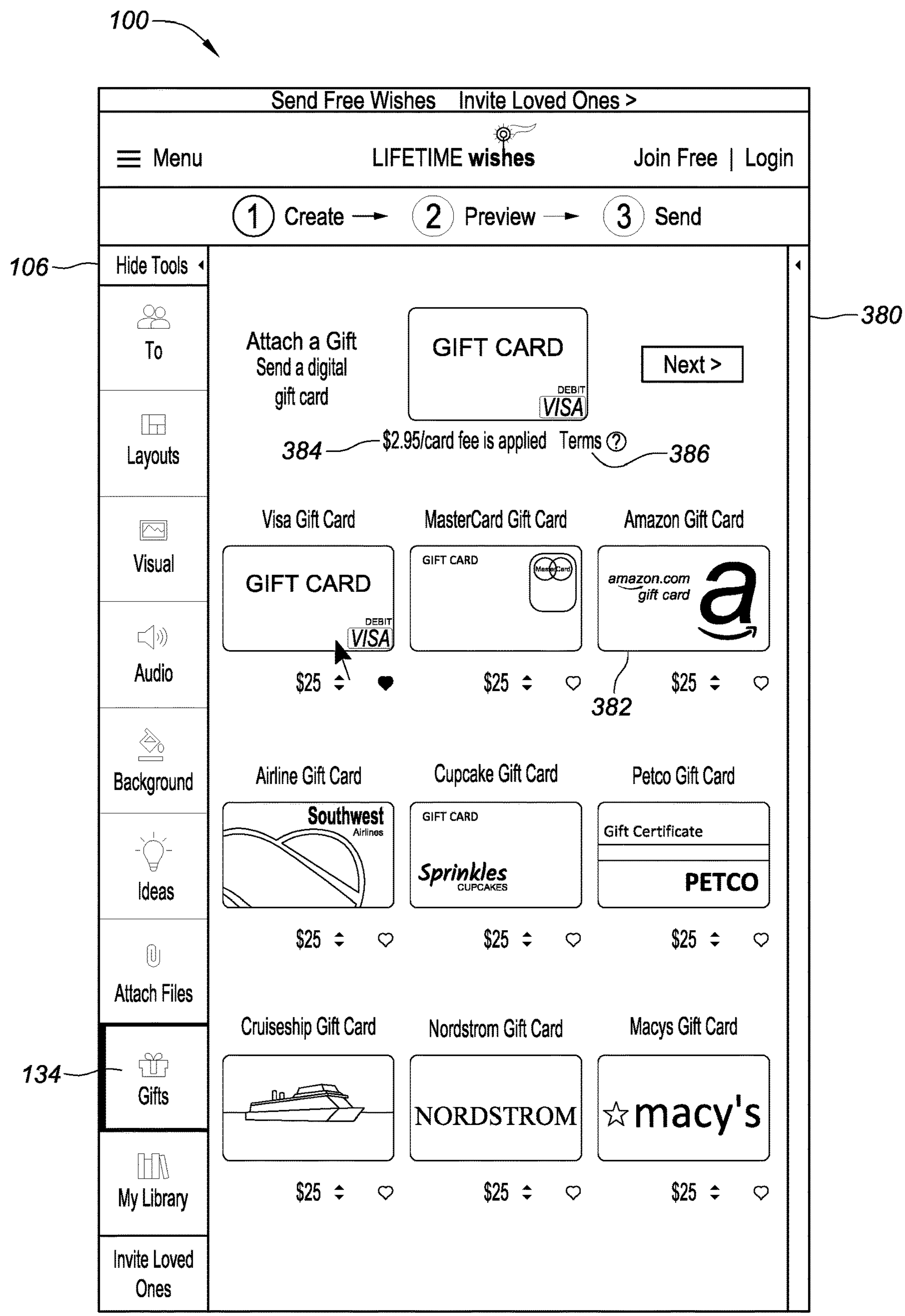

For example, as shown in FIG. 32, the gift library 380 may include images of digital gift cards or gift certificates 382 that a user may add to a wish. The digital gift cards 382 may include any suitable prepaid stored-value money card issued, for example, by a merchant, retailer, bank, credit card, airline and the like. The user may customize the digital gift card by selecting the merchant and the gift cash value amount.

The gift library may include a fee statement 384 indicating that there may be a fee charged for to purchase the digital gift card. It may include a terms button 386 allowing the user to read the full content of a digital gift card terms. Digital gift cards 382 in the gift library 380 may include one or more gift card action icons displayed thereon. The gift card action icons may include, for example, an add to wish icon and/or a designate as favorite icon.

Beyond gift cards, gift library 380 may also include links to retailers or other third party sources of physical gifts. By choosing this type of gift, the user may be directed to the third party's website to order the gift. When doing so, if the wish being sent to the recipient is an e-mail, the e-mail wish may include a link showing the gift that will be delivered to the recipient. As with the digital gift card type of gift, the gift library may include an appropriate fee statement 384.

The foregoing description generally relates to the message creation aspect 100 of the current invention shown in FIG. 53. As shown, the message creation process 100 may generally include the invite—wish list step 100A, select contacts step 100B and the choice of template, addition of content, choice of layout, choice of background and attachment of visual, audio or document/file materials as described in connection with the foregoing GUIs. As noted above, it is preferred that each GUI displays the stage at which the user is in the overall process. For example, the above-described GUIs highlight the "create" stage 1 of the overall process.

After the message creation stage 1, the user may complete the preview stage 2. As shown in FIG. 53, this may include the sender preview 100C (where the sender may preview what the message he or she created actually looks like) and recipient preview 100D (where the sender may preview how the message he or she created would look to the recipient). The user may also perform other operations on the created message during the preview stage 2 as discussed below.

The preview stage 2 is now described with reference to FIGS. 33-34. As shown in these figures, the GUIs may highlight the "preview" stage 2 of the overall process. This visual cue preferably helps the user efficiently use the overall process provided by system 10.

Figure 33:
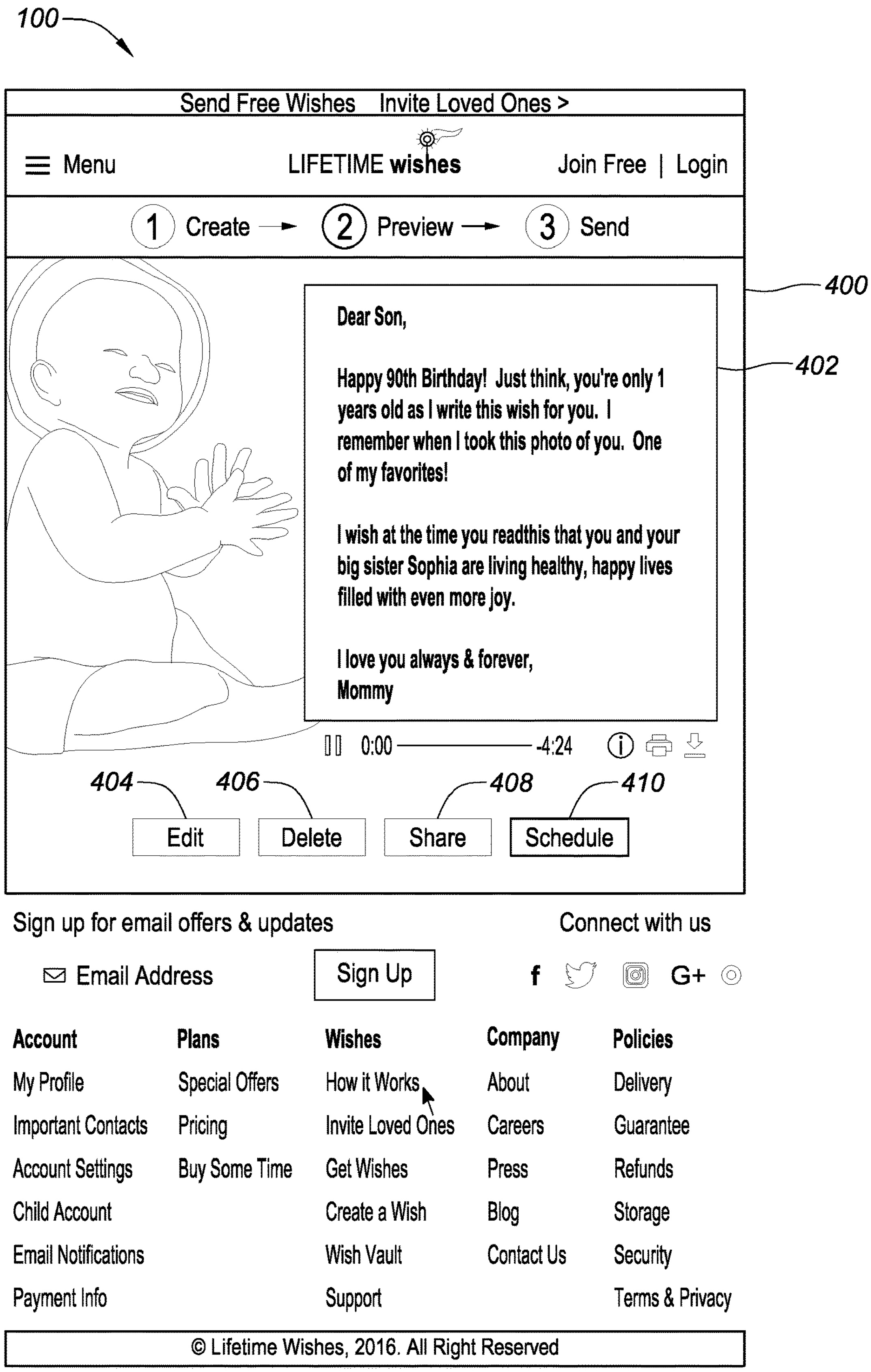
FIGS. 33-34 show graphical user interfaces which may be accessed by the user to preview a message that has been created.
Figure 34:
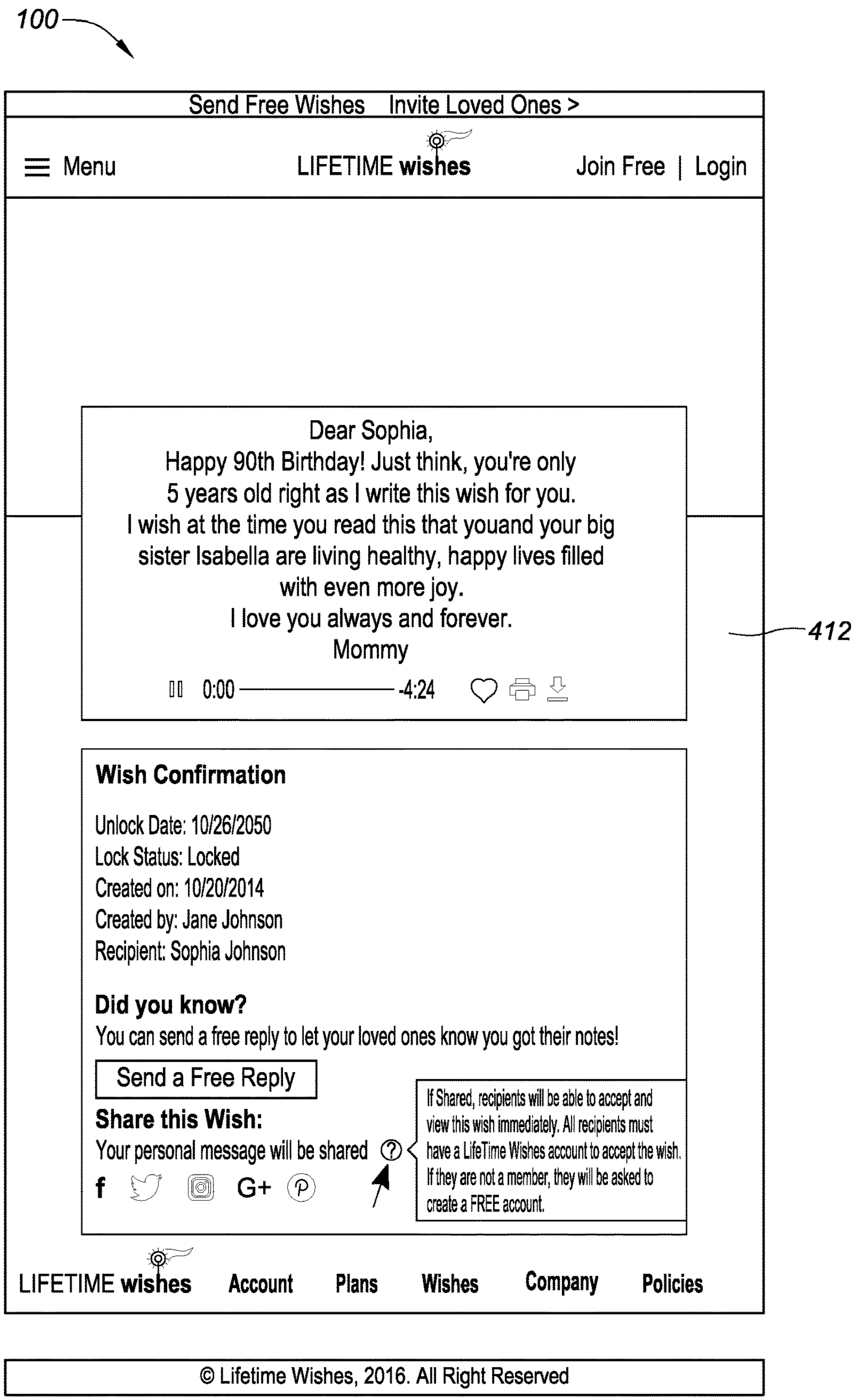

To preview the wish or message created by the user, system 10 may display a wish preview 402 on a wish preview page 400 as shown in FIG. 33. The wish preview 402 may provide a preview of the html page showing visuals, copy/text, audio and other aspects of the message to be sent to the recipient. In short, preview 402 may show how the wish will look, including any selected background, layout, template, text, visual and audio. It may also indicate whether any document or gift is attached to the wish.

The user may view the wish preview 402 and choose how to proceed via the wish preview page 400 by clicking the desired button. For example, as shown in FIG. 33, wish preview page 400 may include one or more of the following buttons: a preview as recipient button, an edit button 404, a delete button 406, a save button 408 and a schedule button 410. Other buttons may be available for additional operations on the created message. By selecting to preview as a recipient, system 10 may display a recipient preview page 412, as illustrated in FIG. 34, showing how the wish will appear to the recipient.

By clicking the edit button 404, the user may navigate back to the appropriate step and GUI in the message creation stage 1 to make any desired edits to the wish, such as adding a different photo, correcting a typographical error in the message text, changing background color or layout, etc. The user may then preview the revised message, and if necessary, make more revisions. As shown in FIG. 53, the user may toggle between message creation state 1 and message preview stage 2 as desired.

After the user is satisfied with the message created, he or show may click the save button 408, and the wish may be stored in the user's wish vault 500 which is described in further detail below. At this point, the message preview stage 2 may generally be complete.

The user may then proceed to the scheduling stage 3 of FIG. 53 by clicking the schedule button 410 in the GUI of FIG. 33. Scheduling stage 3 is now further described with reference to FIGS. 35-38. As with the prior stages, it is preferred that the GUIs associated with the scheduling stage 3 highlighted that the user is in this stage.

Figure 35:
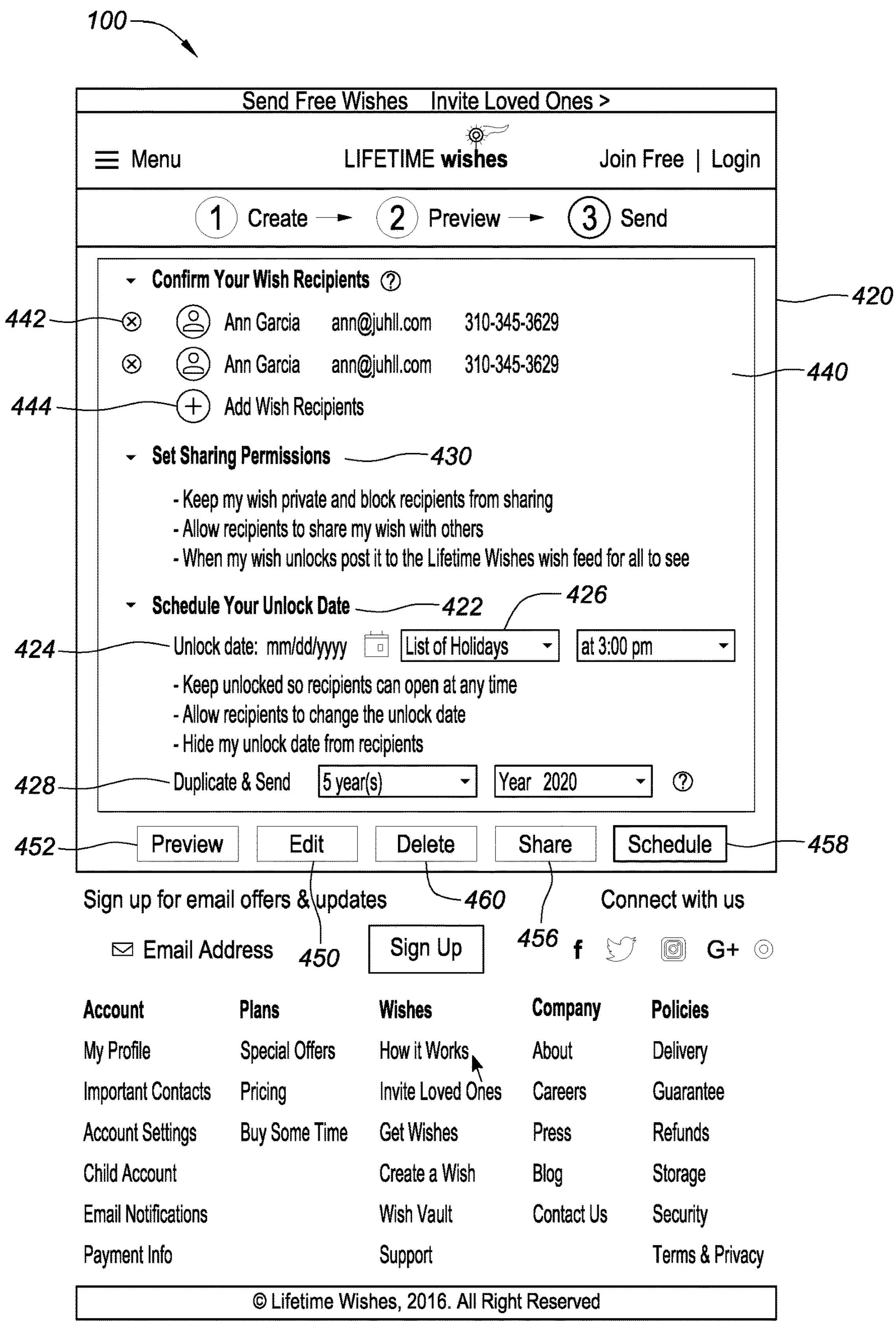
FIGS. 35, 36A, 36B and 37 show graphical user interfaces which may be accessed by the user to schedule and send messages.

When the user clicks the schedule button 410, a schedule and send page 420 may be displayed as shown in FIG. 35, which may allow the user to schedule delivery of the wish, set unlock date and time settings, add recipients, add collaborators, view recipient status, notify recipients, set sharing permissions (allow or block) for the wish, allow recipient to edit wish settings, add a gift through the gift manager, preview, edit, save, send and/or submit payment information for any premium purchases and gift cards.

More specifically, the schedule and send page 420 may include a schedule unlock date box 422. As described above, system 10 may be used to create, store and later send wishes at some time in the future. The unlock date may be the date/time when a currently time-locked wish may become unlocked and delivered and/or otherwise made accessible to the recipient. The unlock date may also reflect a date when an e-mail or other notification is sent to the recipient advising them that he or she has a message waiting to be received. Upon receiving this notification, the recipient may then visit the website or other platform on which system 10 resides to access the message or wish. As such, it is contemplated that the message or wish be available on the date that any notification is sent.

Still referring to FIG. 35, the schedule unlock date box 422 may include an unlock date field 424 and an unlock holiday field 426. In the unlock date field 424, the user may manually enter a specific date (i.e. month/date/year), or the user may select a date from a calendar popup window. In the unlock holiday field 426, the user may select from a dropdown menu of holidays that may fall on different dates each year (for example, Mother's Day, Father's Day, Easter or other holidays or events). Thus, in one form, the user may schedule the unlock date either by entering a certain date (month/date/year) in the unlock date field 424 or by selecting a holiday in the unlock holiday field 426.

In addition, the schedule unlock date box 422 may include various options to change the locked/unlocked status of a wish or message. In one form, the schedule unlock date box 422 may include options allowing the user to select any one or more of the following: keep the wish unlocked so recipients can open at any time, allow recipients to change the unlock date and hide the unlock date from the recipients. Other options may be made available.

The schedule unlock date box 422 may include a duplicate and send field 428 allowing the user to schedule the wish to be re-sent at predetermined dates in the future. For example, the user may schedule the wish to be re-sent every year or every x number of years until a certain date in the future.

The schedule and send page 422 may also include a set sharing permissions box 430, which may include options allowing the user to select any one or more of the following: keep wish private and block recipients from sharing, allow recipients to share wish with others, and/or when wish unlocks and post it to a public wish feed. Other options may be made available to the user.

The schedule and send page 420 may also include a confirm wish recipients box 440. The confirm wish recipients box 440 may display a list of the wish recipients and their e-mail addresses. Each wish recipient may have an x button 442 adjacent thereto, allowing a user to delete the associated wish recipient. In another form, the confirm wish recipients box 440 may include an add wish recipients button 444, which may allow a user to add additional wish recipients to the wish.

The schedule and send page 420 may also include one or more of the following: an edit button 450 allowing the user to navigate back in the system to message creation stage 1 in order to edit the wish, a preview button 452 allowing the user to view a wish preview as in preview stage 2, a delete button 454 allowing the user to delete the wish, a save button 456 allowing the user to save the wish to the wish vault, a schedule or send button 458 allowing the user to send the wish to the wish recipients and a delete button 460.

Figure 36A:
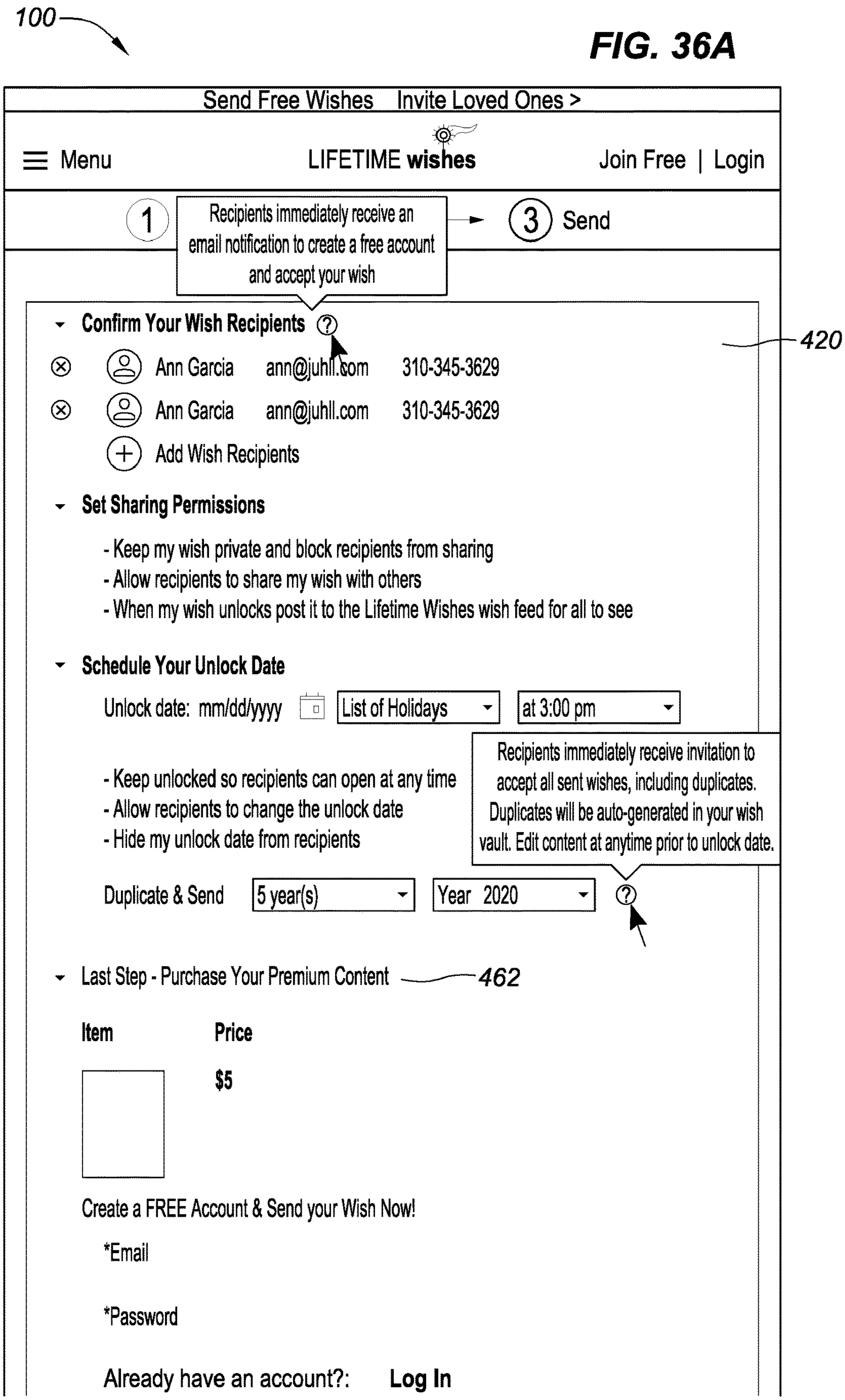
Figure 36B:
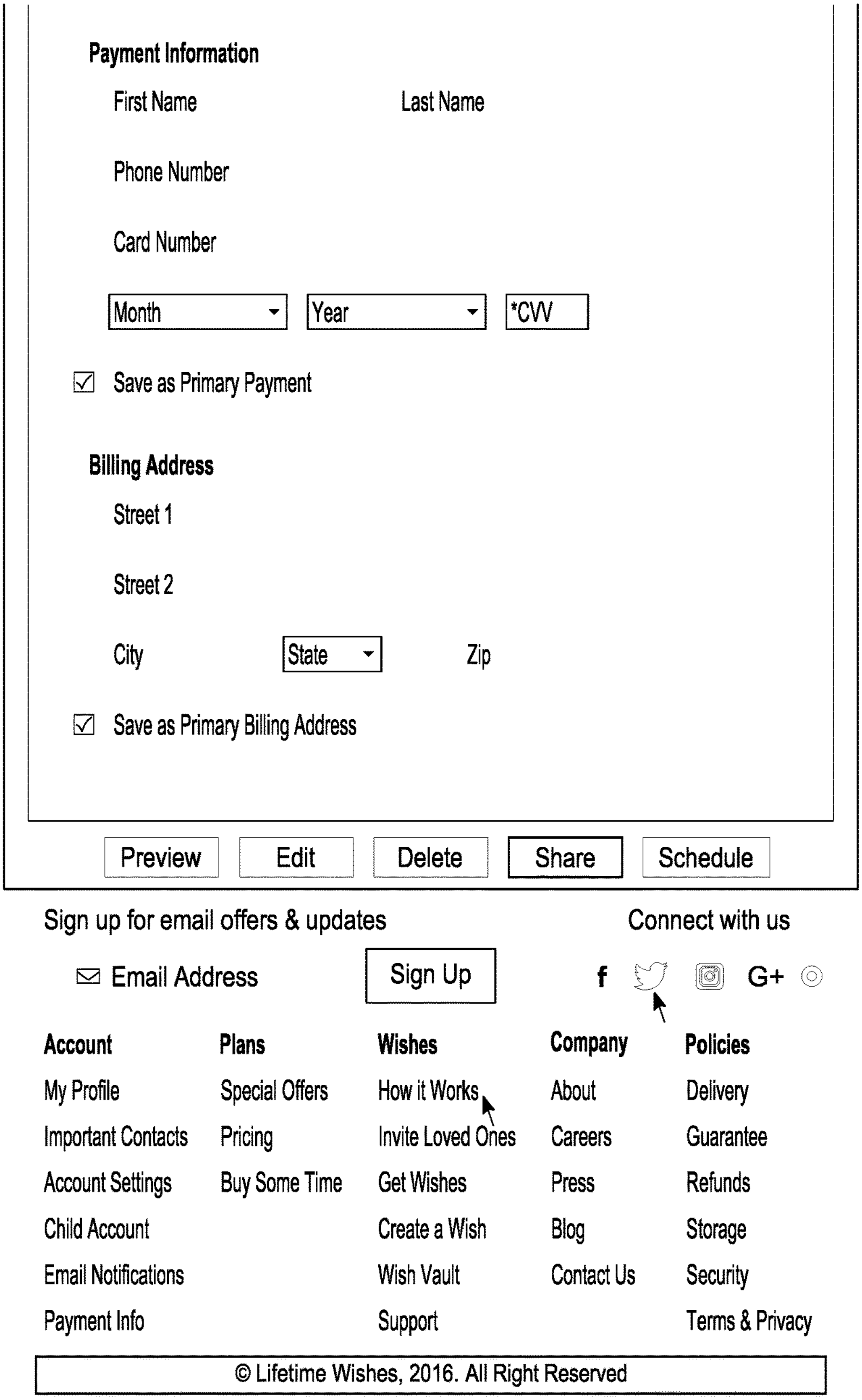

As illustrated in FIG. 36, if the wish includes any premium purchase or gift cards, the schedule and send page 420 may also include a purchase premium content box 462. The purchase premium content box 462 may include an itemized listing of the purchased premium content, gift cards and/or other types of gifts and the prices therefor. It may also include user payment information data fields in which the user may enter payment information data items, such as user name, payment method, credit card number, credit card expiration date, credit card verification value (CVV) code and the like. It may also provide an option to save the payment information as the primary or default payment information for subsequent wish sending costs.

Figure 37:
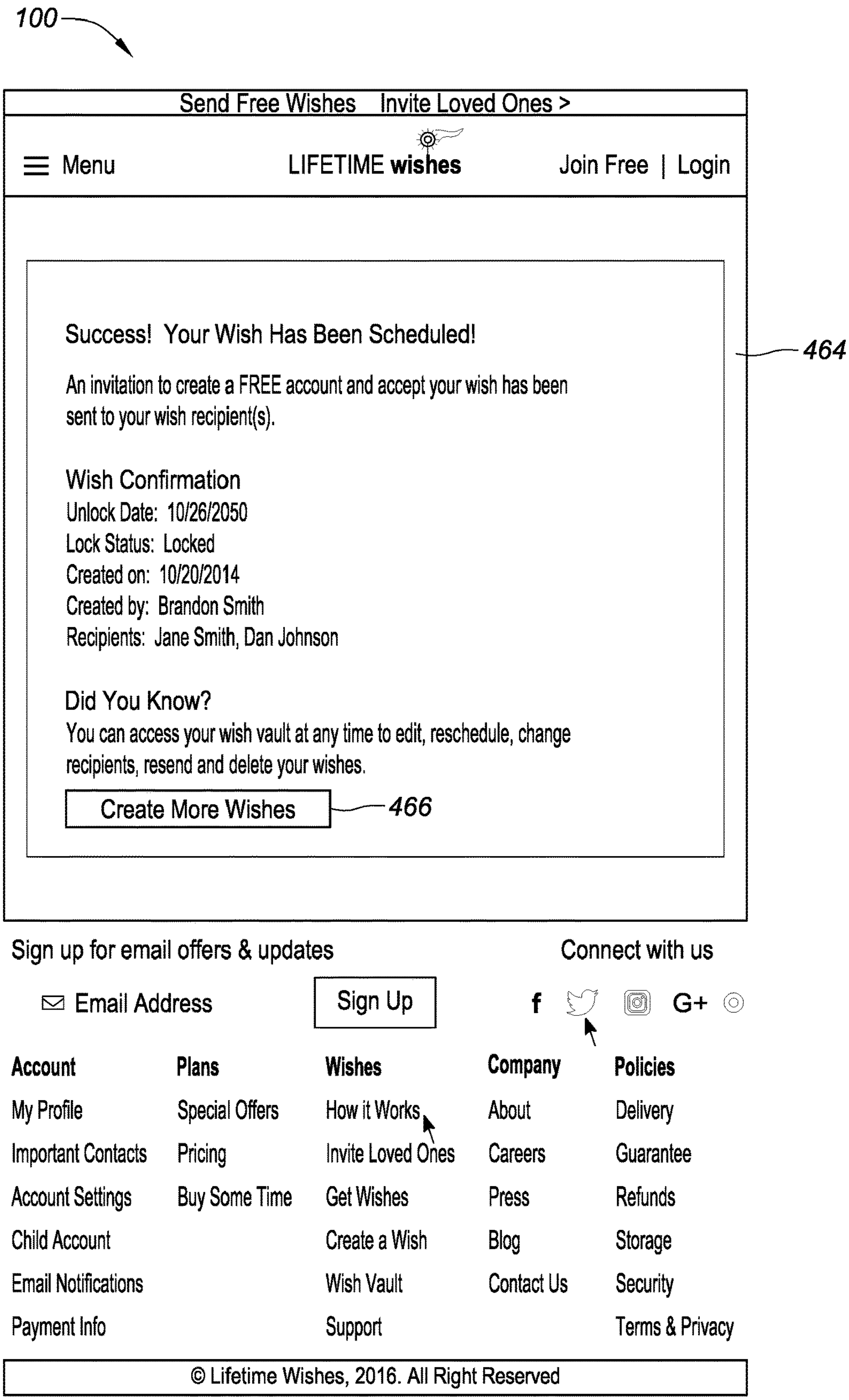

Upon clicking the send button of the schedule and send page 420, the system 10 may display a scheduled confirmation page 464, as illustrated in FIG. 37. This confirms that the user's wish has been successfully scheduled and indicating one or more of the following: the unlock date, the lock status, the creation date, created by, wish recipients. The confirmation page 464 may also include a statement that the user may access the wish in his/her wish vault at any time and may edit, reschedule, change recipients, resend, and/or delete the wish. It may also include a create more wishes button 466 allowing the user to begin the create wish process over again.

For time-locked messages to be sent in the future, when the message or wish is eventually sent, system 10 may generate a confirming e-mail or other notification to the sender to confirm that the time-locked message was indeed unlocked and sent. This may provide peace of mind to senders, e.g., to receive annual confirmation that their Christmas messages have indeed been sent to the intended recipients.

Upon clicking the send button on the schedule and send page 420, a recipient delivery notification may be generated. For example, system 10 may generate and send an e-mail to the recipient(s) including, for example, wish status information such as, date created, unlock date, lock status date, created by, and/or recipient list. It may allow the recipient to create an account, accept/reject a wish, and/or edit wish settings. Where the message is intended to be a surprise and to be sent on a particular date, the recipient delivery notification may be sent by system 10 on that date, or shortly before, so as to not spoil the surprise.

Figure 39:
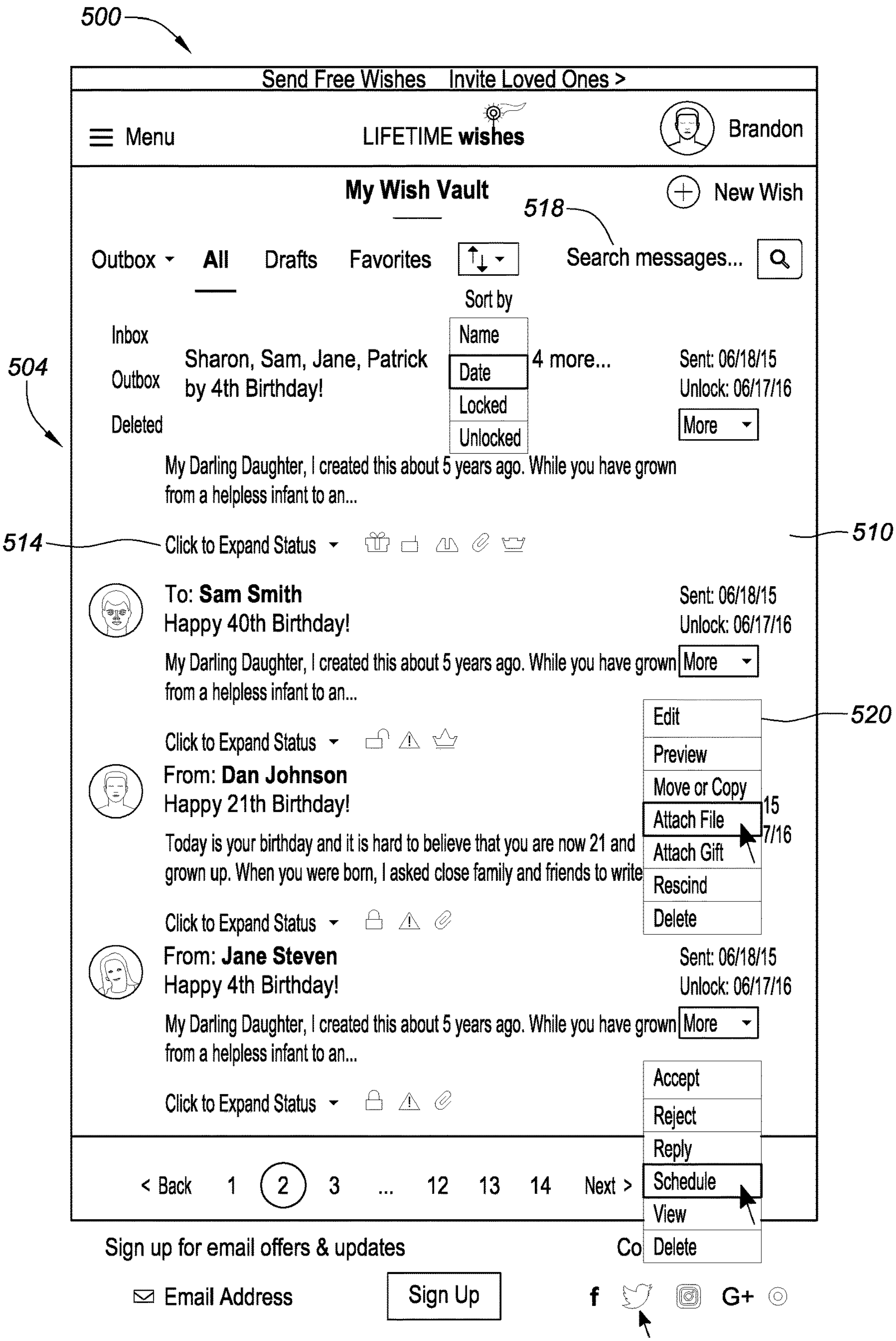
Figure 40:
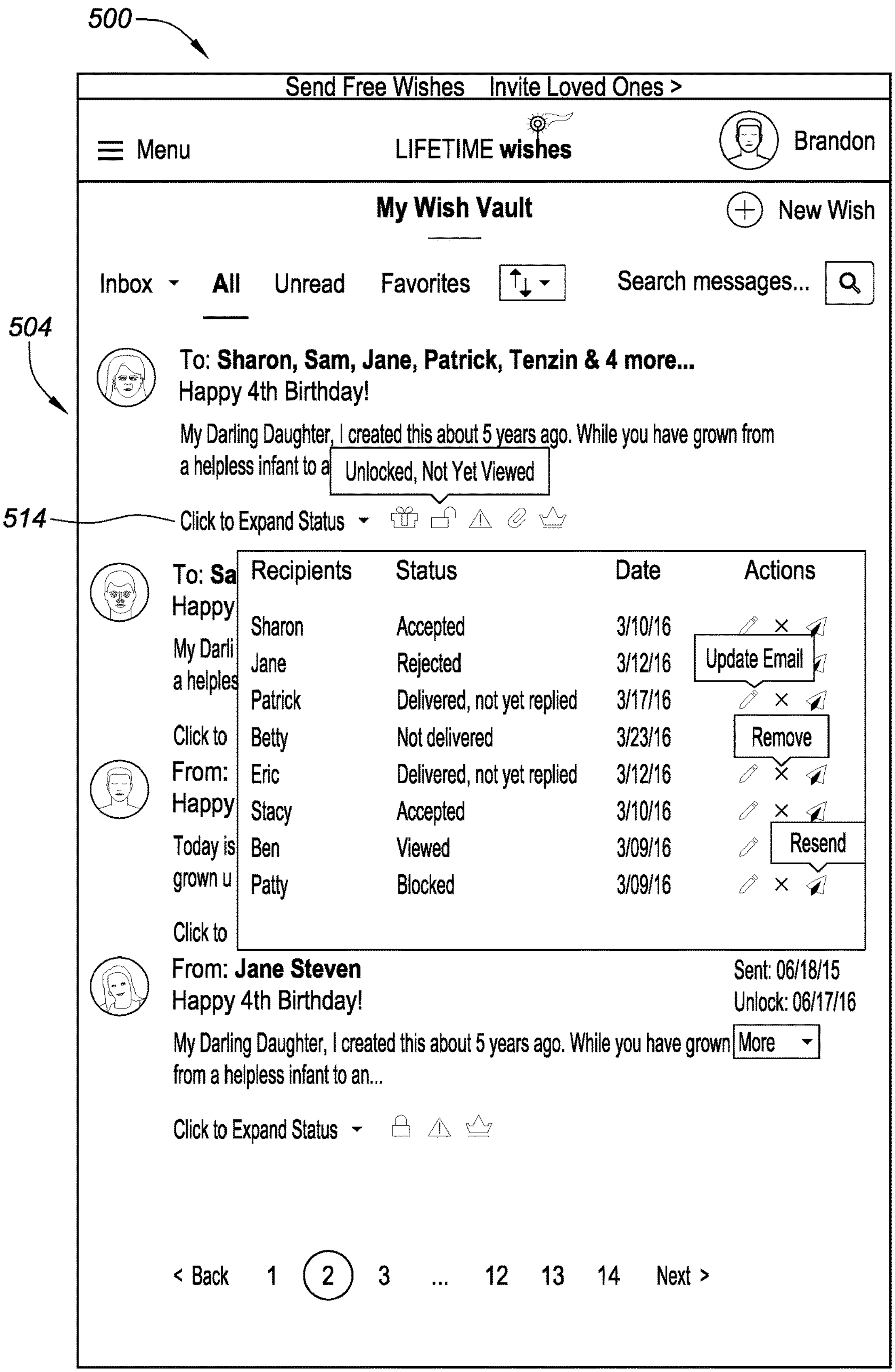

The wish vault component or module 1030 (FIG. 1) of system 10 is now further described with reference to FIGS. 38-40, which show GUIs that allow the user to manage wishes and content that have been previously created and/or saved. Referring back to FIG. 6, the user may select the wish vault button from tool bar 106 which may serve to display the wish vault GUIs 500 as shown in FIGS. 38-40.

Wish vault GUIs 500 may display various information and buttons or links, such as a user wish dashboard, wish message dates and status notifications, user's purchased plan, user's wish list and/or wish list message manager. Through the wish vault GUIs 500, the user may: create new wishes and/or edit existing wishes, search, sort, and/or view existing wishes (for example, by favorites, recipient, sent date, not yet sent, unlock date, accepted, not accepted, viewed, unlocked by not viewed, not yet scheduled, upcoming, past, received and the like), view user's wish dashboard, view wish dates and status notifications, manage received messages/wishes (for example, buy key, accept, reject, delete, update receiver contact information, reply with message/wish to sender, retrieve deleted wishes, send e-mail notifications to sender, share, add other recipients, stop sharing, unlock, view (add to favorites, print visual/text, download visual/text/audio, play video/audio, and/or manage sent wish messages (for example, buy key, edit, preview, schedule, request acceptance, rescind wish, allow sharing, block sharing, delete, update receiver contact information, add collaborator, add more recipients, send e-mail notifications to receiver or retrieve deleted wishes. Other information and/or links may also be provided by wish vault GUIs 500.

The wish vault module 1030 that support GUIs 500 may be similar in some respects to an e-mail account. For example, it may provide a wish outbox 502, a wish inbox 504, deleted wishes and draft wishes.

Figure 38:
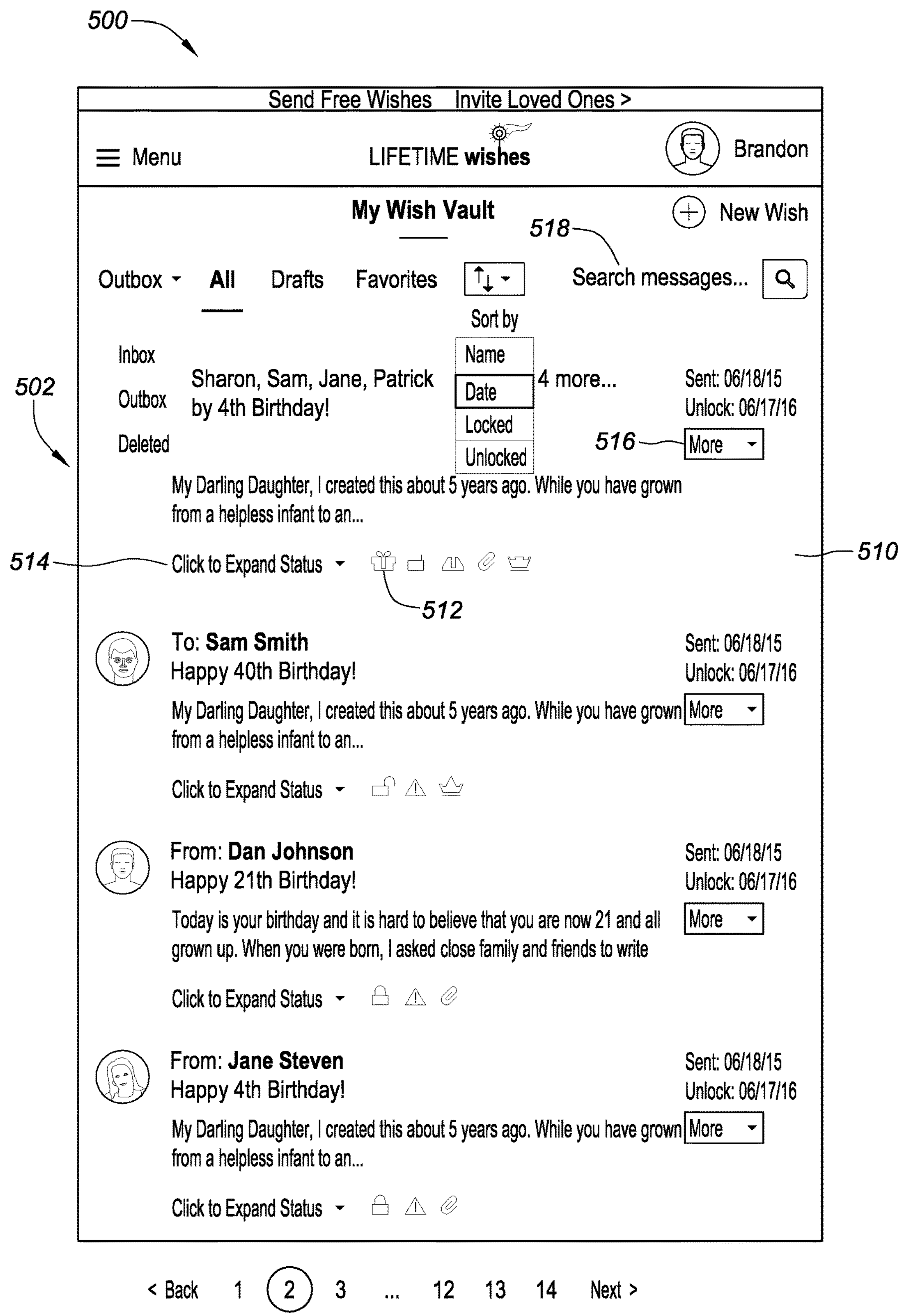
FIGS. 38-40 show graphical user interfaces reflecting a wish (message) vault aspect of the system regarding the storage and history of messages created by the user.

An exemplary wish outbox 502 is shown in FIG. 38. The wish outbox 502 may include a listing of all wishes created and/or stored by the user. It may include, for example, draft wishes, wishes that have been scheduled for delivery and wishes that have already been sent to the recipient(s).

Each wish listed in the wish outbox 502 may include a wish data field 510 displaying one or more of the following items of information: the wish recipient(s), the wish subject/title, a preview of the wish text, the date the wish was sent and the unlock date. Additional fields for other information may also be provided.

Each wish data field 510 may also include one or more wish status icons 512 indicating the status of the wish in terms of whether there was any gift attached, whether the wish is locked or unlocked, whether there are any attachments. The "!" icon may indicate that there is an issue for the user to address. For example, the issue could be that they forgot to "send", did not yet schedule a send date, or perhaps the recipient rejected their wish, blocked them or never opened the e-mail notification. The "crown" over user head icon may indicate that the user is a paid subscriber premium user.

Each wish data field 510 may include an expand status box 514 which, when expanded, may display a list of wish recipients, the wish status for each recipient (for example, accepted, rejected, delivered, viewed and the like, and the respective status date.

Each wish data field 510 may include a wish action menu 516, which, when expanded provides a list of actions to apply to the wish. For example, the wish action menu 516 may provide options to edit the wish, preview the wish, copy the wish, attach a document to the wish, attach a gift to the wish, rescind the wish, delete the wish from the wish outbox 502, designate the wish as a favorite and/or schedule the wish for delivery.

The wish outbox 502 may include one or more sorting features to allow the wishes to be sorted and viewed by category, status, recipient name, and the like. For example, the wishes in the wish outbox 502 may be sorted and viewed by categories including all wishes, draft wishes, favorite wishes and the like. Additionally, the wishes may be sorted and viewed by recipient name, date, unlocked, locked and the like. The wish outbox 502 may also include a search field 518 to search for wishes by keyword, name, date and so forth.

The wish inbox 504 may include a listing of all the wishes received by the user. As shown in FIG. 39, the wish inbox 504 may be arranged much the same as the wish outbox 502 and include many of the same features described above with respect to the wish outbox 502. Thus, only the differences are described in detail below.

Each of the wishes in the wish inbox 504 may include a wish data field 510, which may include a received wish action menu 520, which, when expanded provides a list of actions to apply to the received wish. For example, the received wish action menu 520 may provide options to accept the wish, reject the wish, reply to the wish, schedule, view locked/unlocked status, block sender and designate as favorite.

The wish inbox 504 may include one or more sorting features to allow the wishes to be sorted and viewed by category, status, sender name and the like. For example, the wishes in the wish inbox 504 may be sorted and viewed by categories including all wishes, unread wishes, favorite wishes, and the like. Additionally, the wishes may be sorted and viewed by sender name, date, unlocked, locked and the like. The wish inbox 504 may also include a search field 518 to search for received wishes by keyword, name, date and so forth. As illustrated in FIG. 40, an expand status box 514 may be opened to display the wish recipient(s) status, for example accepted, rejected, delivered, not delivered, viewed, blocked, and the like.

System 10 may also provide a wish calendar allowing the user to manage wishes through a calendar view. The user may: add life event dates, manually add life even dates for individual contact(s), add life event dates from individual contact's calendar, add life events for all contacts in a group, add life events for all contacts, link a wish to each life even date from a calendar, click date in calendar to view life events and scheduled wishes, view upcoming life events of others, automatically update and populate important dates from connected calendars, integrate calendar events with other personal calendars for reminder, choose icons/photos on calendar to represent who the wish is from/to or type of wish, and so forth.

Figure 41:
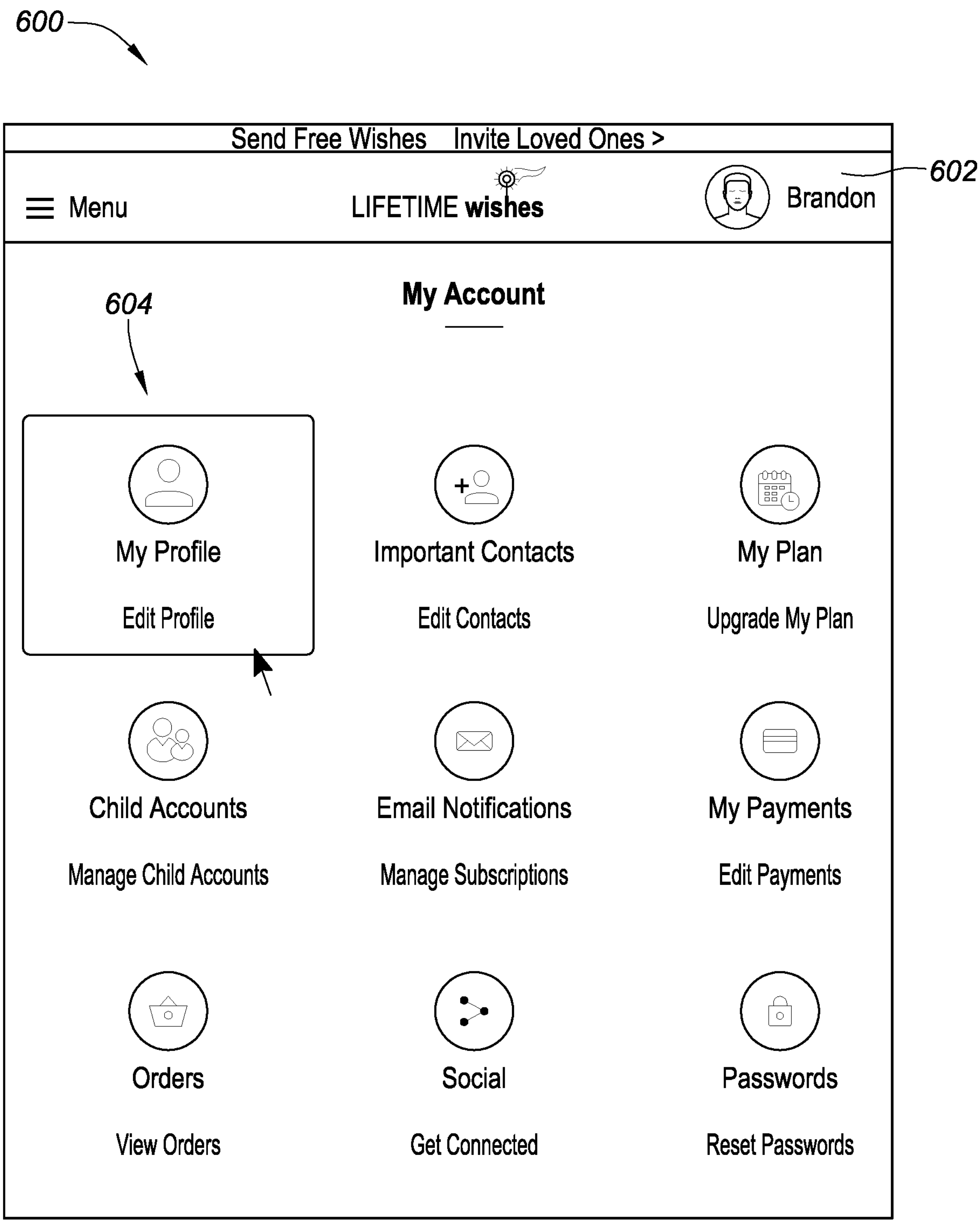
FIGS. 41-51 show graphical user interfaces reflecting the user's account with the system and the manner in which the user may manage his or her account.

The user account (My Account) aspect of the current invention is now described with reference to FIGS. 41-52. As discussed earlier, the logged-in page 24 (FIG. 6) may include navigation menu 34, and if the My Account link is selected, the user may access a series of My Account GUIs 600. As shown in FIGS. 41-52, the user account component 600 may include a plurality of GUIs allowing a user manage his/her user account. As shown in FIG. 41, a user account home page 602 may include a user account submenu 604 providing links to, for example, a user profile page 610, an important contacts page 620, a user plan page 630, a child account(s) page 640, an e-mail notifications page 650, a payments page 660, an orders page 670, a social page 680 and/or a passwords page 690. Other links and pages may be provided.

Figure 42:
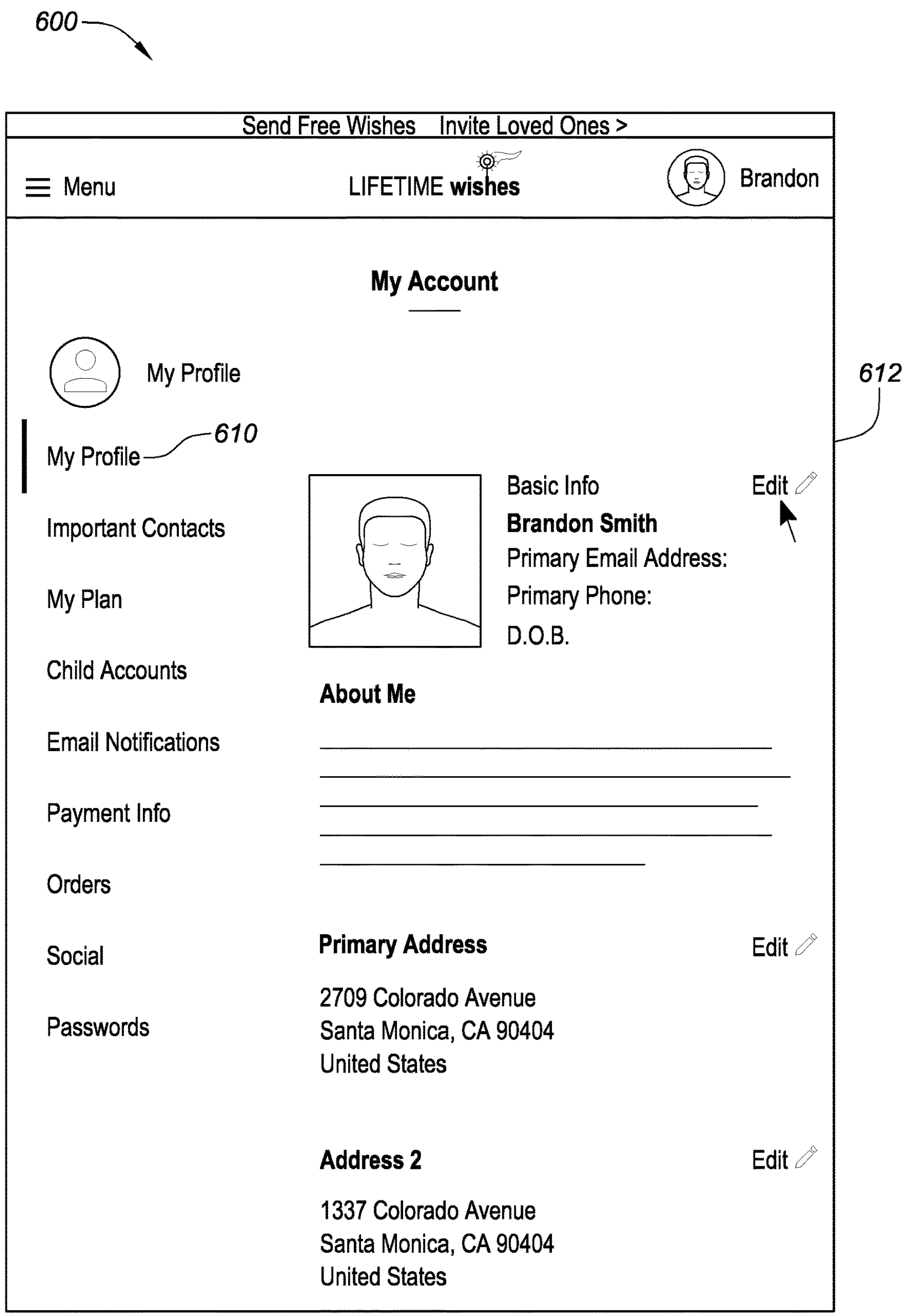

An exemplary profile page 610 is shown in FIG. 42. The profile page 610 may include a plurality of user data fields 612 for entering and/or editing one or more user information items such as photograph(s), name, e-mail address(s), phone number(s), date of birth, biographical information, mailing address(s) and/or other information.

Figure 43:
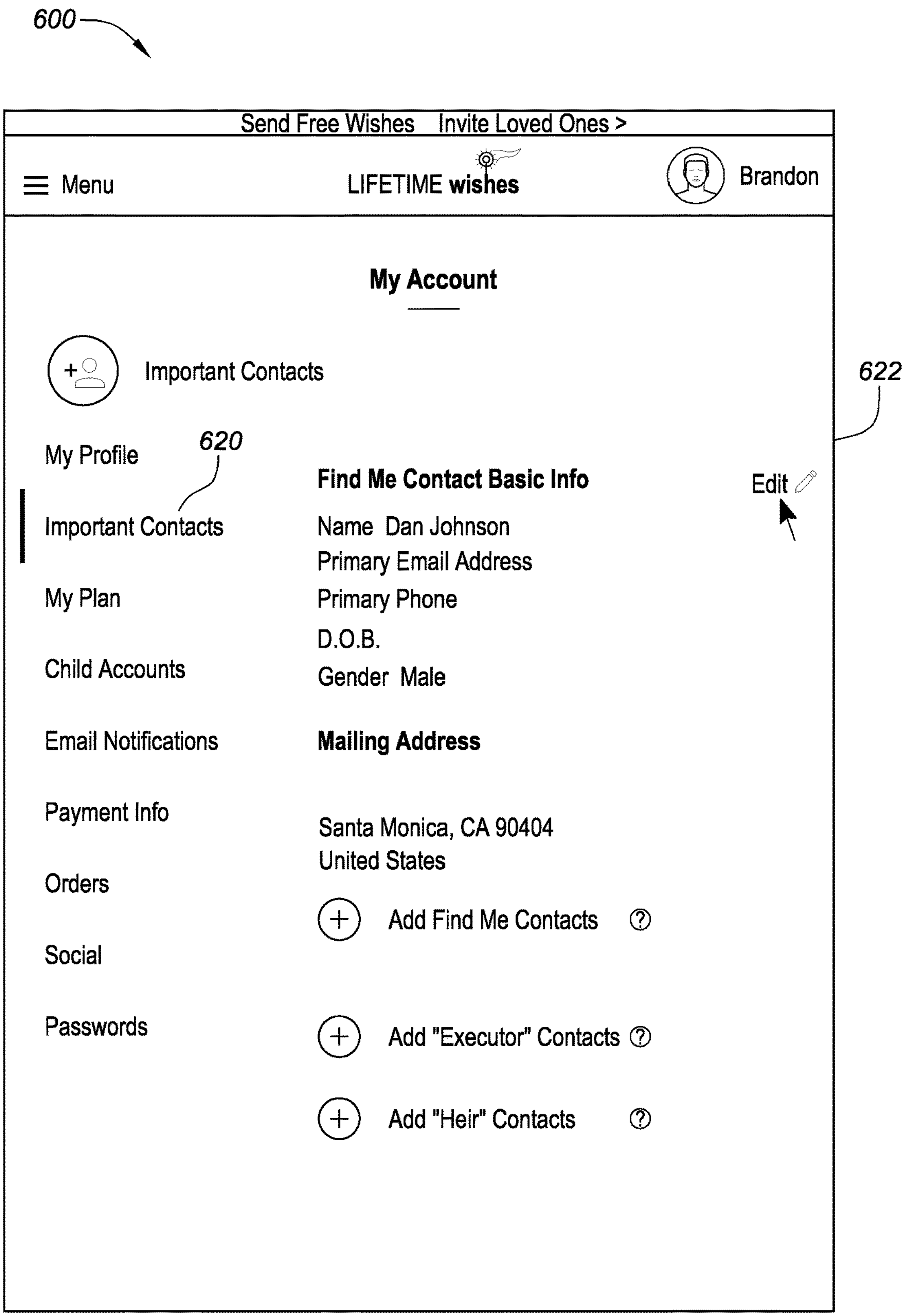

An exemplary important contacts page 620 is shown in FIG. 43. The important contacts page 620 may include one or more contact information fields 622 for a user emergency or "find me" contact and various contacts in the event the user is unreachable and/or passed away. In one form, the important contacts page 620 may include contact information fields for one or more "find me" contacts, one or more "executor" contacts and one or more "heir" contacts. Important contacts page 620 may be particularly useful for messages and/or documents to be sent posthumously. In a preferred embodiment, system 10 may periodically send an e-mail or other communication to confirm that the user is alive and/or at the same contact information.

Figure 44:
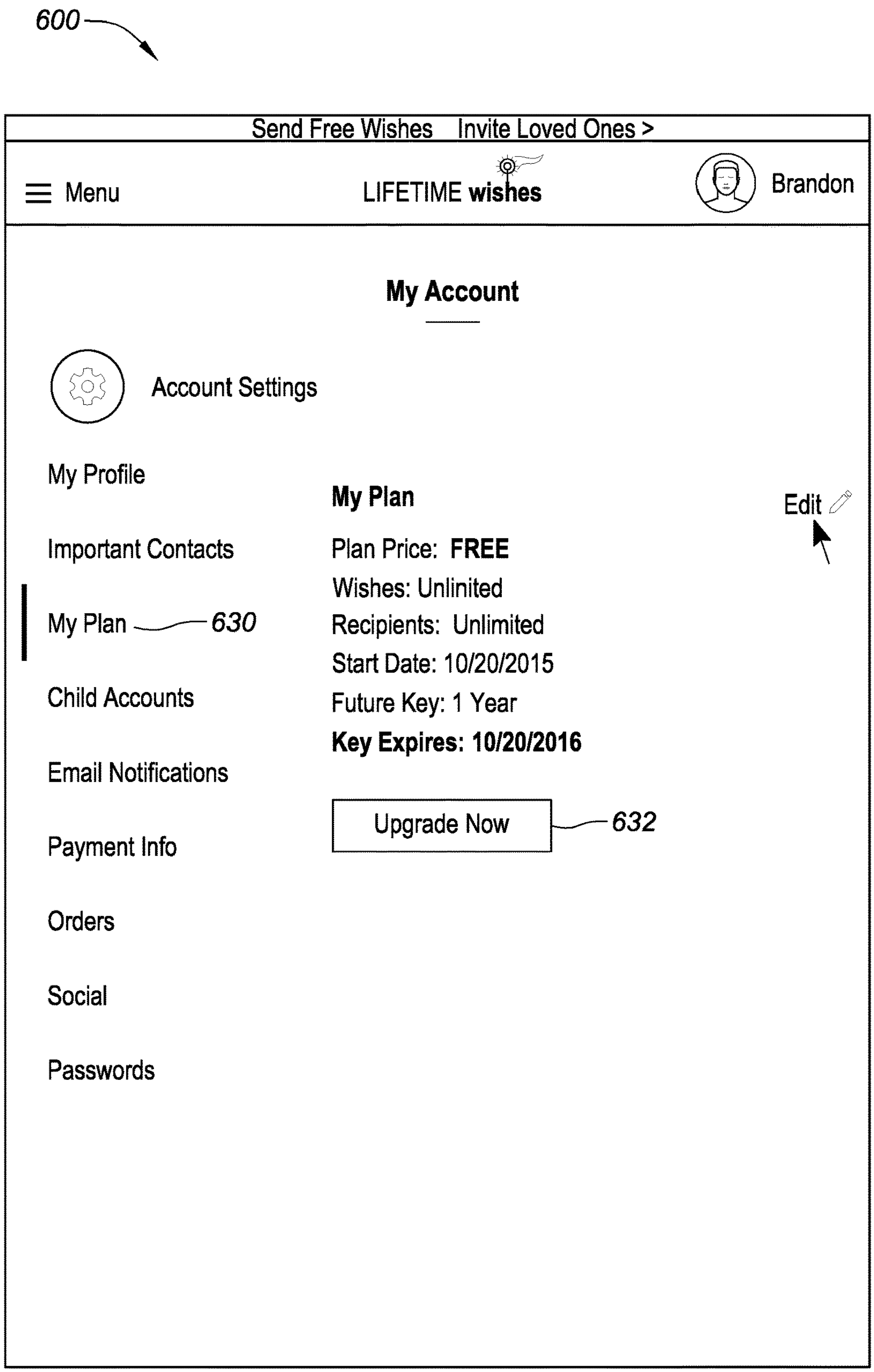

An exemplary user plan page 630 is shown in FIG. 44. The user plan page 630 may include information about the user's account including, for example, plan price, number of wishes, number of recipients, plan start date, future key, key expiration date. It may include an upgrade button 632 allowing the user to upgrade to a premium or other account.

Figure 45:
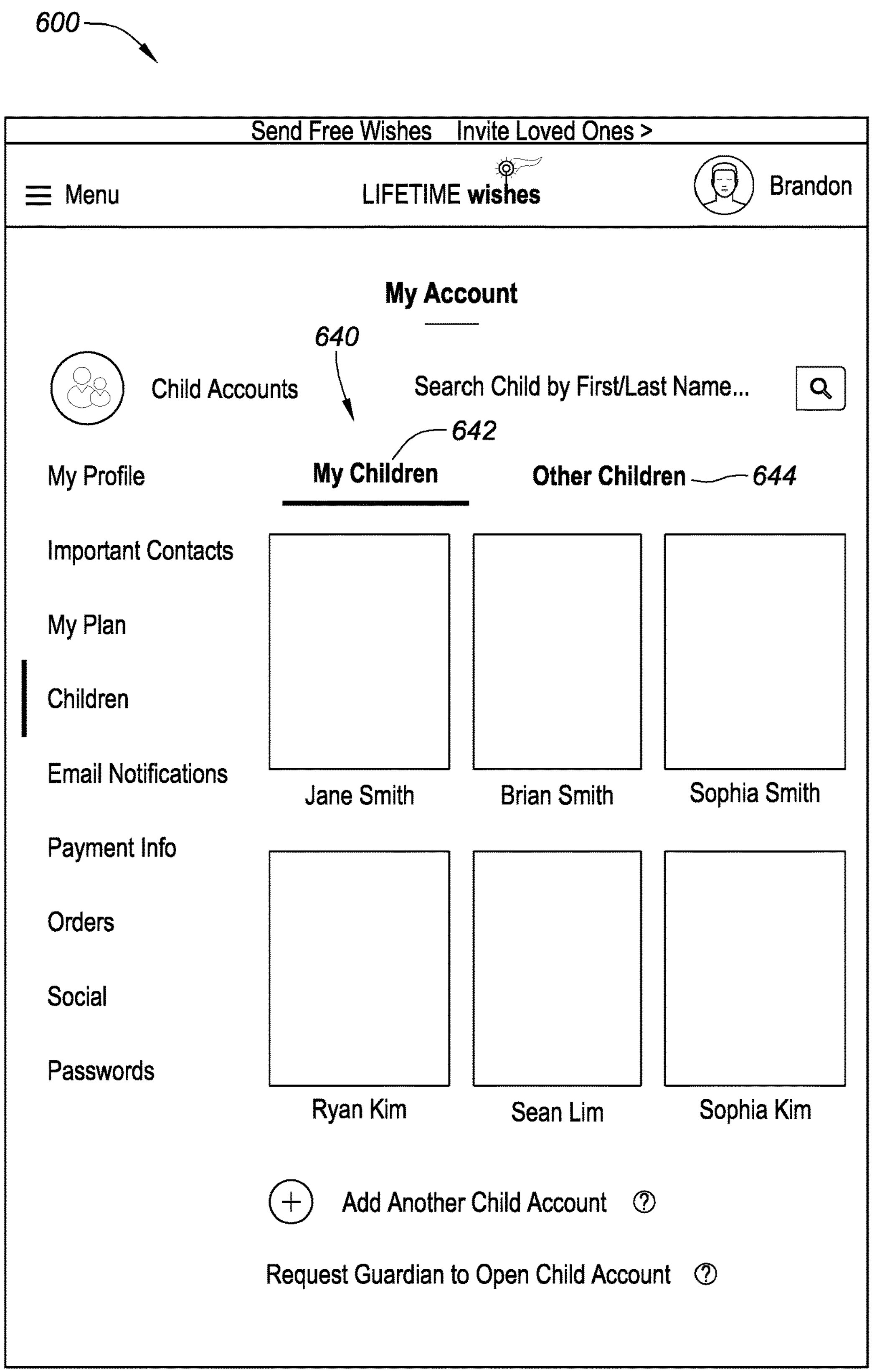
Figure 46:
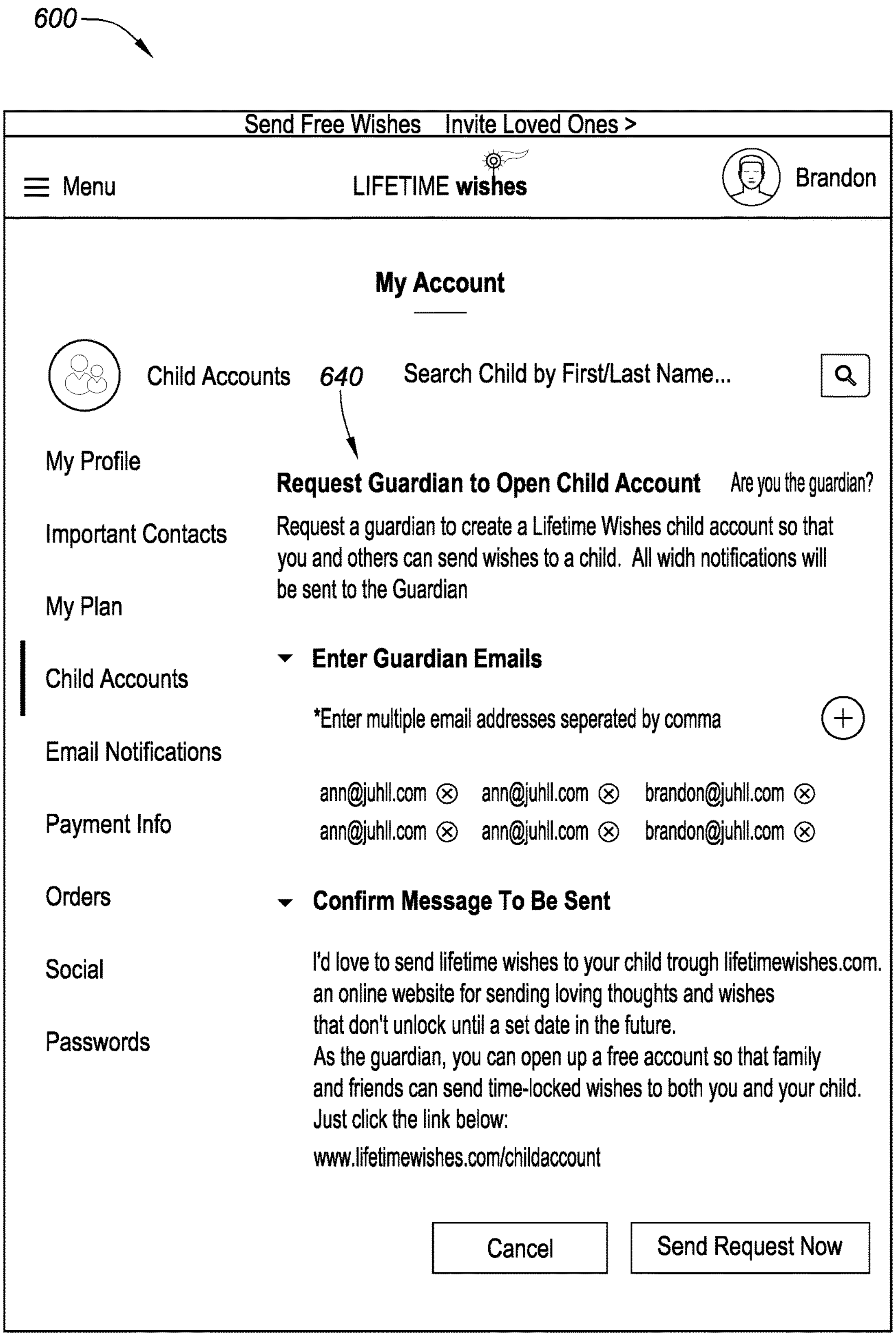

An exemplary child account page 640 is shown in FIGS. 45-46. Each child account page may include a plurality of child account information fields, including for example, photograph, child name, user name, password, phone number, birthday, gender, mailing address and the like. In one form, the child account page 640 may include a my children library 642 and an other children library 644. The my children library 642 and other children library 644 may include links to each associated child account therein. For example, the links may include a name and photograph associated with each child account. Each photograph may have displayed thereon one or more child account action icons, which may include for example, a designate as favorite icon, a delete account icon, and an edit account icon. Each library 642, 644 may also include options to add another child account and to request a guardian to open a child account.

An exemplary request to add child account is shown in FIG. 46. As discussed earlier, this request process may include the option to send an e-mail or other notification to the child's parent or guardian to obtain approval before the child account is opened. The manner in which the child account is opened may change over time to maintain compliance with current child protection regulations.

Figure 47:
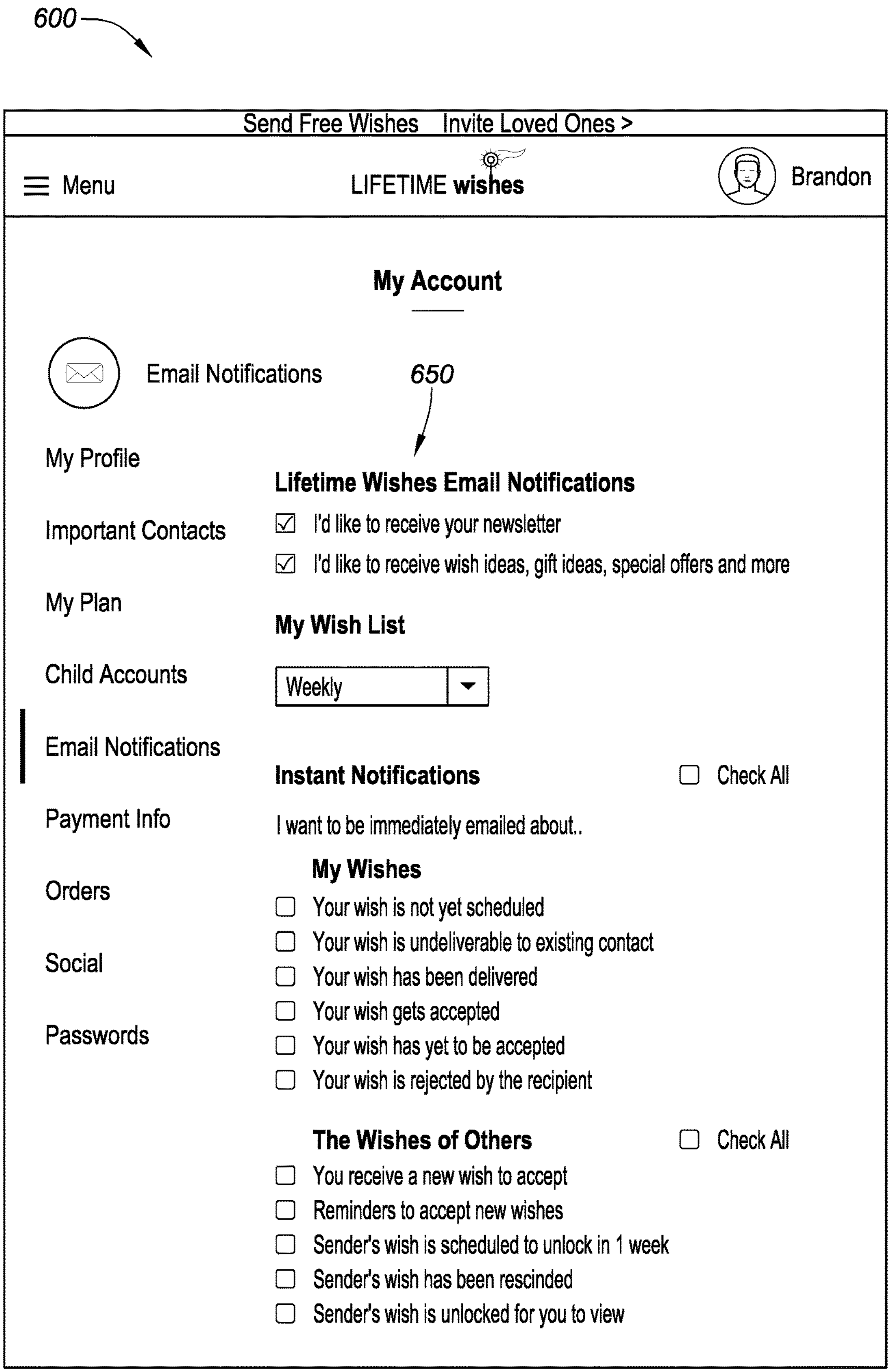

Other aspects of the user account 600 aspect of the current invention are now described. For example, an e-mail notifications page 650 is shown in FIG. 47. The e-mail notifications page 650 may provide the user with options to customize his/her e-mail notification preferences. In one form, the e-mail notifications page 650 may provide options to receive a company newsletter and/or receive wish ideas, gift ideas, special offers, and the like. The user may select whether or not to receive such items and how often (e.g., daily, weekly, monthly, etc.).

In another form, the e-mail notifications page 650 may provide the user options to elect to receive instant notifications regarding his/her own wishes, such as when: the wish is not yet scheduled, the wish is undeliverable, the wish has been delivered, the wish has been accepted, the wish has yet to be accepted, the wish is rejected. Likewise, the e-mail notifications page 650 may provide the user options to elect to receive instant notifications regarding wishes he receives from others, such as: the user has received a new wish, reminders to accept a new wish, a wish is scheduled to unlock in one week, a wish has been rescinded, a wish is unlocked and the like.

Figure 48:
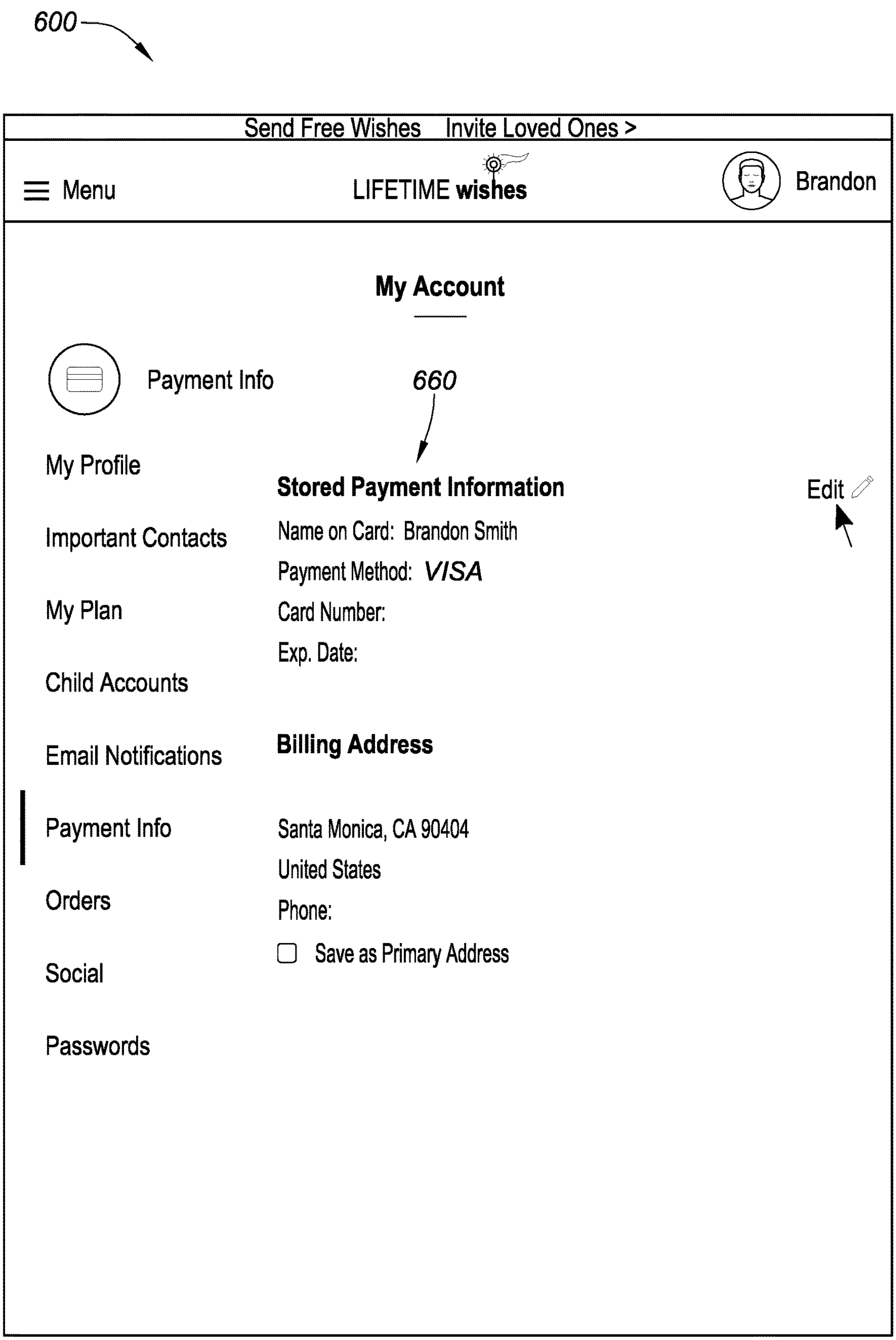

An exemplary payments page 660 is shown in FIG. 48. The payments page 660 may display the user's stored payment information, for example, name on credit card, credit card number, expiration date, billing address and the like. This GUI may also permit a user to edit such information.

Figure 49:

An exemplary orders page 670 is shown in FIG. 49. The orders page 670 may display a user's order history with a listing of a user's previous orders.

Figure 50:
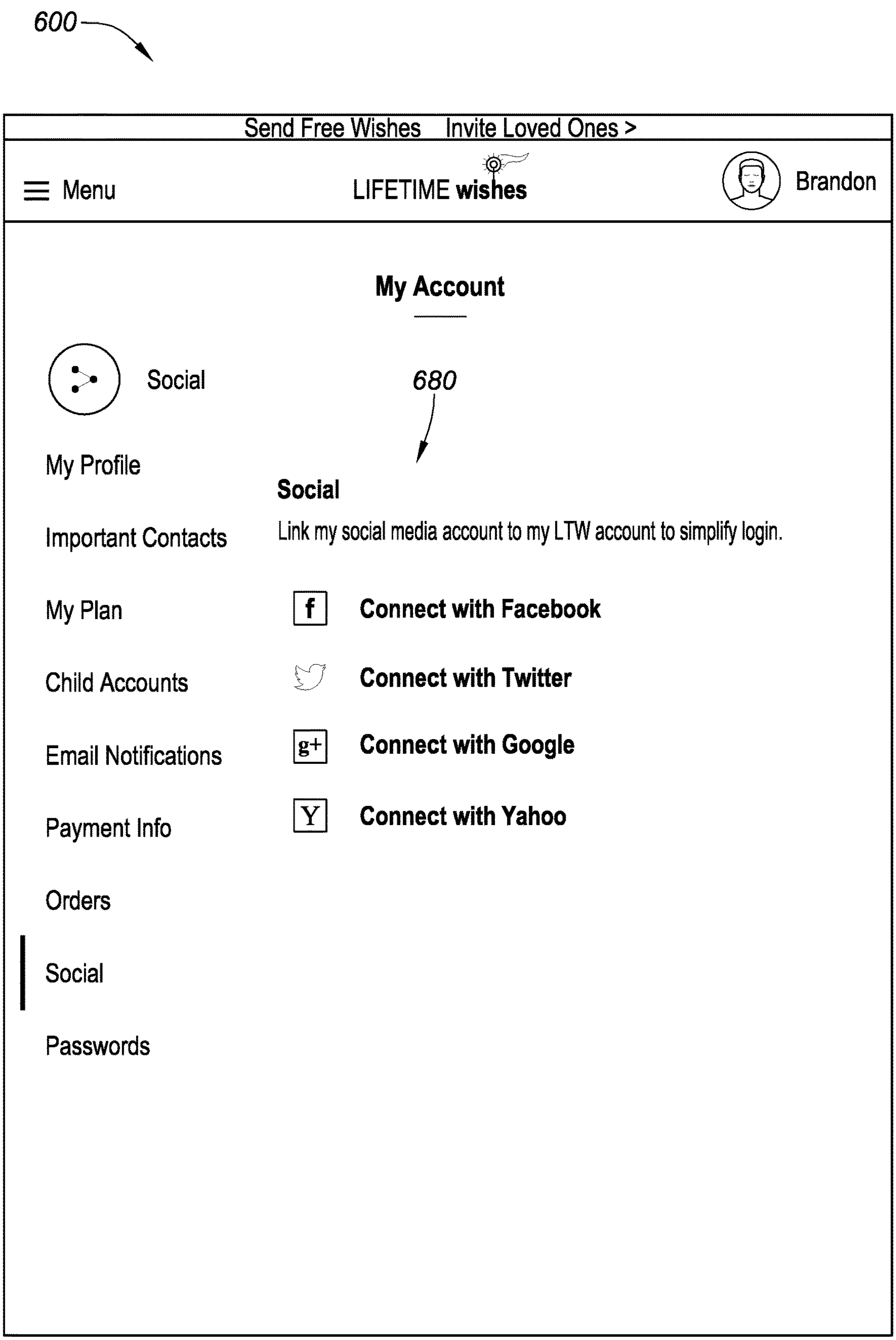

An exemplary social page 680 is shown in FIG. 50. The social page 680 may provide one or more buttons to link social media accounts to system 10. This may be used for various functions, such as importing contact information already stored on other social media sites.

Figure 51:
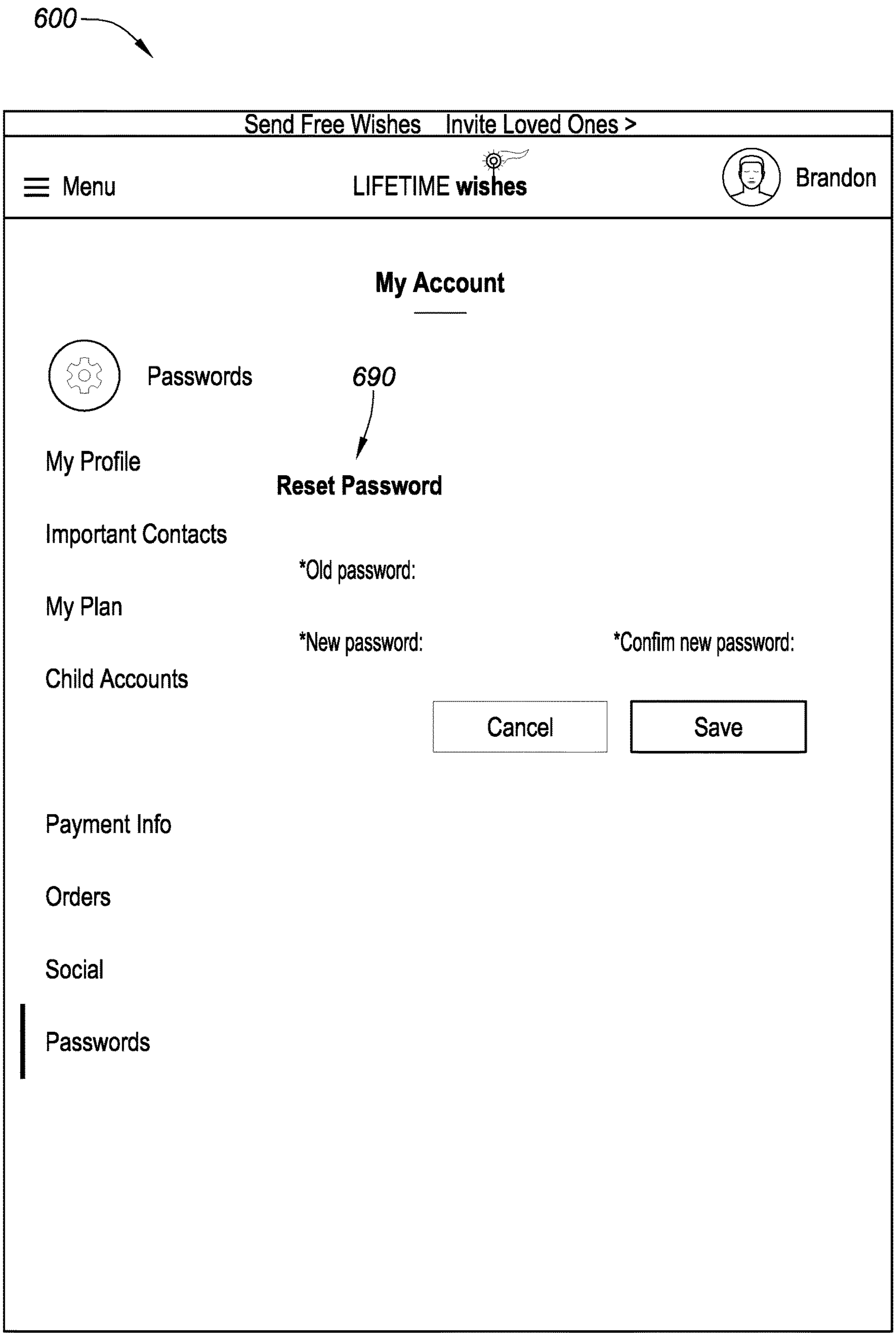

An exemplary passwords page 690 is shown in FIG. 51. The passwords page 690 may allow the user to reset his/her log-in password and save a new password.

Figure 52:
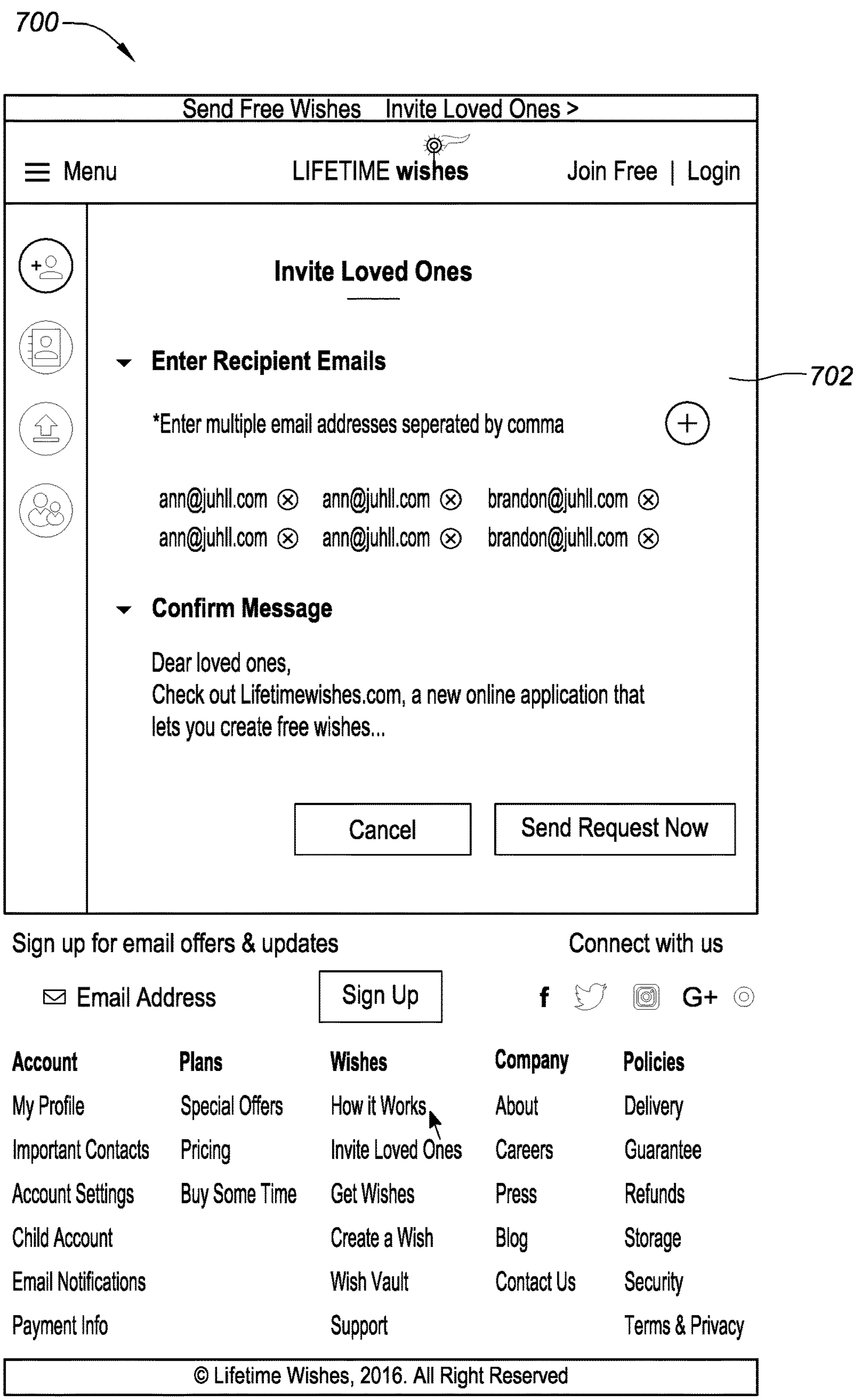
FIG. 52 shows a graphical user interface reflecting how a user may invite another person to the system.

Another aspect of the current invention involves an invite loved ones component 700 as shown in FIG. 52. With this feature, system 10 may use the contact manager 1002 (FIG. 1) to send an e-mail invitation to join/create an account. When the user accesses this aspect of system 10, the contact manager 1002 may allow the user to: add invitation recipients manually, access a user address book and select contacts to add as invitation recipients, import contacts from another contact list, add child account and/or request a guardian to add a child account.

In another aspect, system 10 may provide an interactive wisdom app. In one form, a user may record him/herself answering a template of questions regarding his/her viewpoints in life, for example: How do you know when to trust someone? How do you deal when life throws you a bunch of lemons? How do you deal with a broken heart? How do you inspire yourself to live life to the fullest? What are your thoughts on the afterlife? The receiver may then select the question to be answered and view the user's video/audio response.

In yet another form, the system 10 may provide an interactive magic fate ball app. In one form, the user may record him/herself giving "YES", "NO", and "MAYBE SO" answers. The receiver may thereafter ask a question and receive a randomized audio/video response from the user.

The system 10 may include a number of additional pages providing, for example but not limited to, legal notice(s), company information, job posting(s) and/or career information, press, blog posts, a contact form, how it works information, help/FAQ, wish stories, and the like. These may be associated with the appropriate databases and software modules.

Additional aspects of the current invention are now described with reference to Appendix A and additional figures.

An aspect of system 10 regarding inviting loved ones and contact interactions is described in section 3 of Appendix A. This section describes how the components of system 10, e.g., as shown in FIG. 1, may interact with each other and the logic followed thereby.

Wish vault 1030 is further described in section 4 of Appendix A. This section describes the logic followed by wish vault 1030 and the manner in which it may interact with the components of system 10, e.g., as shown in FIG. 1.

Figure 54:
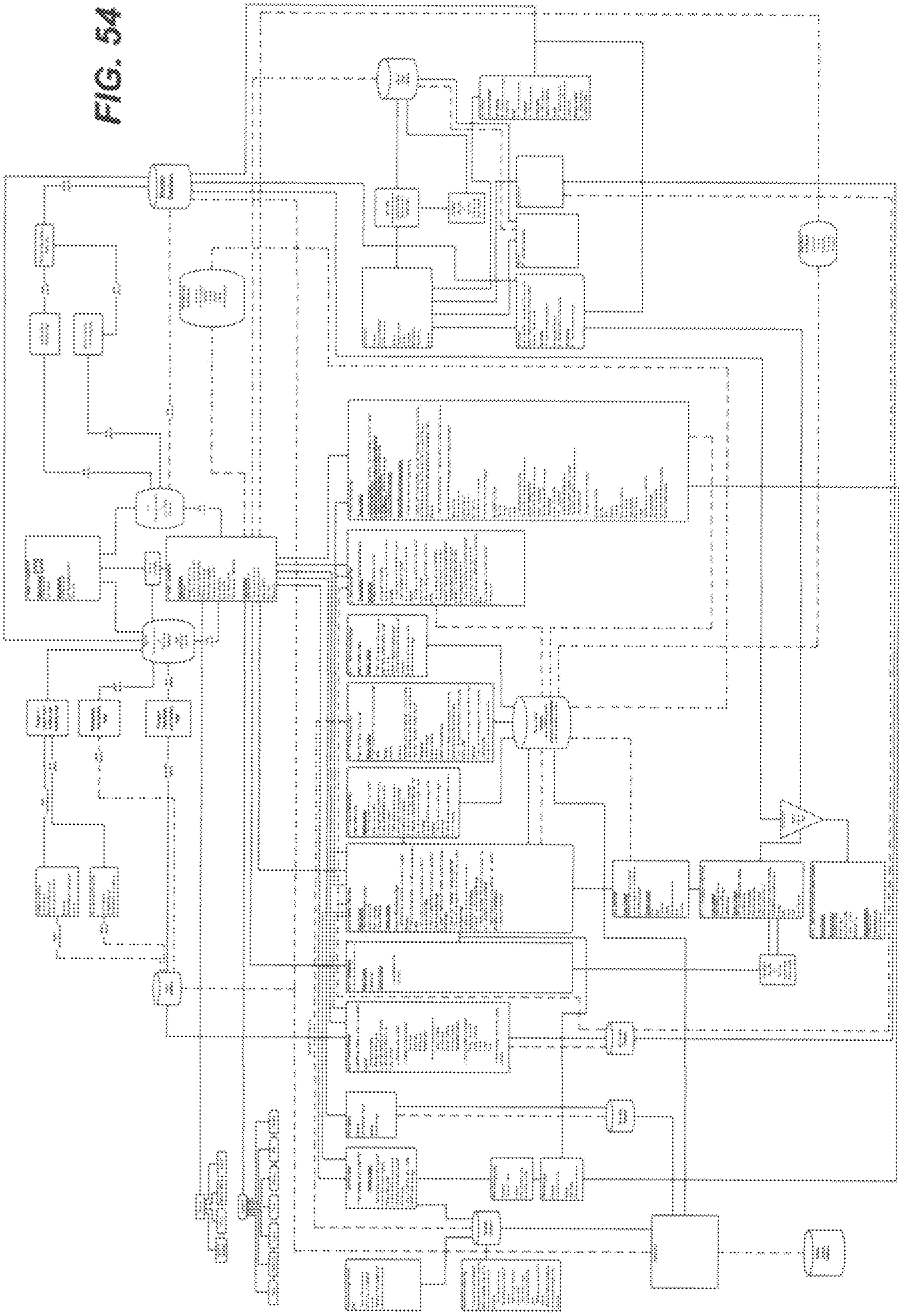
FIG. 54 shows a flow diagram illustrating a flow of data in a system in accordance with another aspect of the invention that may be suitable for use through an app, e.g., for use on a smart phone or other mobile device.
Figure 54B:
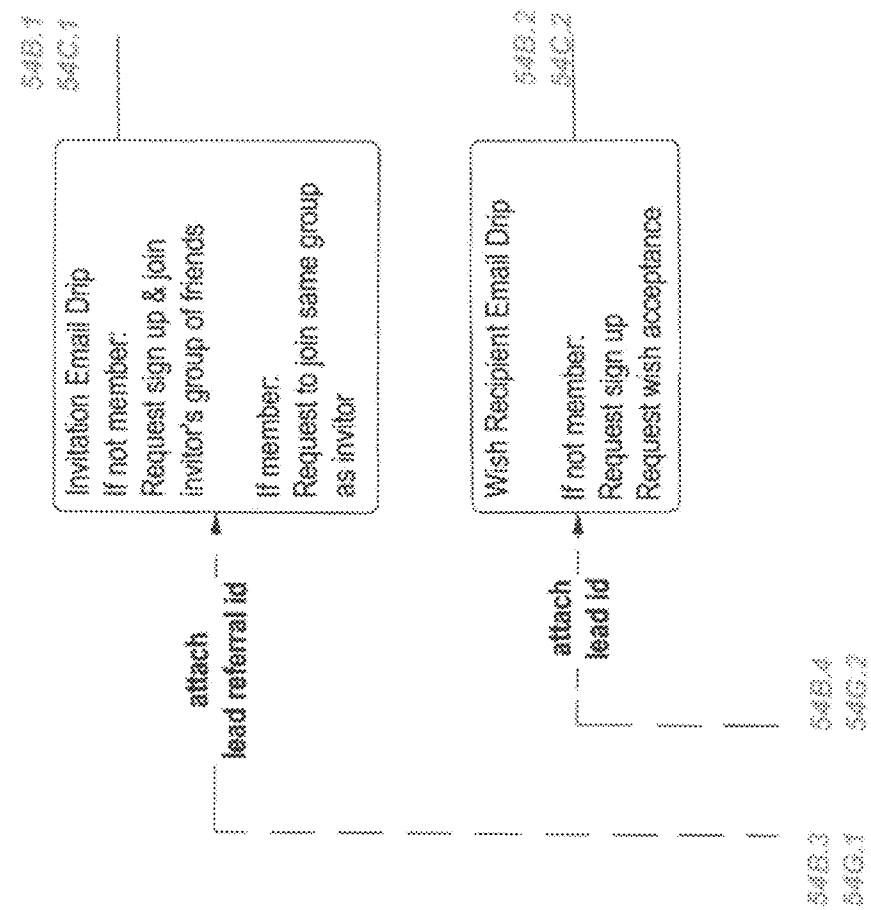
FIGS. 54A-54II are enlarged views of portions of FIG. 54. The relationships between the items shown in FIGS. 54A-54II are shown by FIG. 54.
Figure 54C:
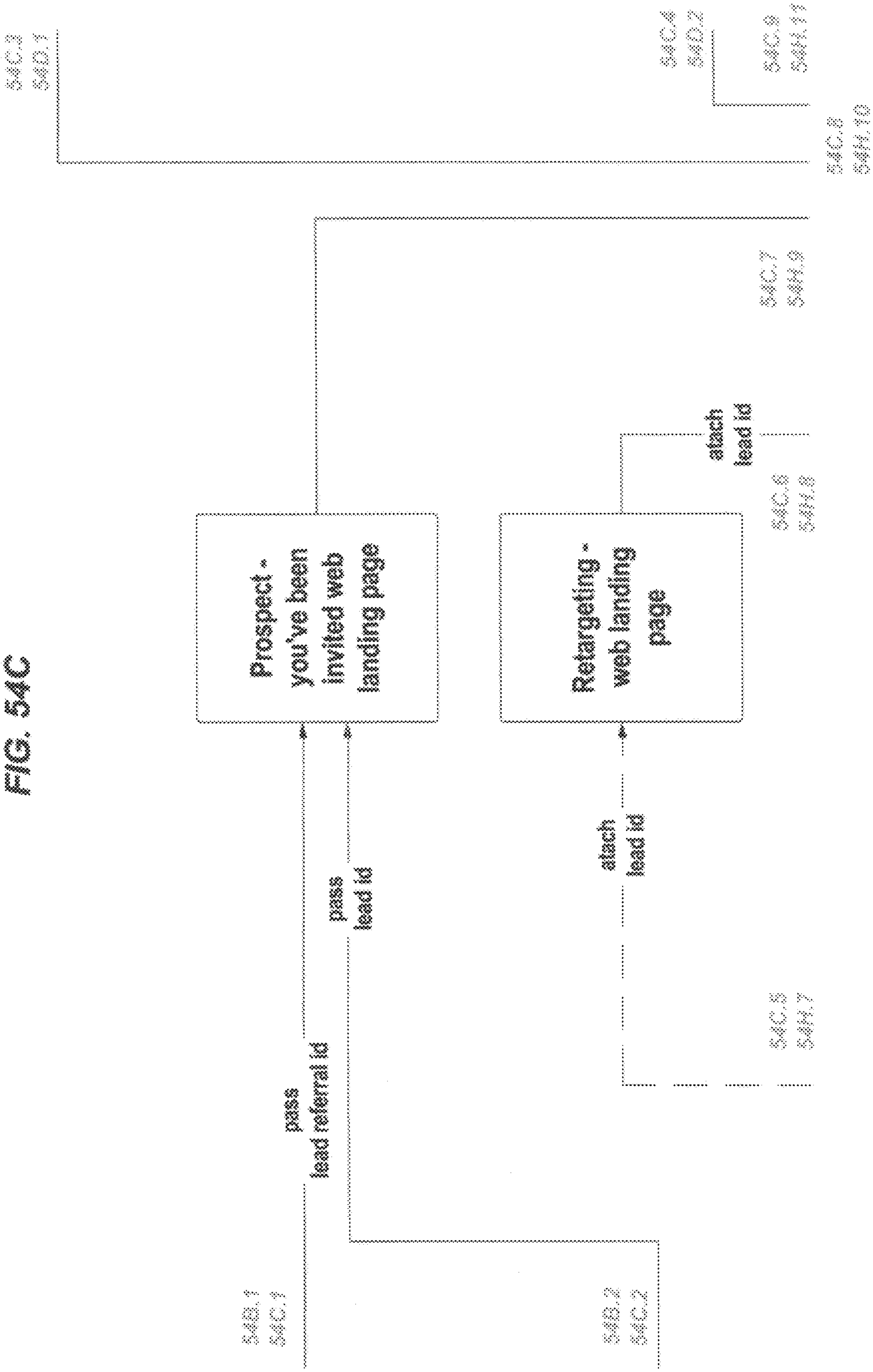
Figure 54D:
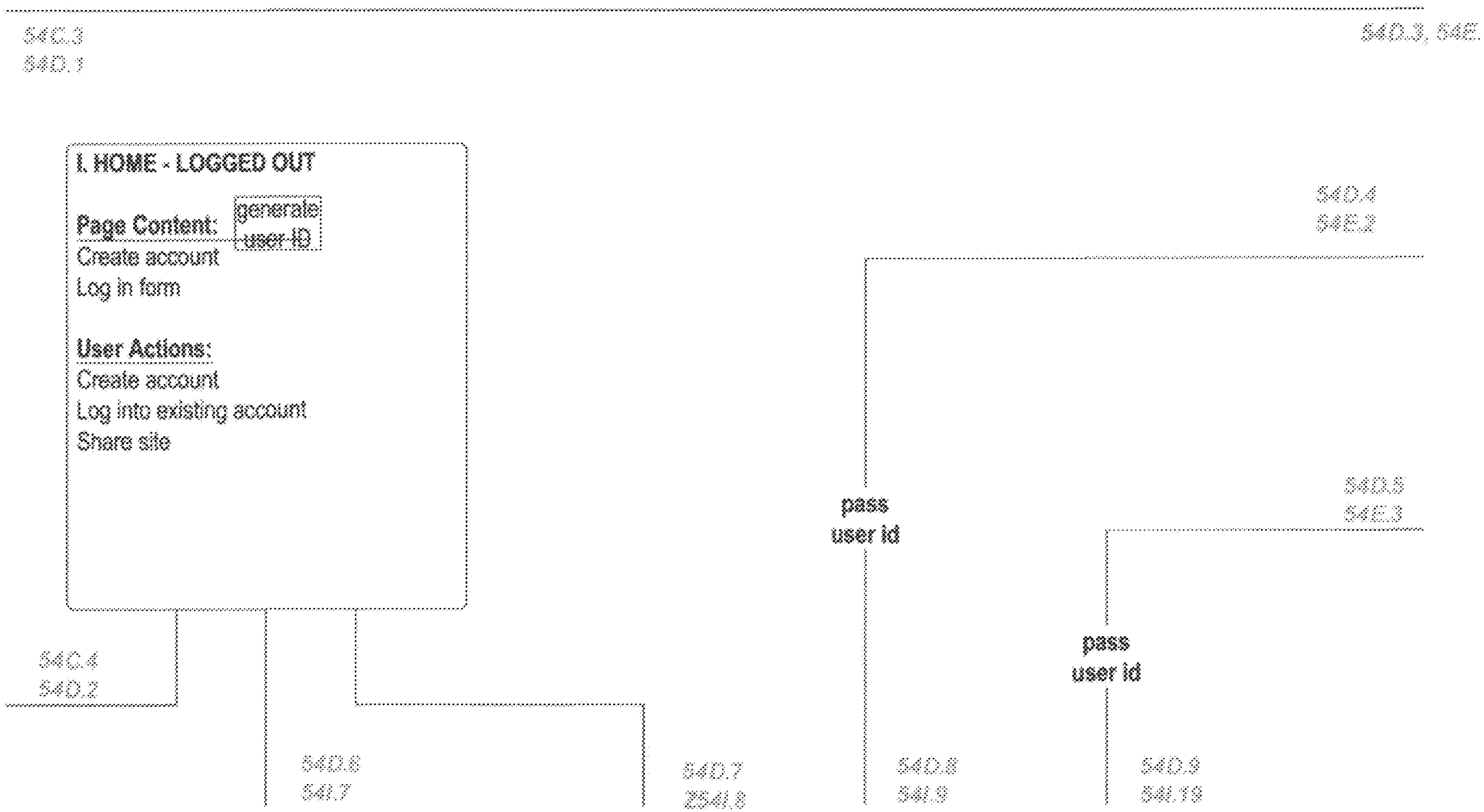

Another embodiment of system 10 is now described with reference to FIG. 54 and FIGS. 54A-54II. These figures show the infrastructure and data flow of system 10 when configured as an app such as may be used on a smartphone, PDA or other electronic device. FIG. 54 shows the overall system 10 while FIGS. 54A-54II show portions of system 10. Data flow and database calls may occur as described in connection with FIG. 1.

Figure 54E:
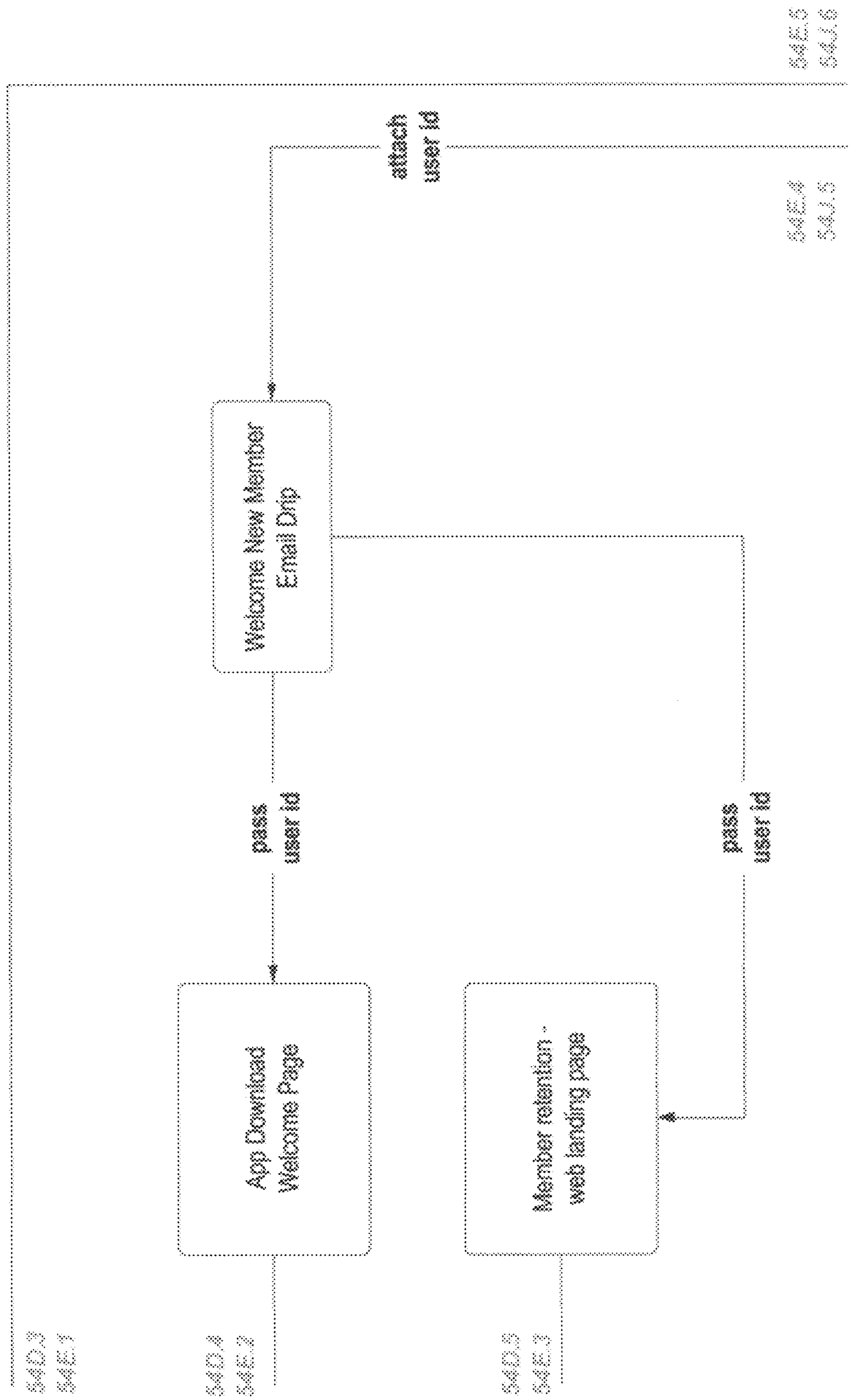
Figure 54F:
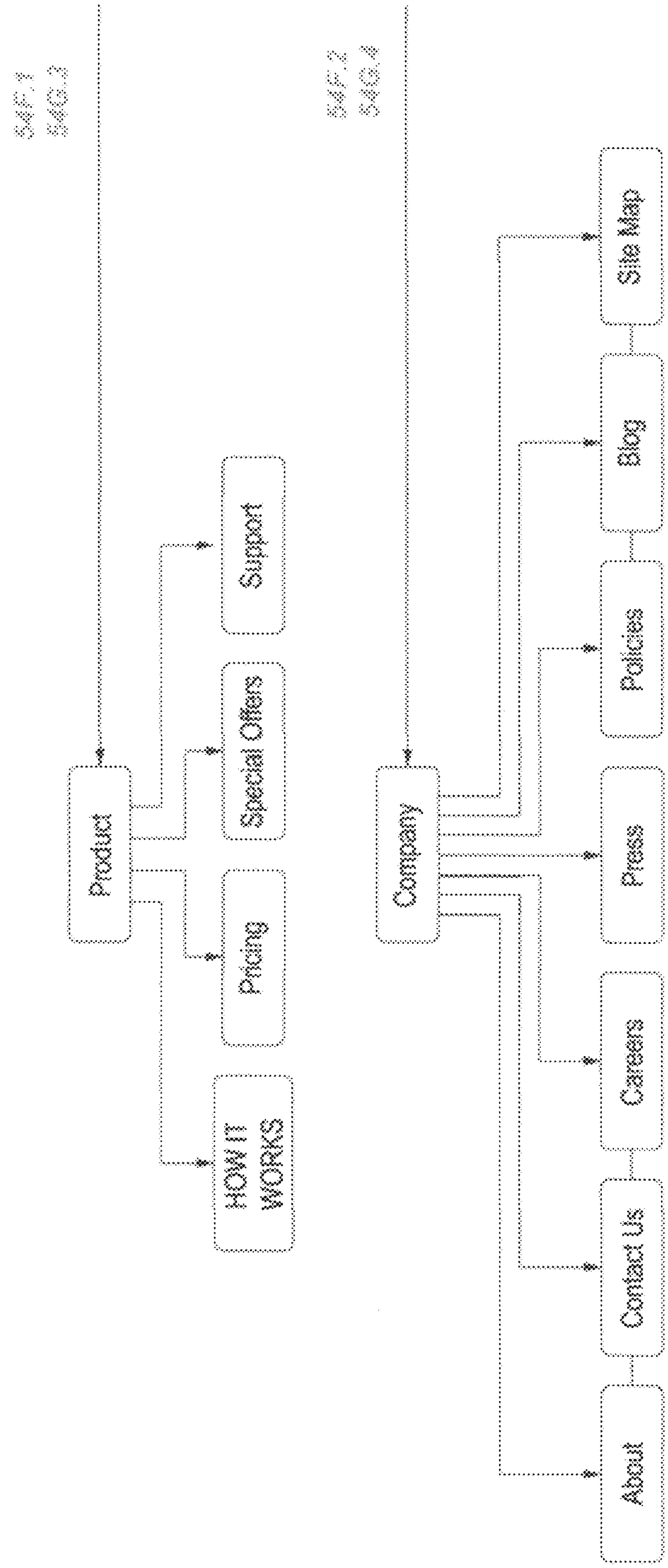
Figure 54G:
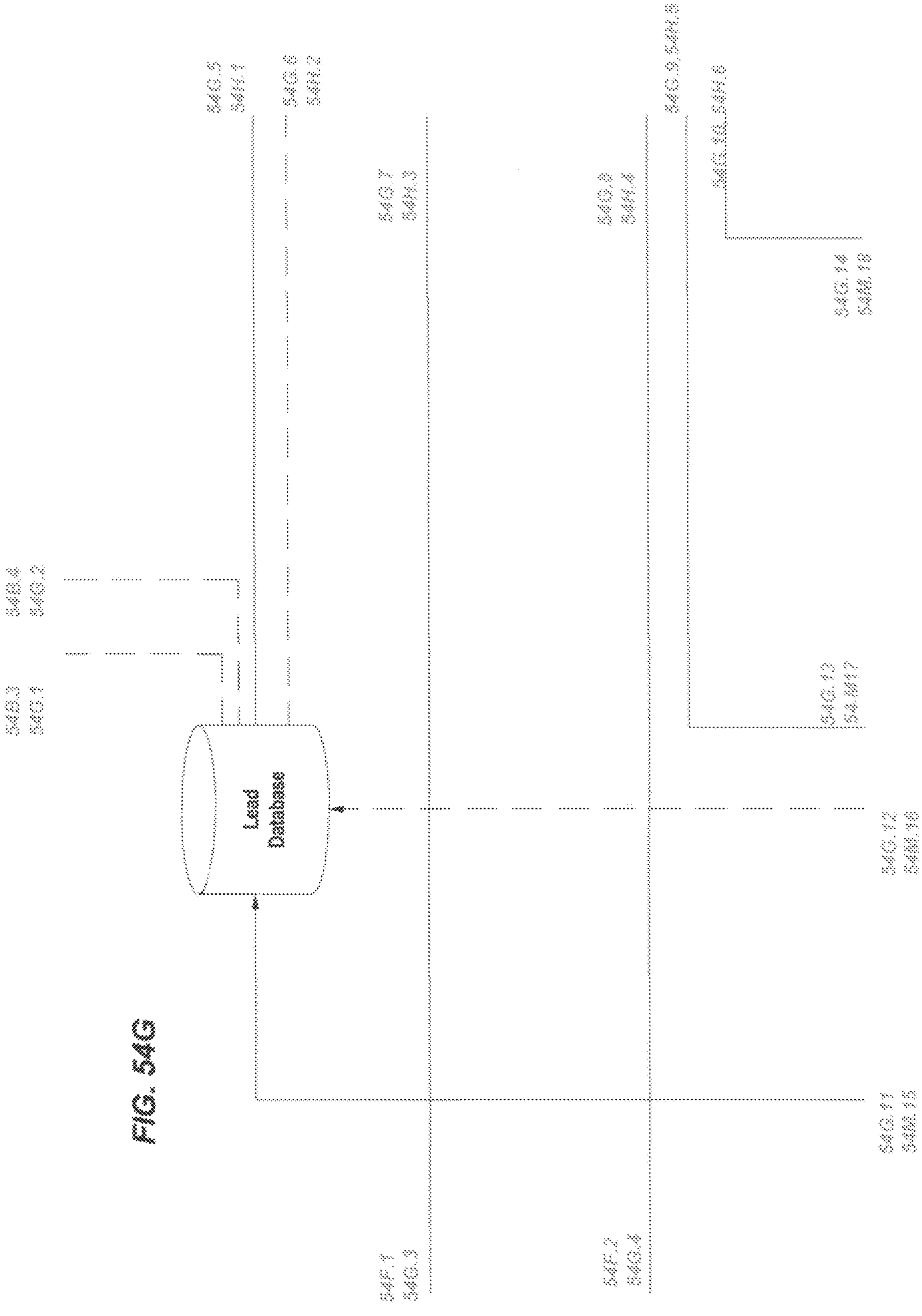
Figure 54H:
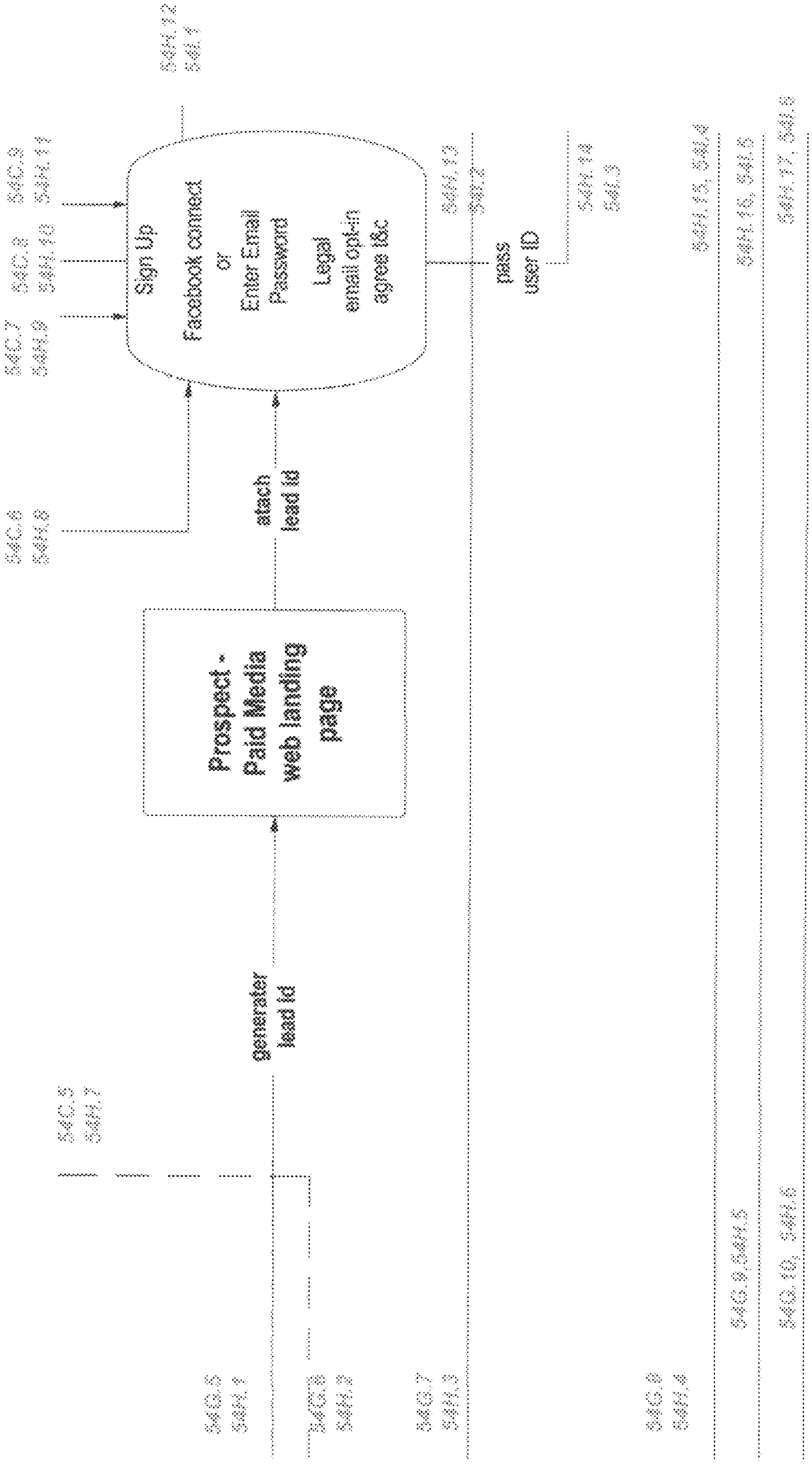
Figure 54I:
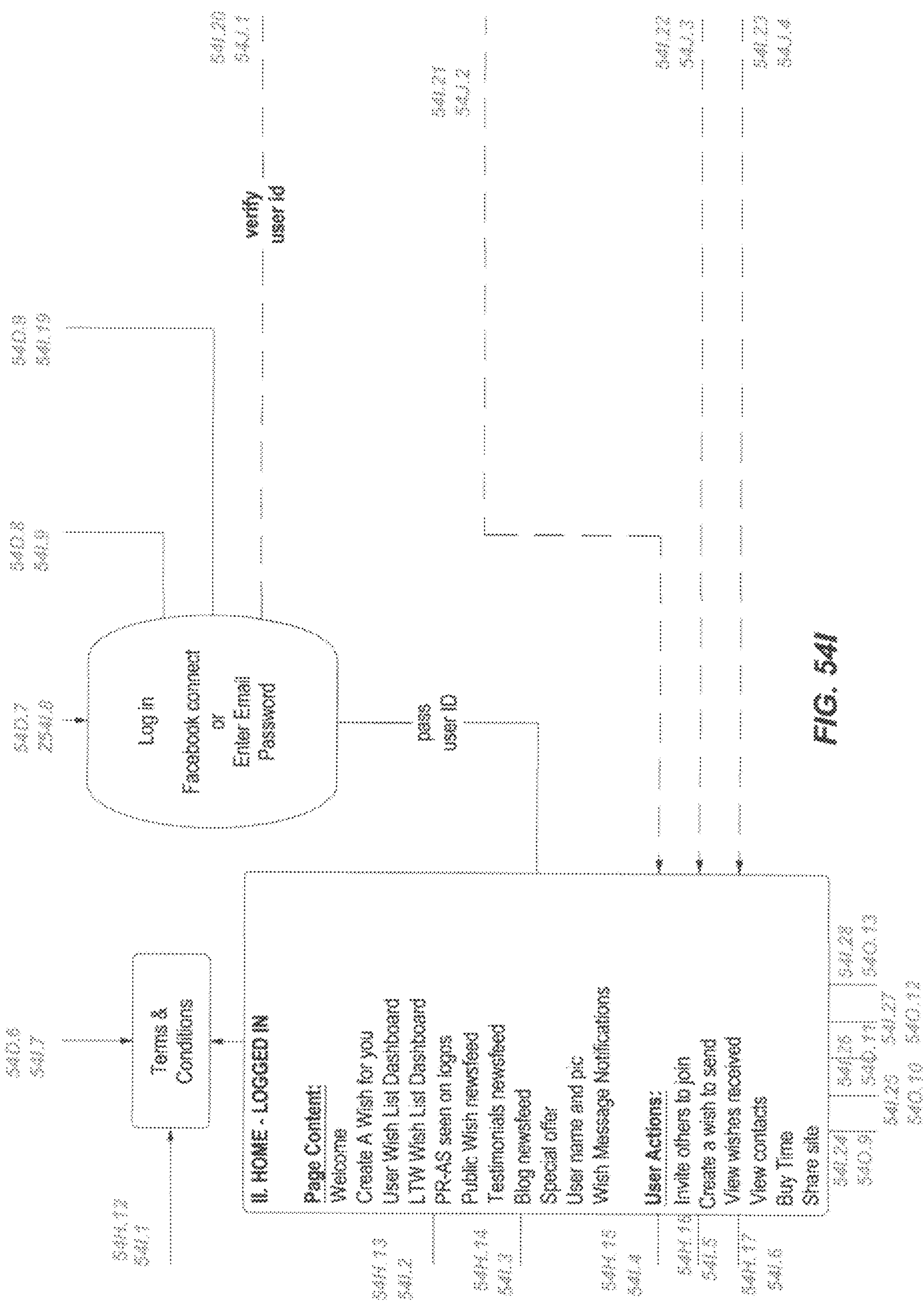
Figure 54J:
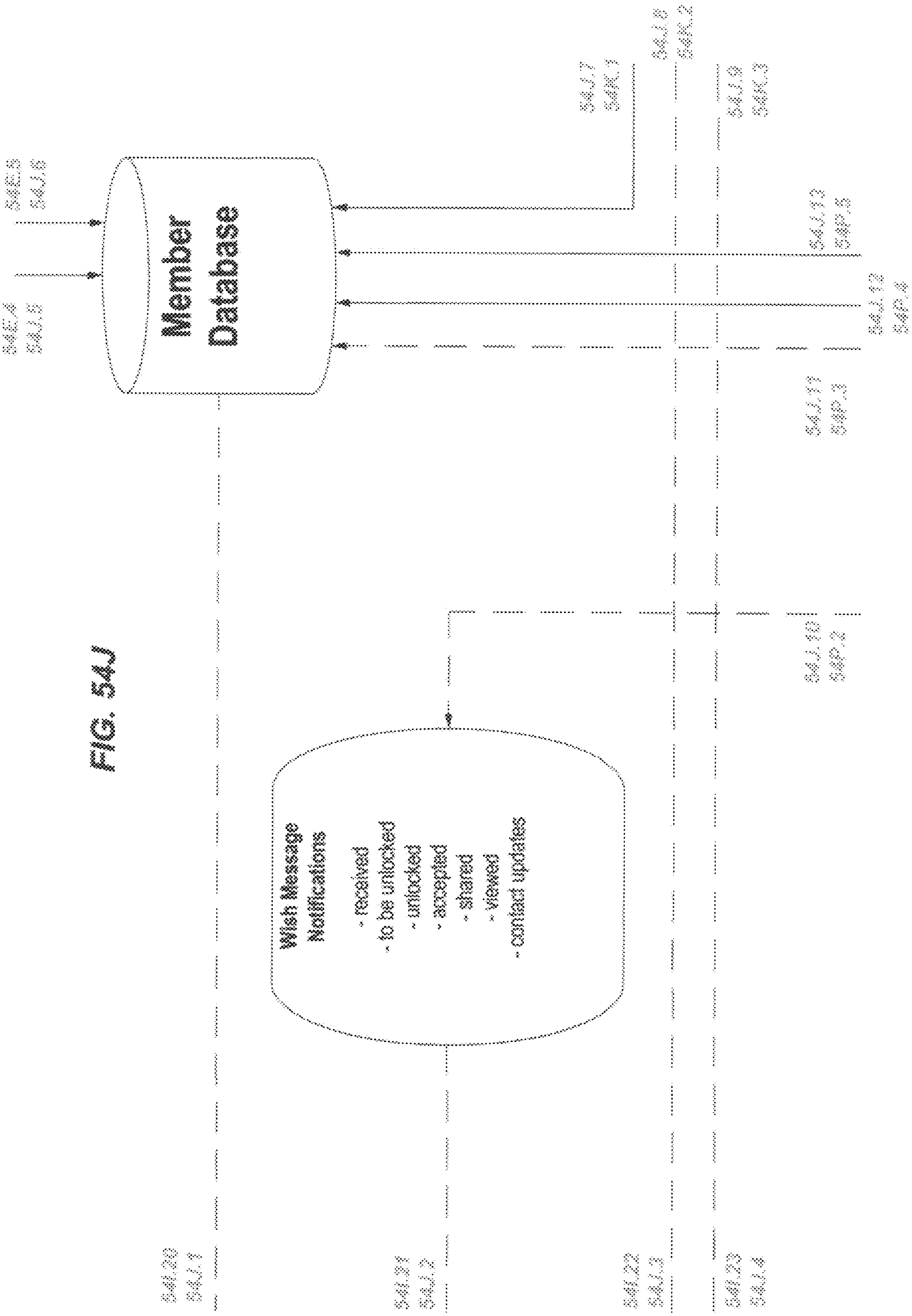
Figure 54K:
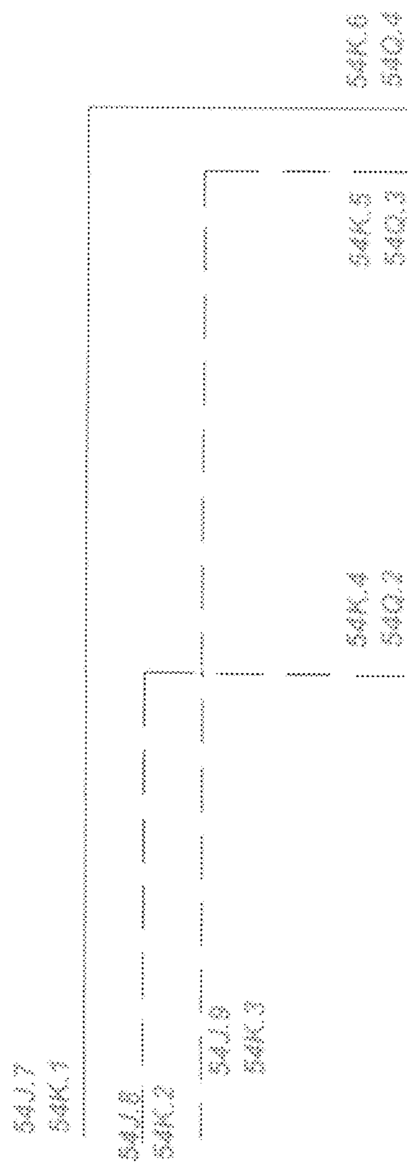
Figure 54L:
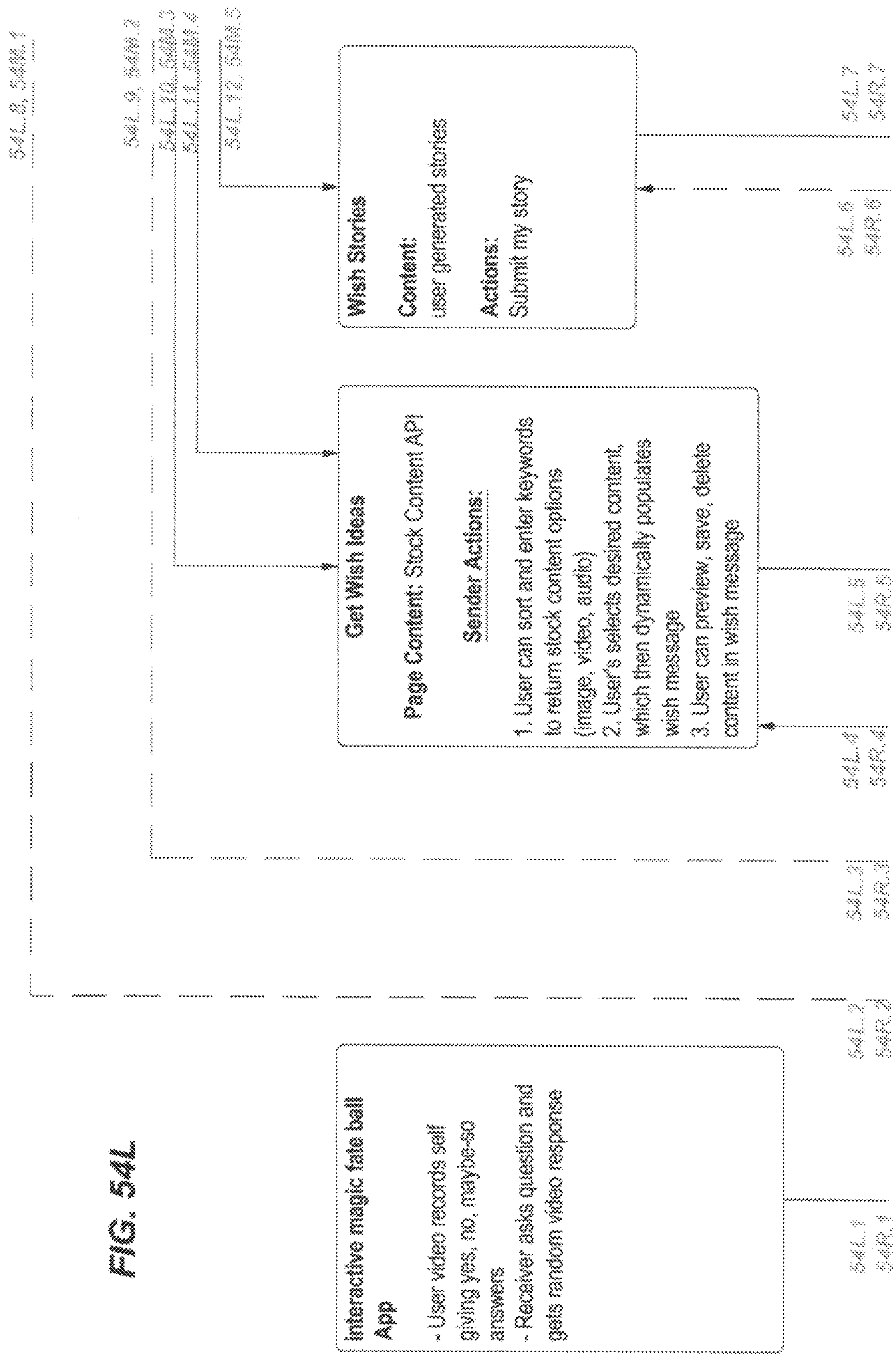
Figure 54M:
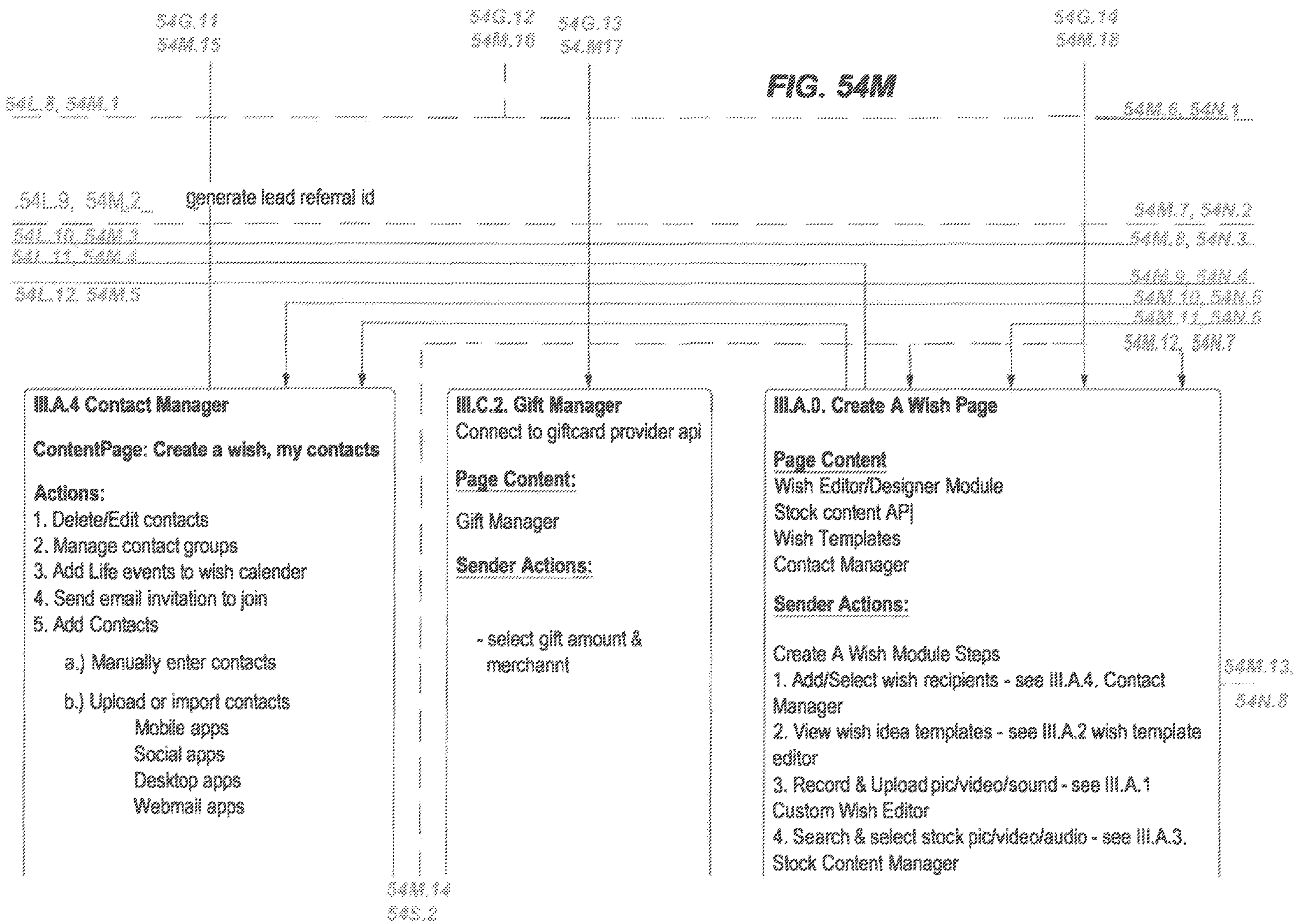
Figure 54N:
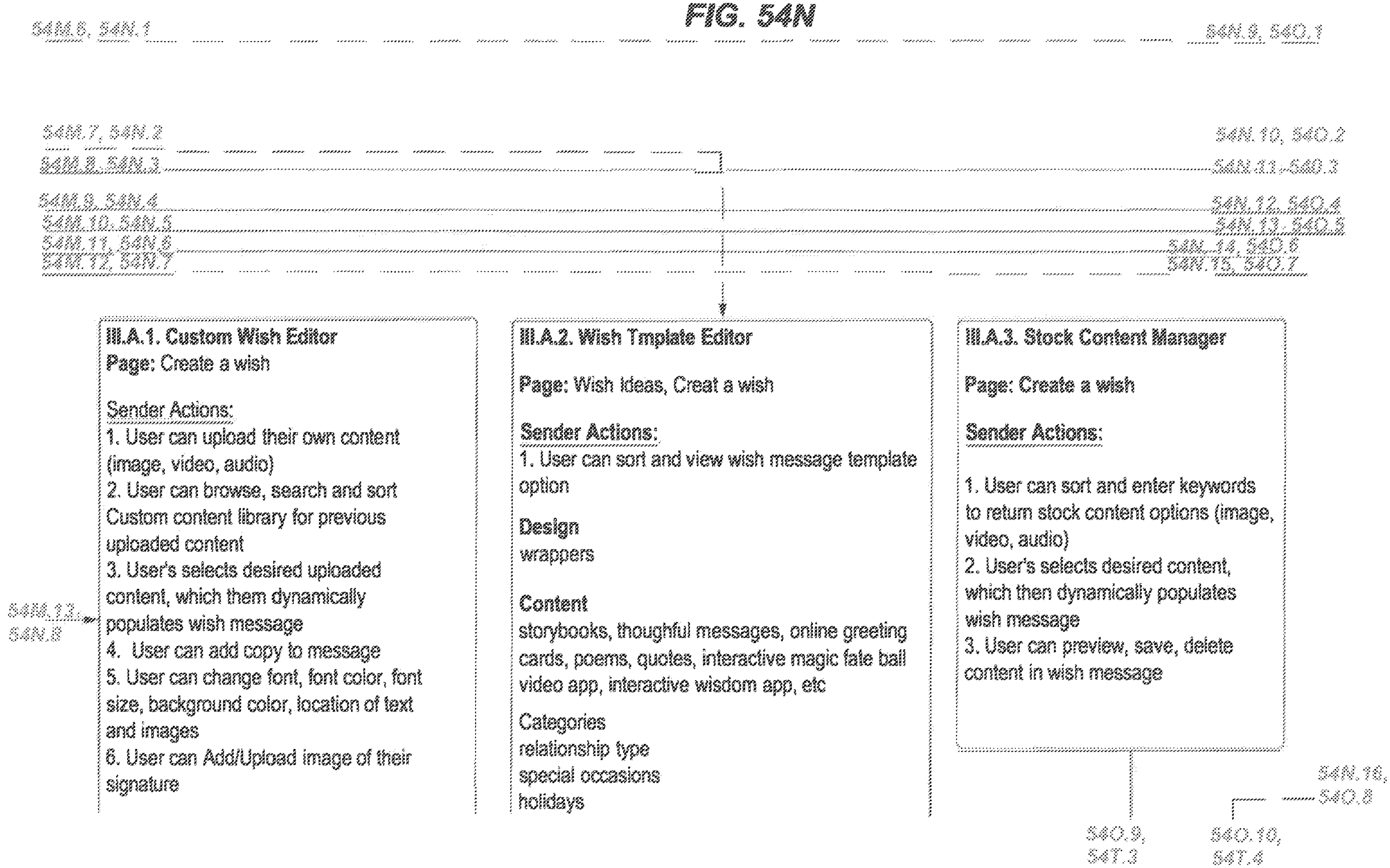
Figure 54O:
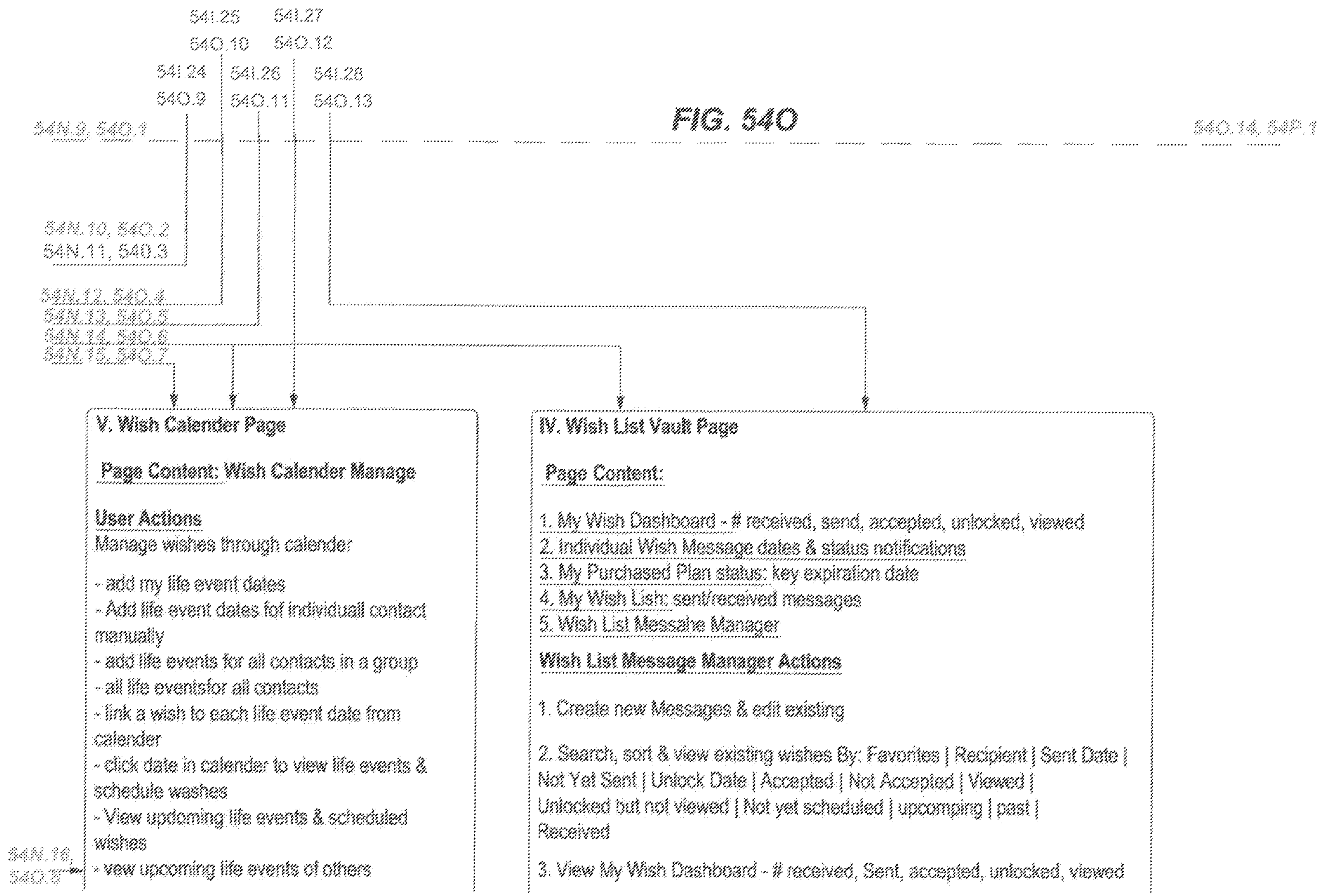
Figure 54P:
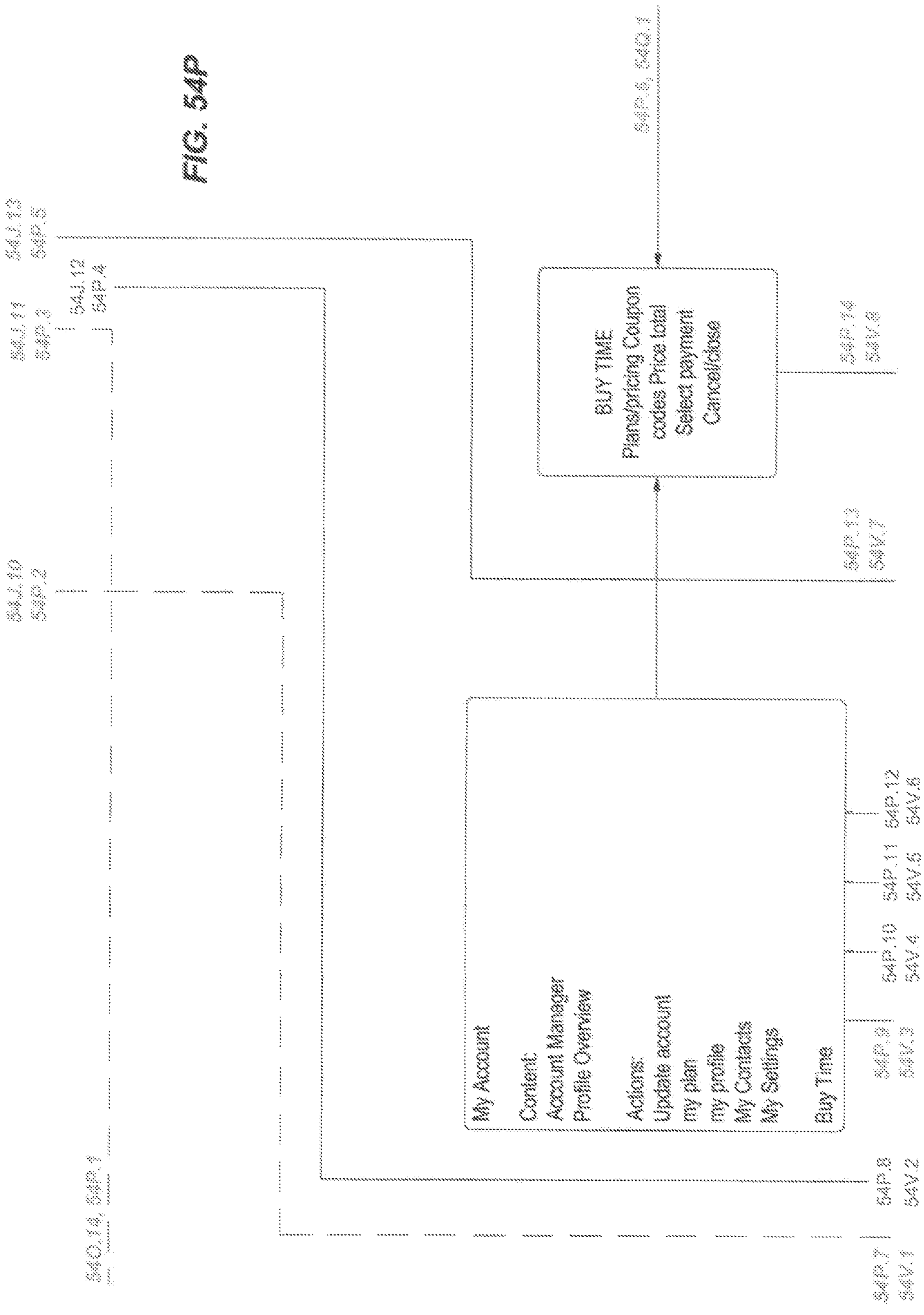
Figure 54Q:
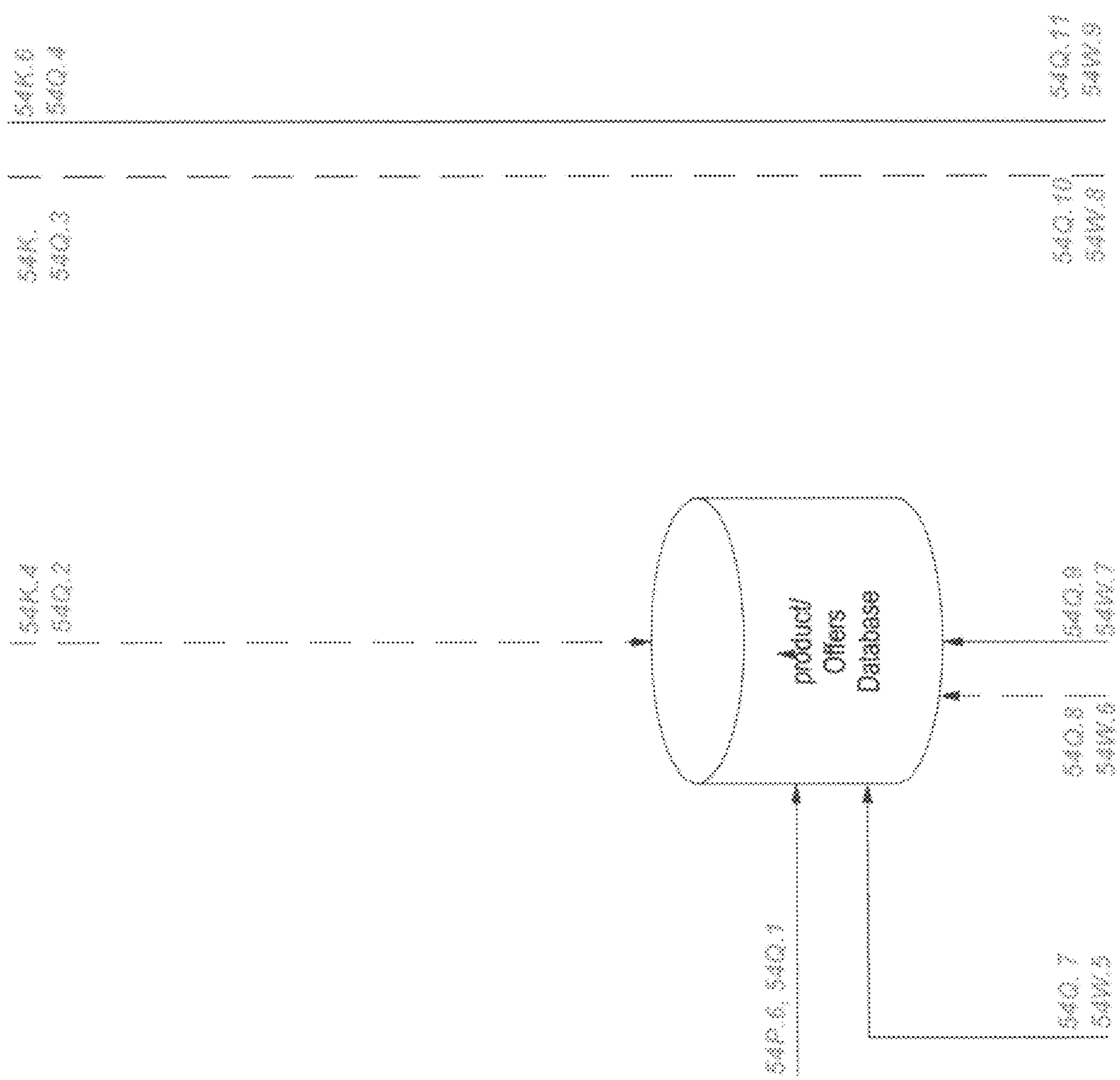
Figure 54R:
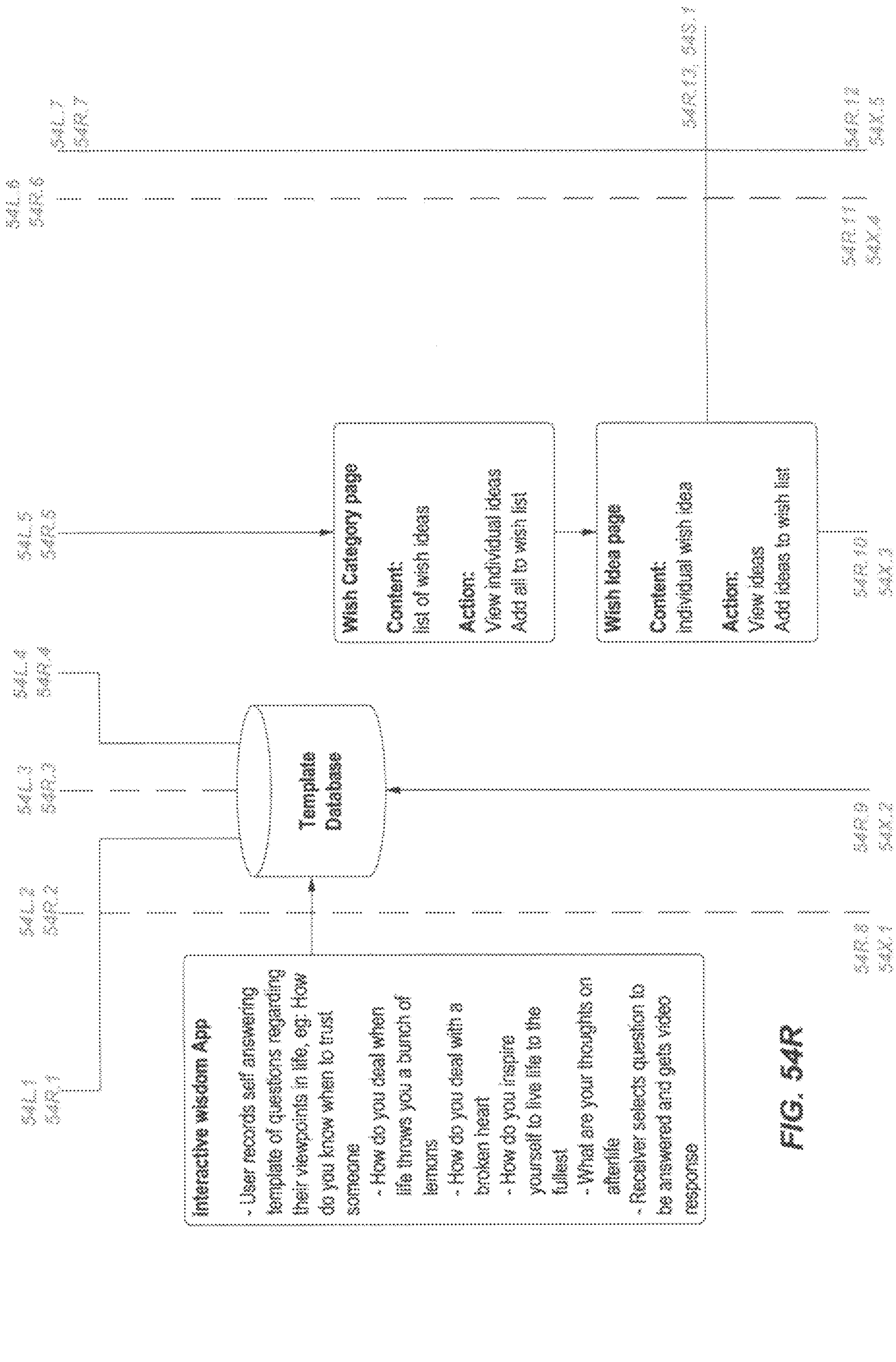
Figure 54S:
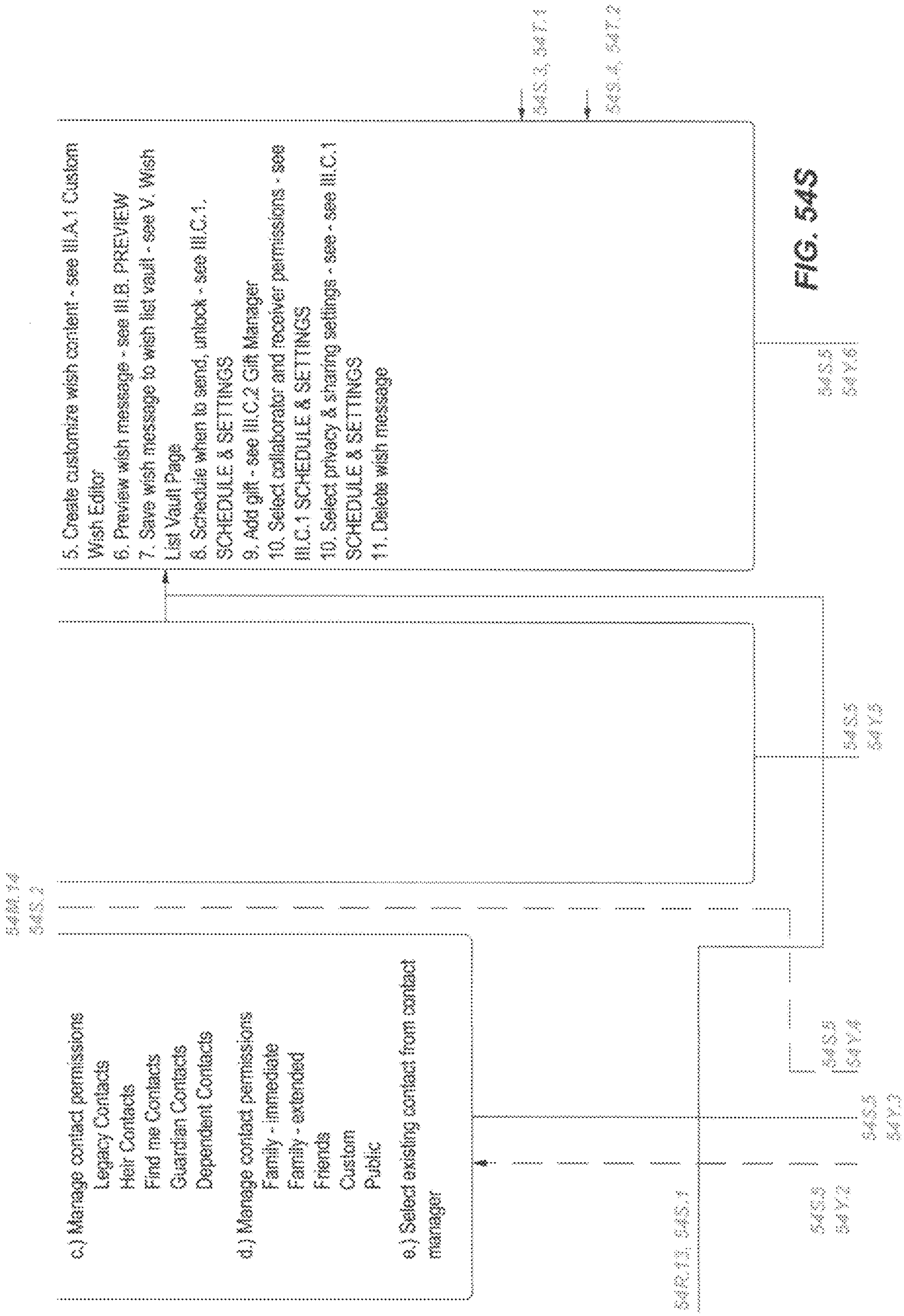
Figure 54T:
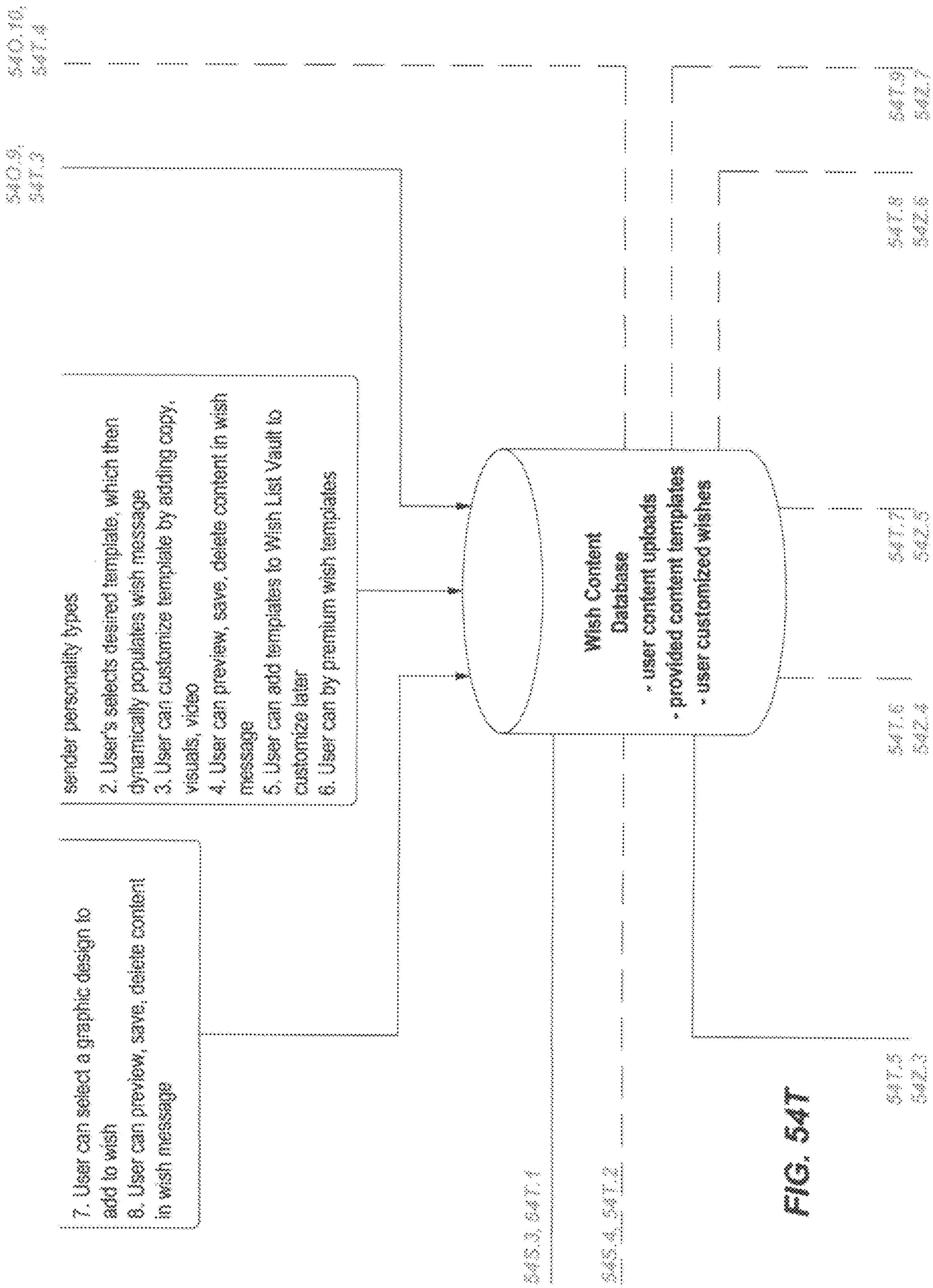
Figure 54V:
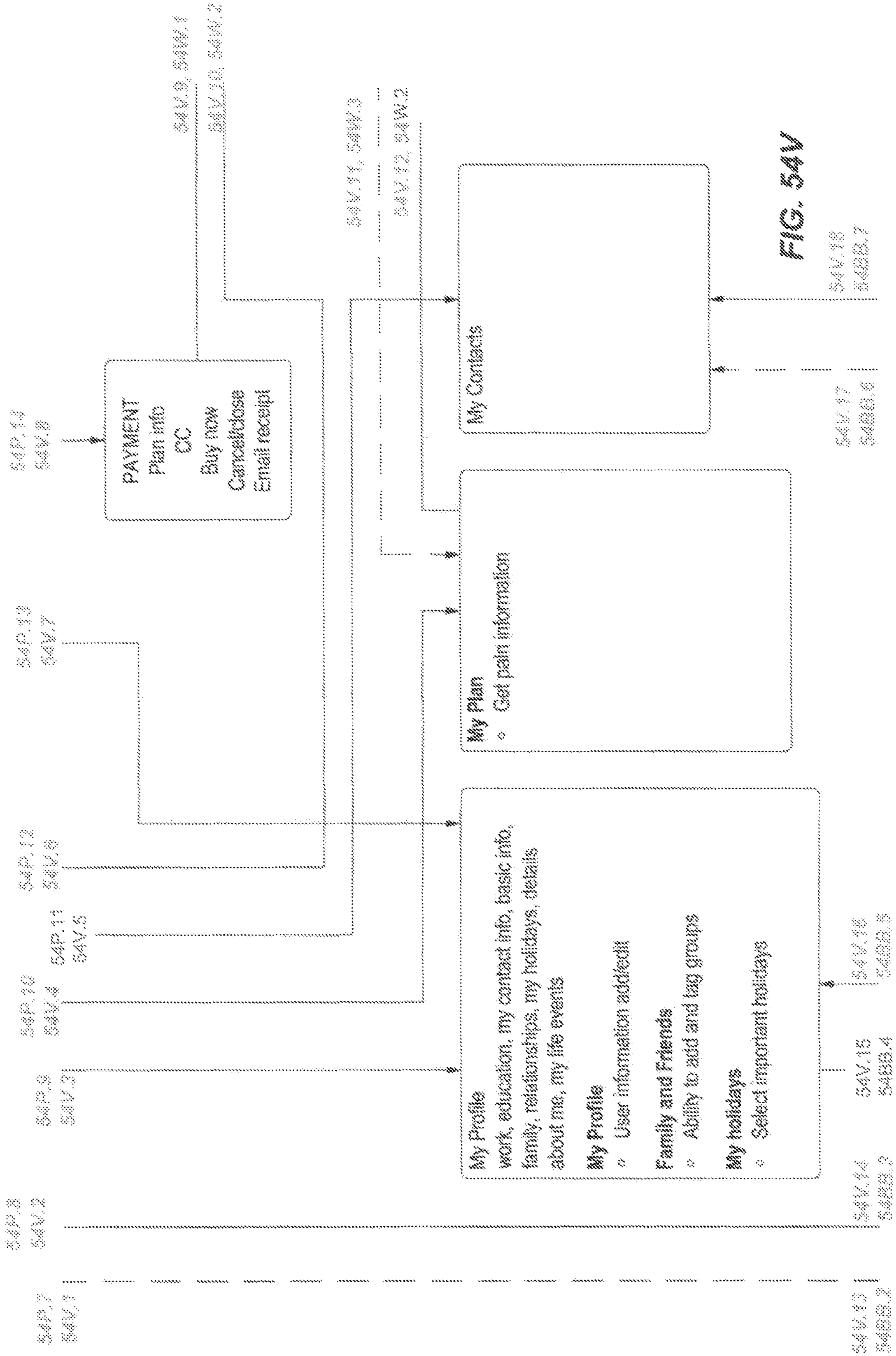
Figure 54W:
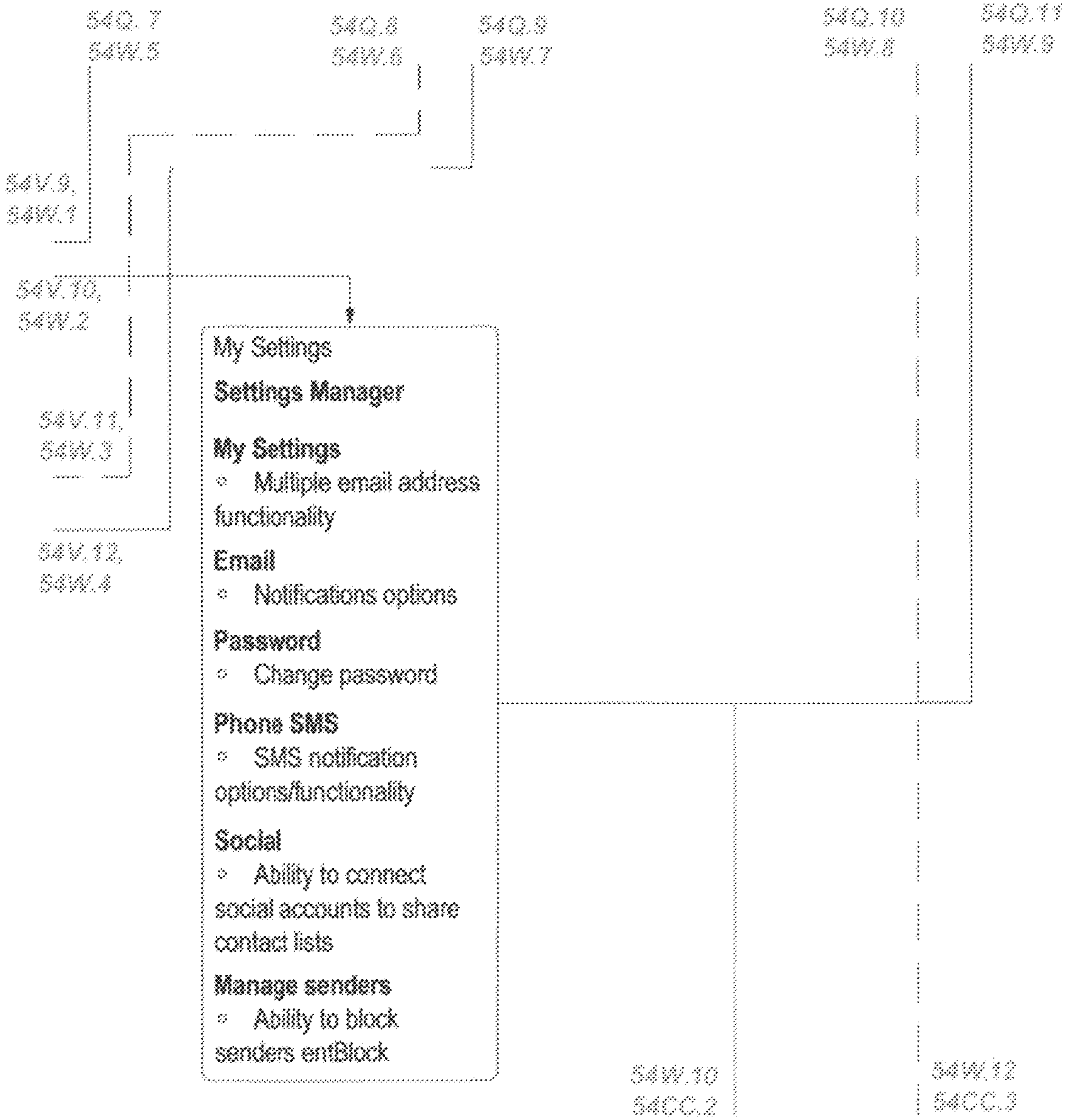
Figure 54X:
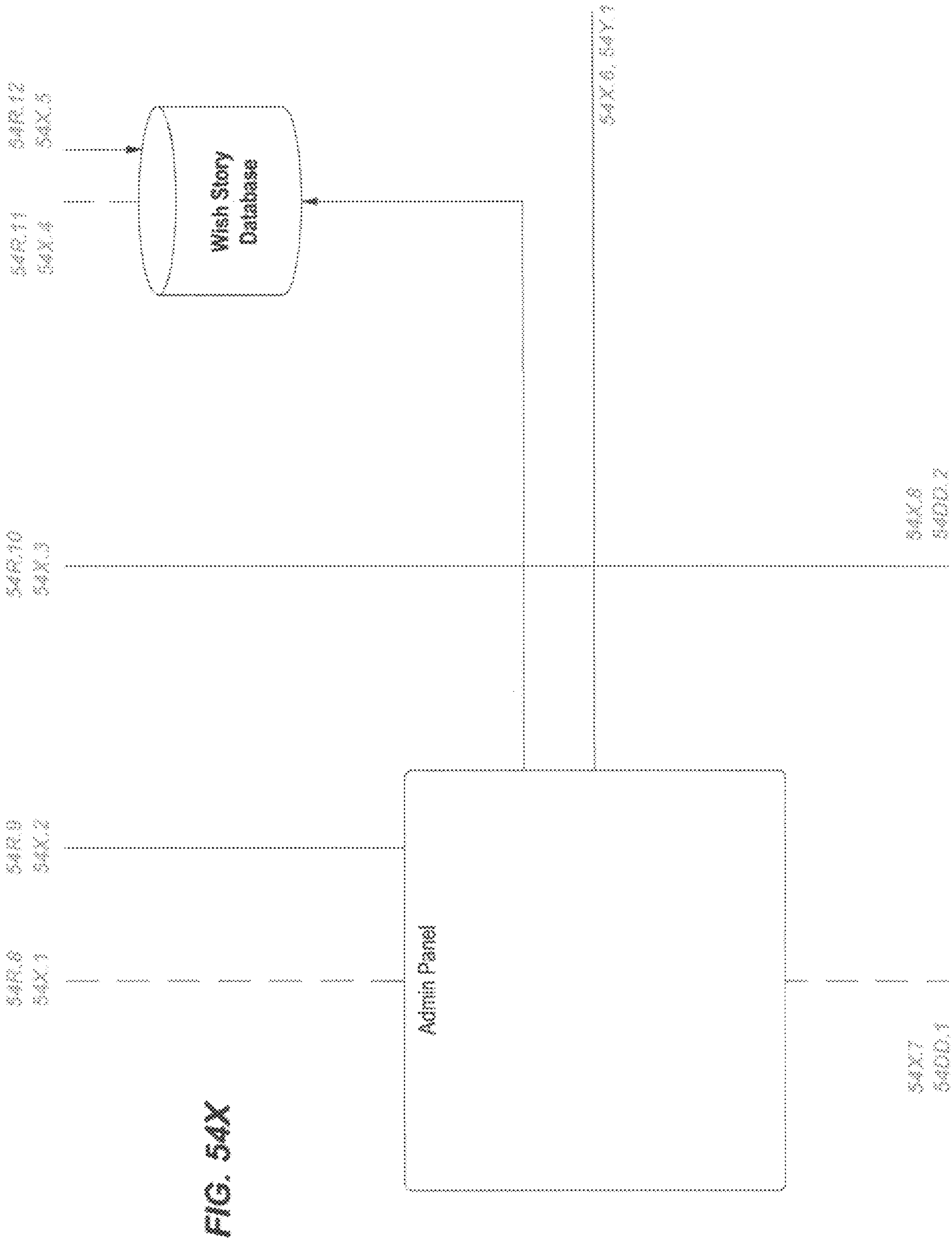
Figure 54Y:
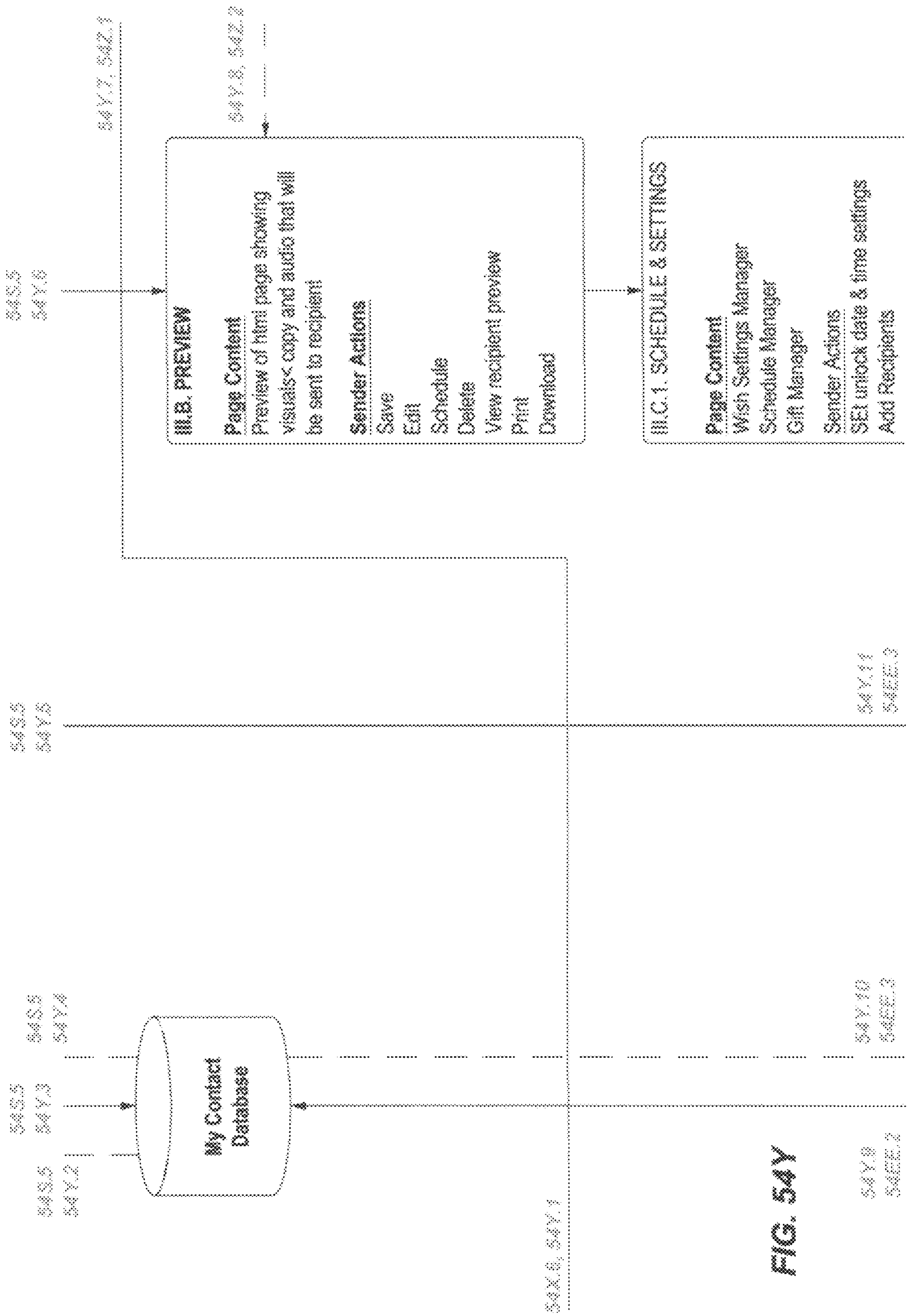
Figure 54Z:
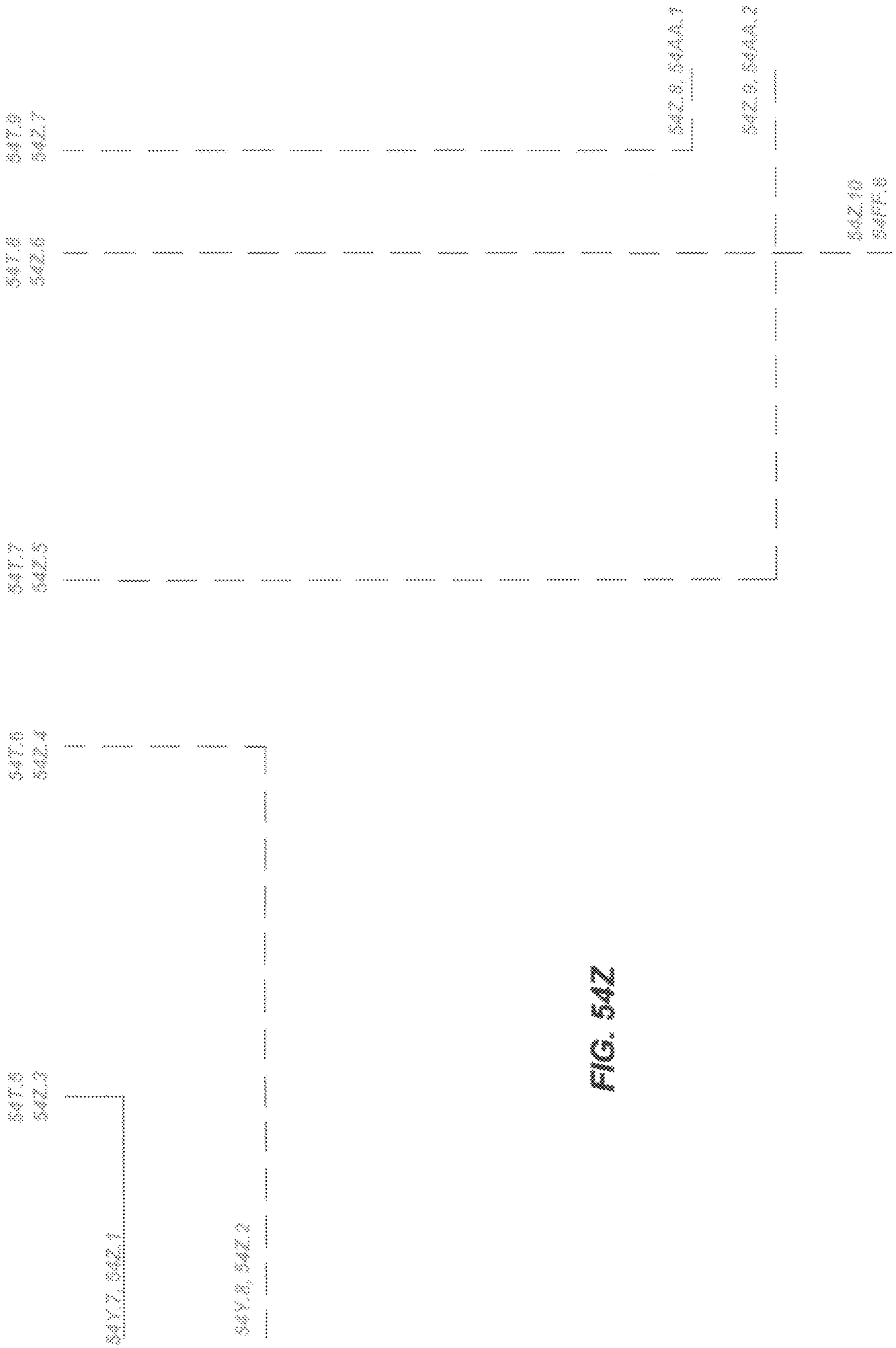
Figure 54A:
Figure 54B:
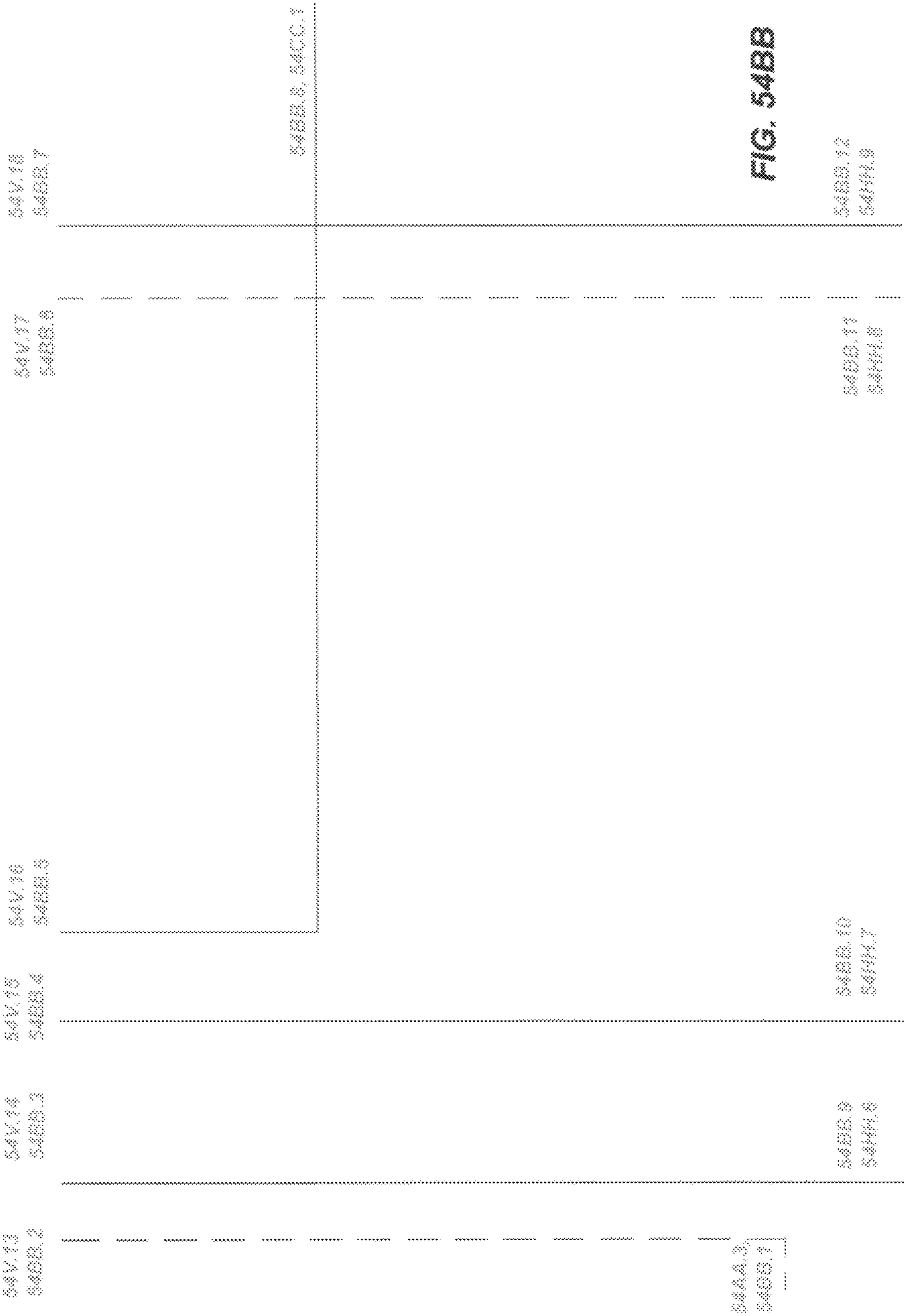
Figure 54C:
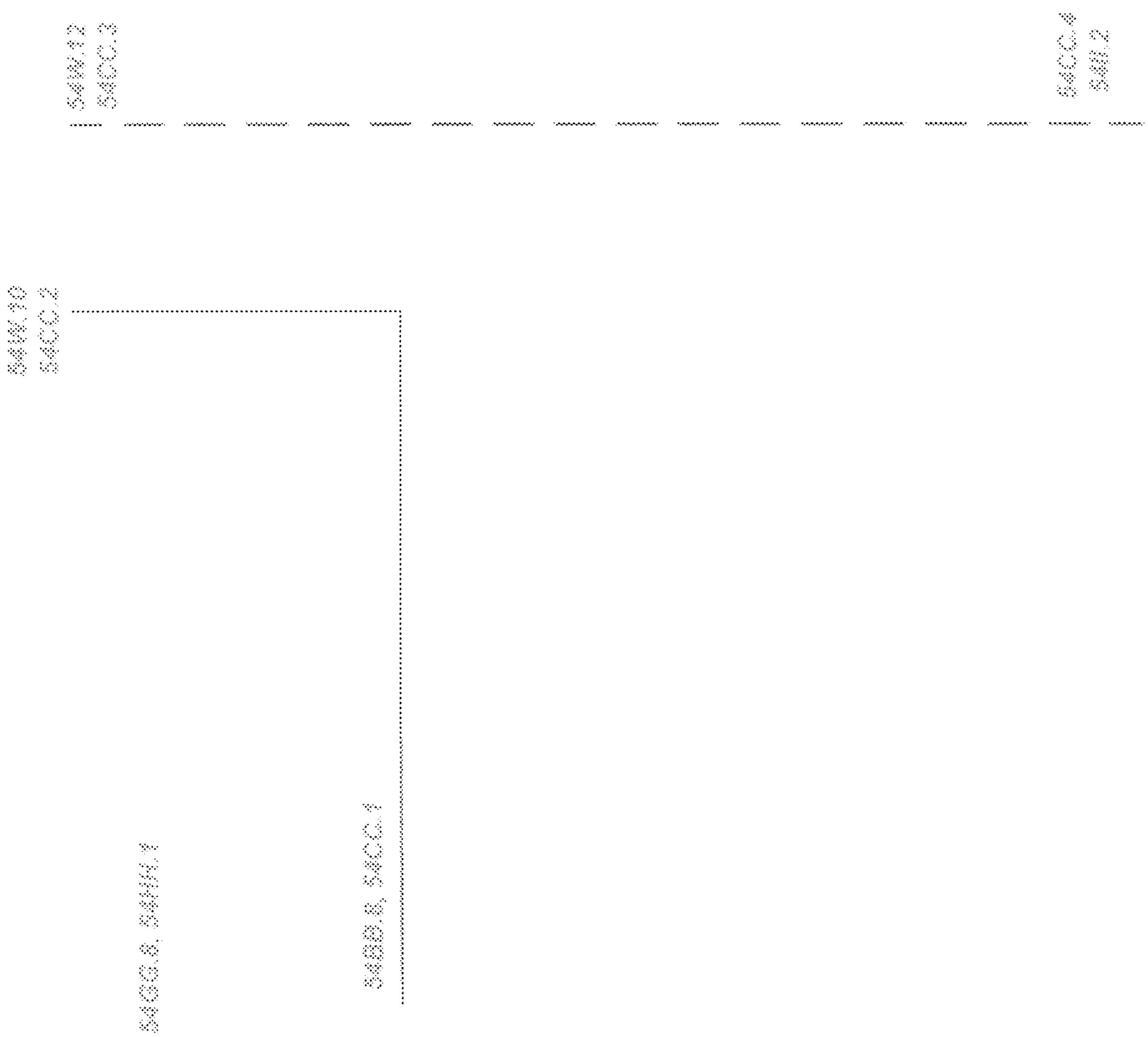
Figure 54D:
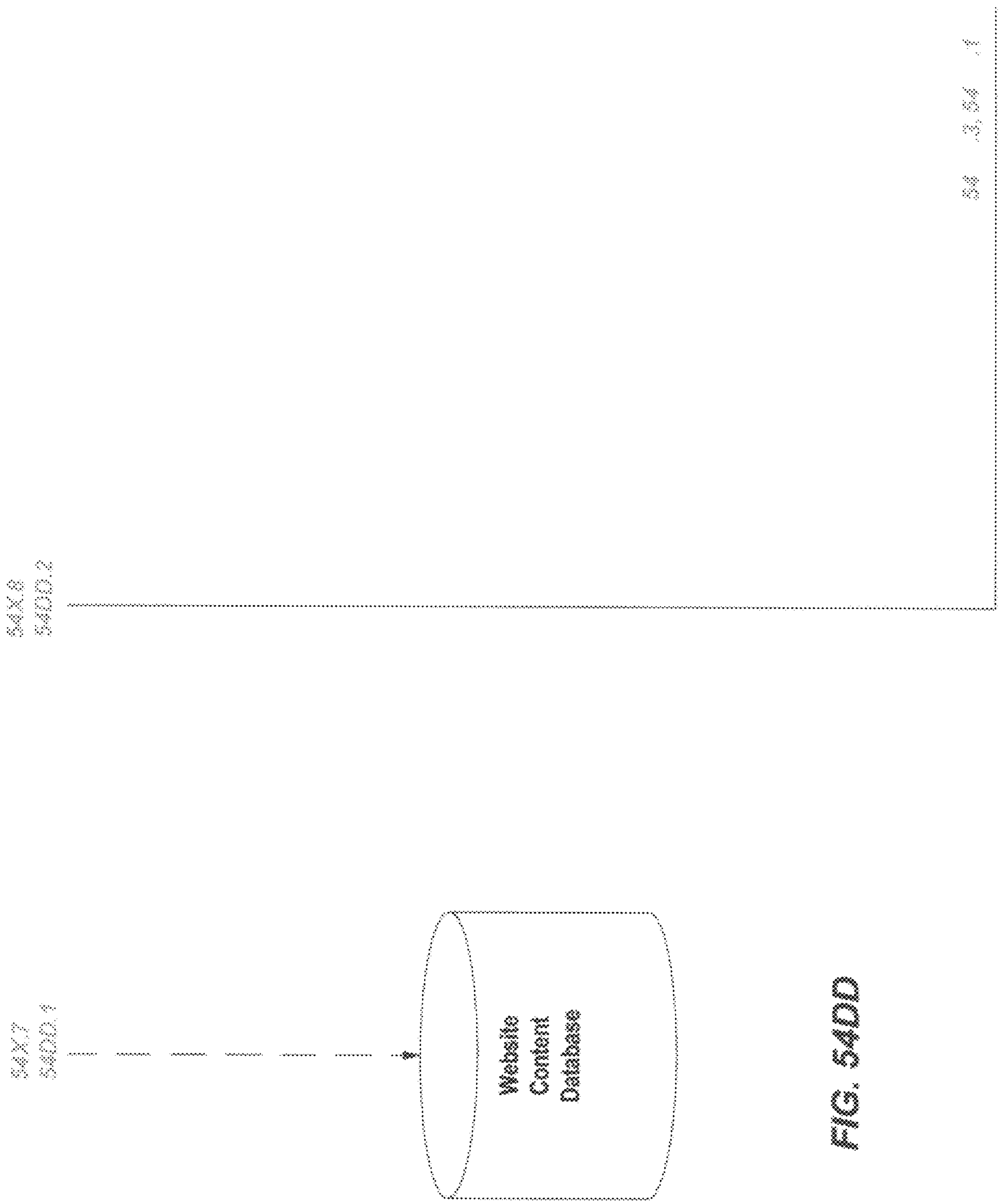
Figure 54E:
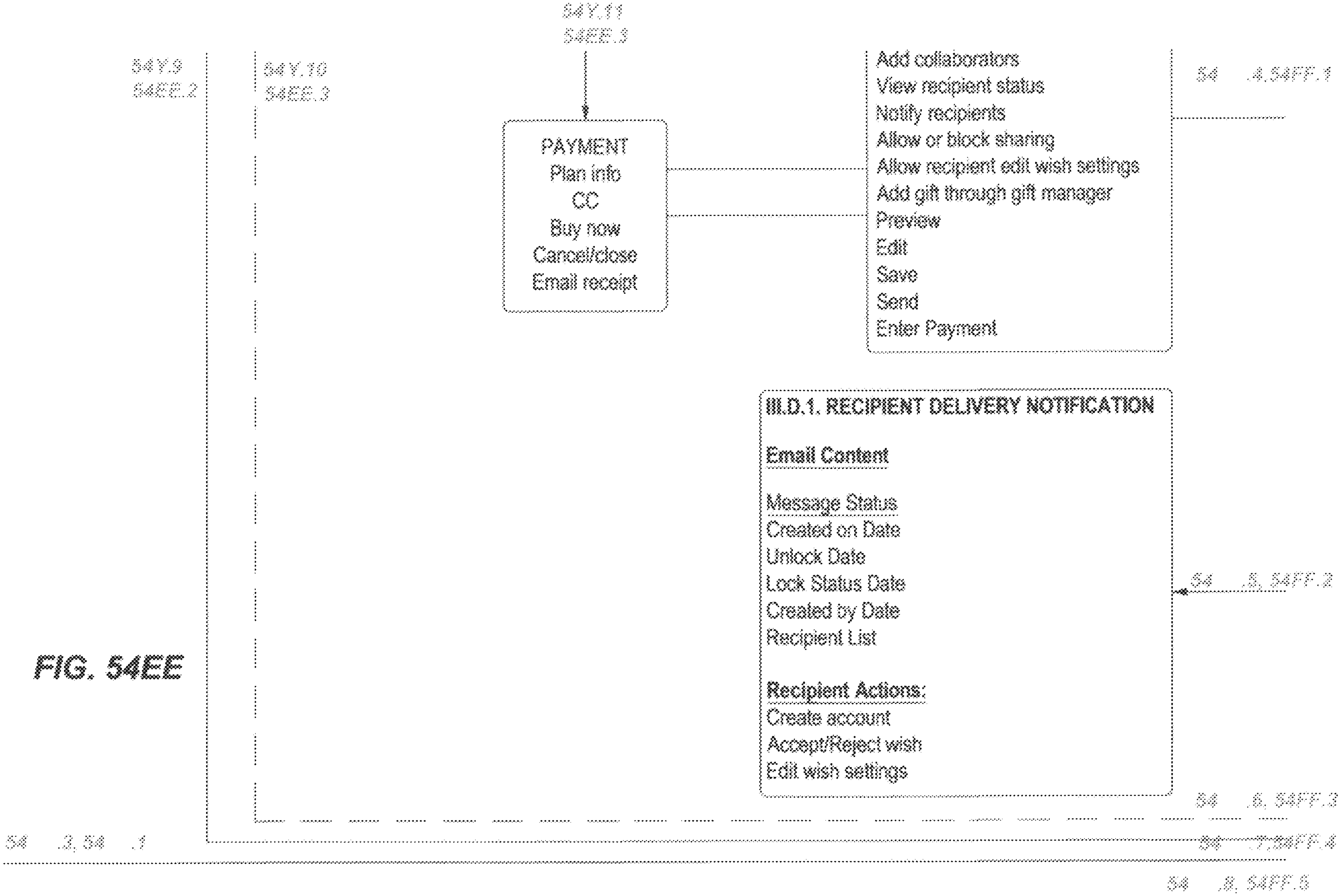
Figure 54F:
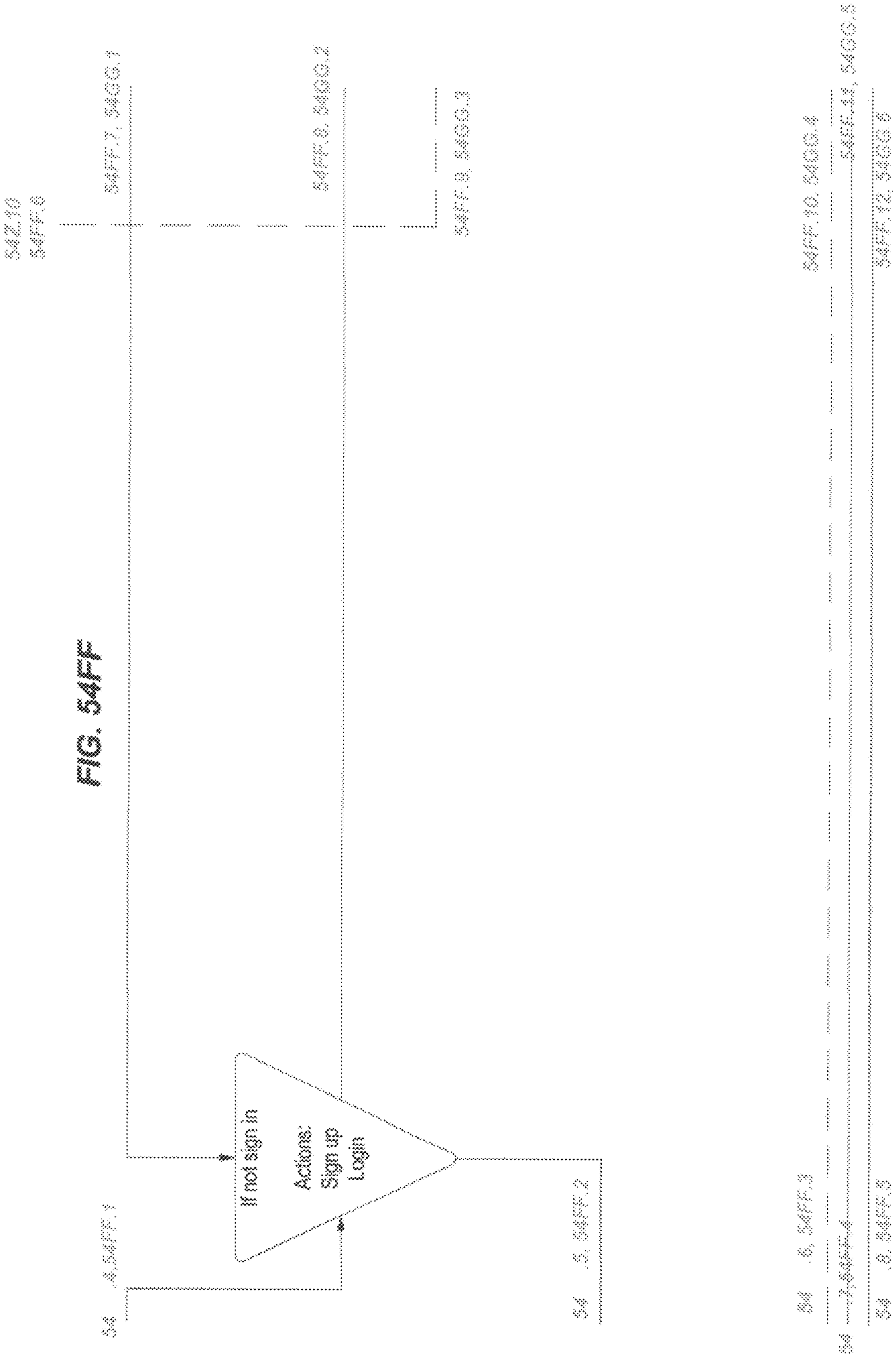
Figure 54G:
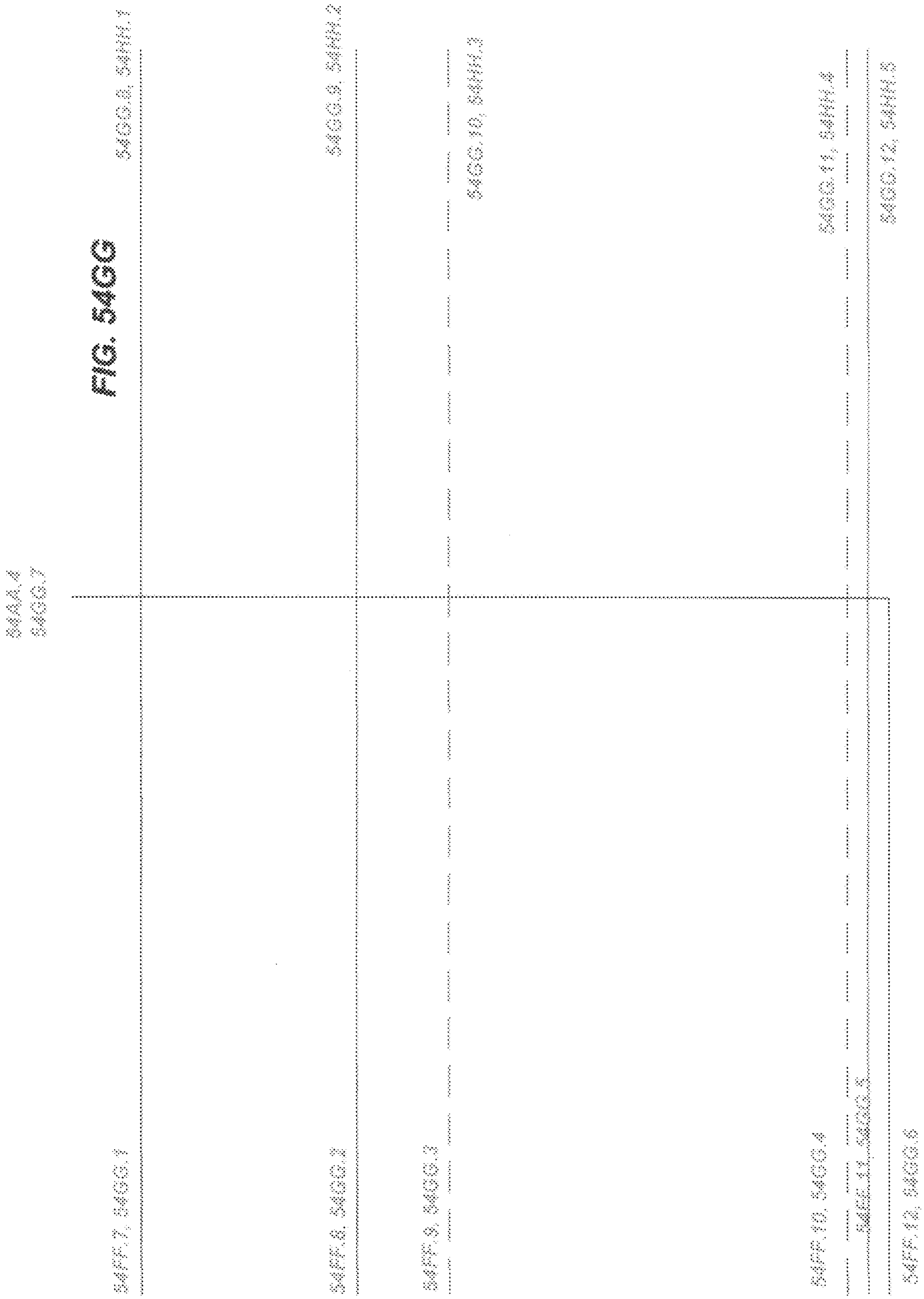
Figure 54H:
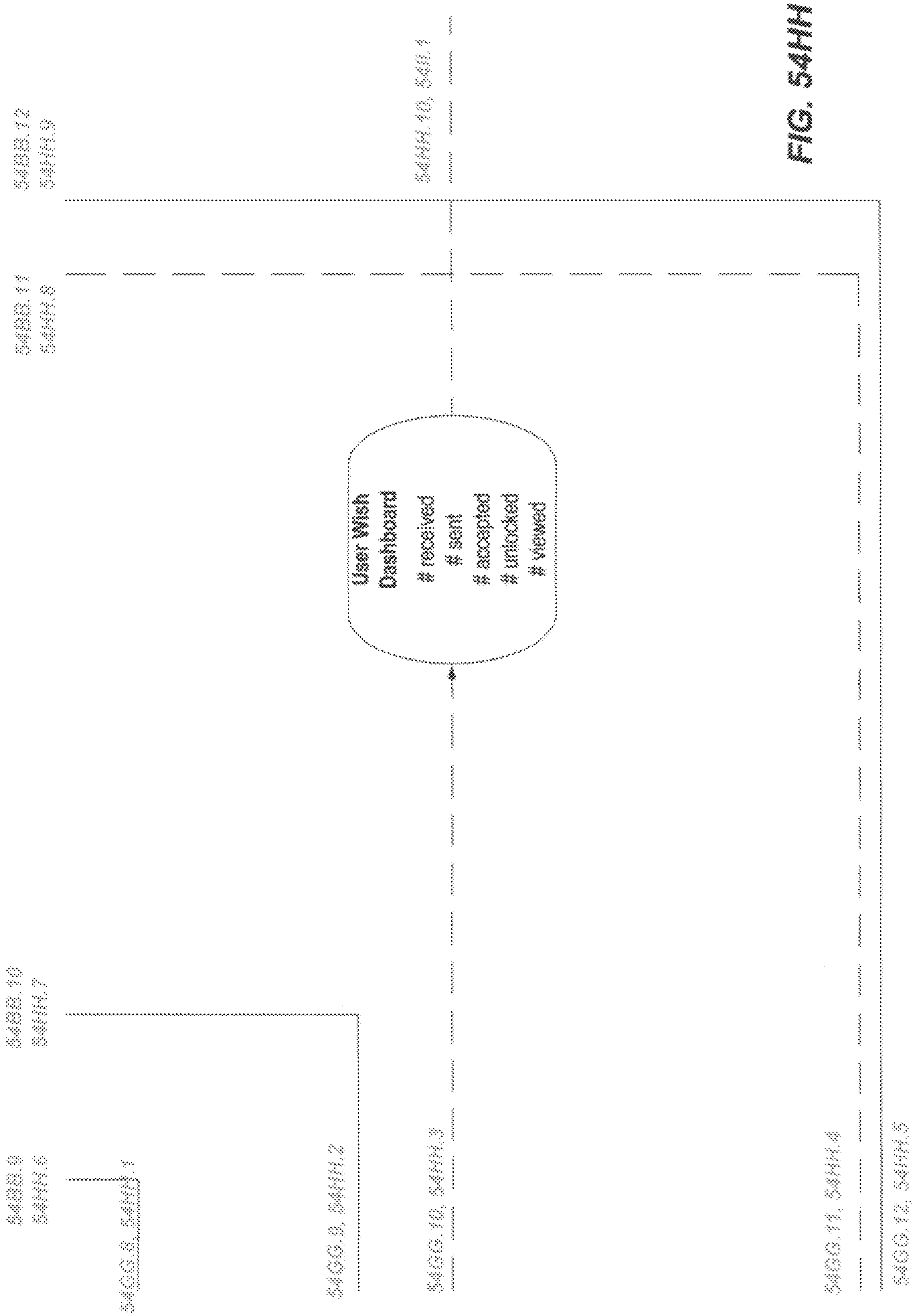
Figure 54I:
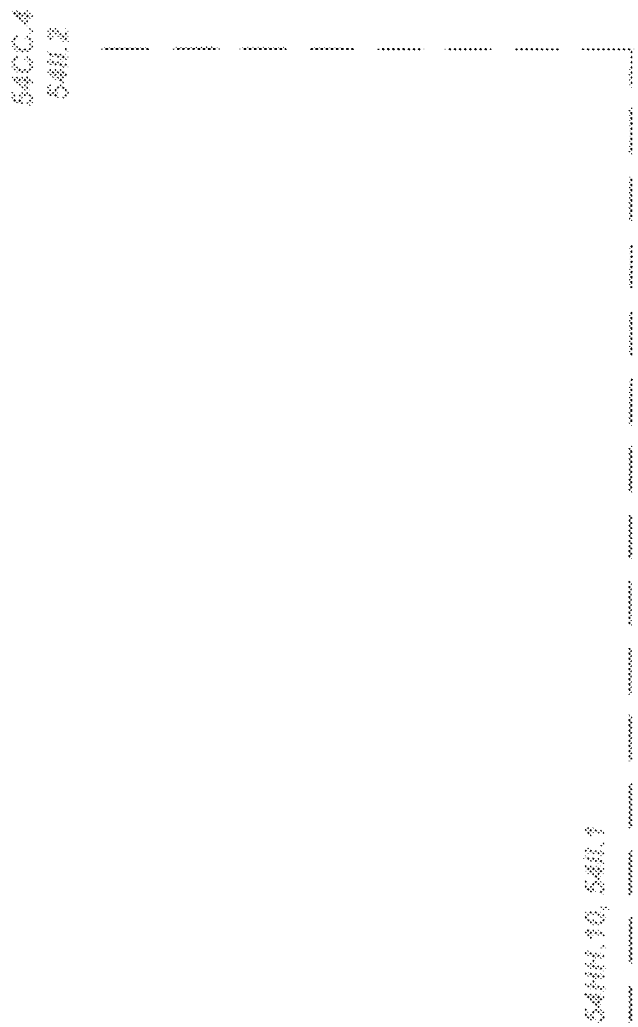

FIG. 54A summarizes objectives and the manner in which system 10 operates in this embodiment. For example, the time-locked nature of messages transmitted by system 10 is described. These messages may occur via text, app or e-mail though other types of message may be used.

FIGS. 54F and 54G show an overall hierarchy of information that may be stored and accessed by a user through a log-in page. The lead database that may interface with the admin panel of FIGS. 54L, 54R, 54X and 54DD, the contact manager of FIGS. 54M and 54S and the web landing page of FIGS. 54B, 54C, 54D, 54H and 54I are also shown.

FIGS. 54B, 54C, 54D, 54H and 54I show e-mail drips, landing pages and Home-Logged Out and Home-Logged In pages that may interface with the components as shown in FIG. 54.

FIGS. 54H, 54I, 54E, 54J show components associated with a user signing up to system 10, e.g. through an existing social media account, e-mail or otherwise. The member database is also shown and may interface with the foregoing. The components shown may interface with the Home-Logged In and Home-Logged Out components as shown in FIG. 54.

FIGS. 54L, 54R, 54X and 54DD show the website content and wish story databases from which information may be accessed by the components shown. Different apps and wish pages are also shown.

FIGS. 54M and 54S show the content manager, gift manager and create a wish components that may operate similar as described in connection with FIG. 1 or otherwise.

FIGS. 54Y, 54EE and 54FF show the contact database and payment, preview, schedule and setting, and recipient delivery notification components. The manner in which these components interface together and with other aspects of system 10 is also shown by the triangle item.

FIGS. 54N and 54T show the Custom Wish Editor, Wish Template Editor, Stock Content Manager and Wish Content Database. These components may interface in system 10 as described in connection with FIG. 1 or otherwise.

FIGS. 54O, 54P, 54U, 54AA and 54GG show the Wish Calendar and Wish Vault, as well as an account page. These components may interface in system 10 as described in connection with FIG. 1 or otherwise.

FIGS. 54K, 54P, 54Q, 54V, 54W, 54BB, 54CC, 54HH and 54II show the product/offers database and other components regarding user information.

A domain model associated with system 10 is now described with reference to FIGS. 55 and 55A-55I. These figures show the structure of data associated with system 10 and the manner in which data may flow and how such data may be used.

For example, as shown in FIGS. 55B, 55C, 55E and 55H, various User data fields may exist to contain information regarding the user. Address and Blocked User fields may also contain pertinent information for use with the User data. Payment Plan, Holiday and Order data field may also contain pertinent information for use with the User data.

Figure 55:
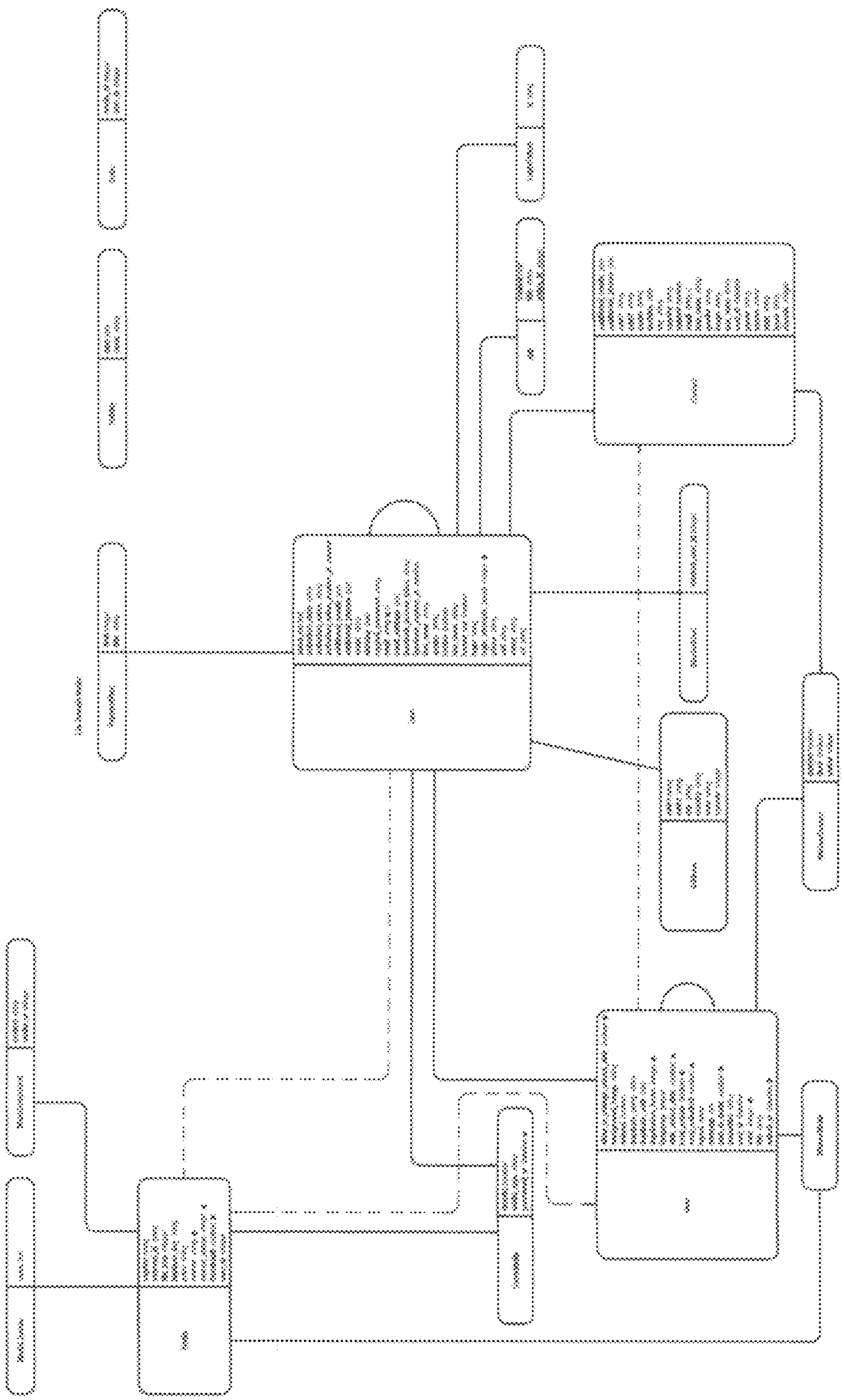
FIG. 55 shows a domain model reflecting a domain model that shows the structure of data fields and their storage, and the manner in which data may be processed.
Figure 55A:
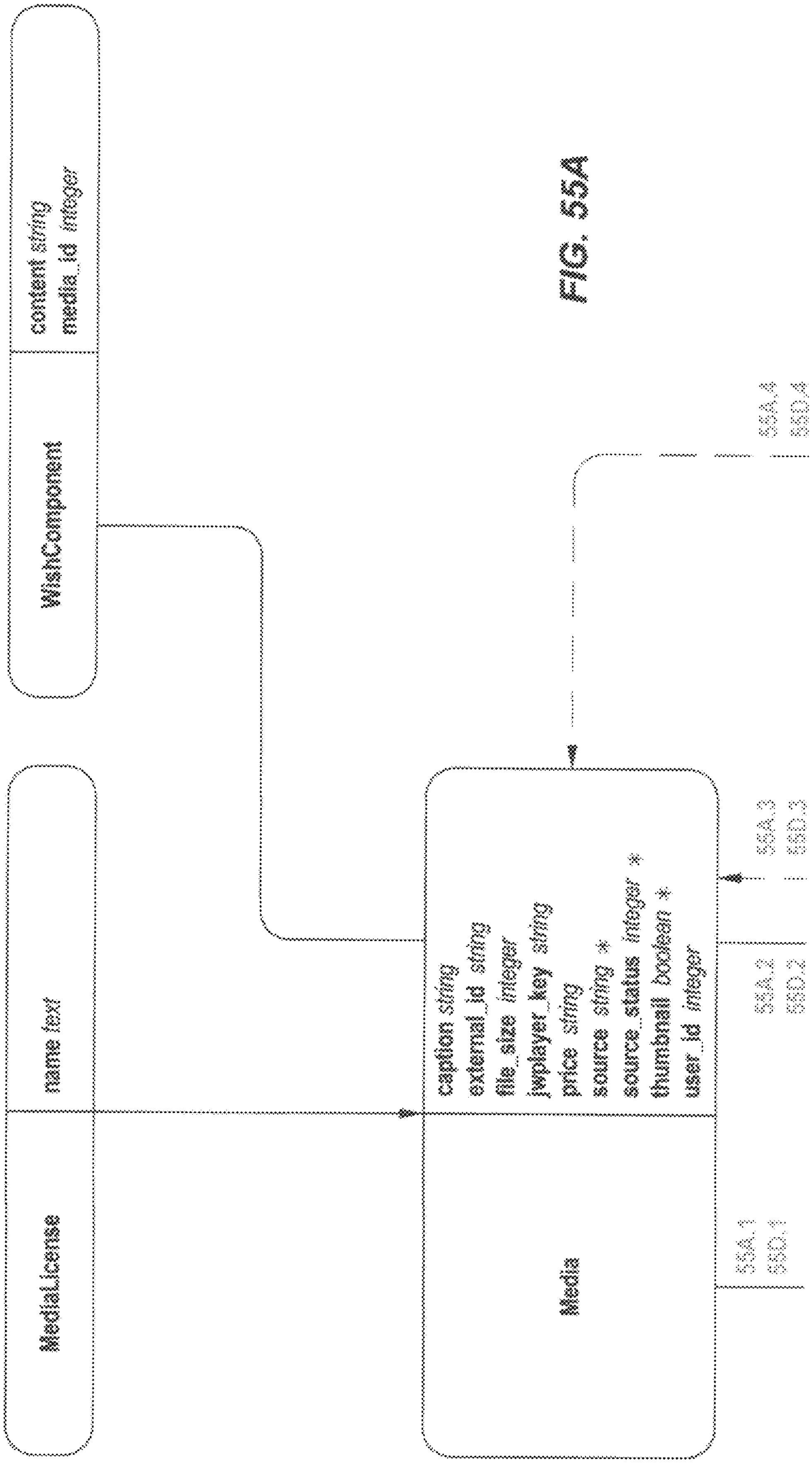
FIGS. 55A-55I are enlarged views of portions of FIG. 55. The relationships between the items shown in FIGS. 55A-55I are shown by FIG. 55.
Figure 55B:
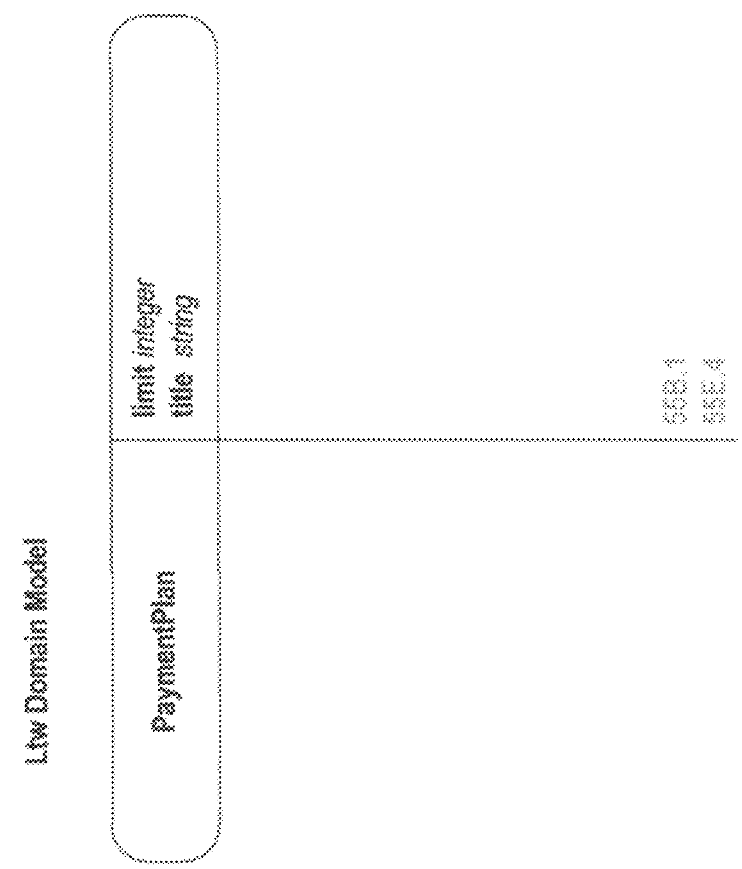
Figure 55C:
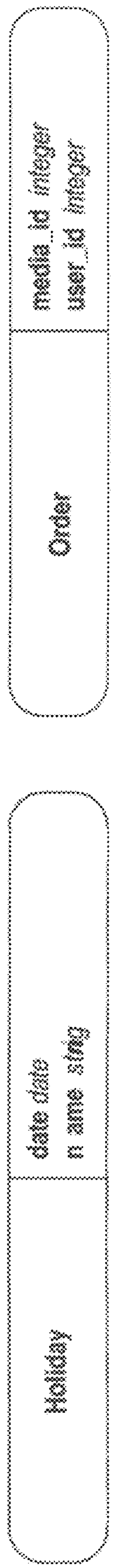
Figure 55D:
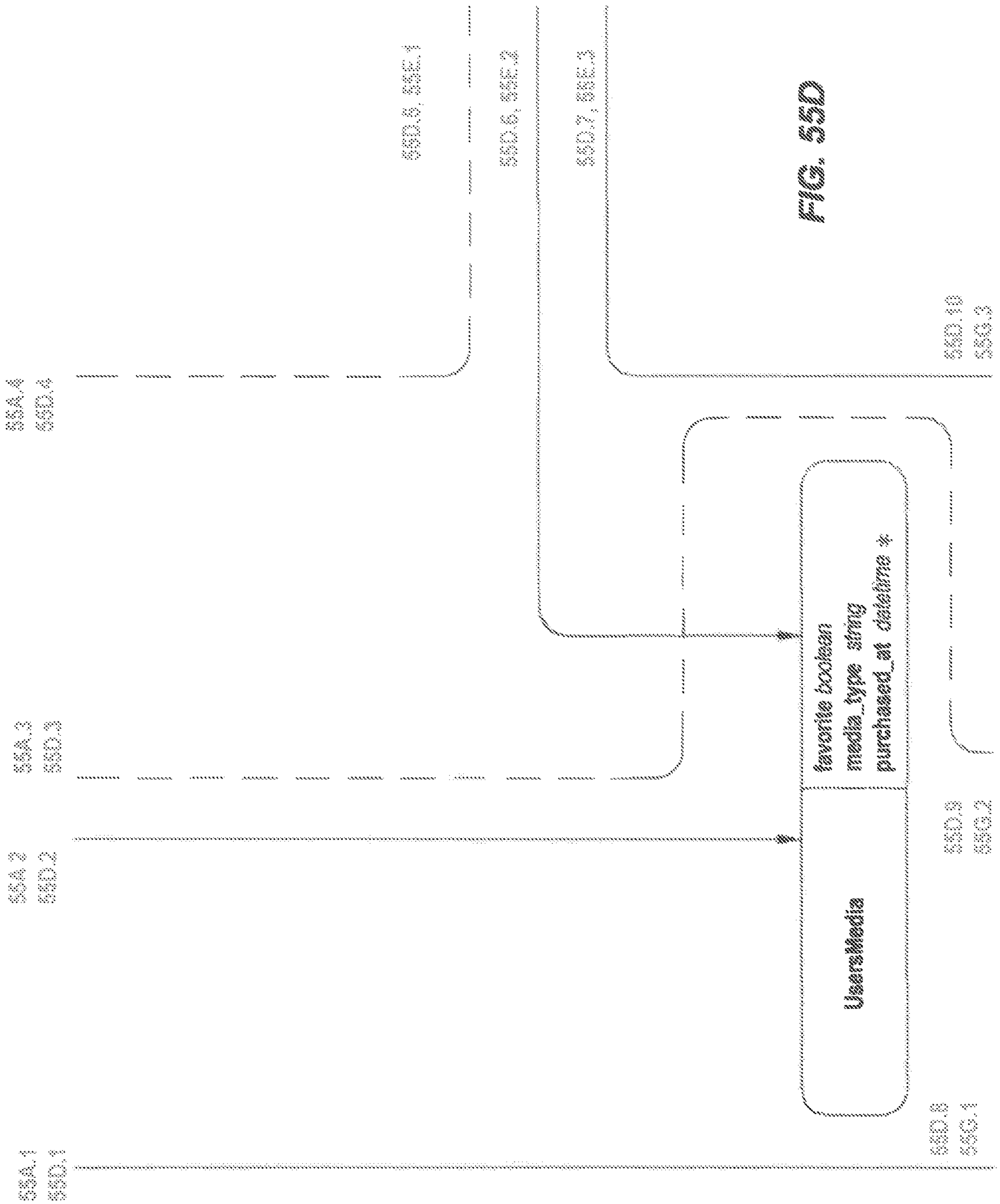
Figure 55E:
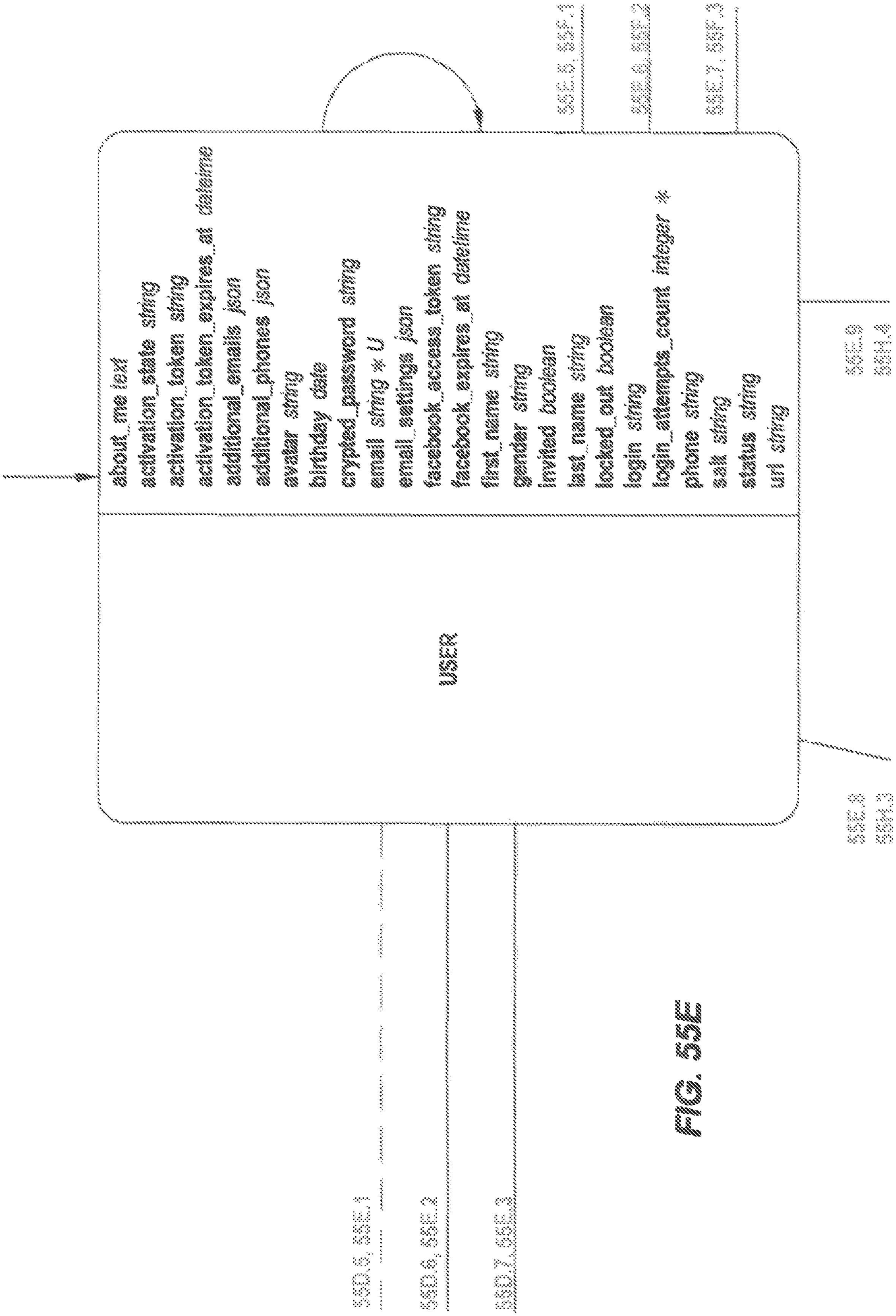
Figure 55F:
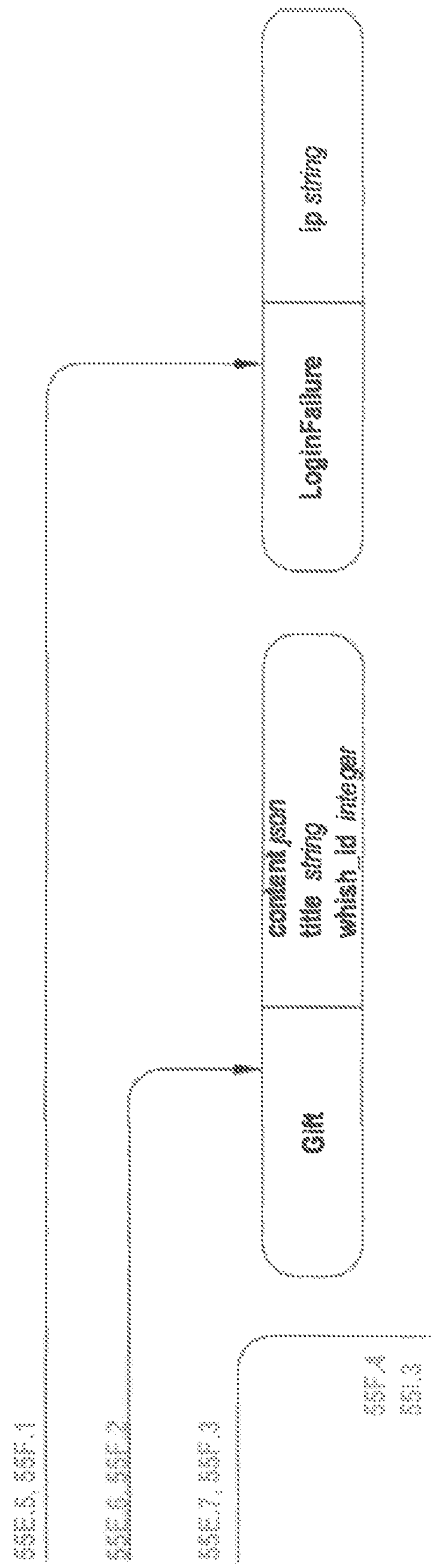
Figure 55G:
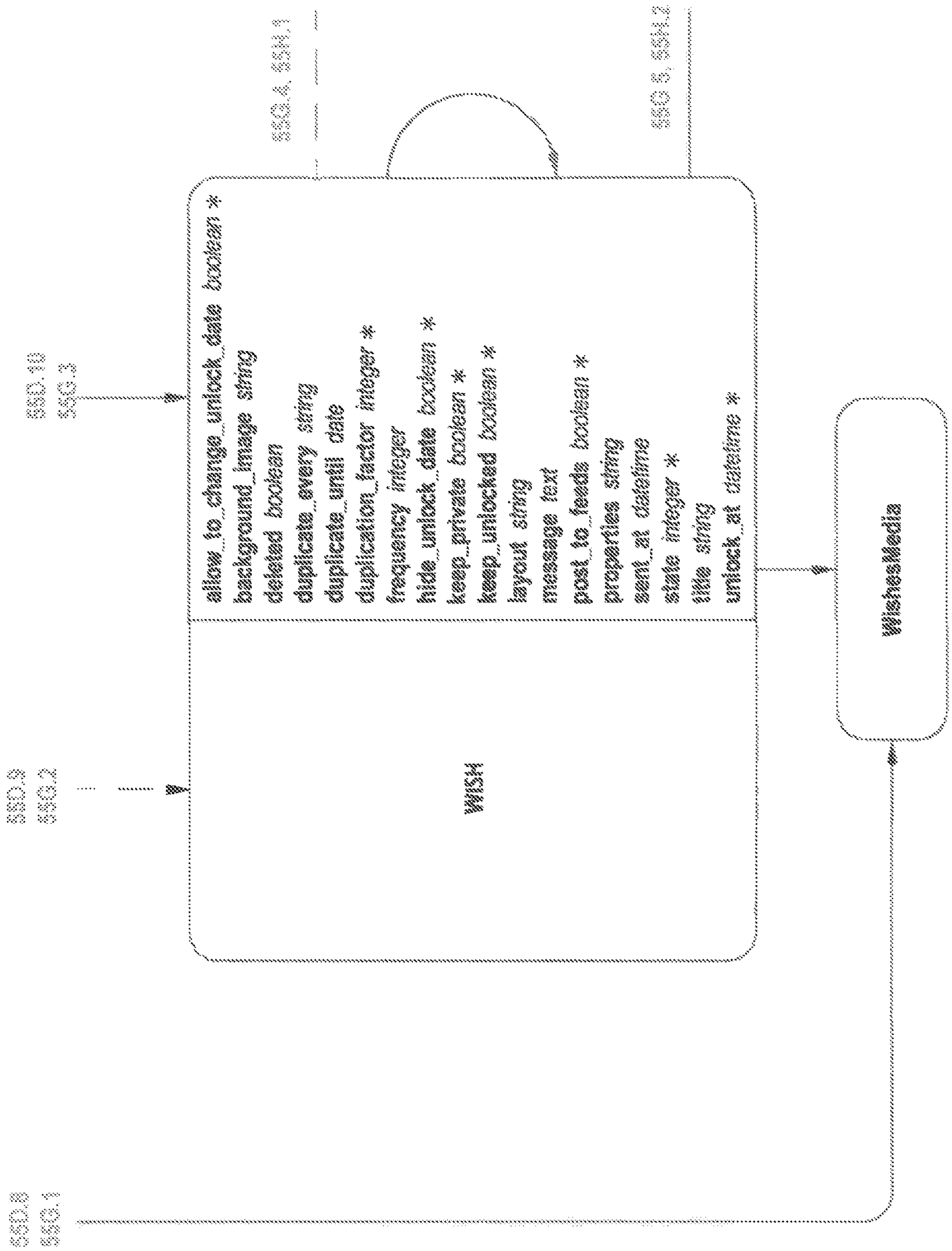
Figure 55H:
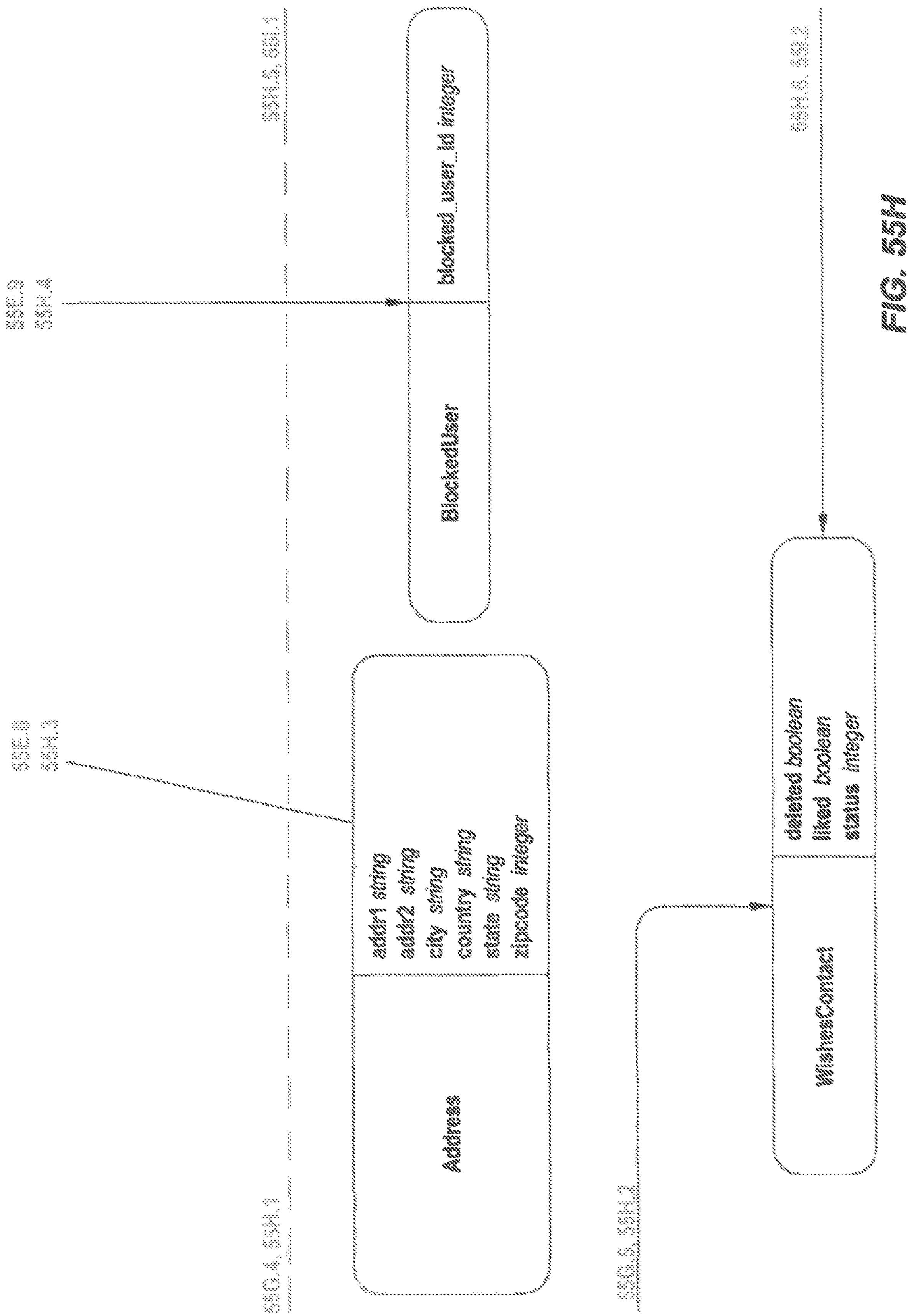

FIGS. 55G, 55H, 55D show Wish, Users Media, Wishes Media and Wishes Contact data fields to contain pertinent information. Data flow may be as indicated as shown.

FIG. 55A shows Media, Media License and Wish Component data fields to contain pertinent information. The use of media data may be governed by the pertinent license for that data.

Figure 55I:
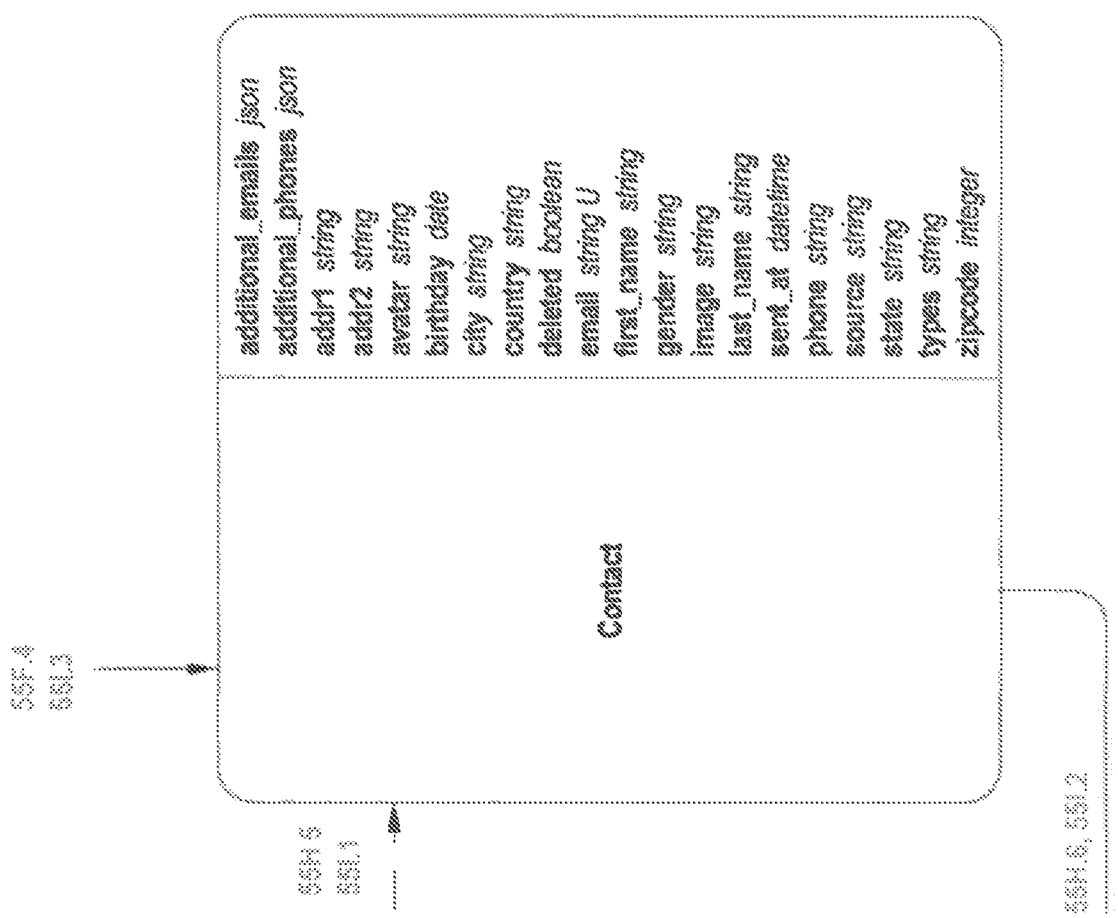

FIGS. 55F and 55I show Content, Gift and Login Failure data field which may contain pertinent information.

Figure 56:
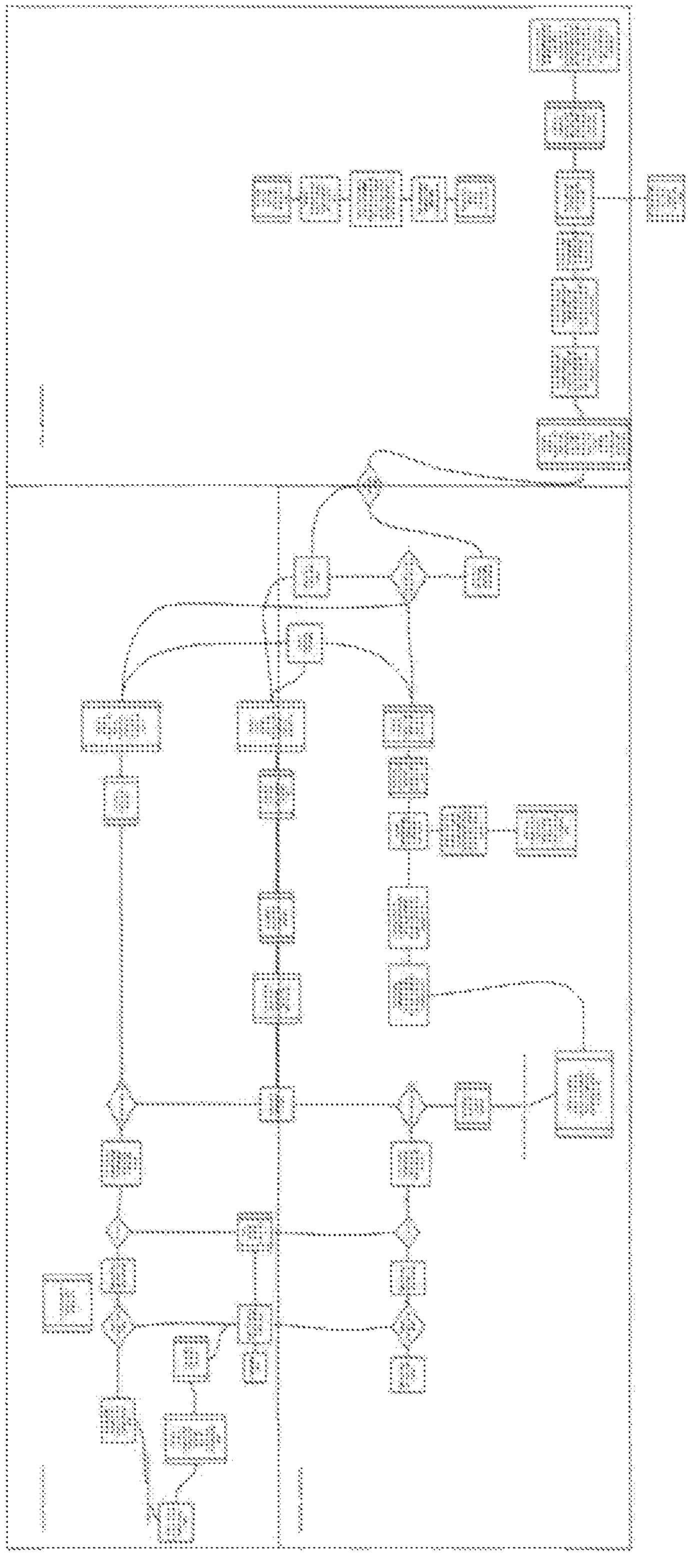
FIG. 56 shows a registration process.
Figure 56B:
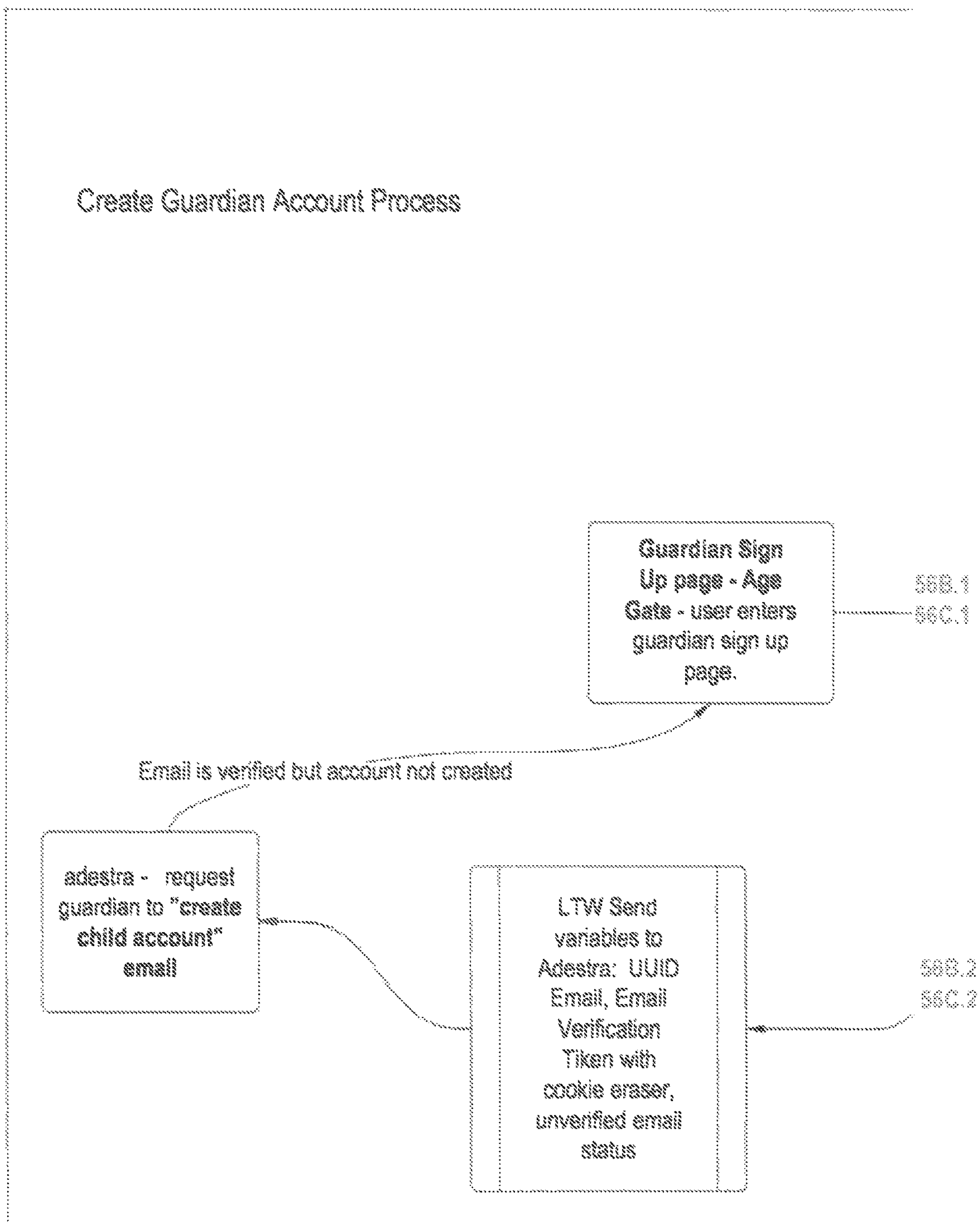
FIGS. 56A-56BB are enlarged views of portions of FIG. 56. The relationships between the items shown in FIGS. 56A-56BB are shown in FIG. 56.
Figure 56C:
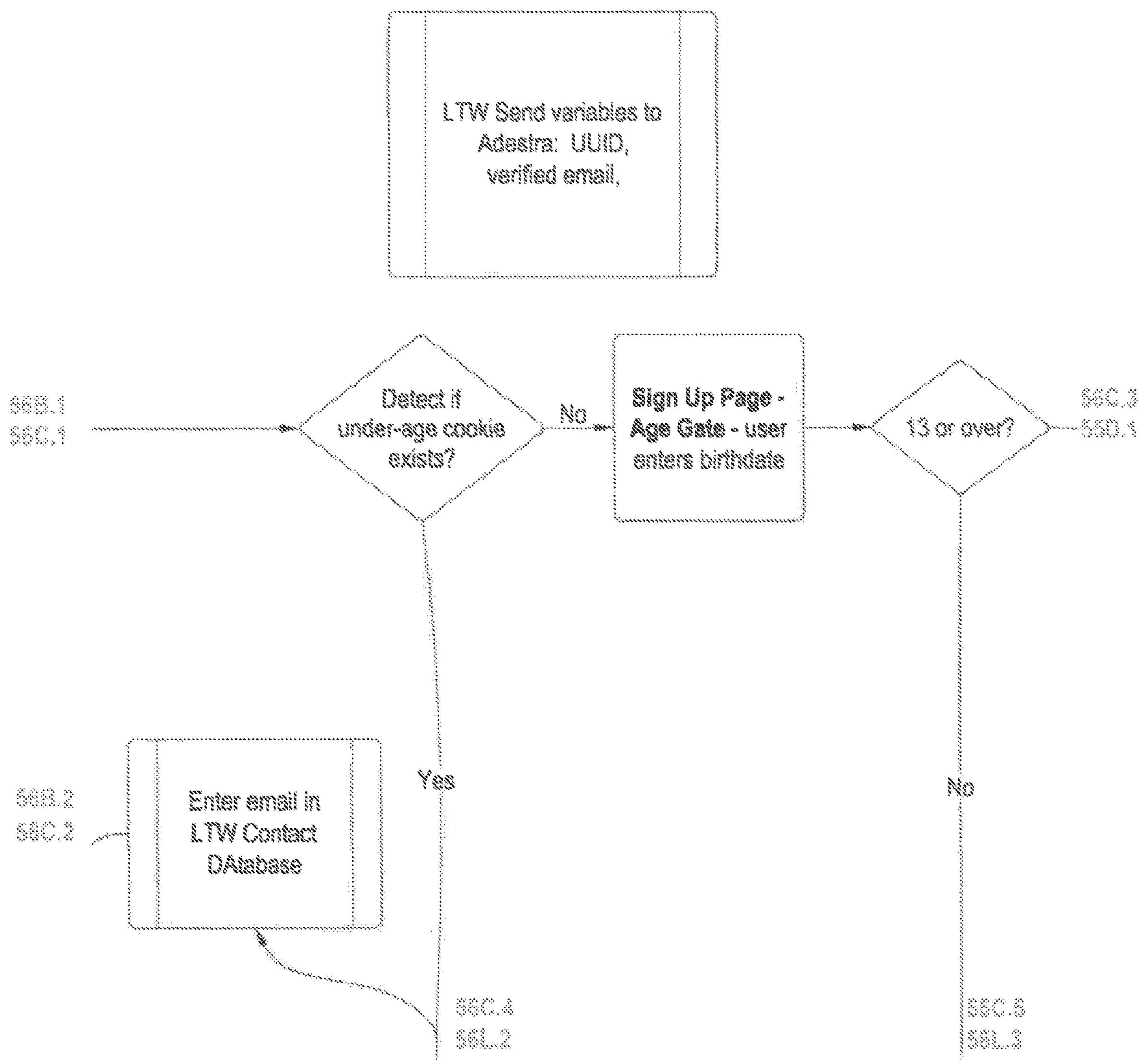
Figure 56D:
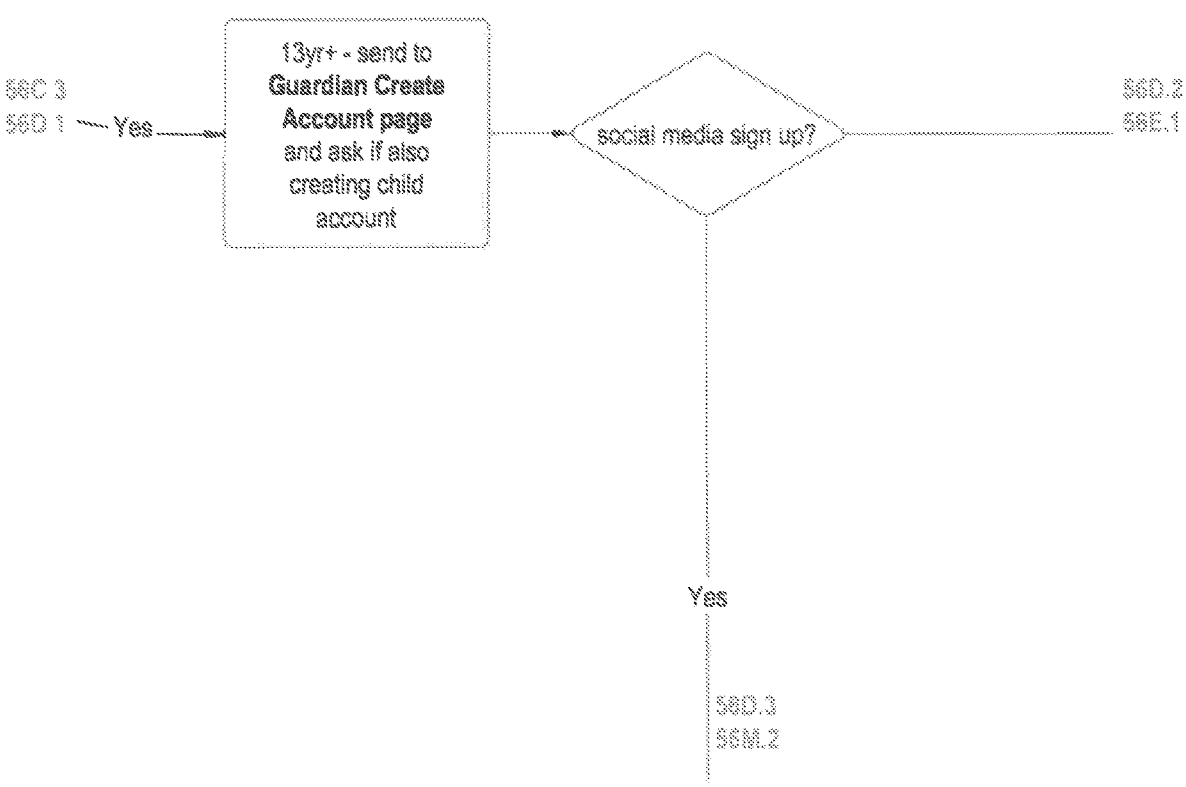
Figure 56F:
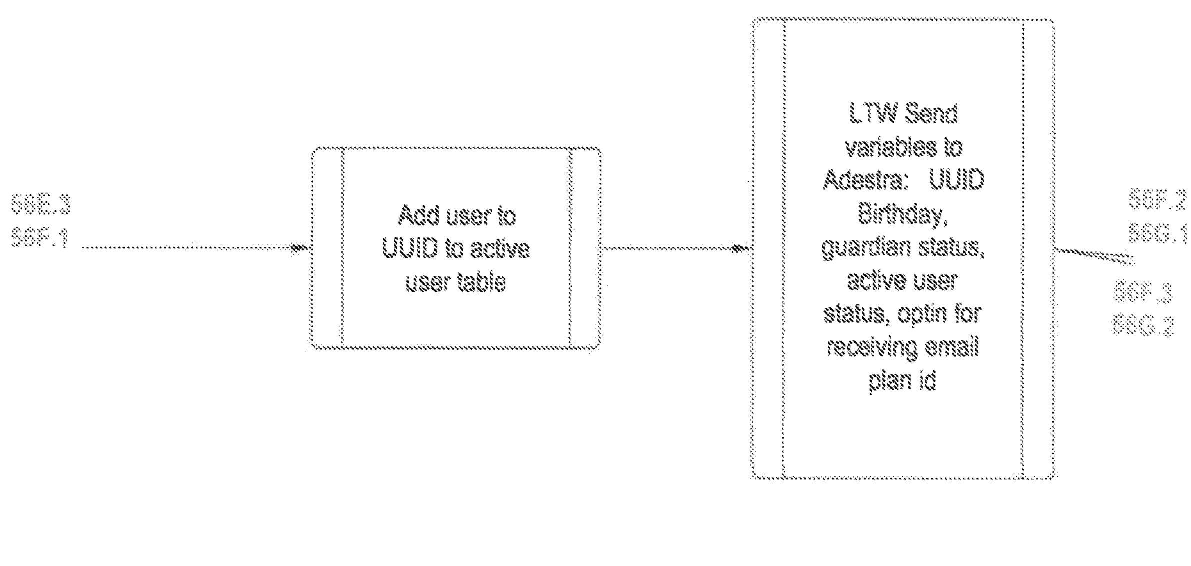
Figure 56G:
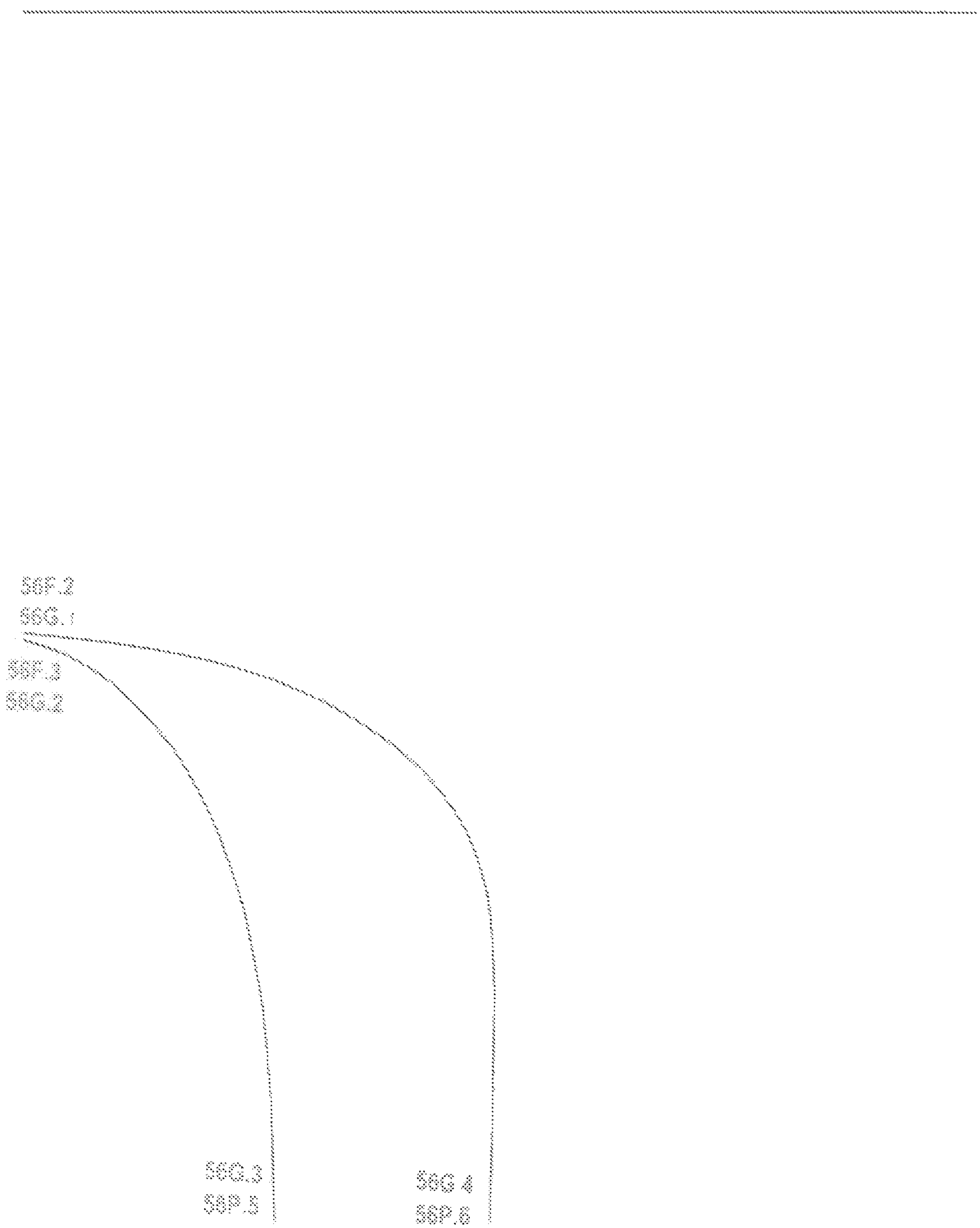
Figure 56H:
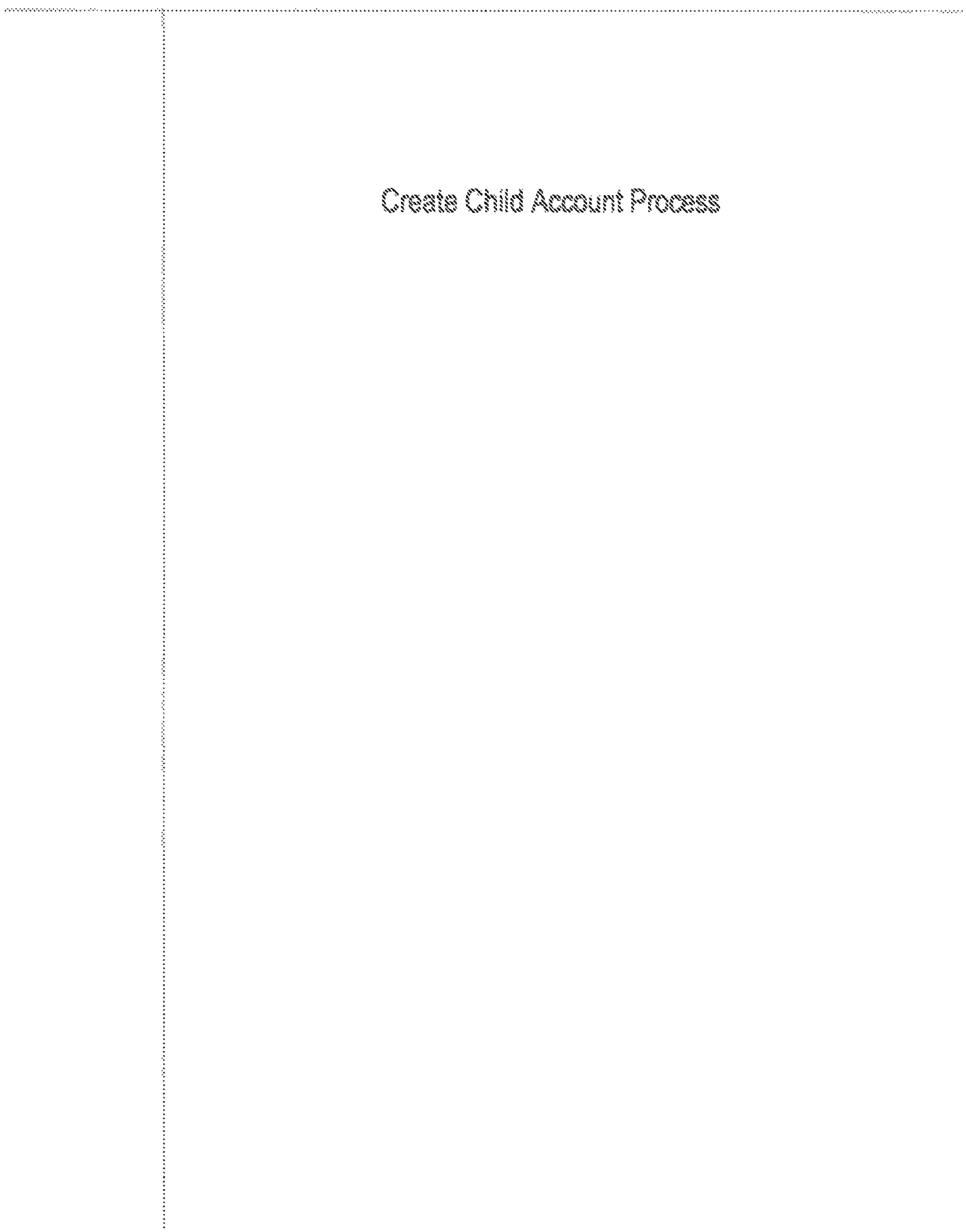
Figure 56I:
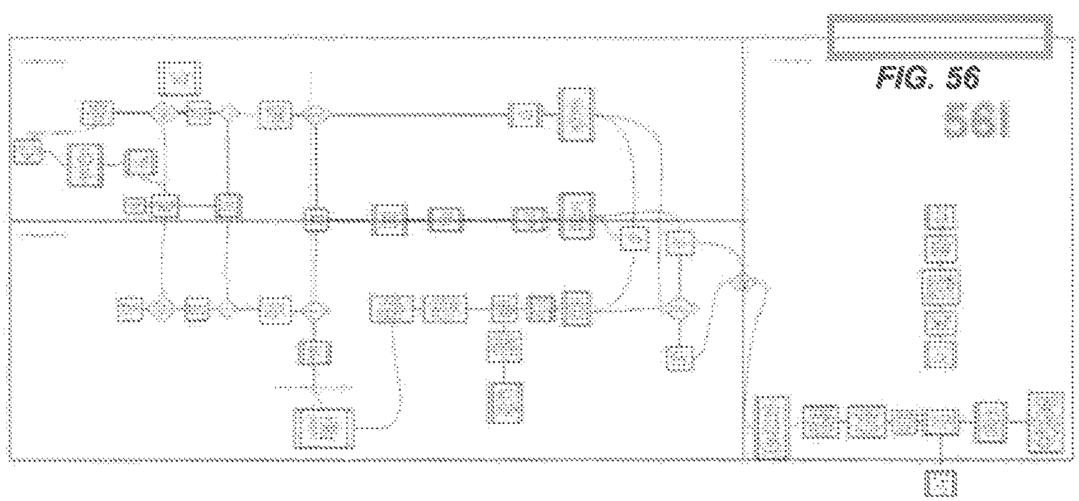
Figure 56J:
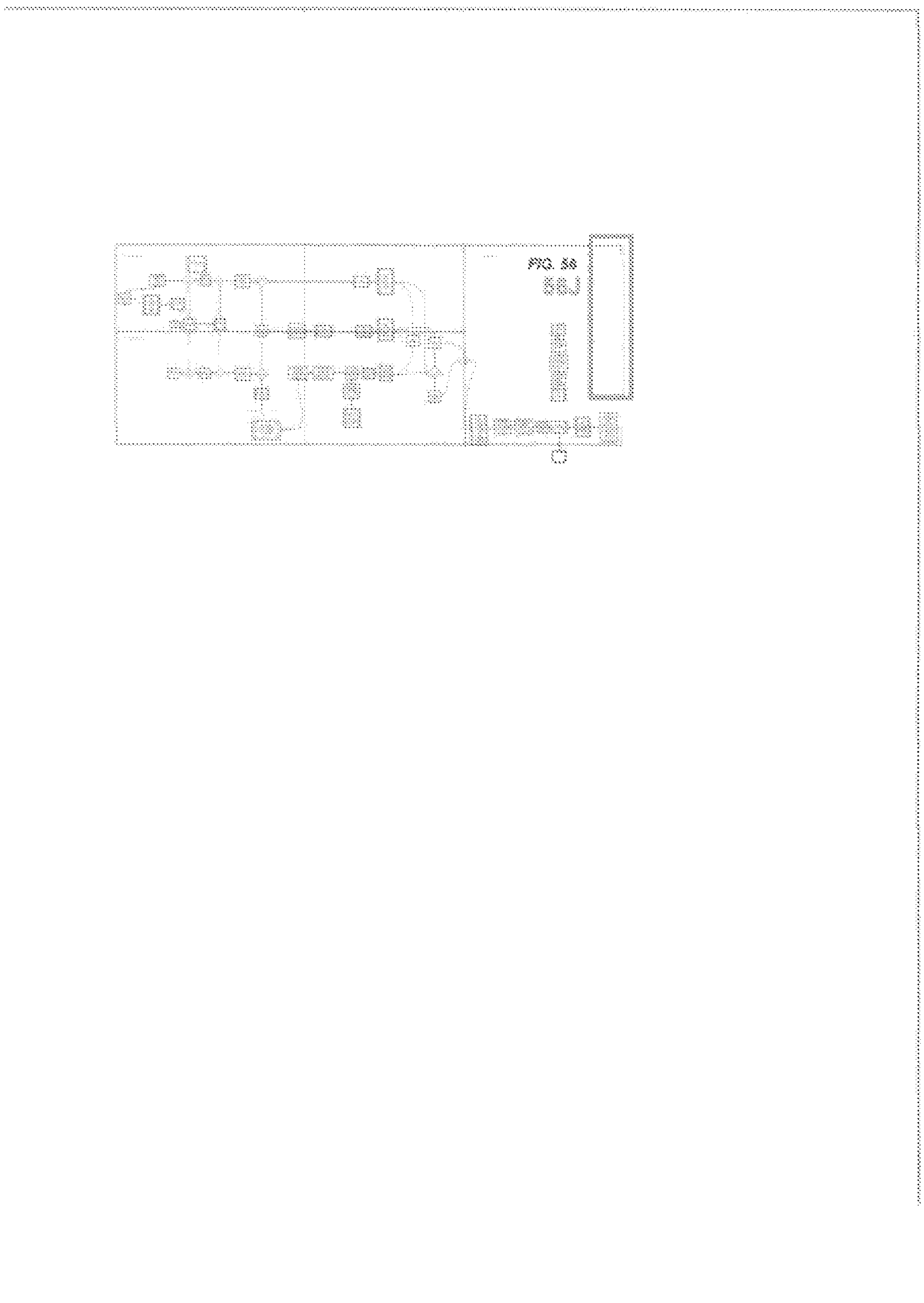
Figure 56K:
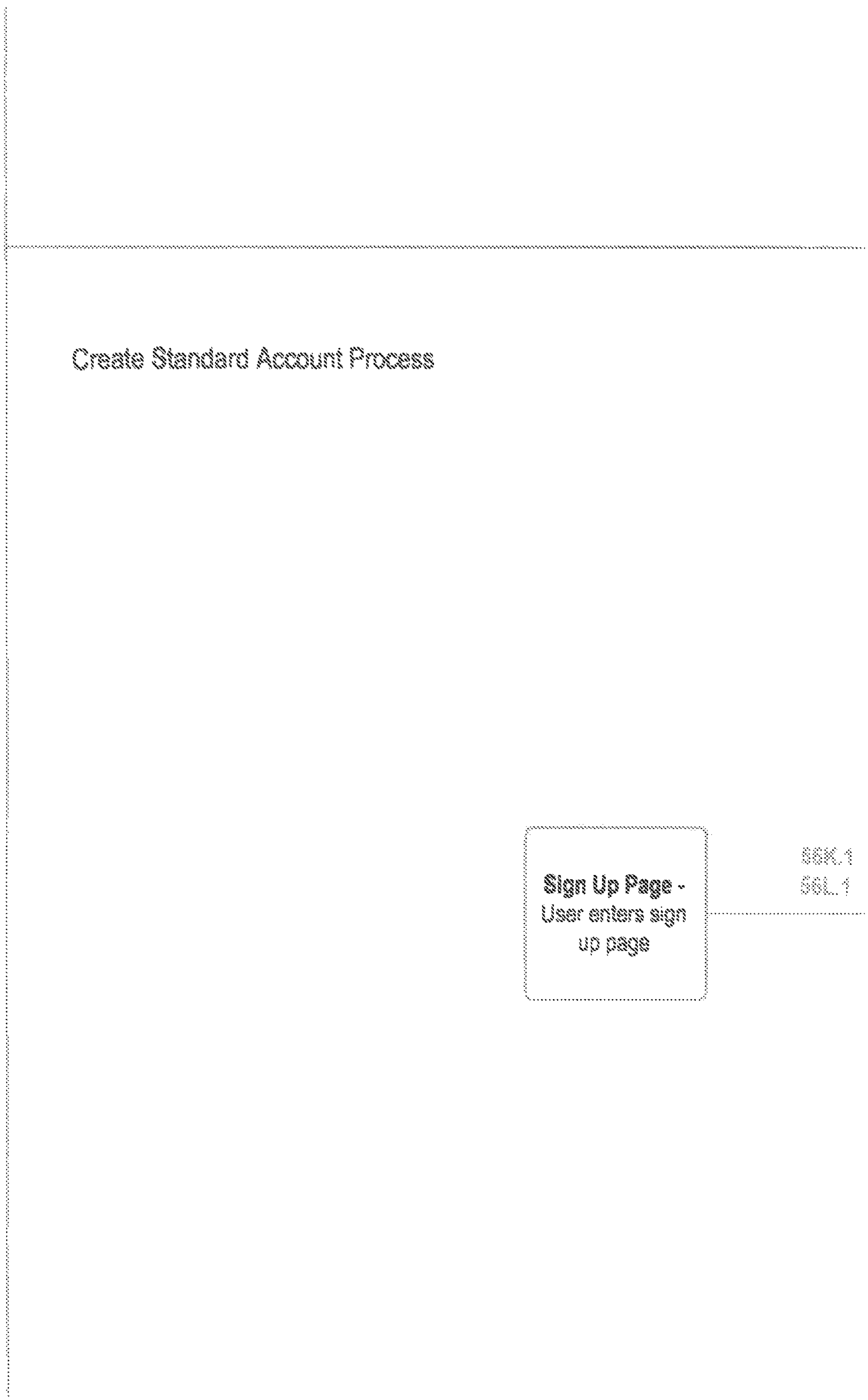
Figure 56L:
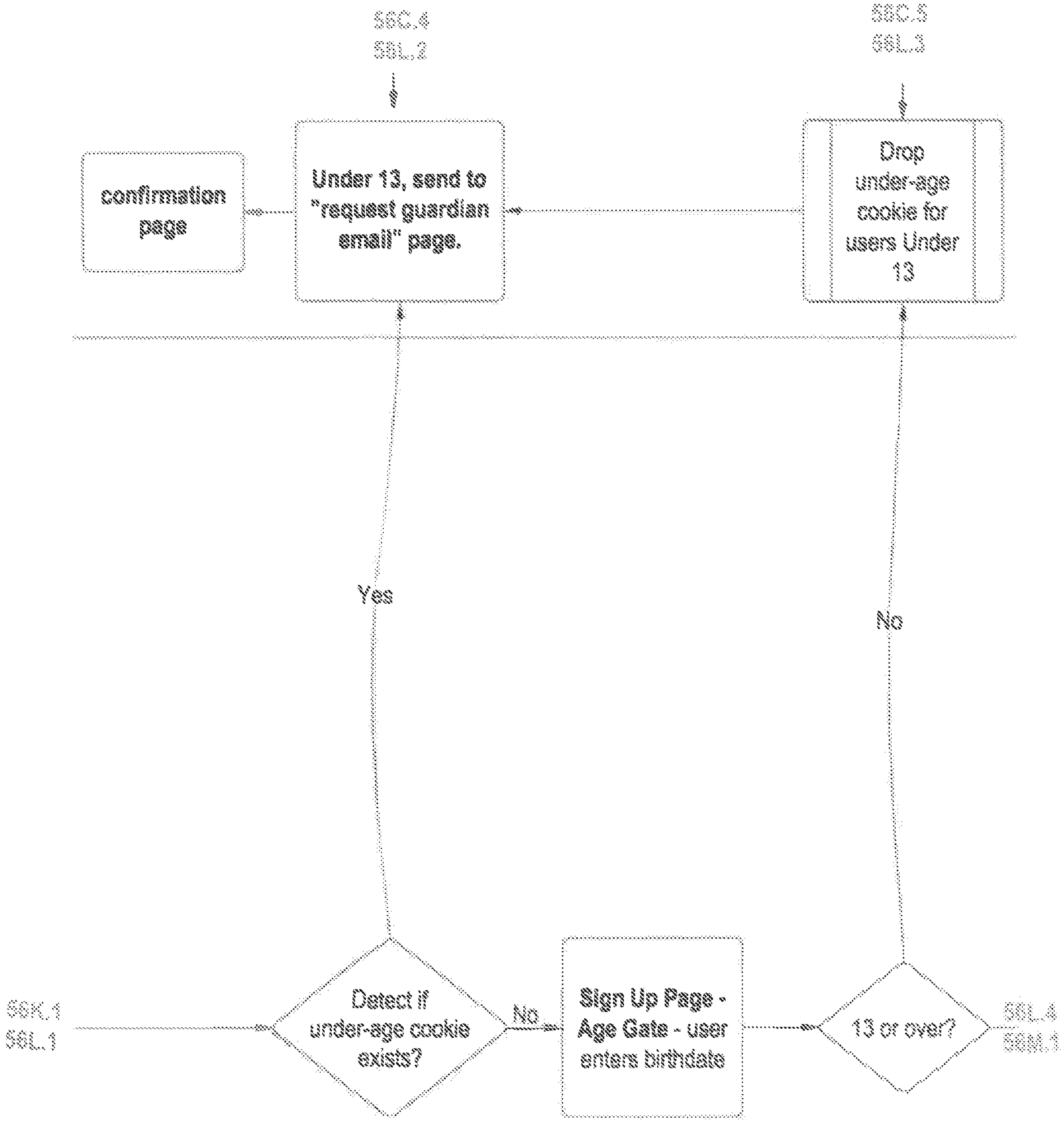
Figure 56M:
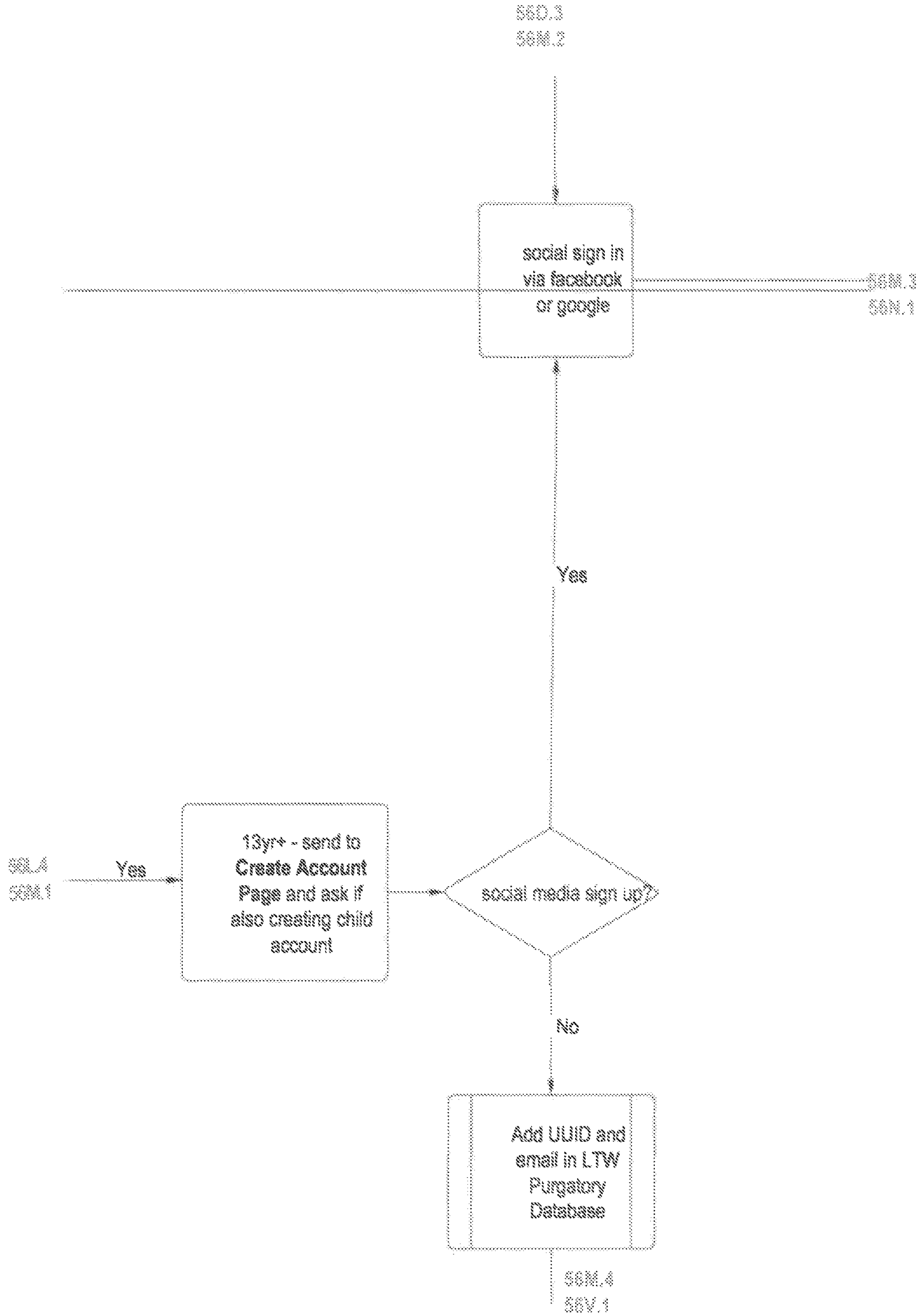
Figure 56N:
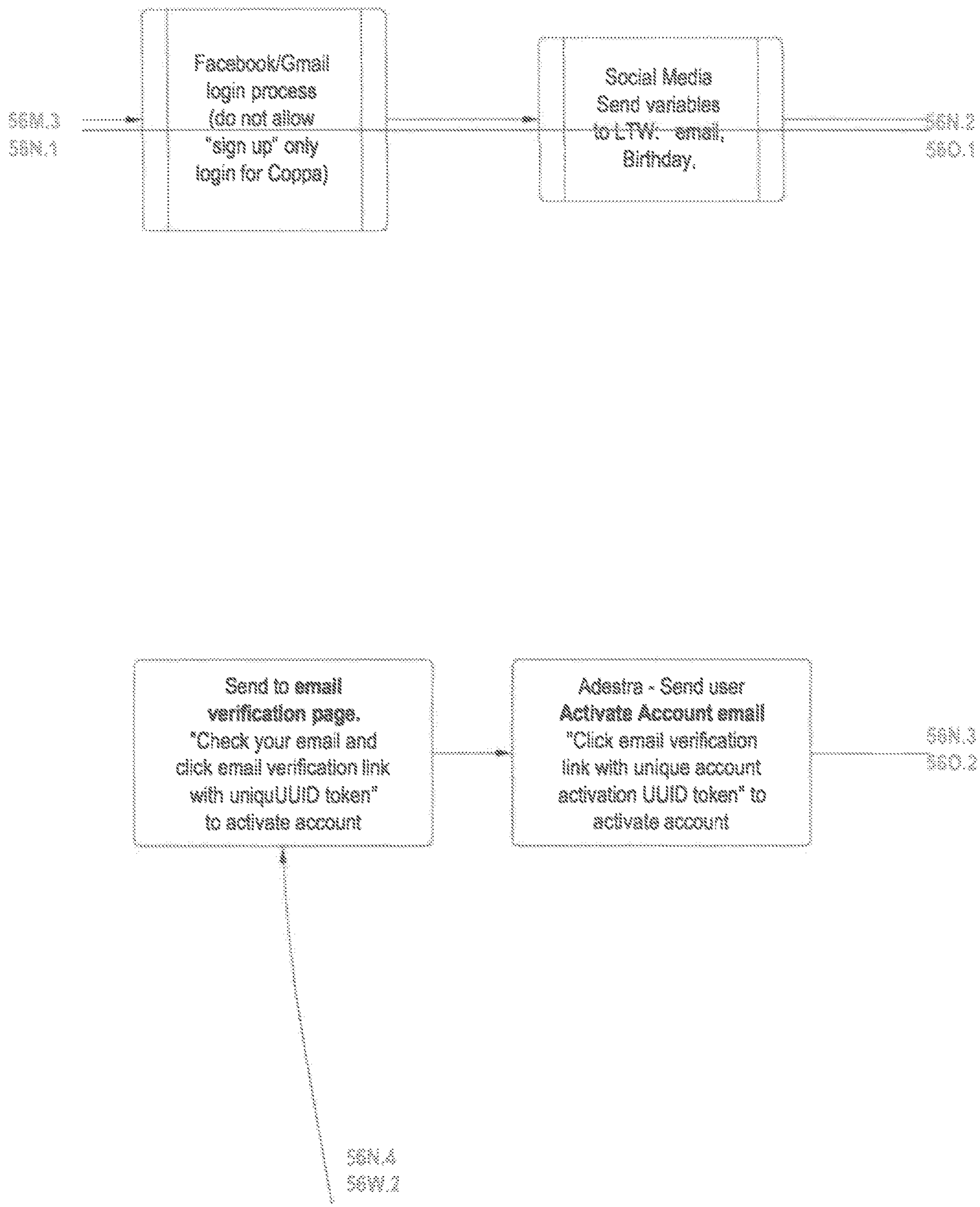
Figure 56P:
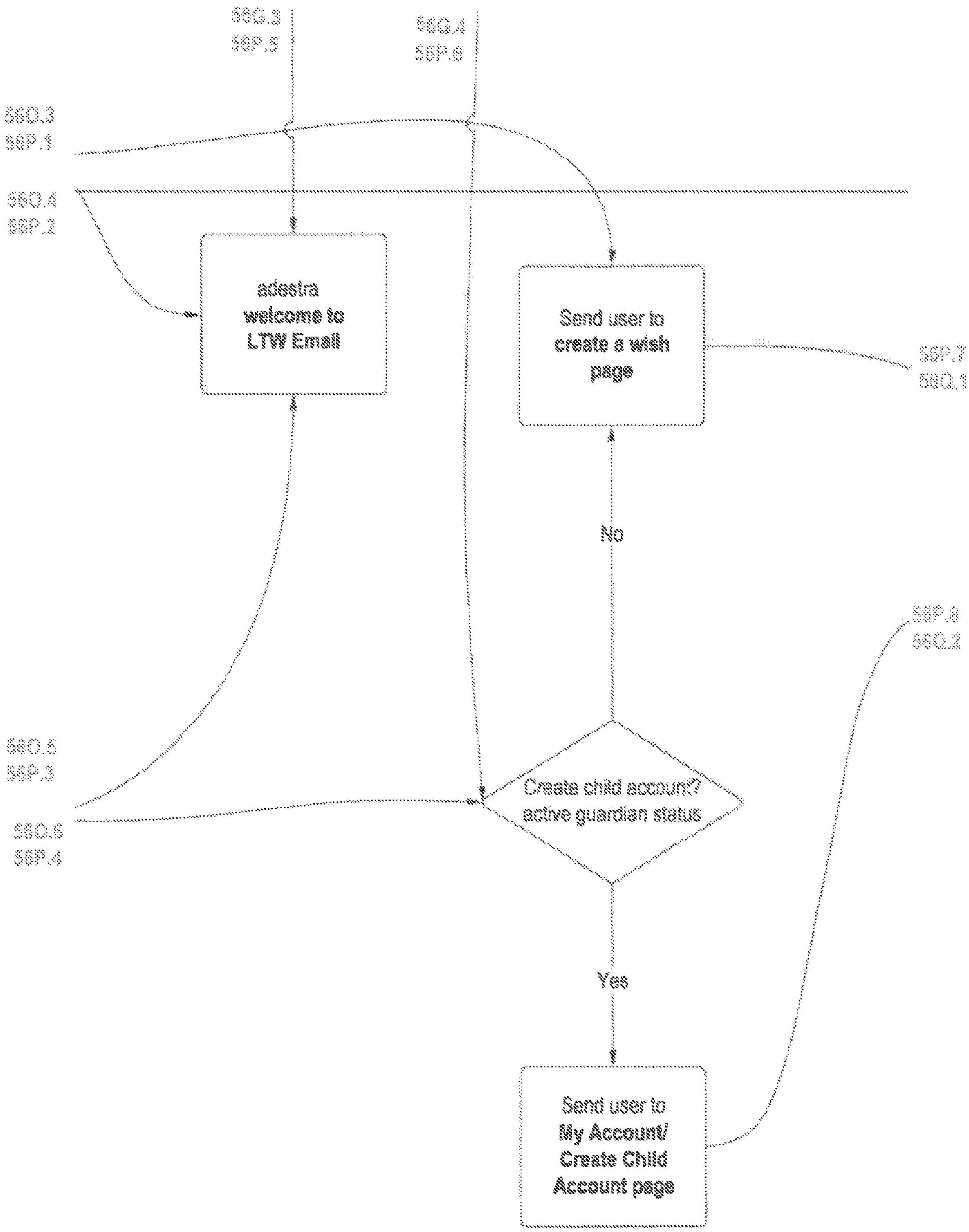
Figure 56Q:
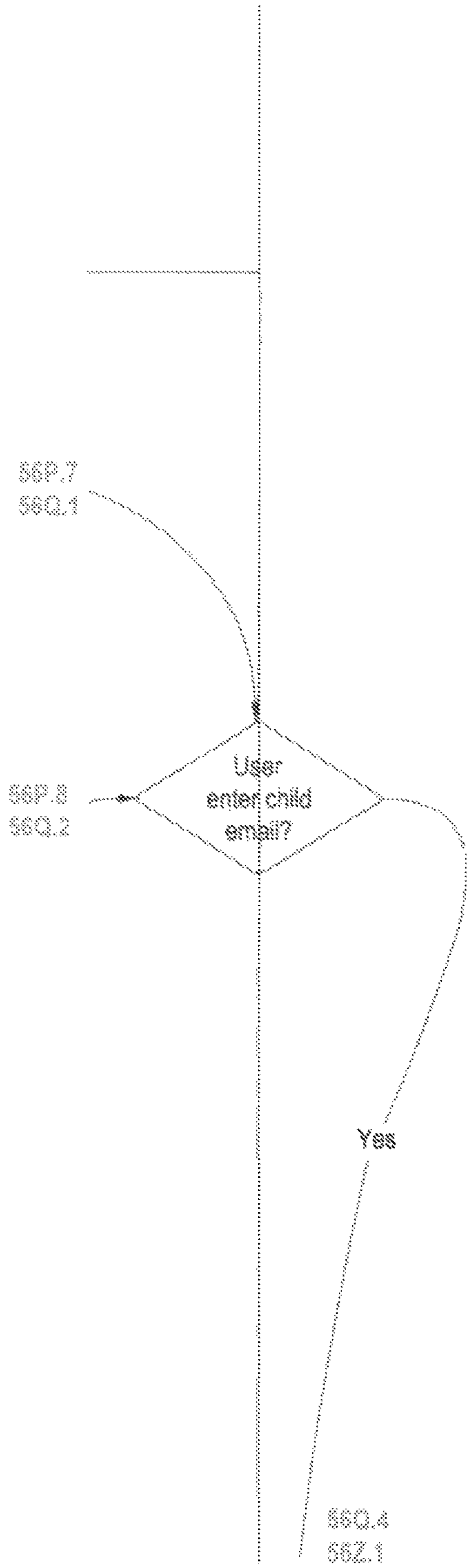
Figure 56R:
Figure 56S:
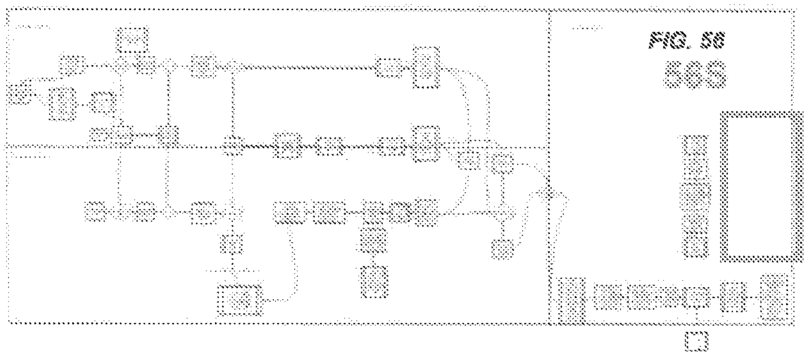
Figure 56T:
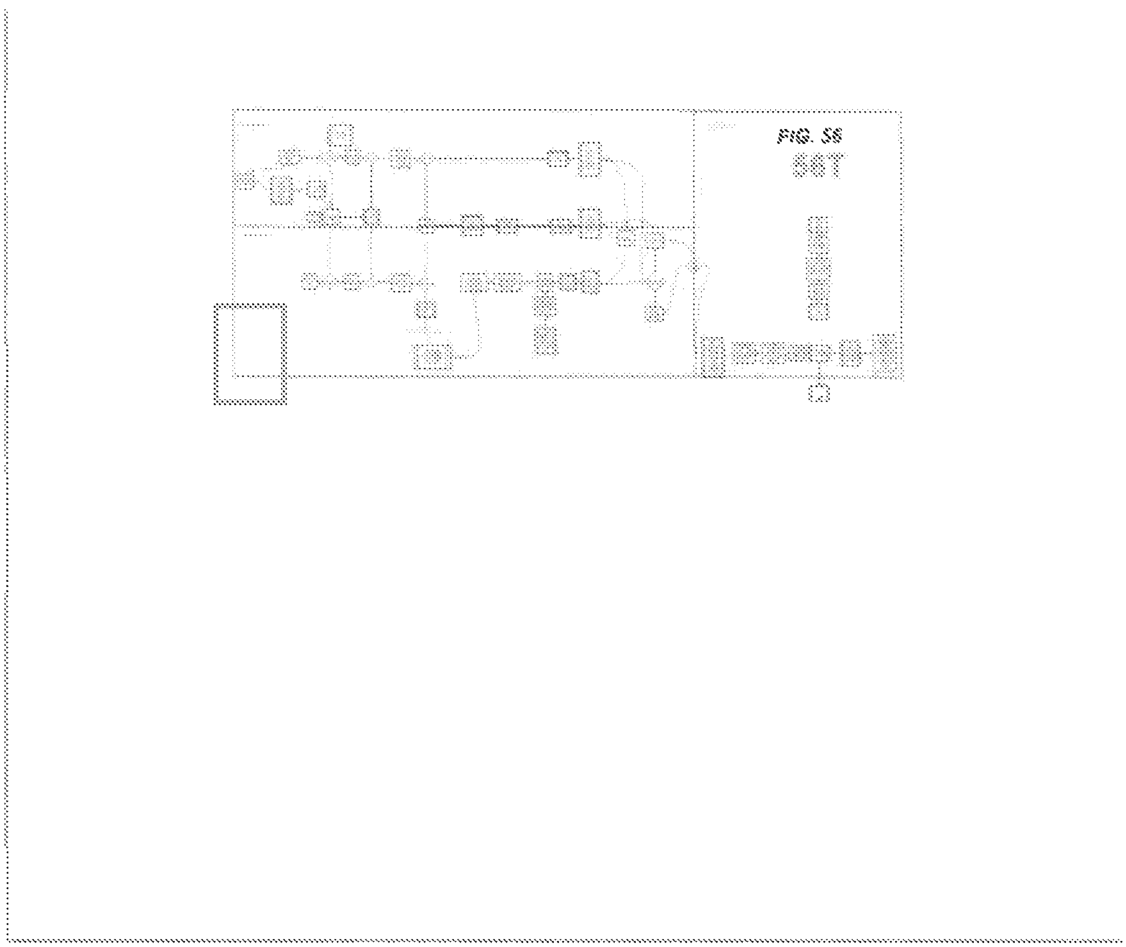
Figure 56U:
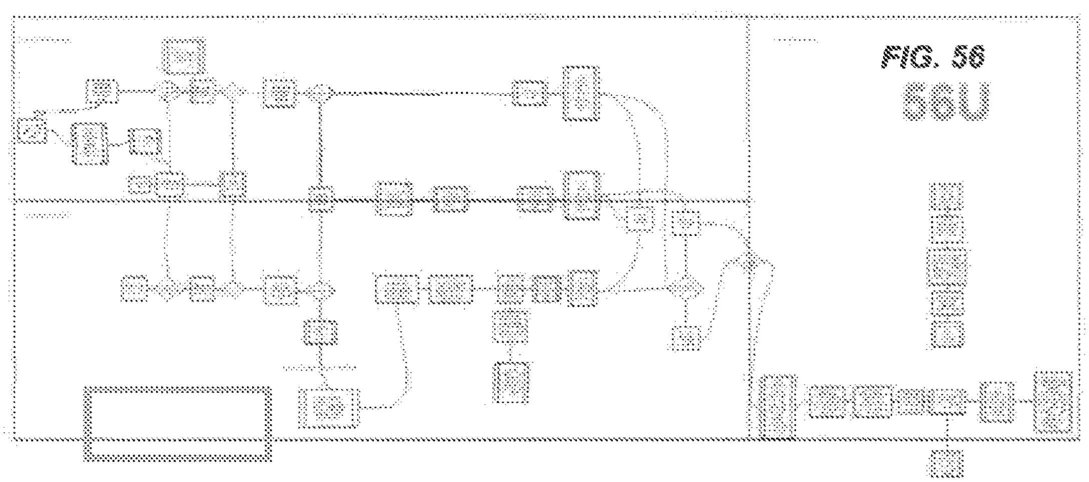
Figure 56V:
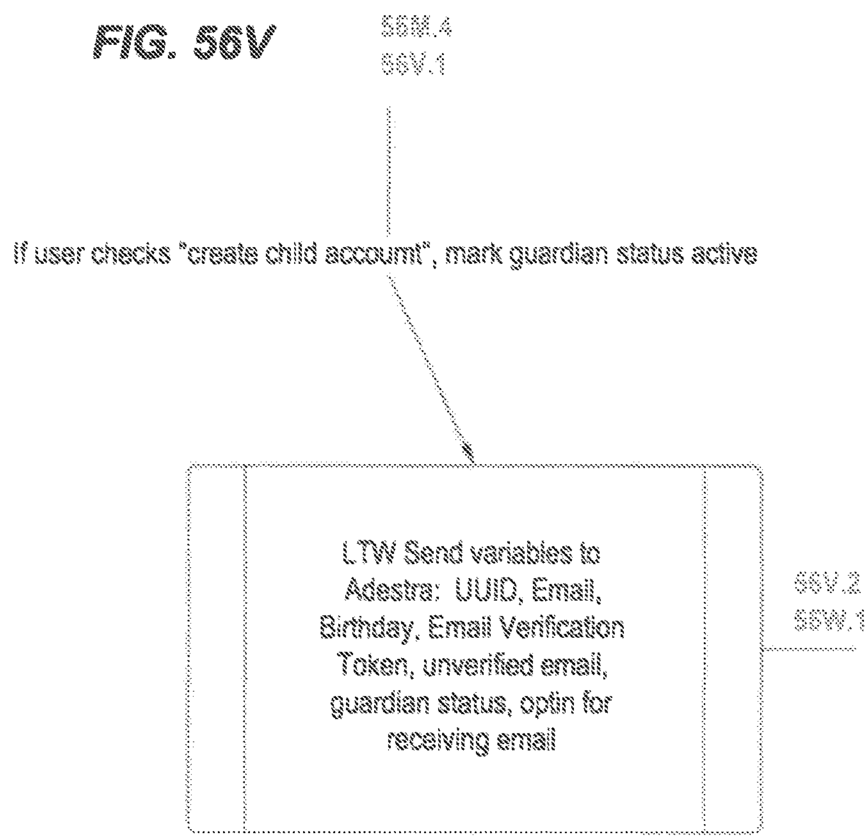
Figure 56W:
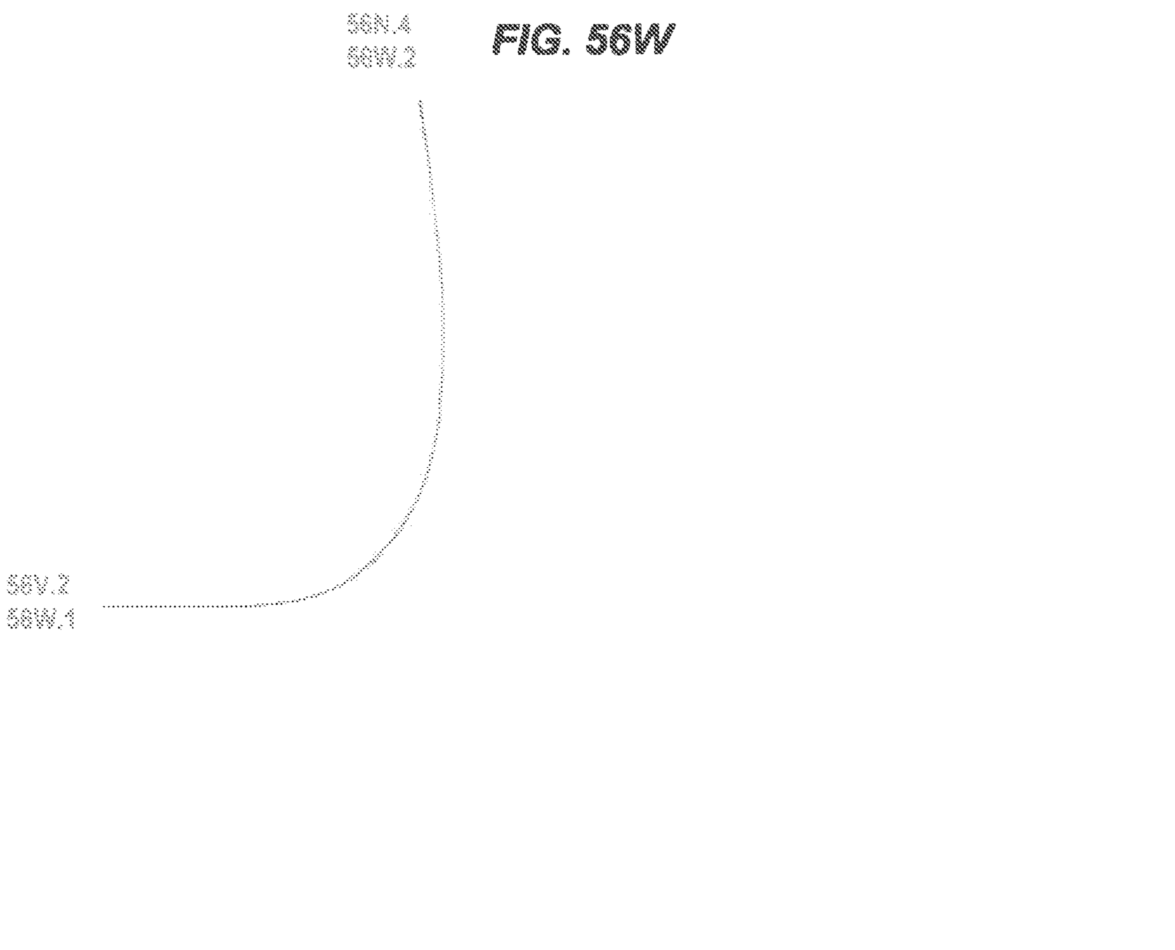
Figure 56X:
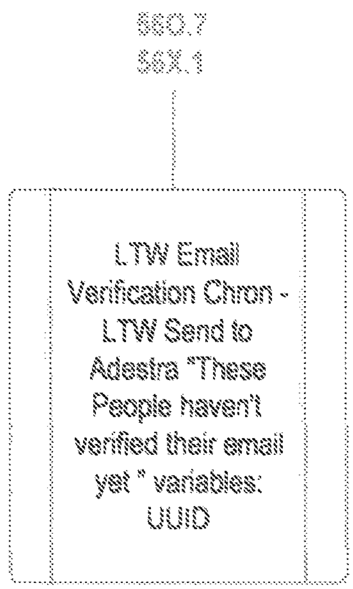
Figure 56Y:
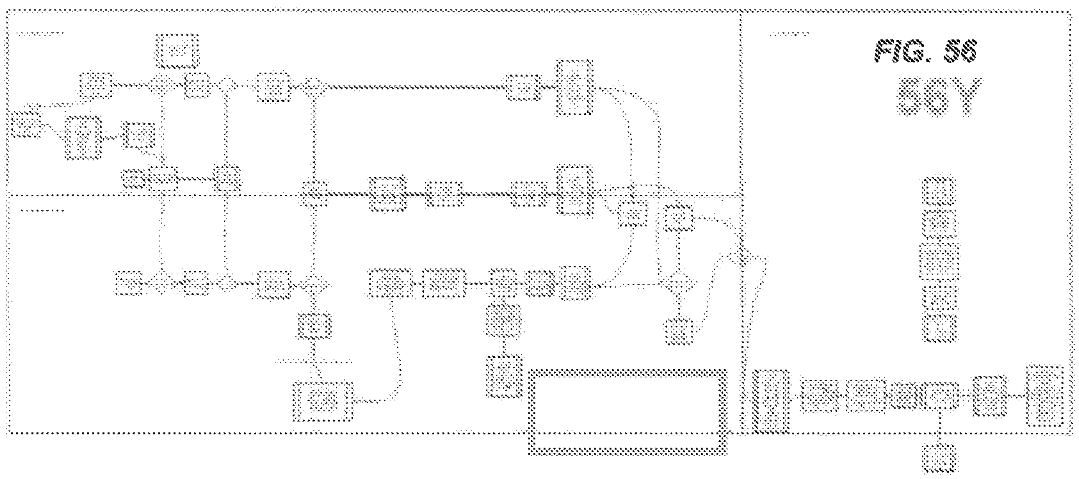
Figure 56Z:
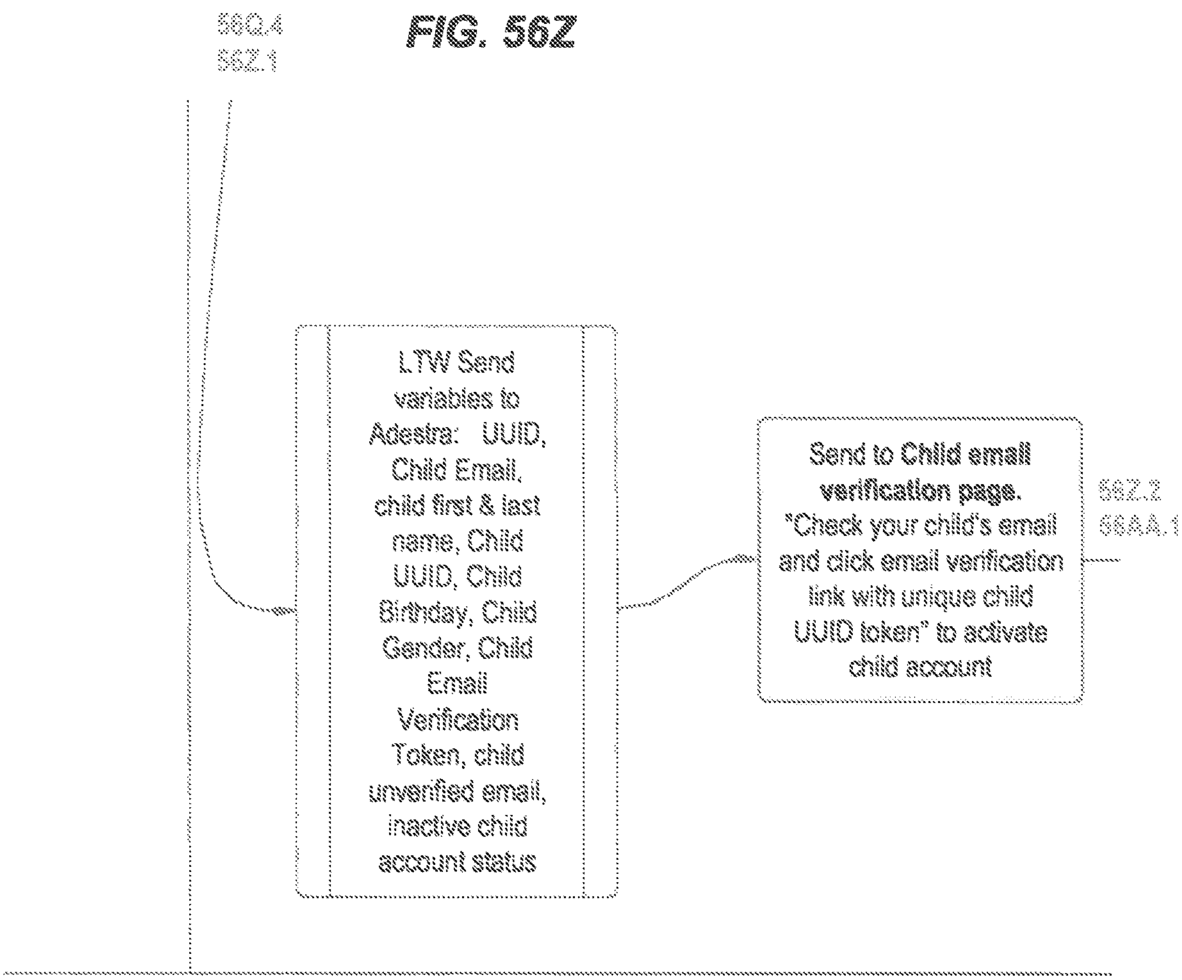
Figure 56A:
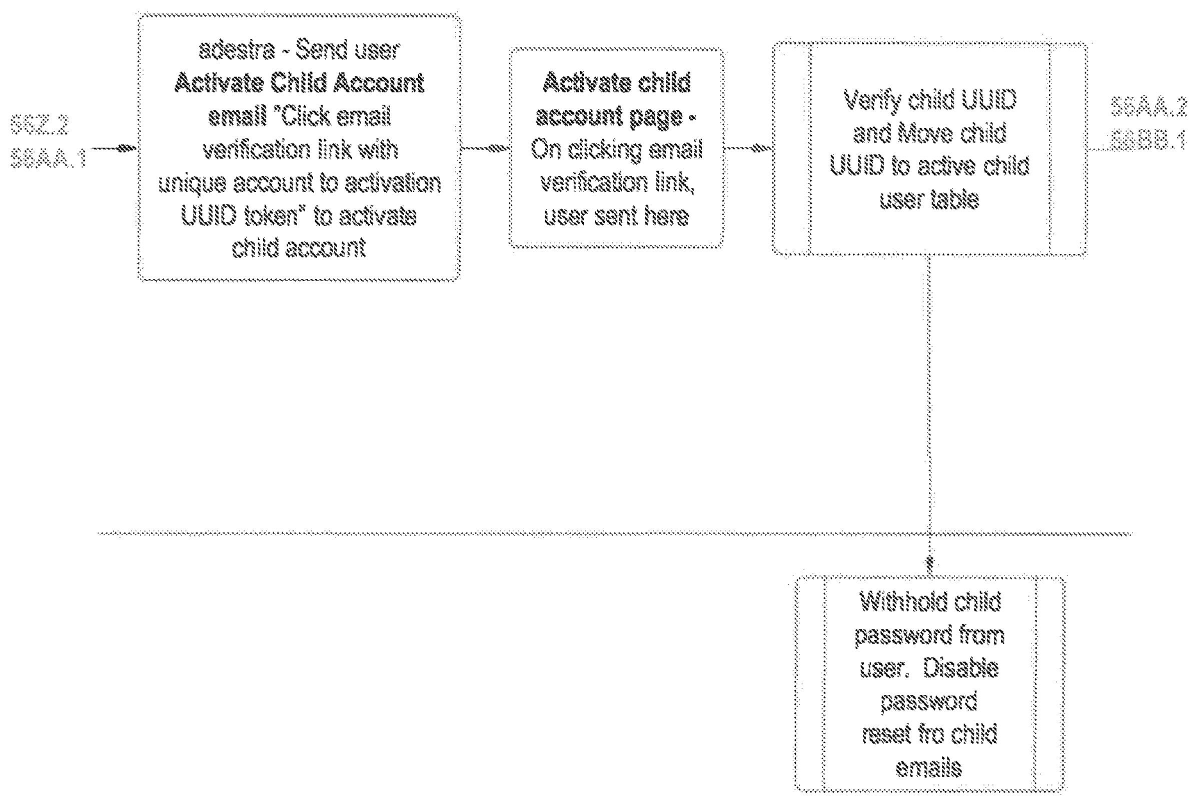
Figure 56B:
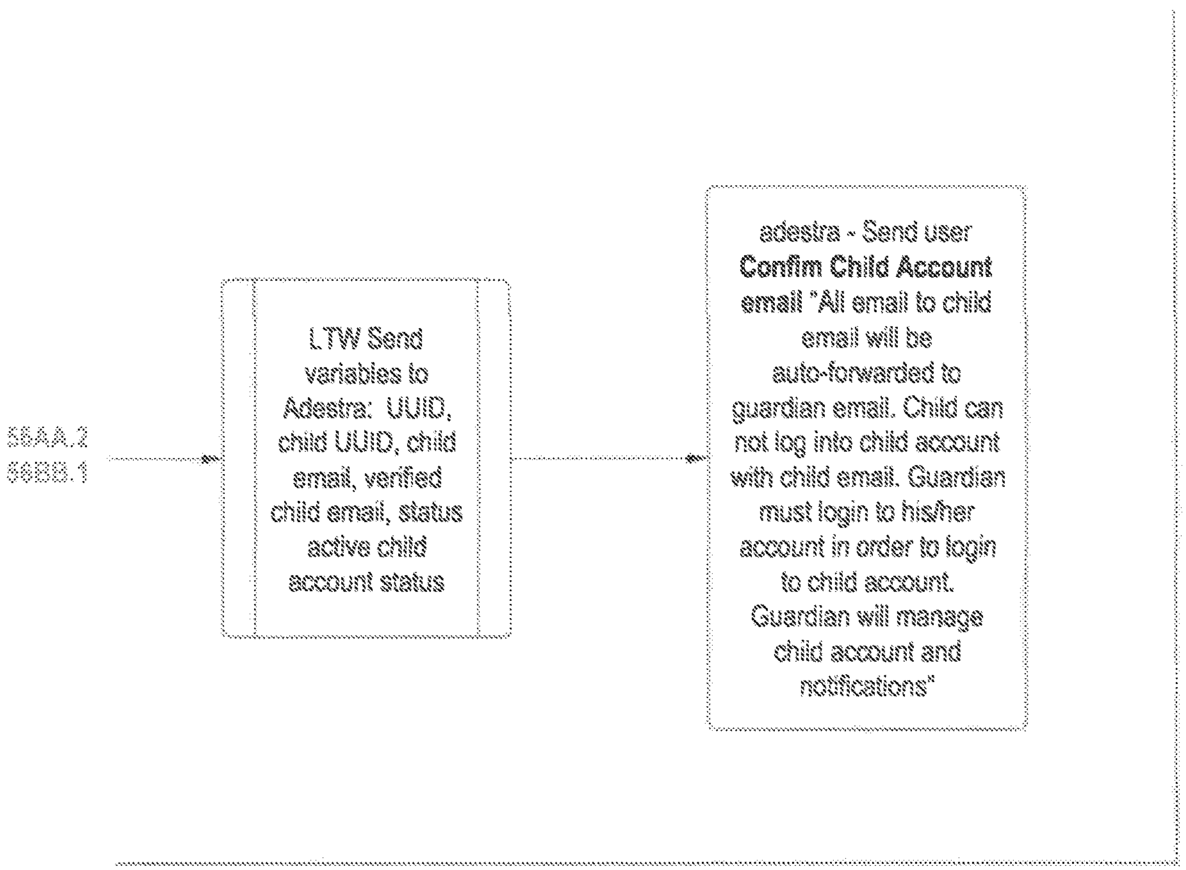

The account creation, including the creation of child accounts and associated supervisory safeguards, are now further described with reference to FIGS. 56 and 56A-56BB. As shown in FIG. 56A, system 10 may include several different types of accounts, user databases and shared database fields. These accounts may be created as shown in FIGS. 56B-56D.

Figure 57:
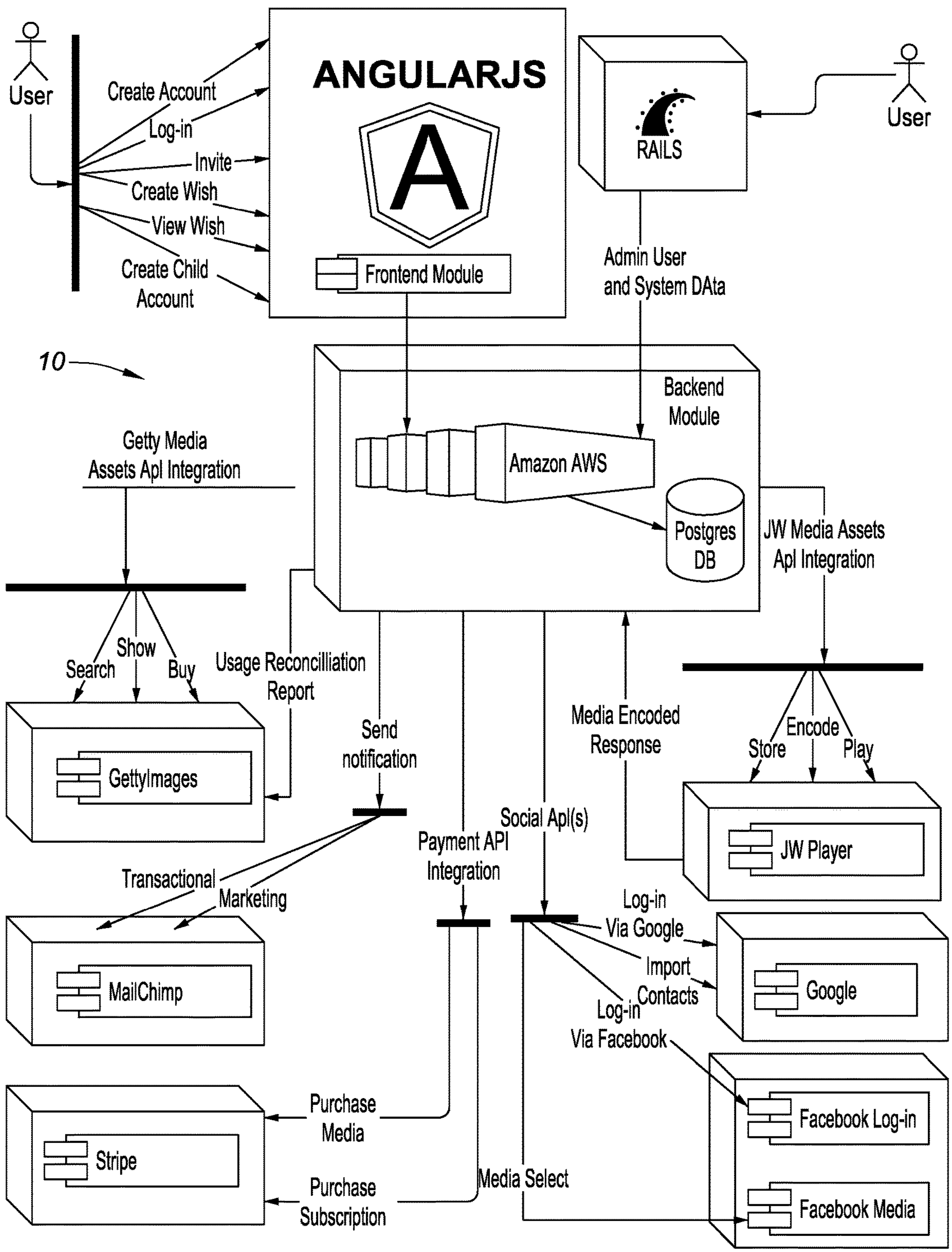
FIG. 57 shows another depiction of the infrastructure and flow of the system of the current invention.

The infrastructure and data flow of system 10 is now further described with reference to FIG. 57. As shown, the user may perform frontend functions through a computer, PDA or other electronic device. This may occur through a series of GUIs as described earlier. The user's data may be used by a frontend module using appropriate software, e.g., Angular JS, to provide appropriate data to a backend module. An administrator's data may also be used by software, such as Rails, to provide appropriate structure for databases, web services and web pages in the backend module.

The backend module may interface with the components shown in creating, sending, receiving, etc., wishes or messages according to the current invention. As shown, third party sources for media, such as Getty Images and/or JW Player may comprise part of system 10 so that media therefrom may be used in, e.g., the creation of wishes. As also shown, the backend module may interface with third party social media as described earlier.

Figure 58:
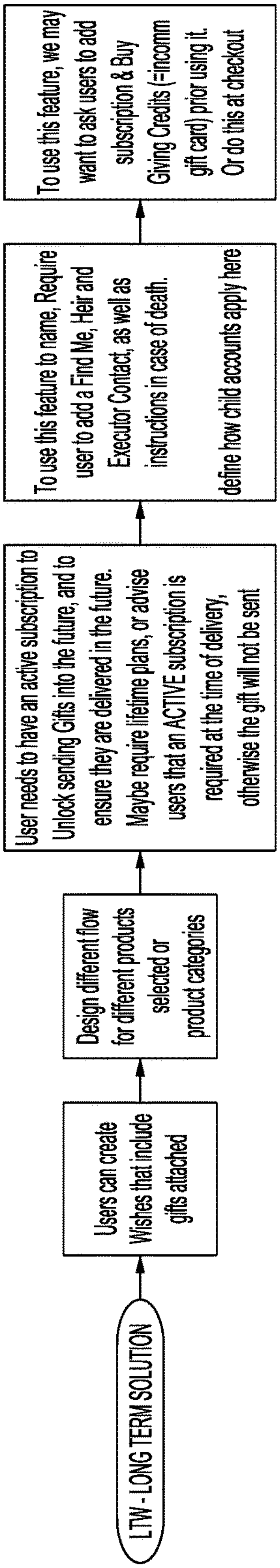
FIG. 58 shows a flow diagram summarizing objectives and requirements of a system in accordance with another aspect of the invention including an e-commerce component.
Figure 59A:
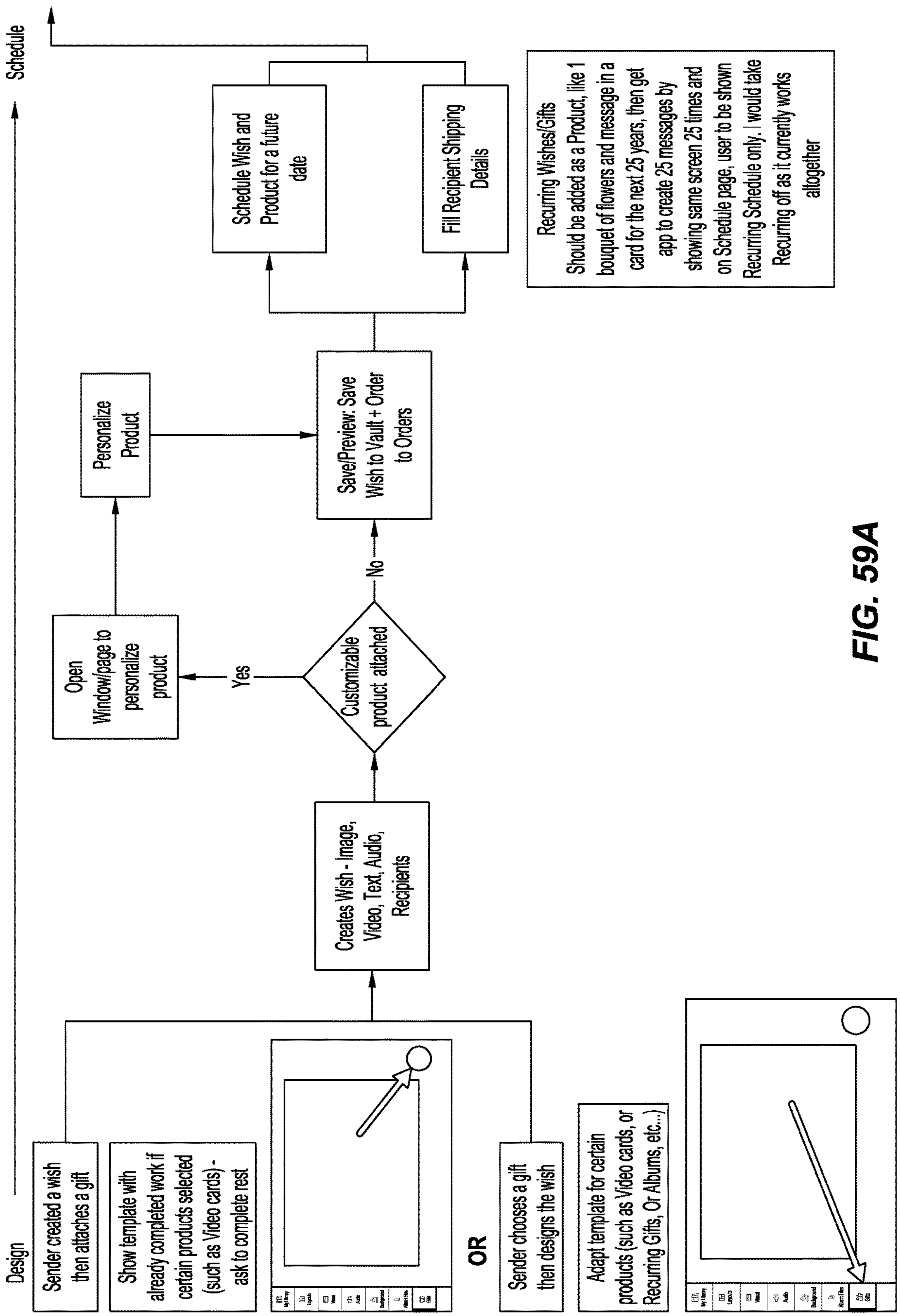
FIG. 59A-B show partial views of a flow diagram depicting the infrastructure and flow of a system as summarized by FIG. 58.
Figure 59B:
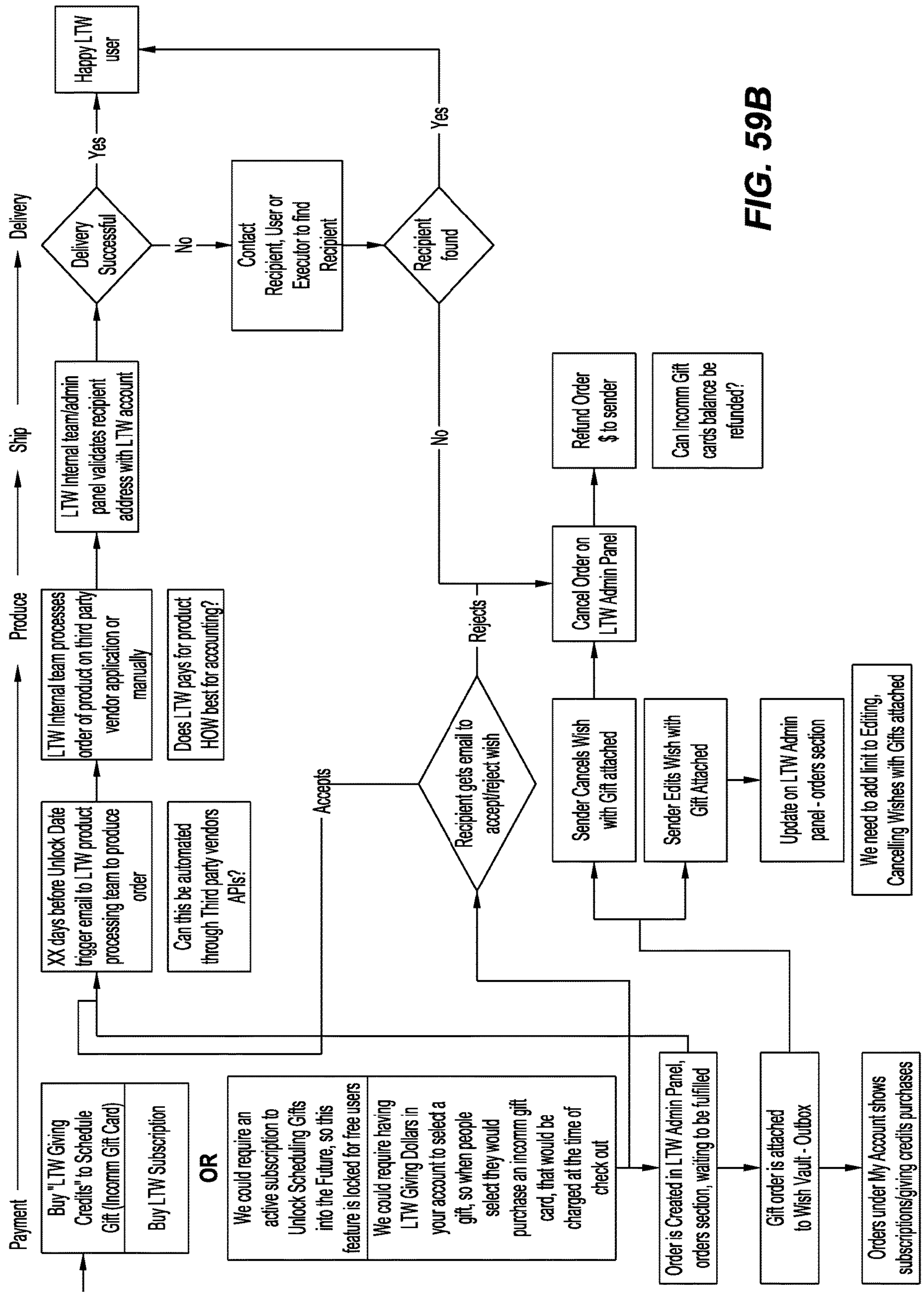

Another embodiment, aspect or module of system 10 is now described with reference to FIG. 58, FIGS. 59A-B, and FIG. 60. FIG. 58 summarizes objectives and requirements for an embodiment whereby system 10 may include an e-commerce component or module that facilitates a user's ability to send time-locked gifts, for example, gifts that will be accessible to the recipient at a future date or event. FIGS. 59A and 59B each show partial views of a flow diagram of such an embodiment, whereby the system 10 may facilitate a process for a user to arrange to send one or more gifts to one more recipients at a future date or time. As shown, in one form, the process may include six stages, including design, schedule, payment, produce, ship and delivery. The design and schedule stages may be performed as described and shown in connection with FIG. 1 and FIG. 53, and using the associated GUI's illustrated in FIGS. 7-38. Data flow and database calls may occur as described in connection with FIG. 1. In one form of the infrastructure of the current invention, the e-commerce component 1032 may be included in and/or may interface with the gift manager 1012 shown in FIG. 1.

As illustrated in FIG. 59A, the payment stage may involve the user purchasing system credits or dollars which may be applied toward a gift purchase in the future. The user may be required to have a predetermined amount of system credits/dollars in the user's account to schedule a gift. Alternatively, the system may allow the user to purchase said system credits/dollars at the time of scheduling.

In another form, the user may be required to purchase and maintain an active system subscription to allow the user to schedule gifts to be sent at future dates. In another form, the ability for a user to schedule gifts for future dates may be a locked feature that may only be available/unlocked to users with an active subscription account status.

The e-commerce component may operate with the system administrator interface 19 module shown in FIG. 1. For example, completion of the payment stage may cause a gift order to be created in a system administrator interface 19, which may in turn, operate or activate other system components, for example, wish vault 1030, wish calendar 1040, preview 1006, schedule and settings 1008, and receipt delivery notification 1010 for facilitating the production, shipping and delivery stages as detailed in FIG. 59B.

Figure 60:
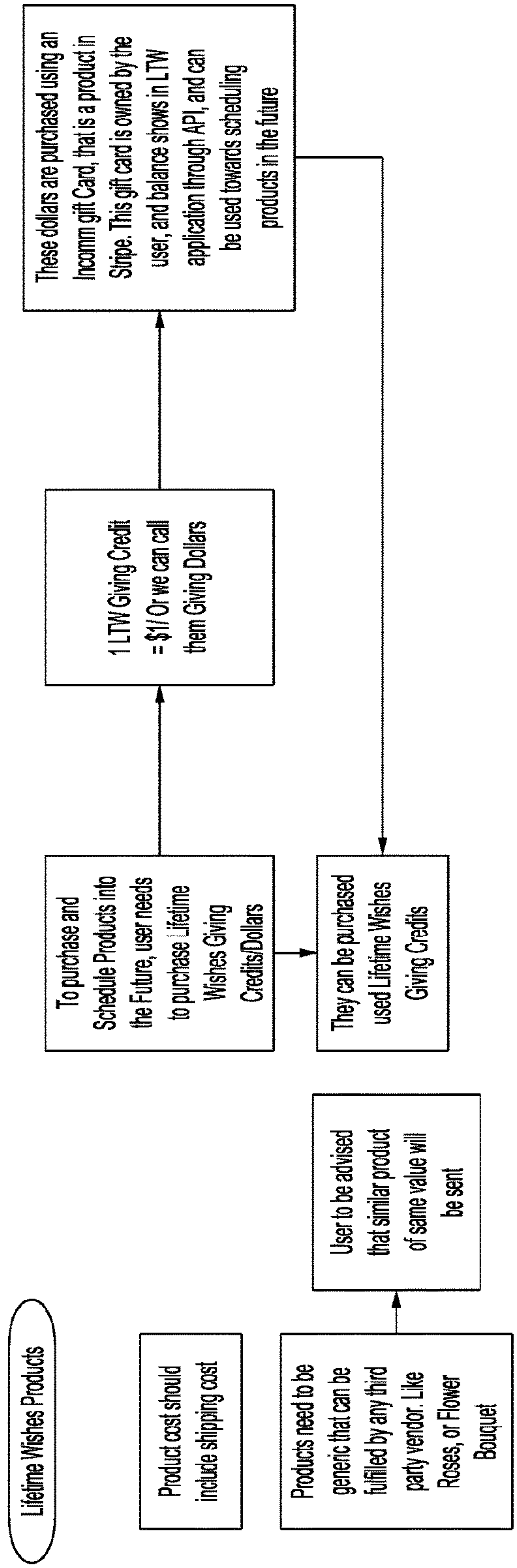
FIG. 60 shows another flow diagram depicting the infrastructure and flow of a system as summarized by FIG. 58.

As shown in FIG. 60, the e-commerce component may incorporate a number of products available for purchase and gifting. The products are preferably generally accessible such that they may be fulfilled by a variety of third party vendors. Examples may include, but are not limited to, vases and/or bouquets of flowers and the like. Other gifts or items to be sent may be available to accommodate a variety of sender and/or recipient desires. System 10 may have connectivity with pertinent third party gift or item vendors or suppliers.

In one form, to purchase and schedule a future gift, the user may purchase system credits/dollars. Each system credit/dollar may be equivalent to one U.S. dollar, other desired currency or they may be equivalent to any greater or lesser value. In one form, the credits/dollars may be purchased by the user via a third party prepaid gift card, such as an Incomm Gift Card, or other suitable prepaid gift card. Once purchased, the gift card balance may appear in the user's account, for example, through an API, so that the user may be apprised of the amount of system credits/dollars that are available to the user for scheduling gifts to be sent at a future date. Bitcoin technology may also be used with system 10.

Figure 61A:
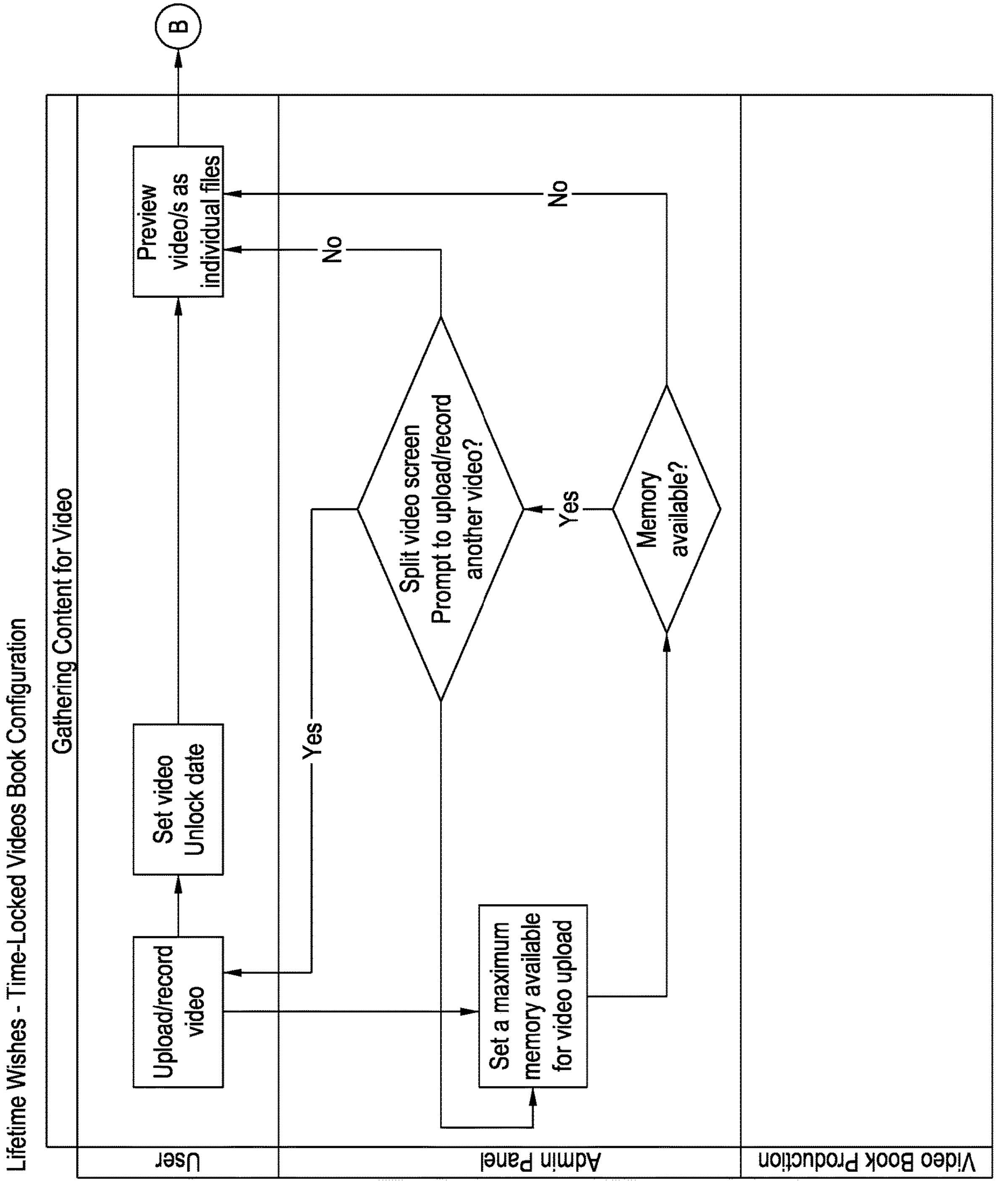
FIGS. 61A-B show partial views of a flow diagram depicting the infrastructure and flow of a system in accordance with another aspect of the invention in which the system facilitates the sending and/or receiving of a message in the form of a video book.
Figure 61B:
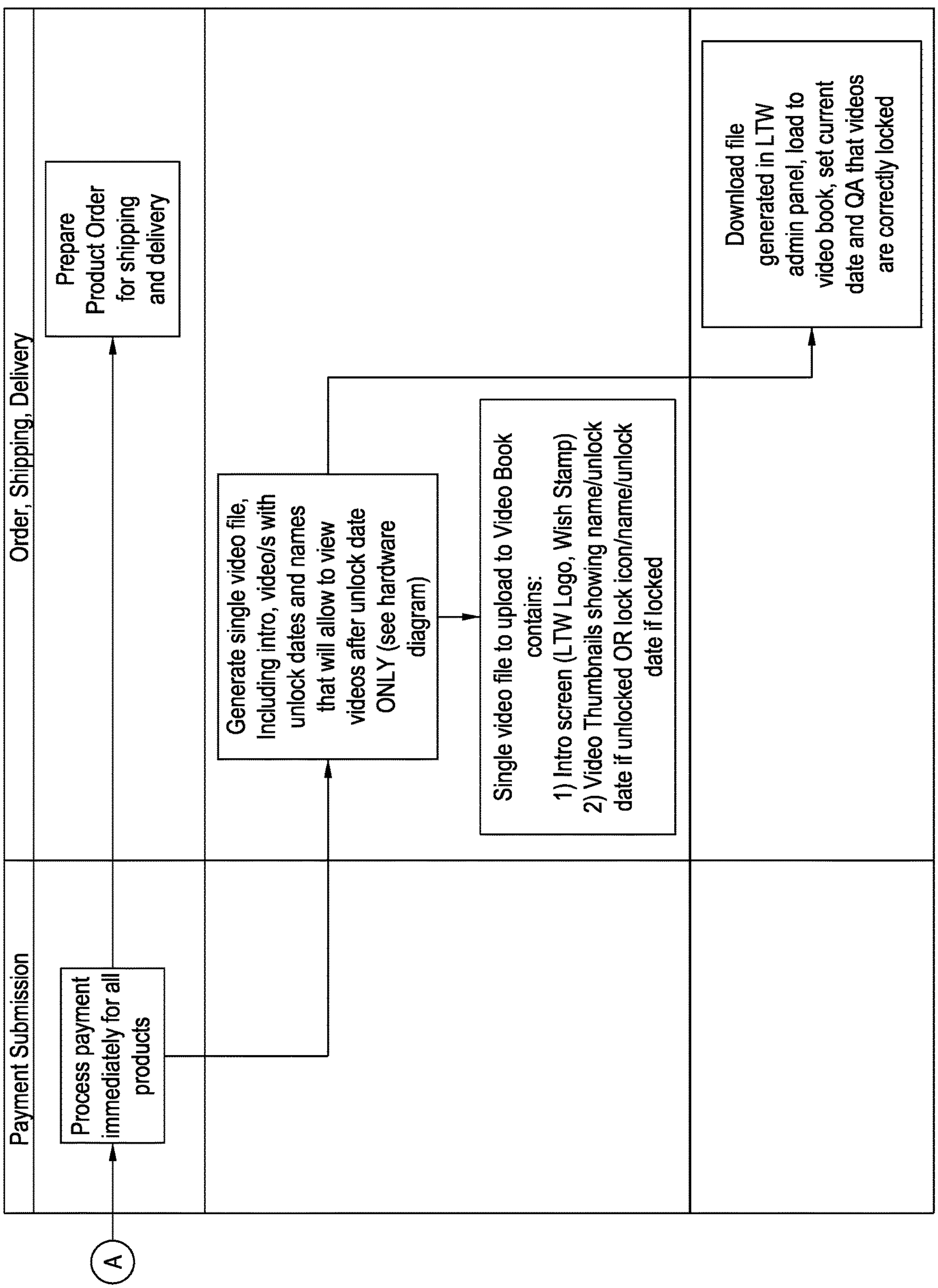
Figure 62A:
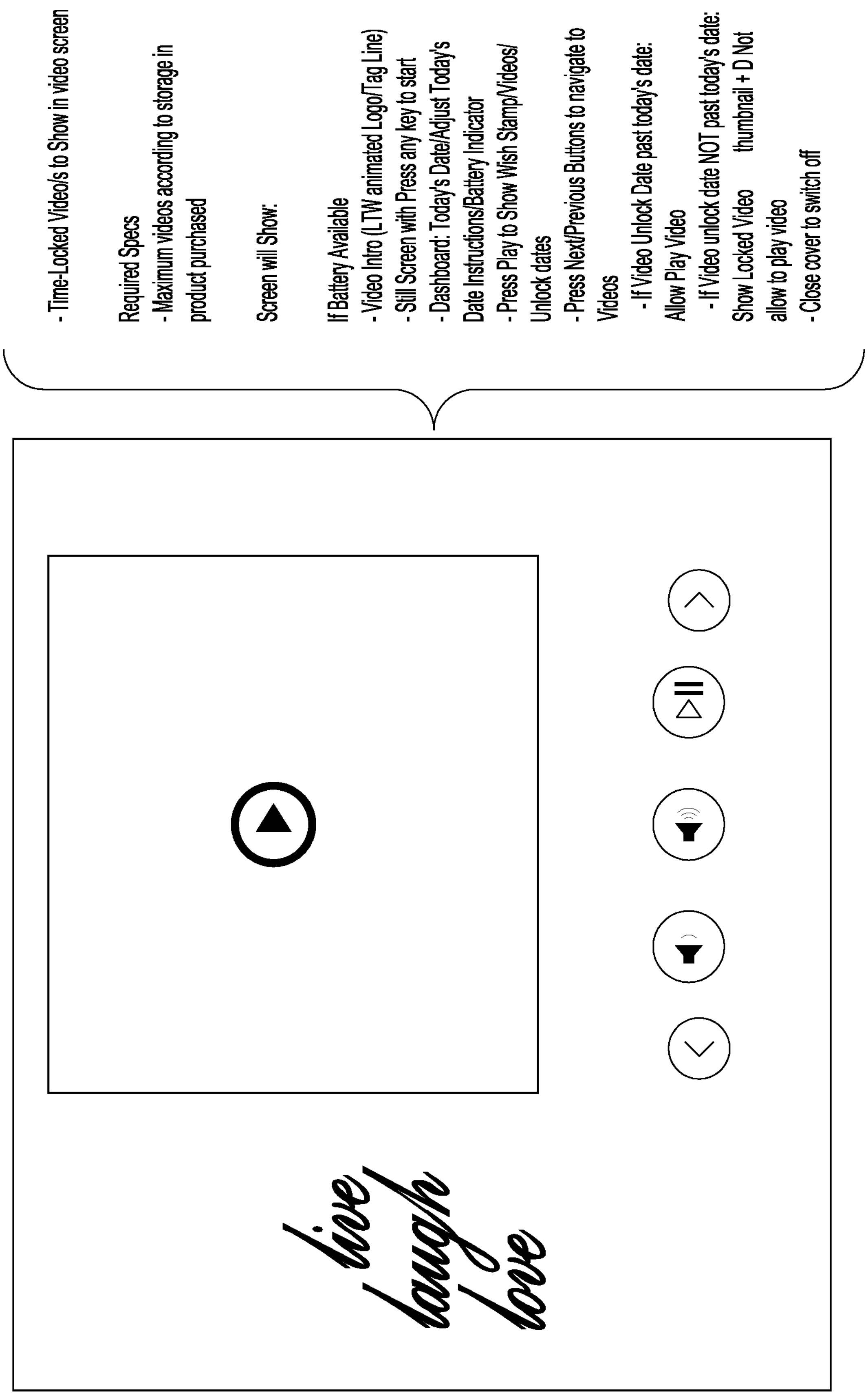
Figure 62B:
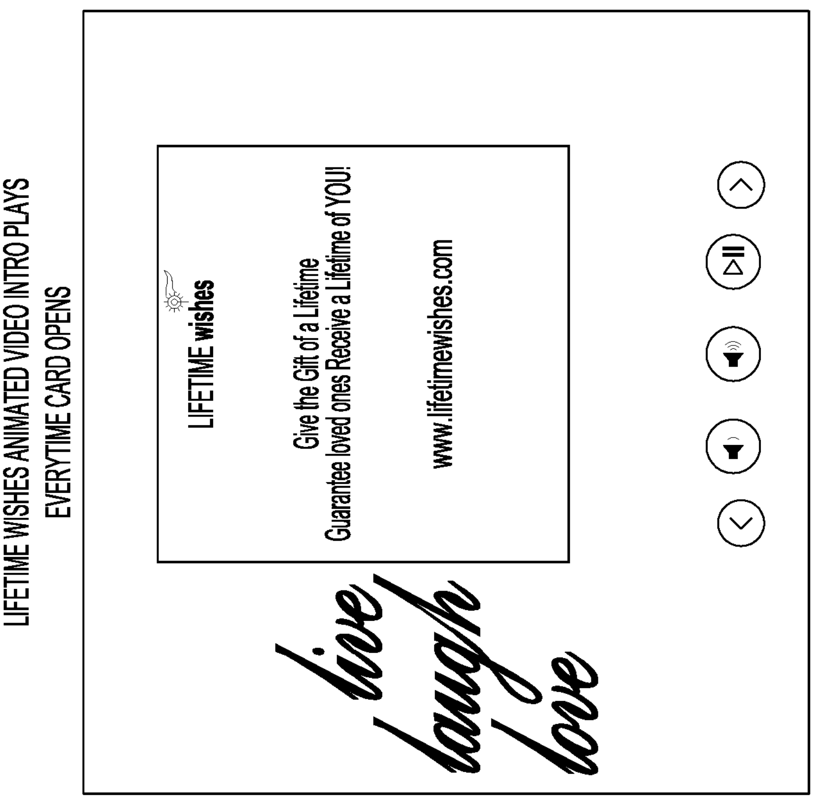
Figure 62C:
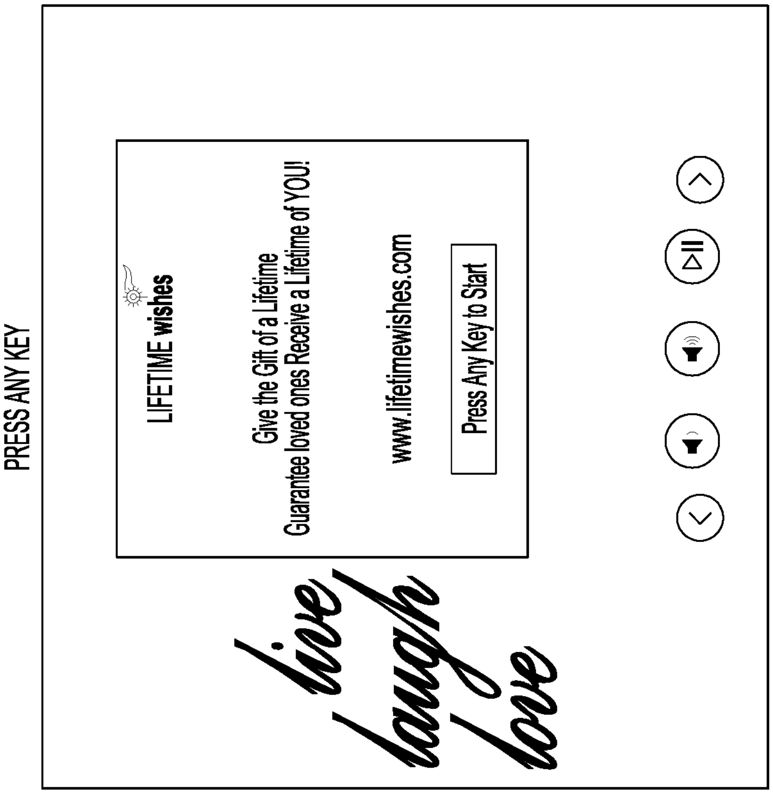
Figure 62D:
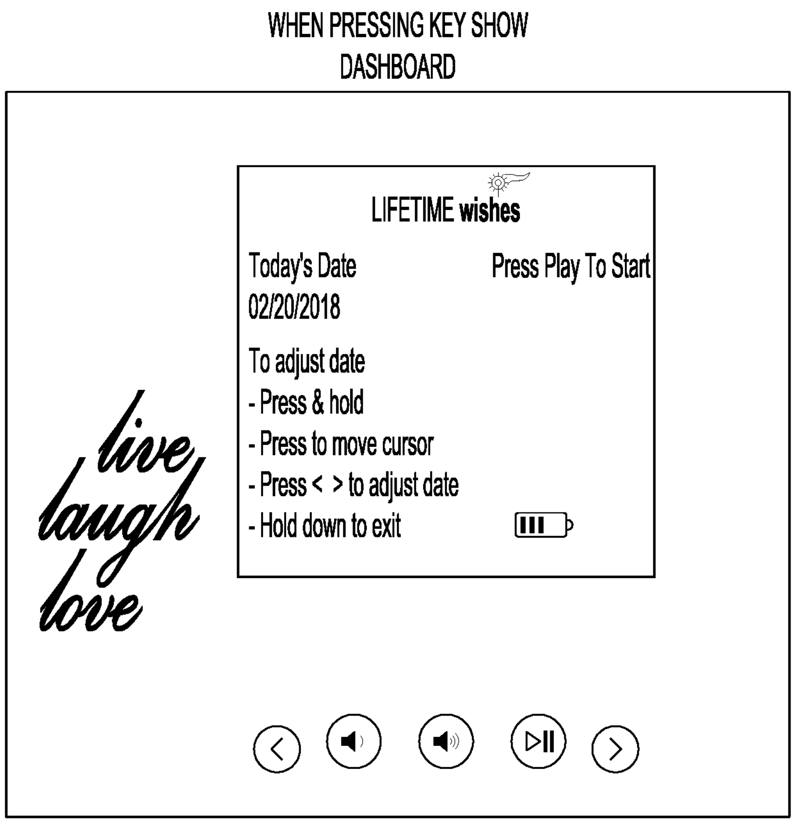
Figure 62E:
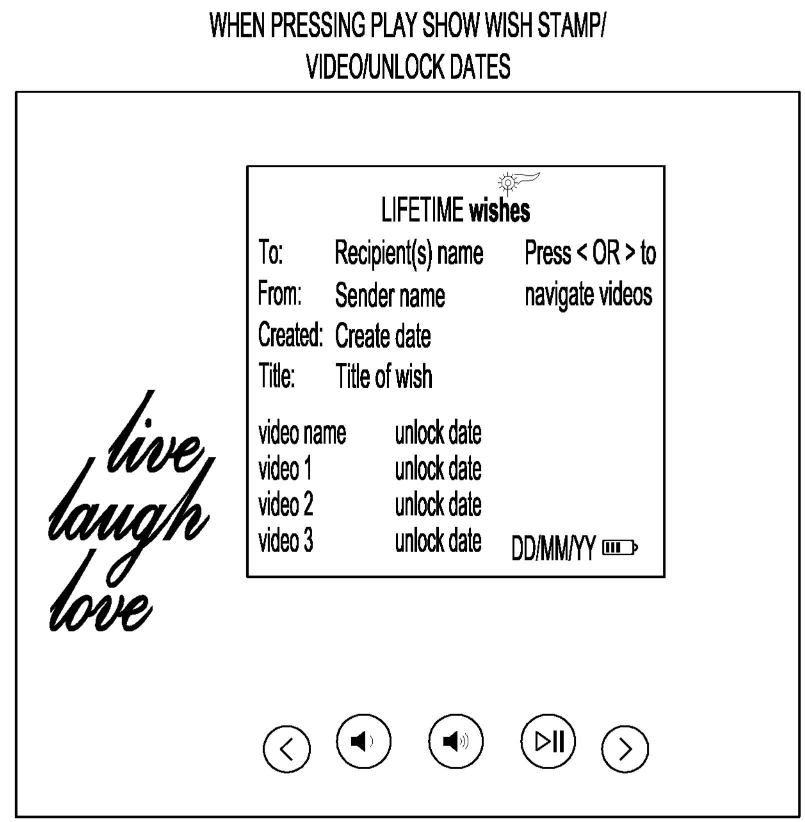

Another embodiment of system 10 is now described with reference to FIGS. 61A and 61B, 62A-G, and 63A-B whereby system 10 may facilitate the sending and/or receiving wishes/messages in the form of a video book. FIGS. 61A and 61B are partial views of a flow diagram for this embodiment, which may include, for example, multiple stages wherein each stage may include steps performed by different parties. In one form, the stages may include, for example, gathering content for the video book as summarized in FIG. 61A, and payment submission and order, shipping and delivery as summarized in FIG. 61B. As shown in FIGS. 61A and 61B, various steps may be performed, for example, by the user, the system administrator, and video book producer, which may be integral with the system or may be provided by a third party.

Video books created in accordance with this embodiment may be produced and delivered to the recipient upon completion or they may be time-locked such that the video book may be scheduled for delivery to the recipient at a future date or event. It should be noted that though the term video book is used herein, other forms of video format or delivery beyond typical books may be used in connection with the current invention.

The creation and/or coordination of video book is now further described. For example, in the first stage—gathering content for the video—the user may upload and/or record one or more videos and/or images, set the video unlock date for each video, and preview the videos individually.

The system administrator may set a predetermined maximum memory amount available for the video upload. The memory available may comprise designated space on a certain hardware component or separate hardware. This may be dependent on the product selected by the user. That is, certain video book products may include more or less available storage. If, upon uploading and/or recording a video, the system administrator determines the maximum memory amount has not yet been reached, the system 10 may prompt the user to optionally upload and/or record another video or increase the content uploaded for the existing video.

The payment submission stage may occur as described above with respect to time-locked gifts. In another form, system 10 may require that payment be processed immediately for any video books, regardless of the delivery date.

In one form, the order, shipping, and delivery stage may involve the system administrator generating a single video file from the content gathered for the video in the first stage. This may include additional content such as an introductory screen and/or video, a wish stamp, one or more video thumbnails, one or more video names and unlock dates, formatting or editing functions, and the like. Exemplary GUIs that may be associated with this single file as well as a summary of objectives and requirements for each are shown in FIGS. 62A-G.

In one form, the video book producer or sender may load the video file to the video book, set the current date, ensure the videos are correctly time-locked and have system 10 perform other desired functions in accordance with the user's specifications, and then prepare the product for shipping and delivery. FIGS. 63A-B illustrates an exemplary video book that may be created in accordance with this embodiment including customizable items, required specifications and the like.

The utilization of system 10 in connection with the process of video book configuration through to product fulfillment is shown and described in greater detail with reference to FIGS. 64A-D, 65A-Z, 66A-B, and 67A-E. FIGS. 64A-D are partial views of a flow diagram for this embodiment showing the following stages in further detail: wish and video book configuration, shipping and delivery configuration, payment submission, order submission, video book production, and video book delivery. As noted with respect to FIGS. 61A-B, various steps in the process may be performed by one or more parties, including for example, the user, the system administrator, the video book producer or sender, or others.

The wish and video book configuration may generally be performed as described and shown in connection with FIG. 1, FIG. 53 using the associated GUIs illustrated in FIGS. 7-38 as well as FIGS. 61A-B and the associated GUIs illustrated in FIGS. 62A-G.

Figure 64A:
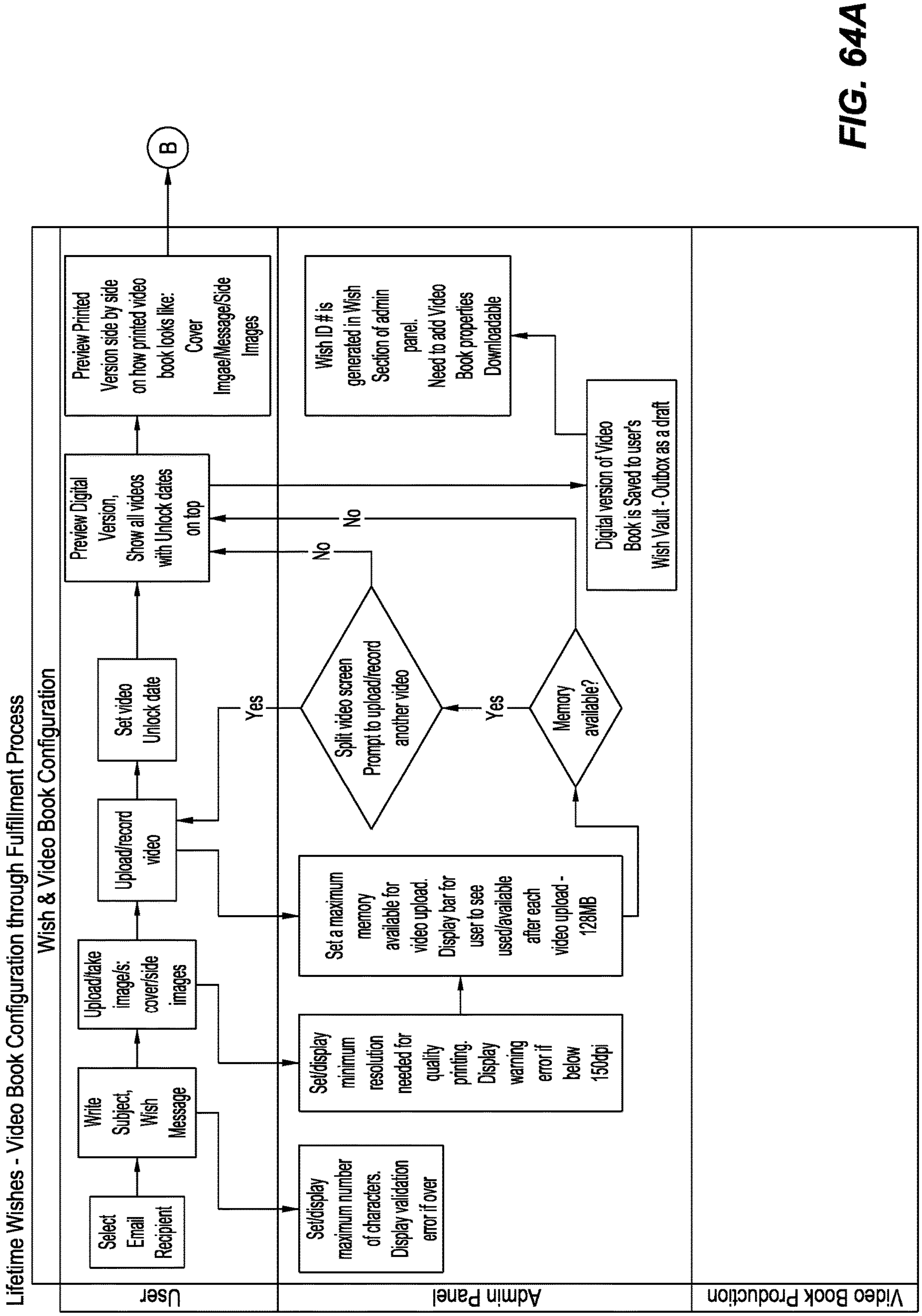
FIGS. 64A-D show partial views of a flow diagram further depicting the infrastructure and flow of a system in accordance with the system shown in FIGS. 61A-B.

In particular, with reference to FIG. 64A, during the wish and video book configuration, which may encompass the video content gathering stage depicted in FIG. 61A, the user may have the option to select a recipient, write a wish message, upload and/or create images (for example, a cover image and/or one or more side images), upload and/or record one or more videos, set video unlock date(s), preview a digital version of the videos, and/or preview a representation of the printed version of the video book including, for example, the appearance of the cover, images, messages, and any side images. In general, the user may use this aspect of the system 10 to configure the video book, or other video item, as he or she sees fit.

In connection with the wish and video book configuration stage, the system administrator may have the option to set and/or display a maximum number of characters for the wish text, which may be dependent on the wish template selected by the user. The system may display a validation error if the wish text has exceeded the maximum number of characters. Additionally, the system administrator may set a predetermined maximum memory amount available for the video upload as described above. Additionally, the system administrator may cause a digital version of the wish/video book to be saved to the user's wish vault outbox, for example, as a draft wish.

Figure 64B:
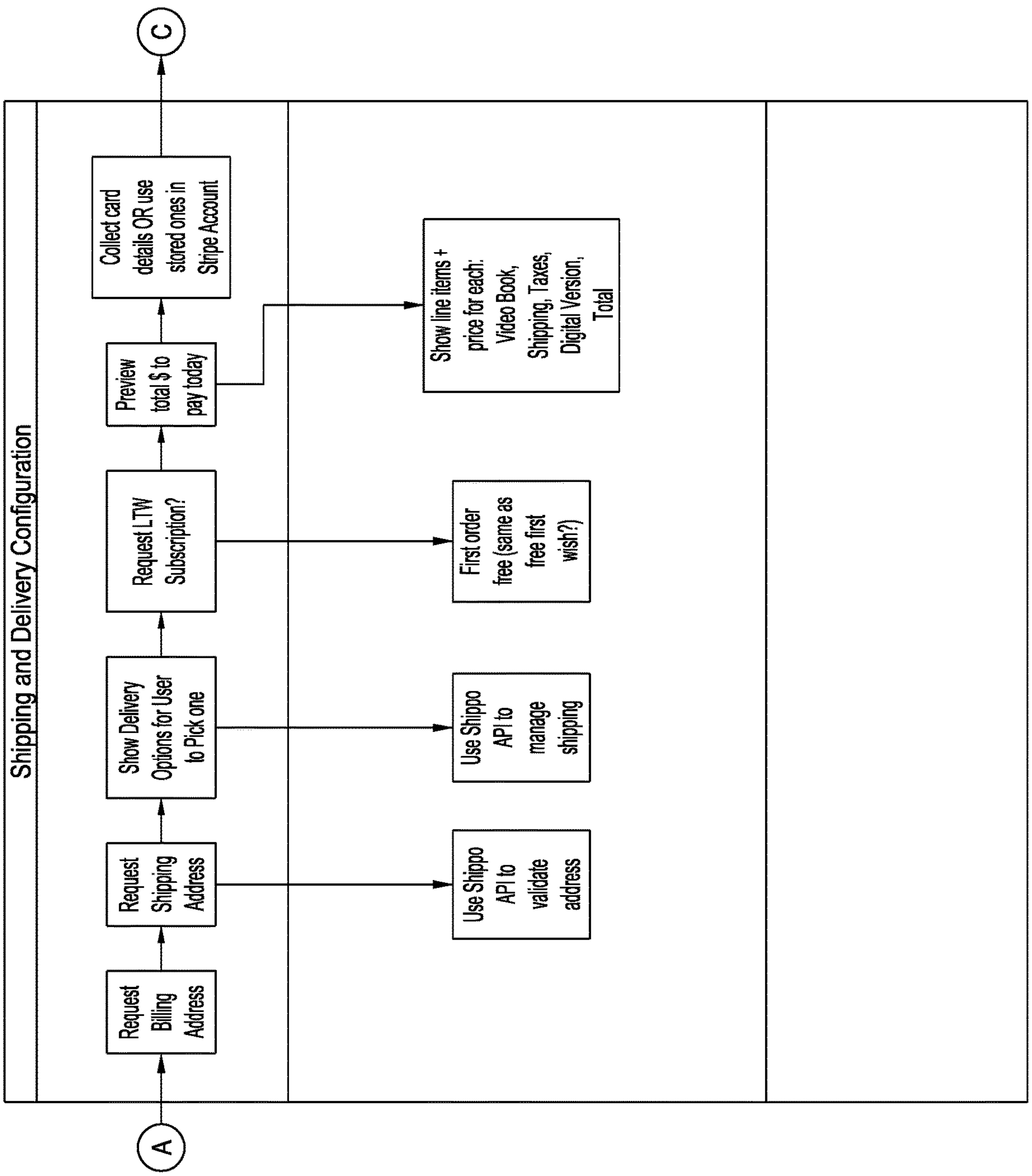

As shown in FIG. 64B, during the shipping and delivery configuration, system 10 may prompt the user to provide a billing address and a shipping address, to view and select from available delivery options, to purchase a system subscription, to preview the total cost of the wish/video book, and to provide credit card details or to use credit card details previously stored in the user's account. Bitcoin technology may also be used with this aspect of system 10.

Meanwhile, the system administrator may validate the user address, manage shipping, and generate an invoice showing line items for each purchased product as well as shipping costs, taxes, an additional digital version and the total amount to be paid by the user. Bitcoin technology may also be used with this aspect of system 10.

Figure 64C:
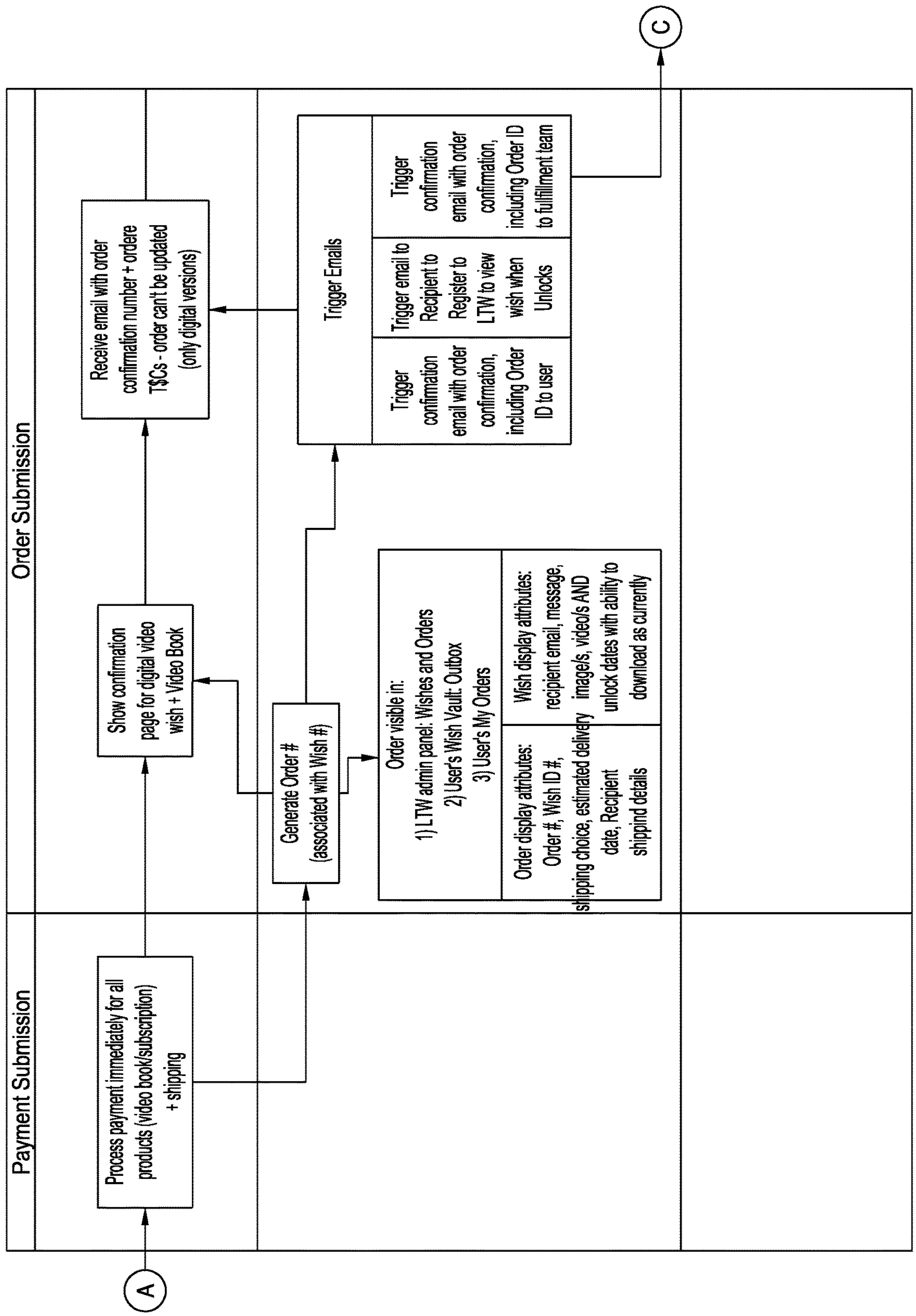

As shown in FIG. 64C, upon completion of payment submission, the system administrator may generate an order number and optionally an associated wish number. The system may display the order in one or more of the system administrator interface, the user's wish vault outbox, and the user's my orders section.

Order display attributes may include, for example, one or more of the following: order number, wish number, shipping selection, estimated delivery date, and recipient shipping details. Likewise, wish display attributes may include, for example, one or more of the following: recipient email, wish message, image(s), video(s), unlock dates, and download link(s). Other attributes may also be specified.

The system may also cause one or more emails, or other messages, to be created. For example, the system may generate an order confirmation email to the user and/or to the video book fulfillment team. Additionally, the system may generate an introductory email to the recipient, alerting him or her to his pending wishes/video books and inviting him or her to register with the system to unlock same.

The system may concurrently show the user a confirmation page for the digital video and video book. The system may also send the user an email confirmation. The confirmation may include an order number, and order terms and conditions.

Figure 64D:
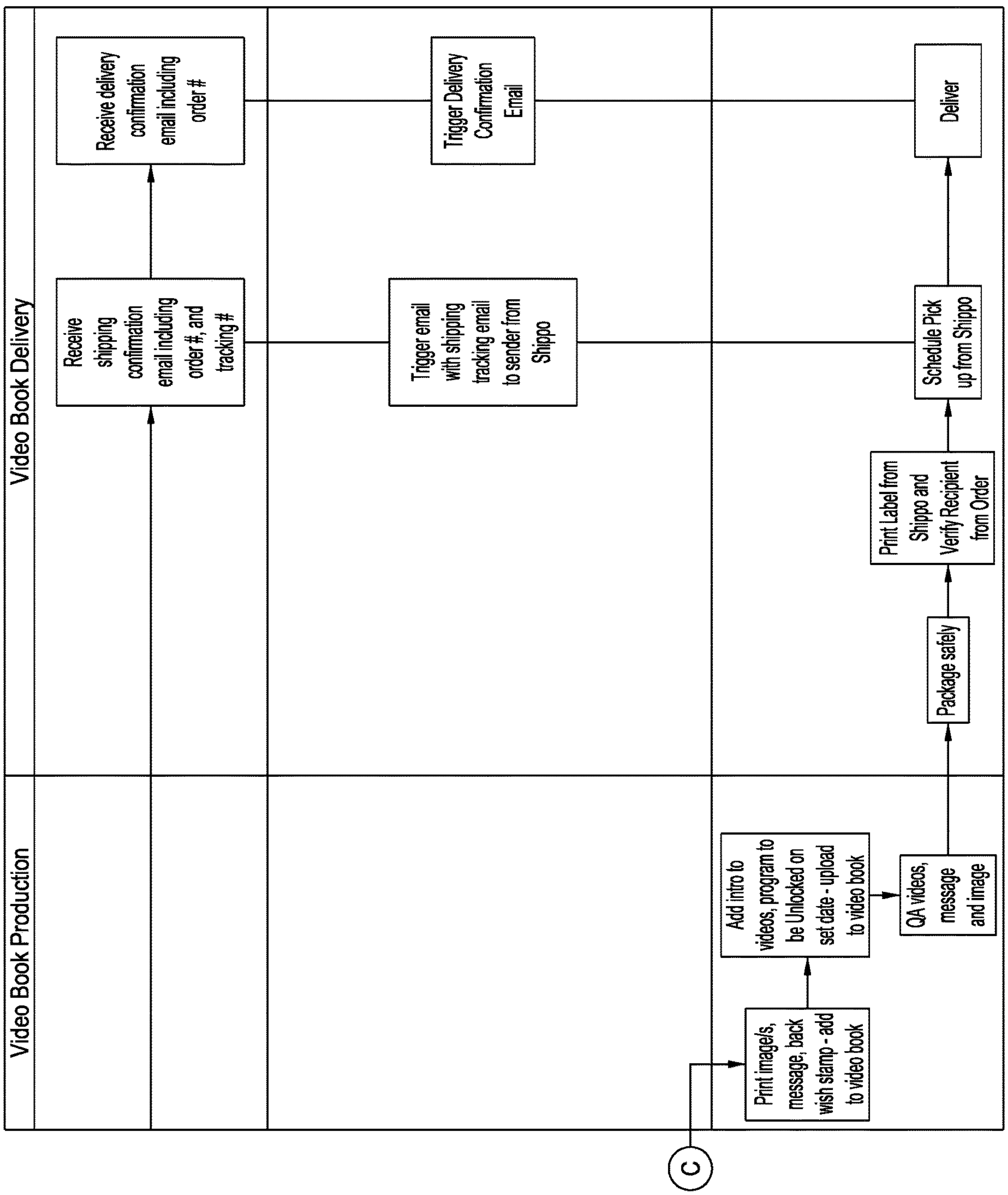
Figure 65A:
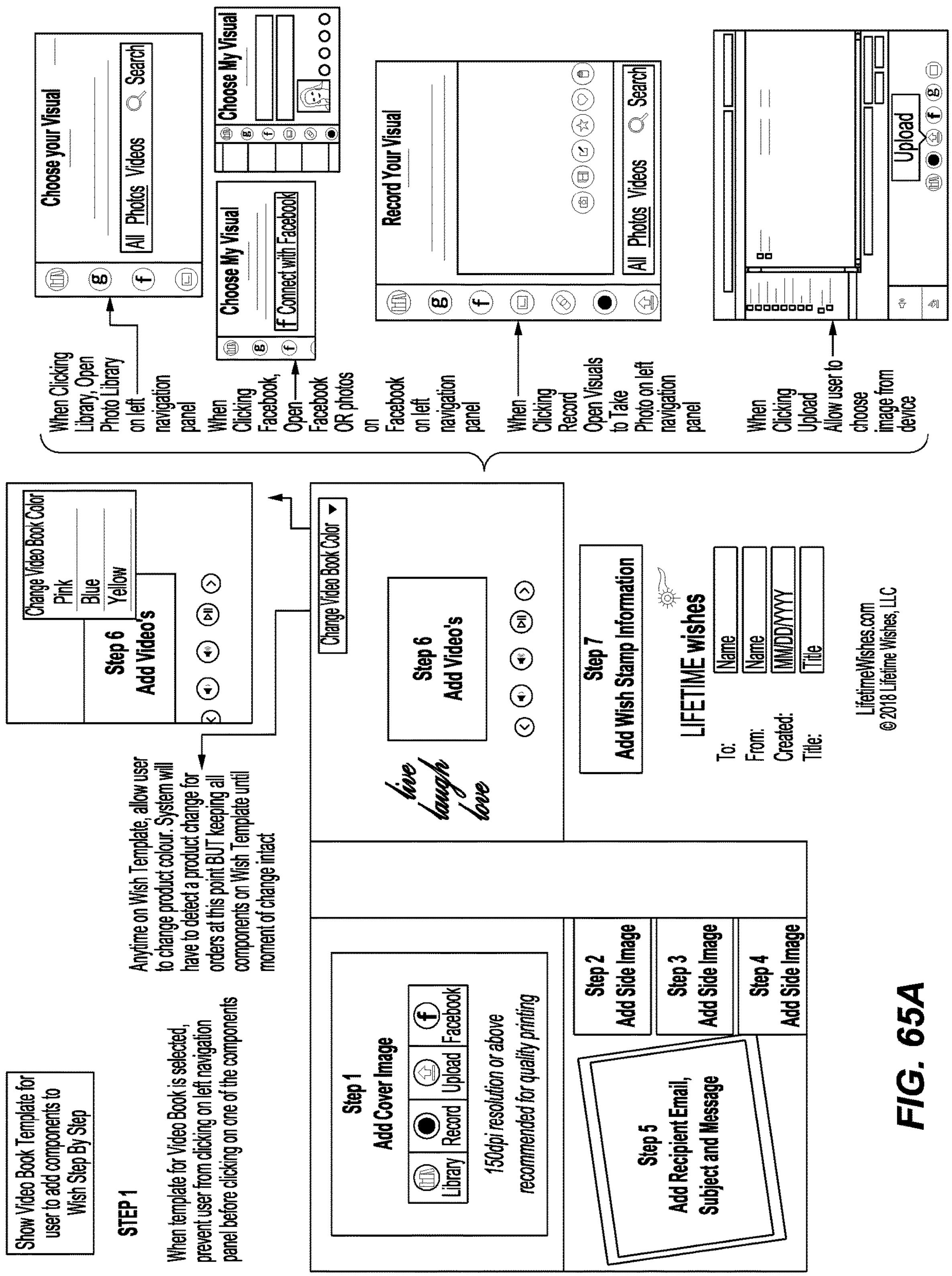
FIGS. 65A-Z and 66A-B show partial views of a flow diagram of graphical user interfaces which may be accessed by the user to create a message in the form of a video book in accordance with the system shown in FIGS. 61A-B.
Figure 65B:
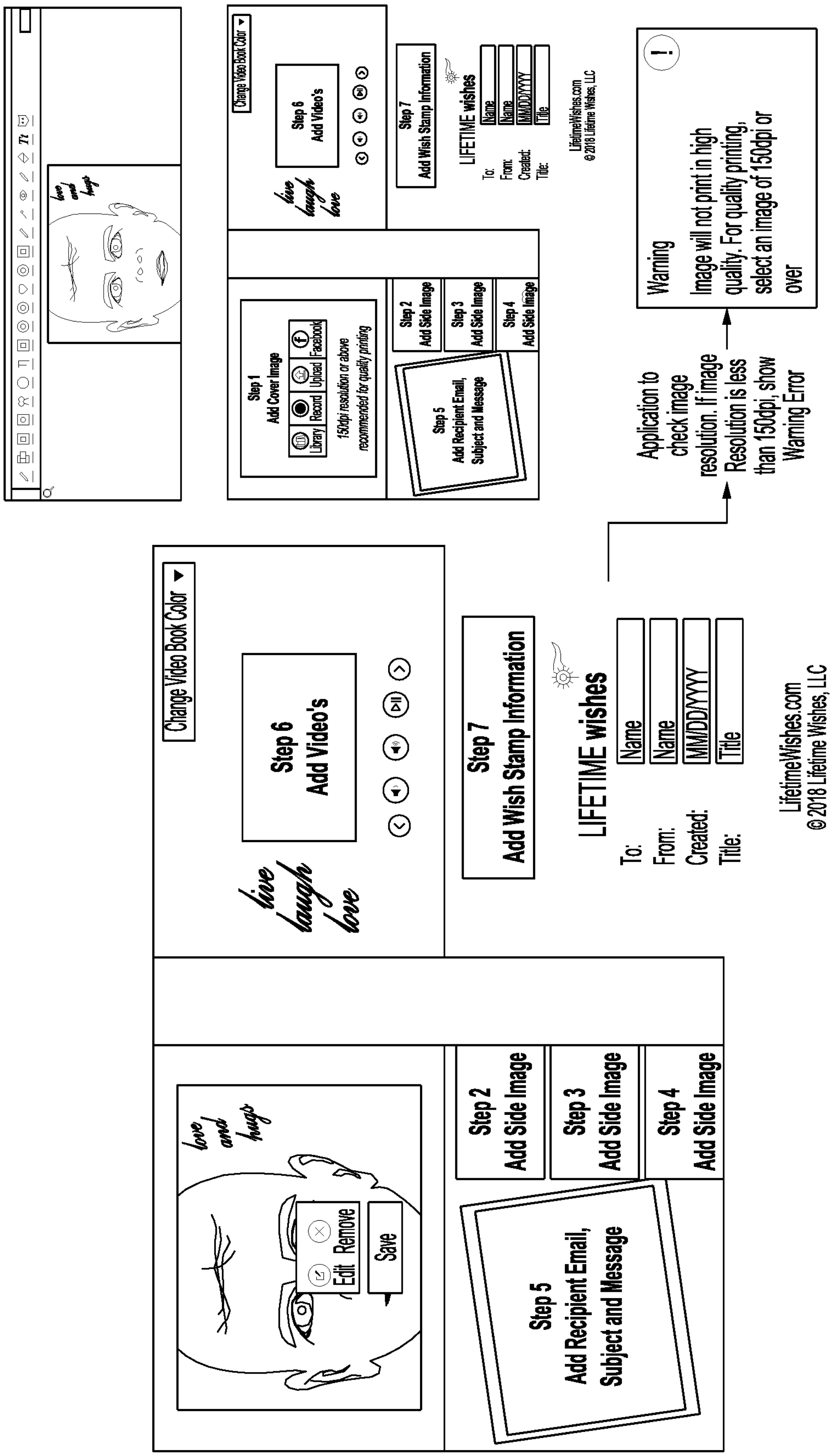
Figure 65C:
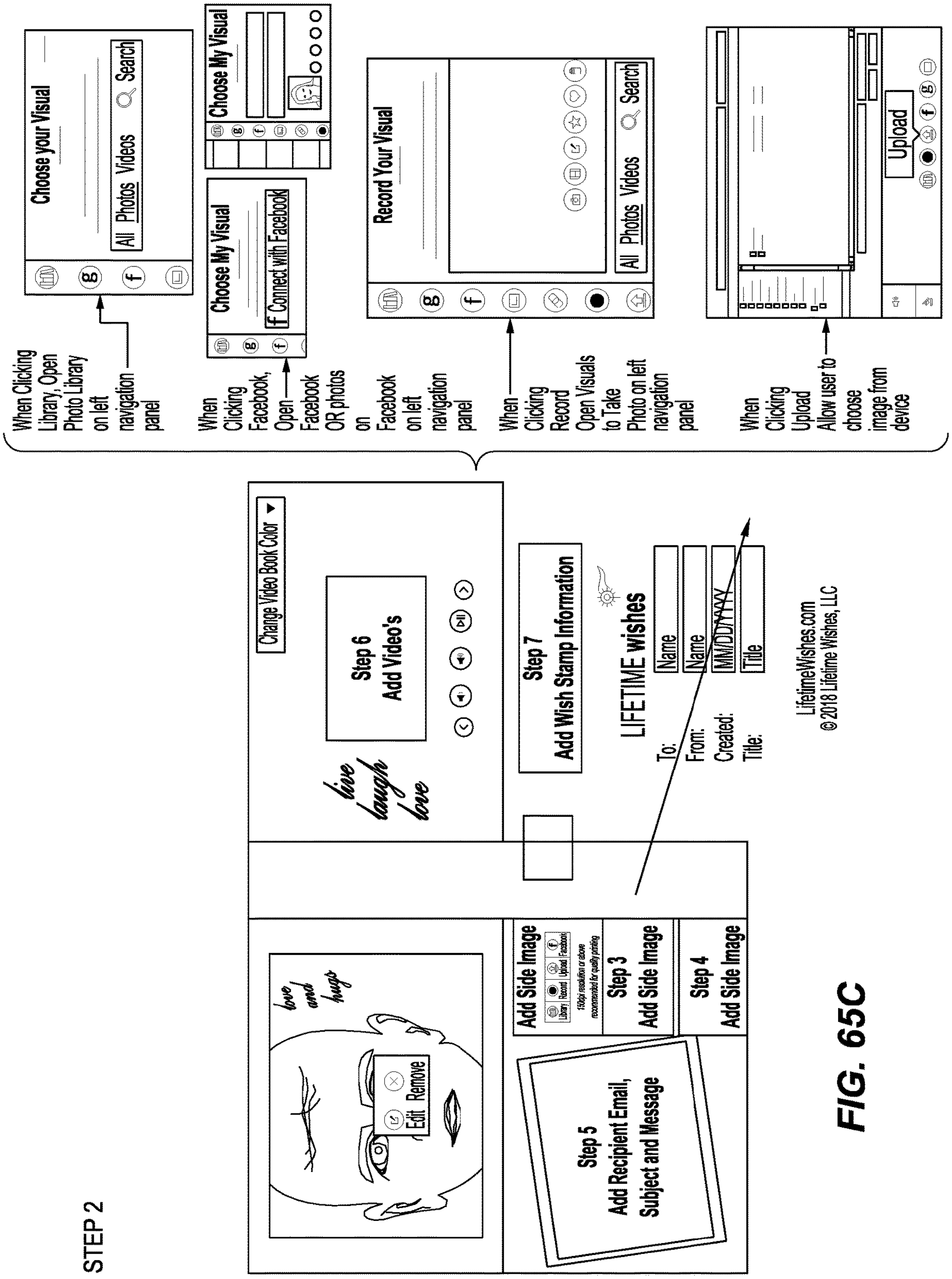
Figure 65D:
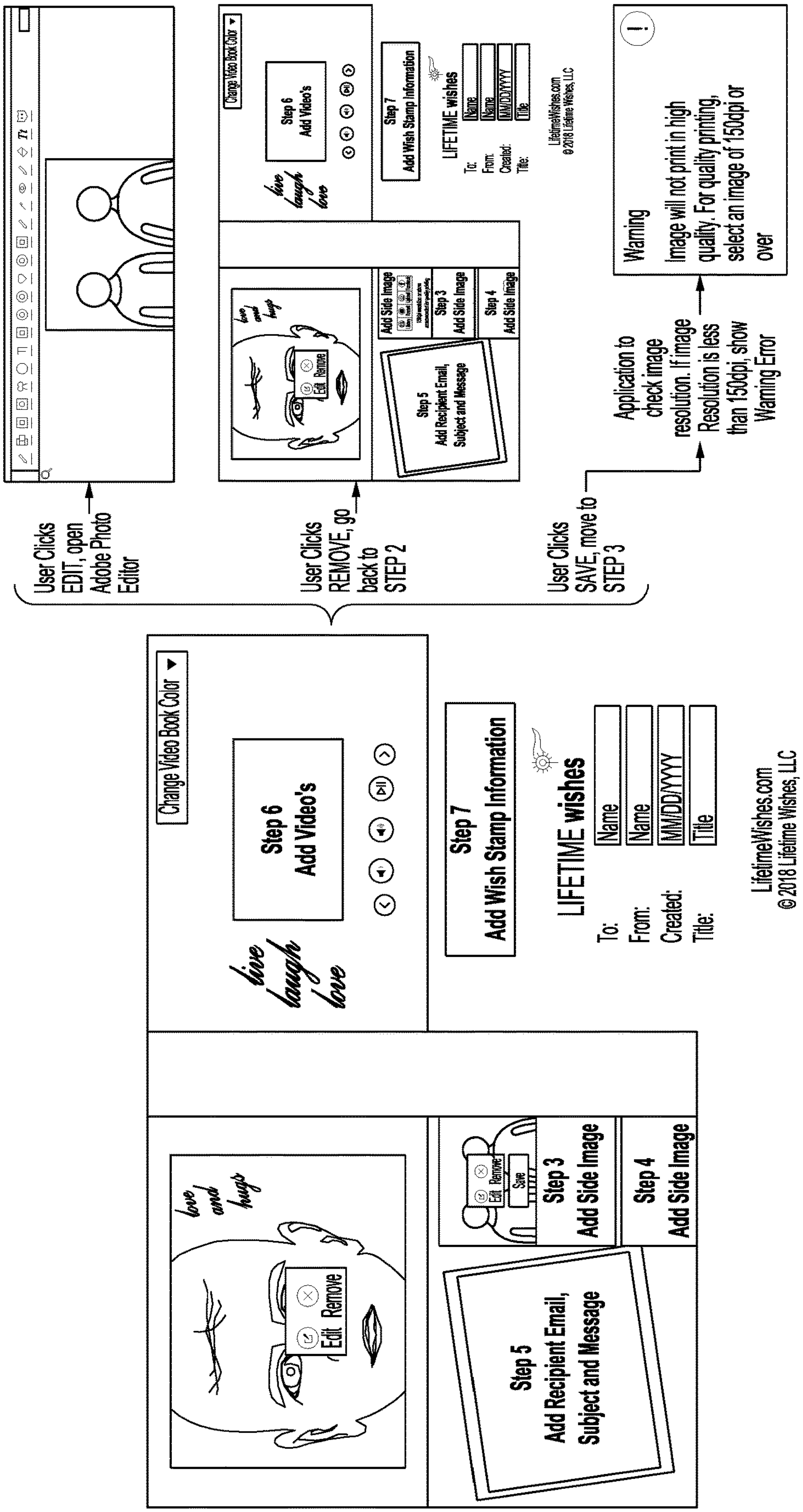
Figure 65E:
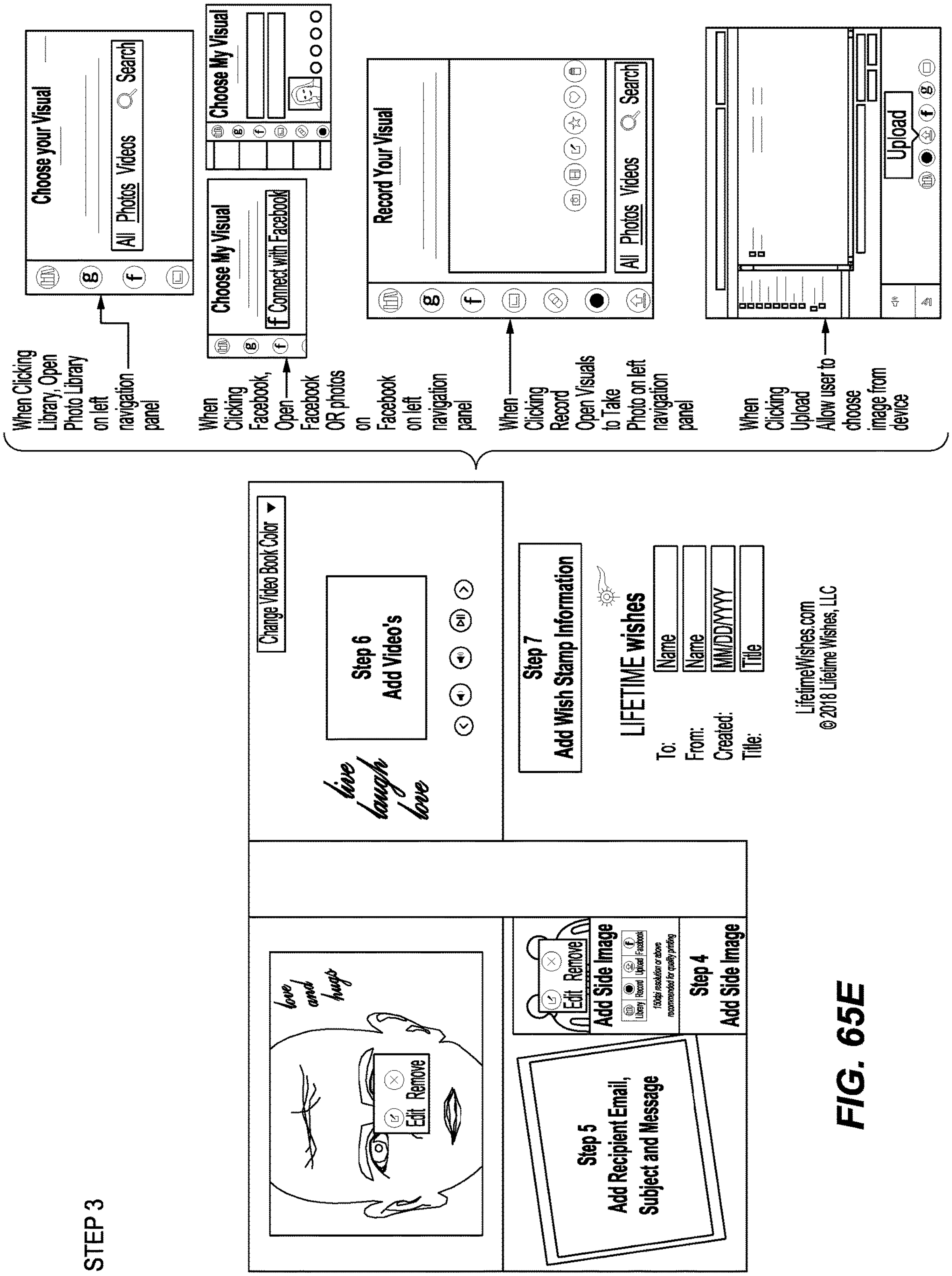
Figure 65F:
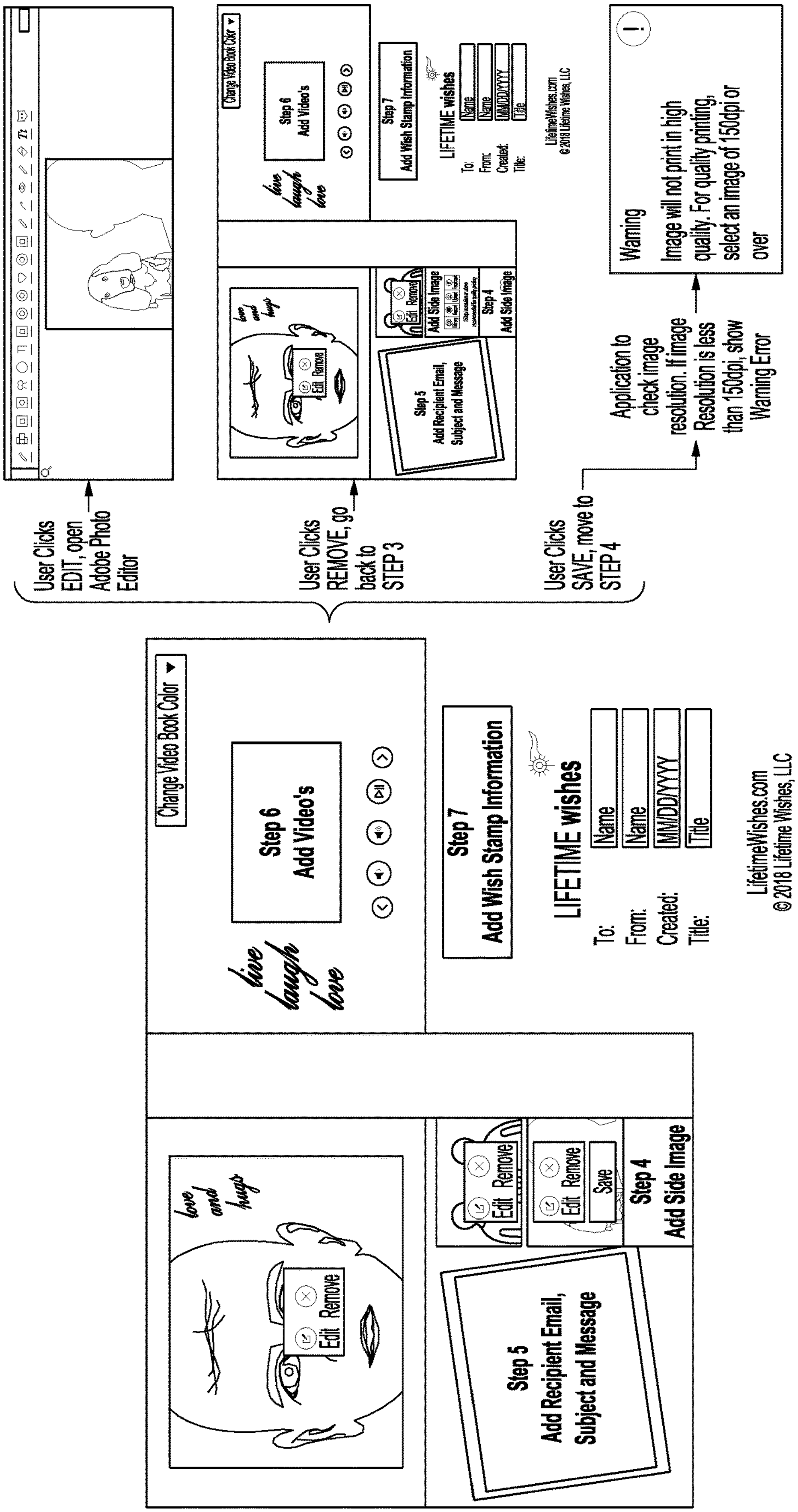
Figure 65G:
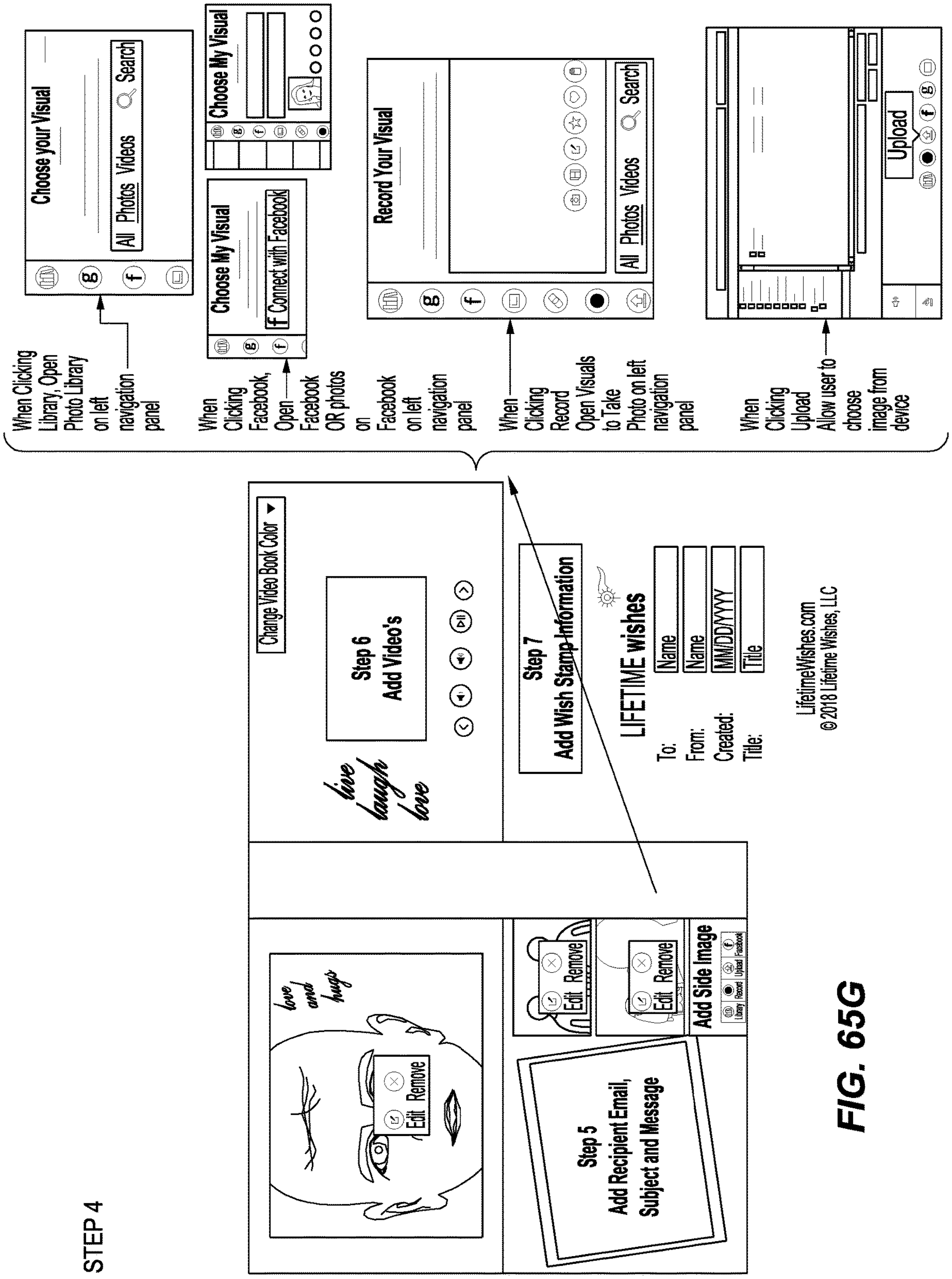
Figure 65H:
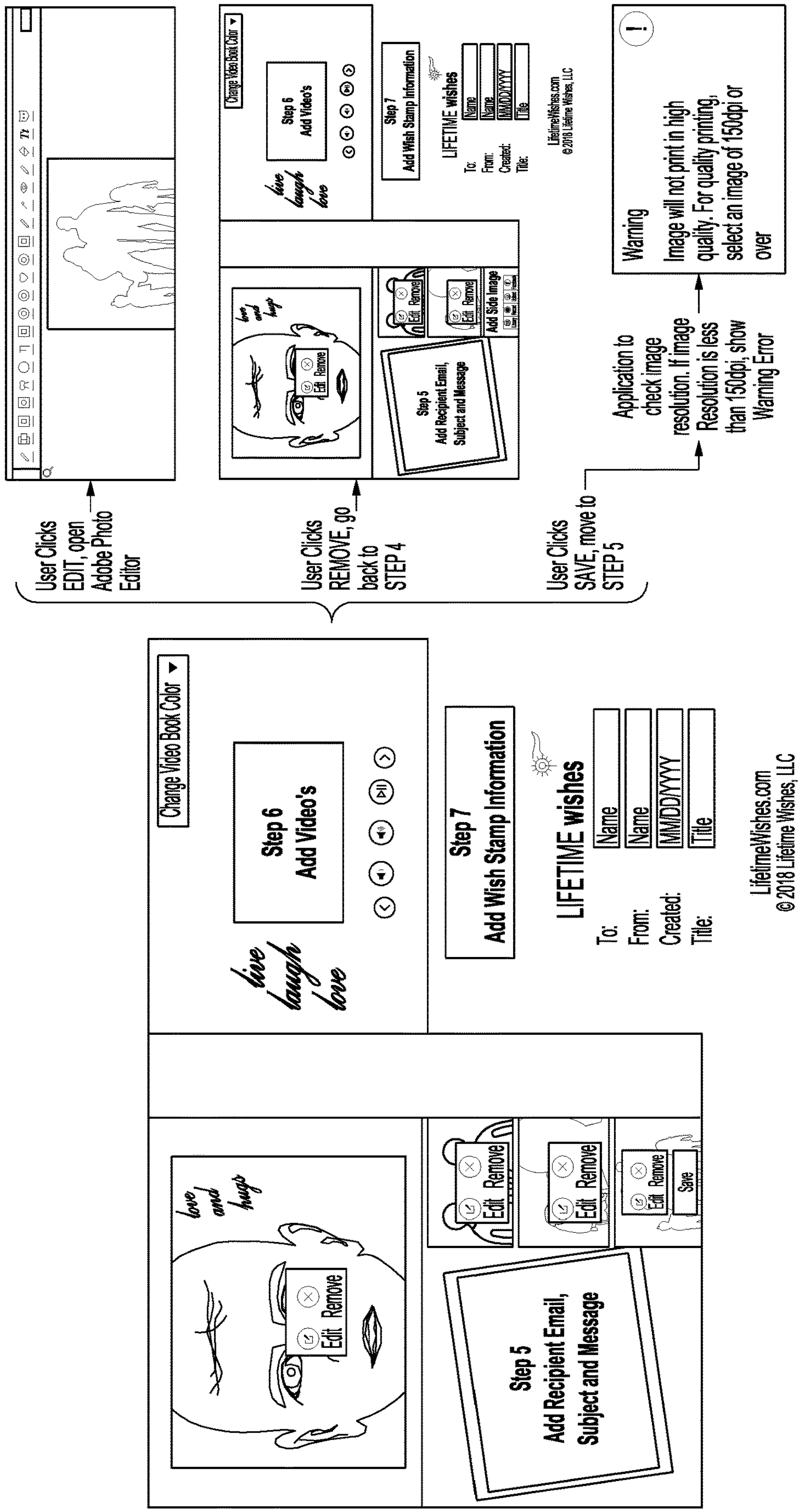
Figure 65I:
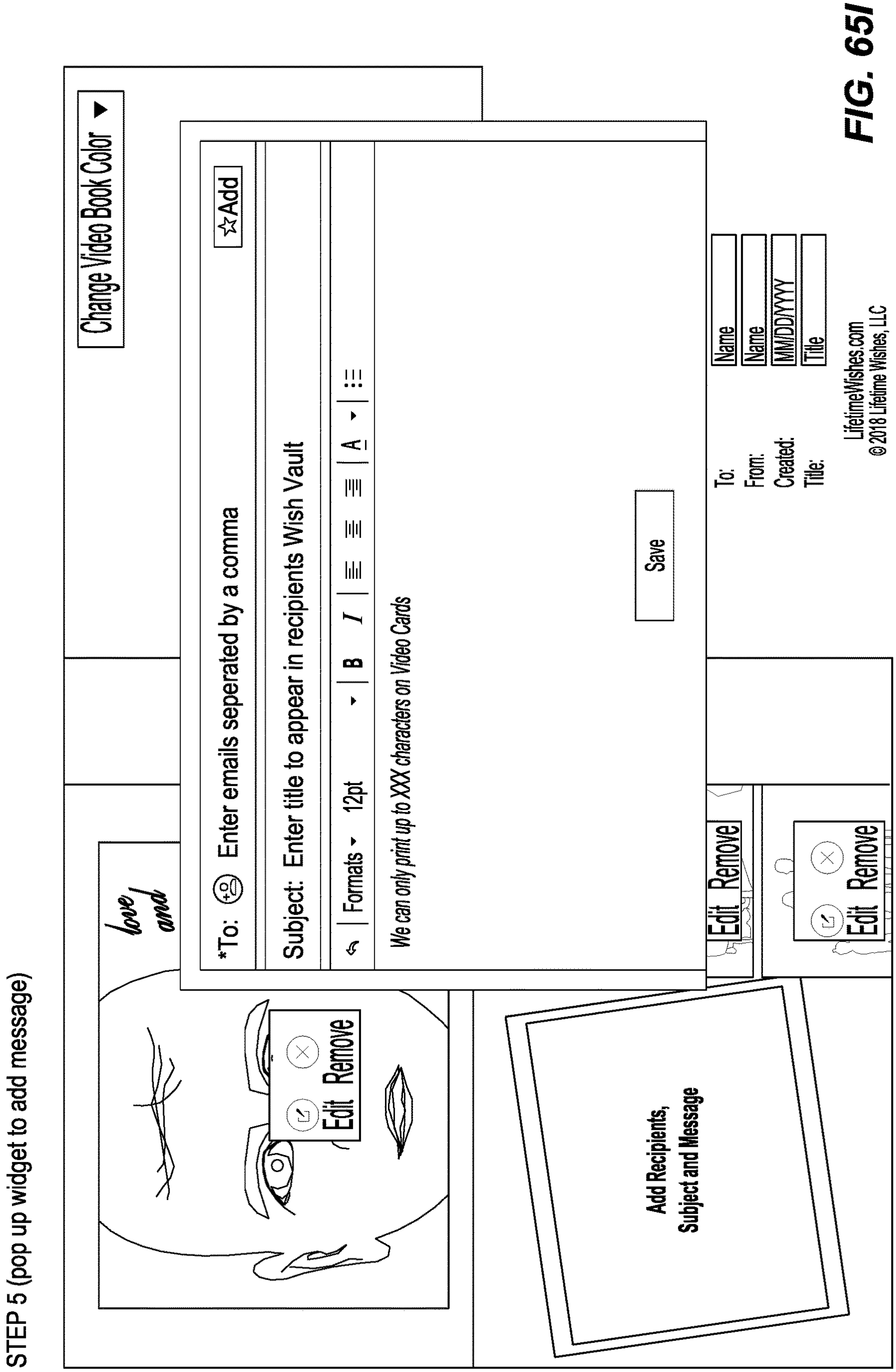
Figure 65J:
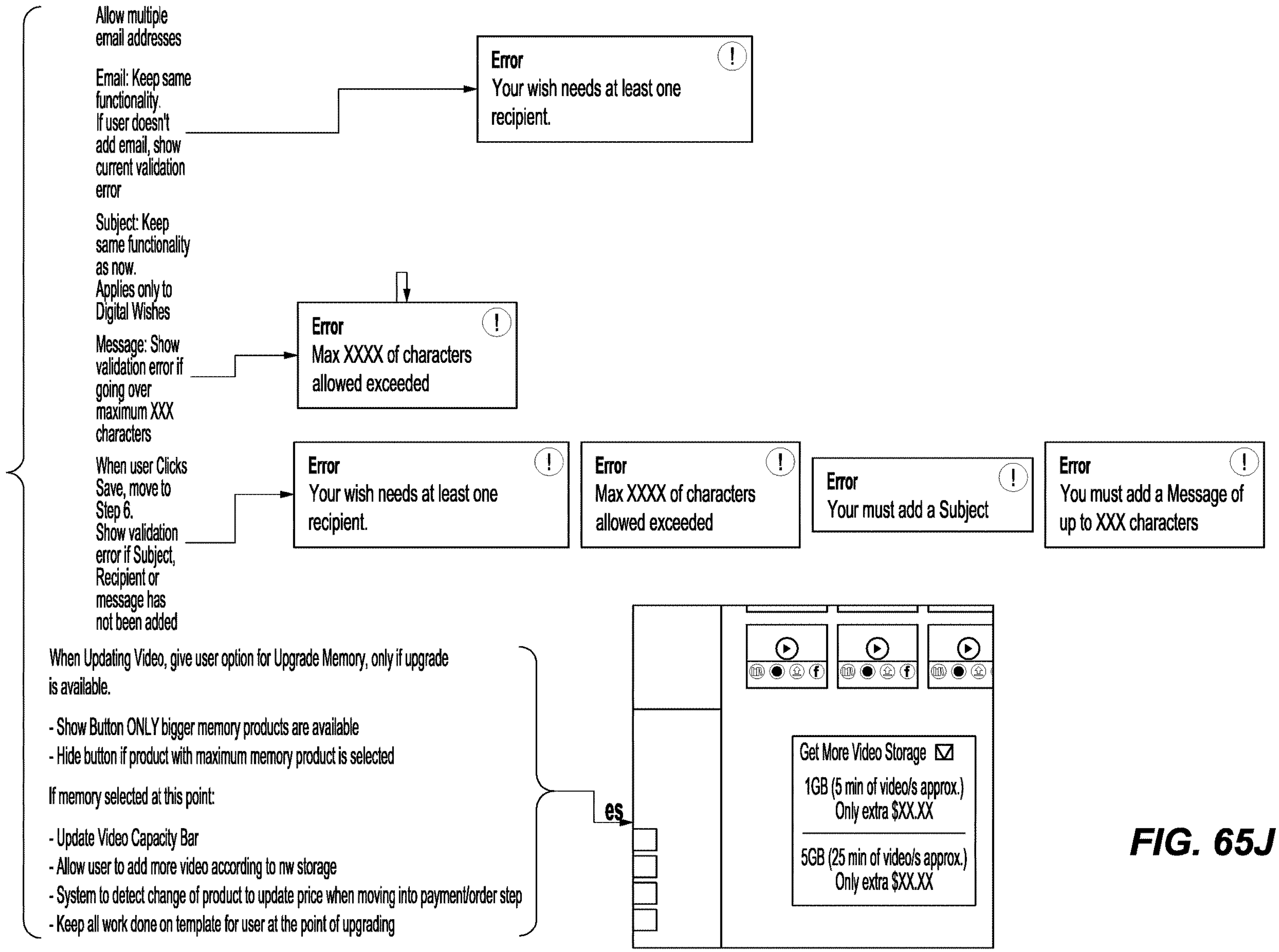
Figure 65L:
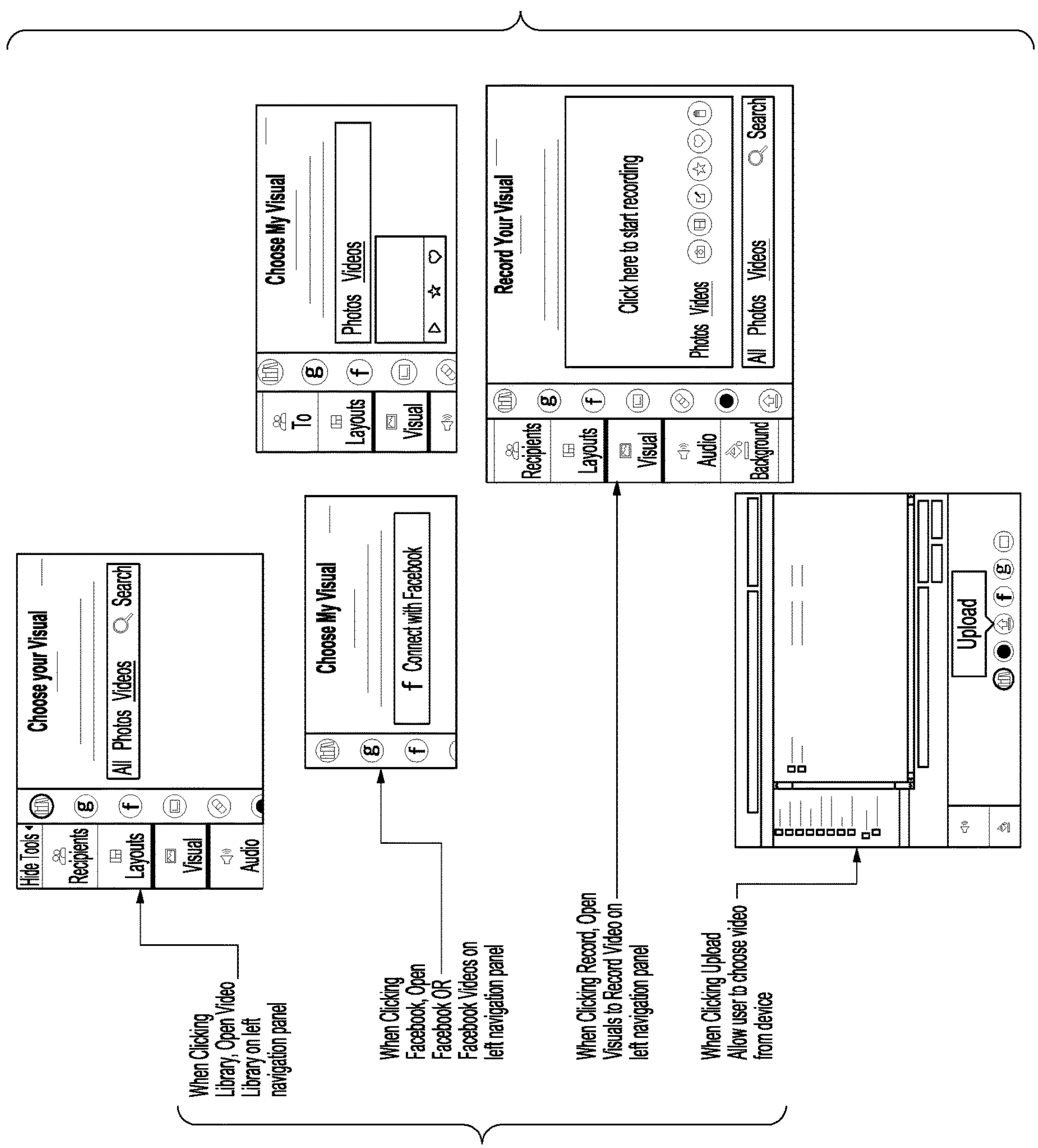
Figure 65M:
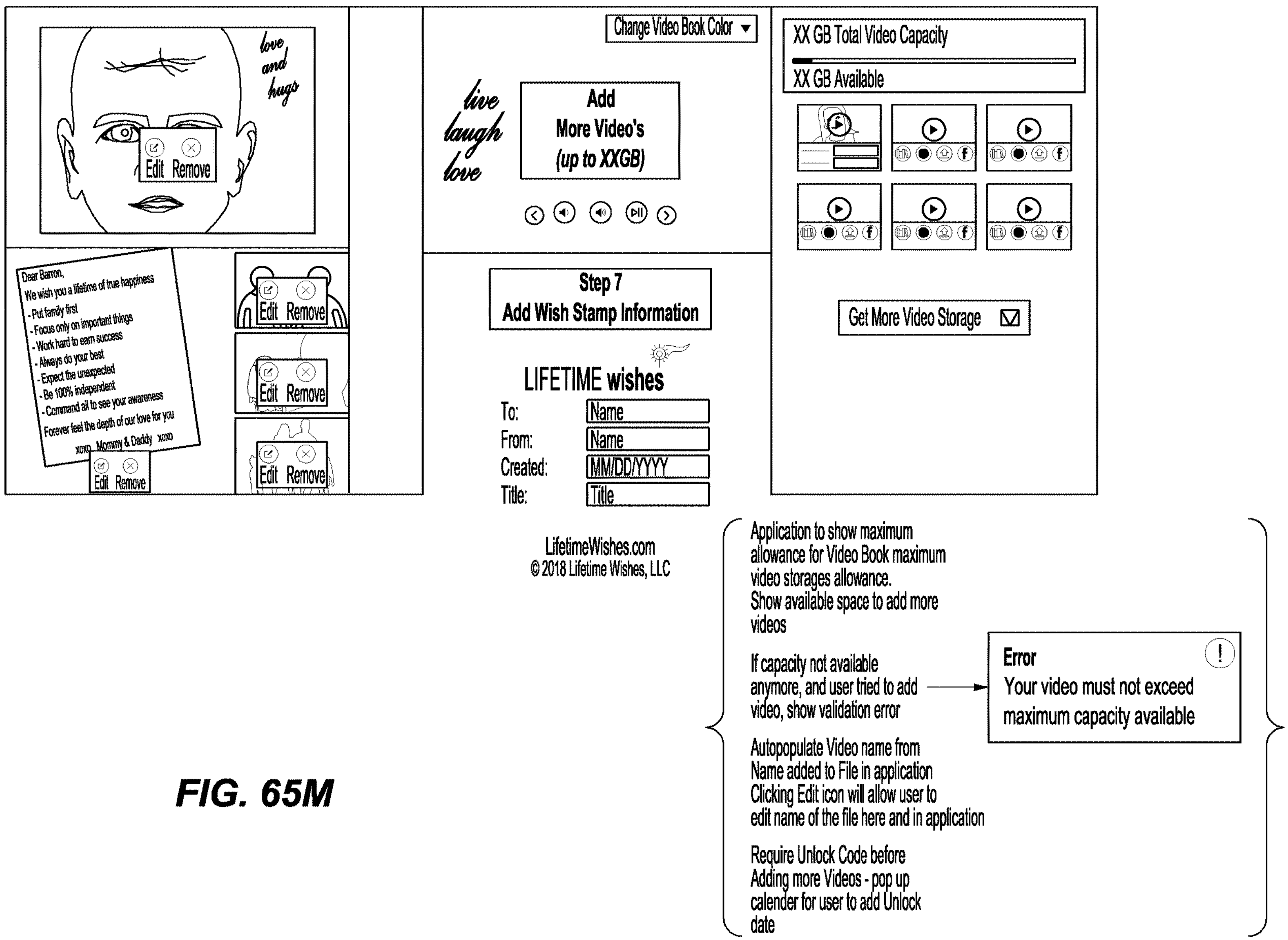
Figure 65N:
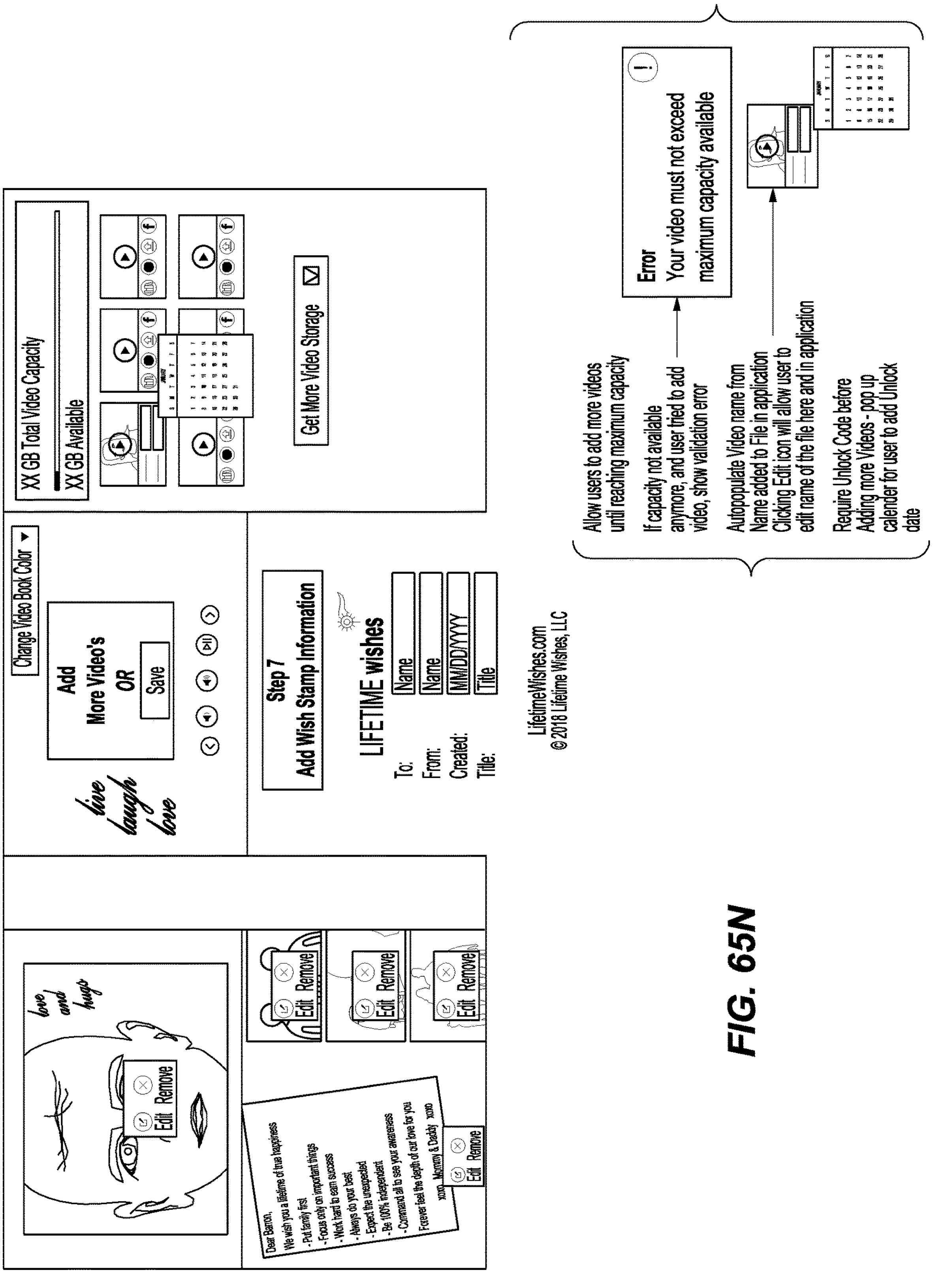
Figure 65O:
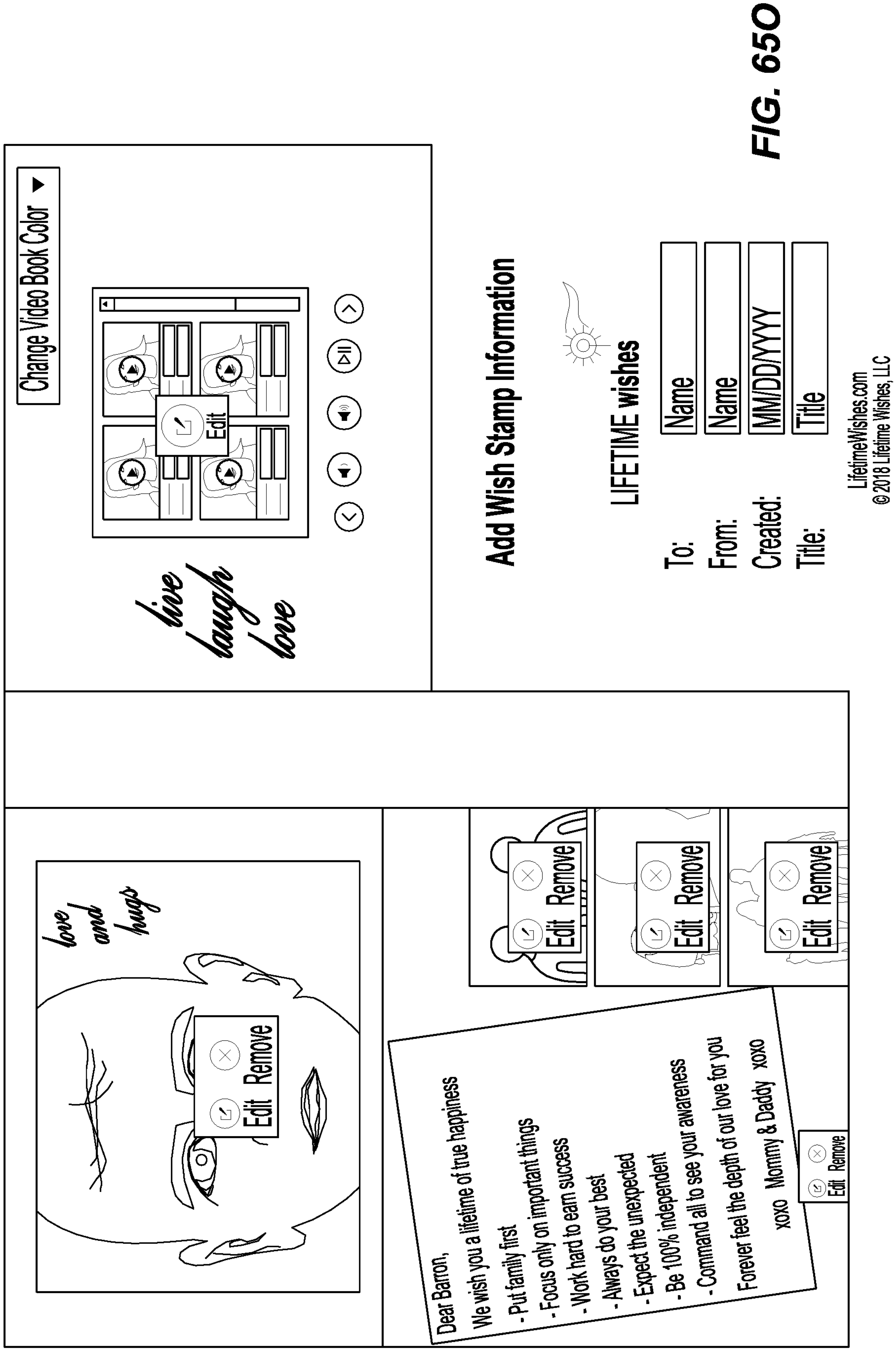
Figure 65P:
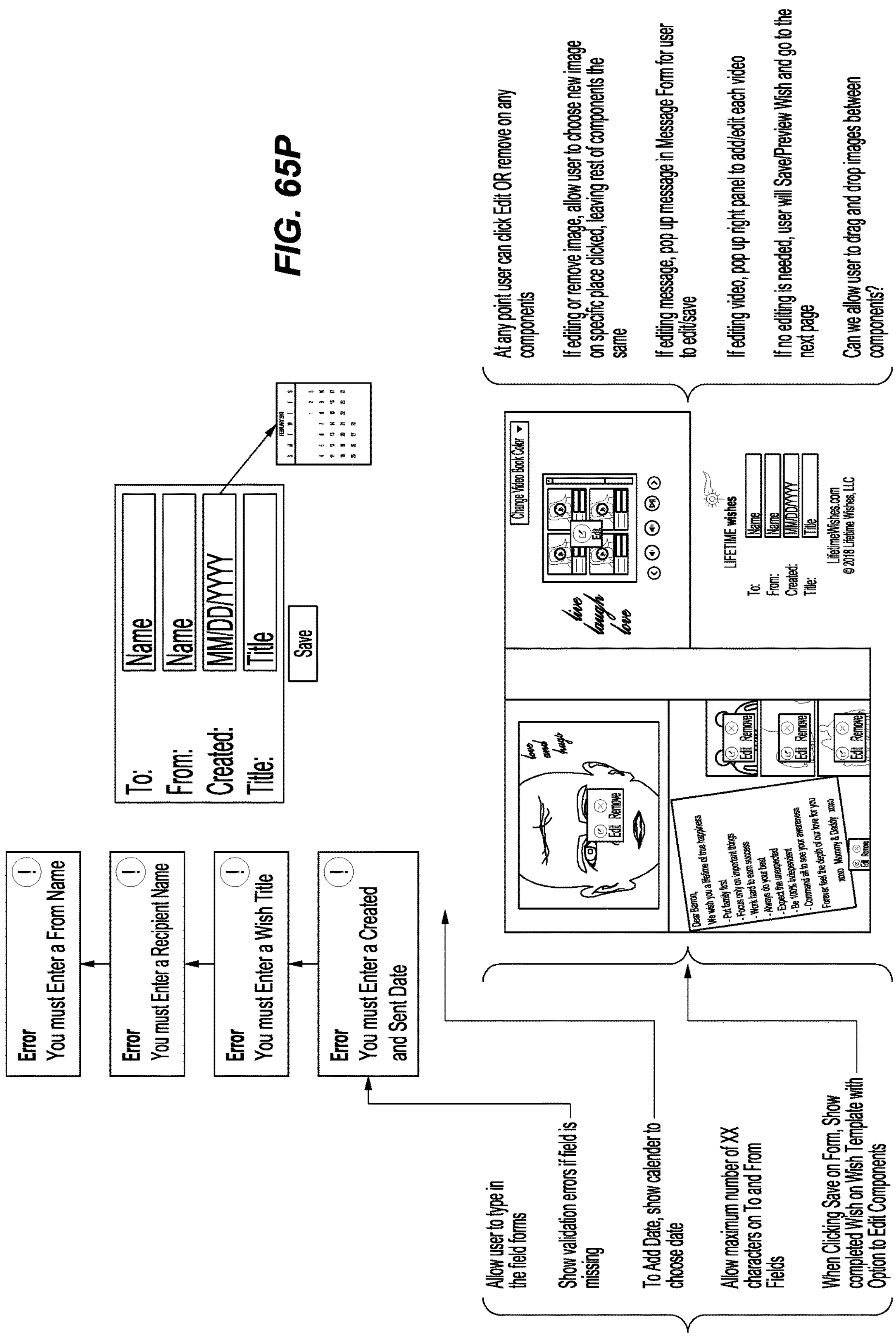
Figure 65Q:
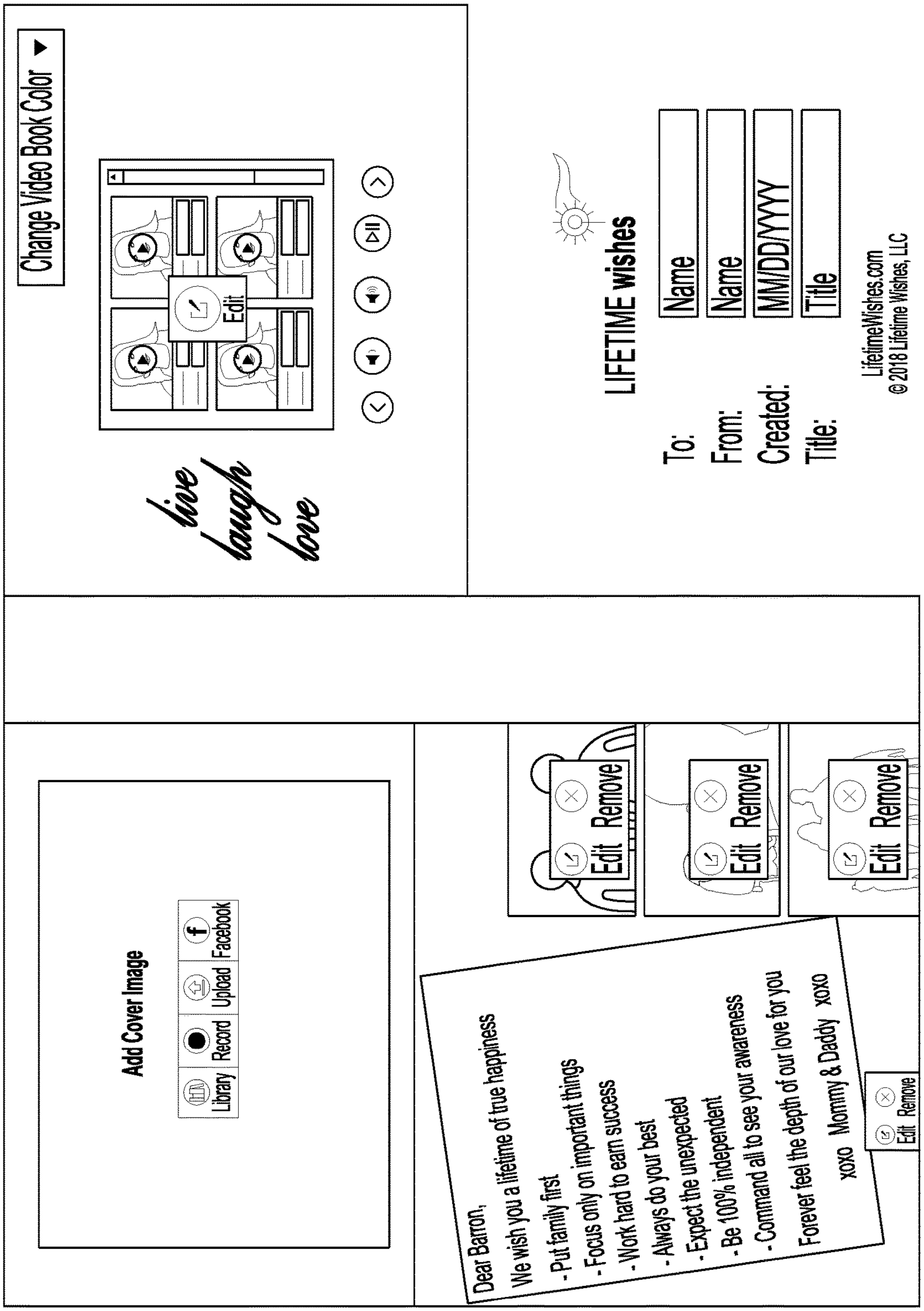
Figure 65R:
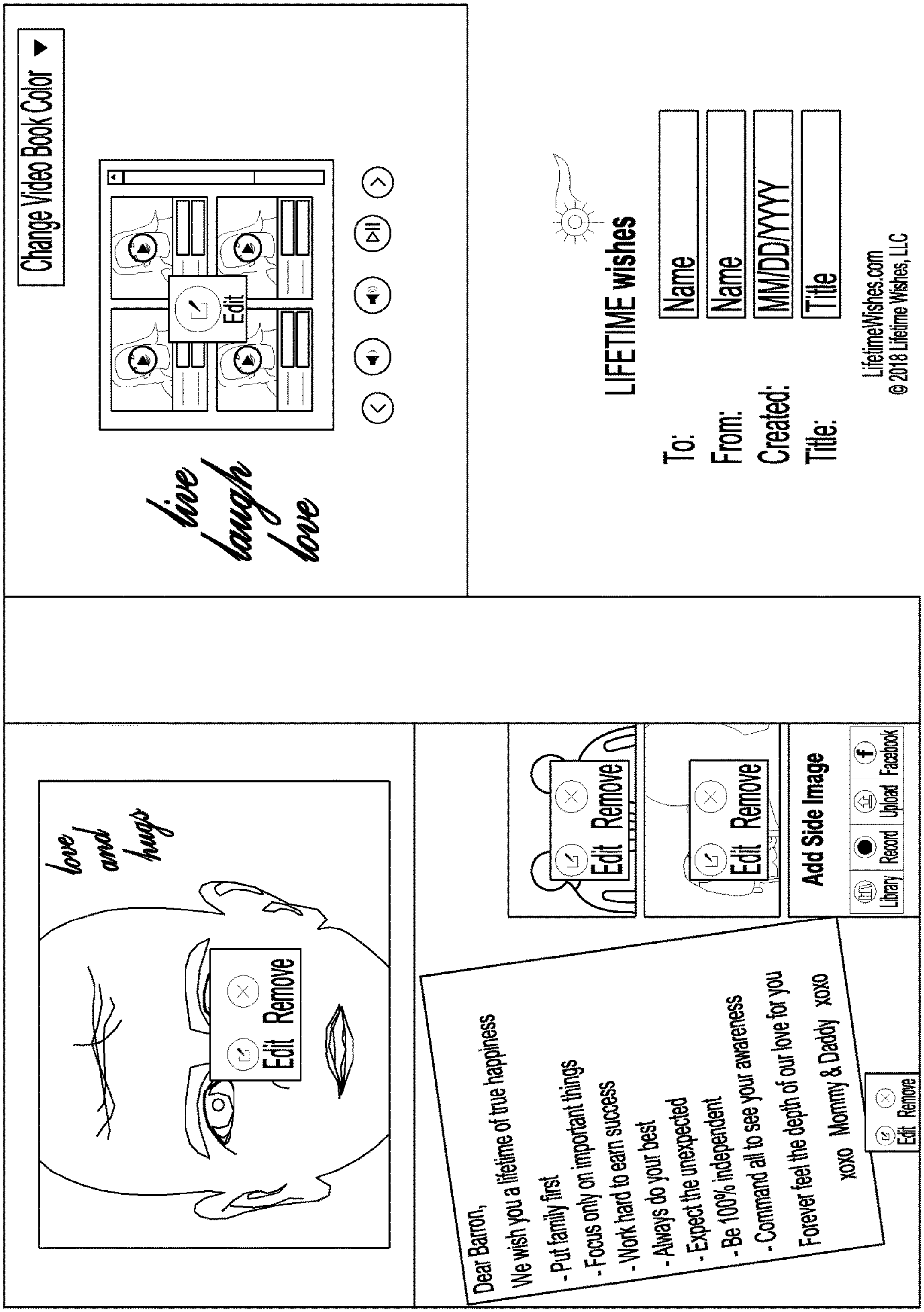
Figure 65S:
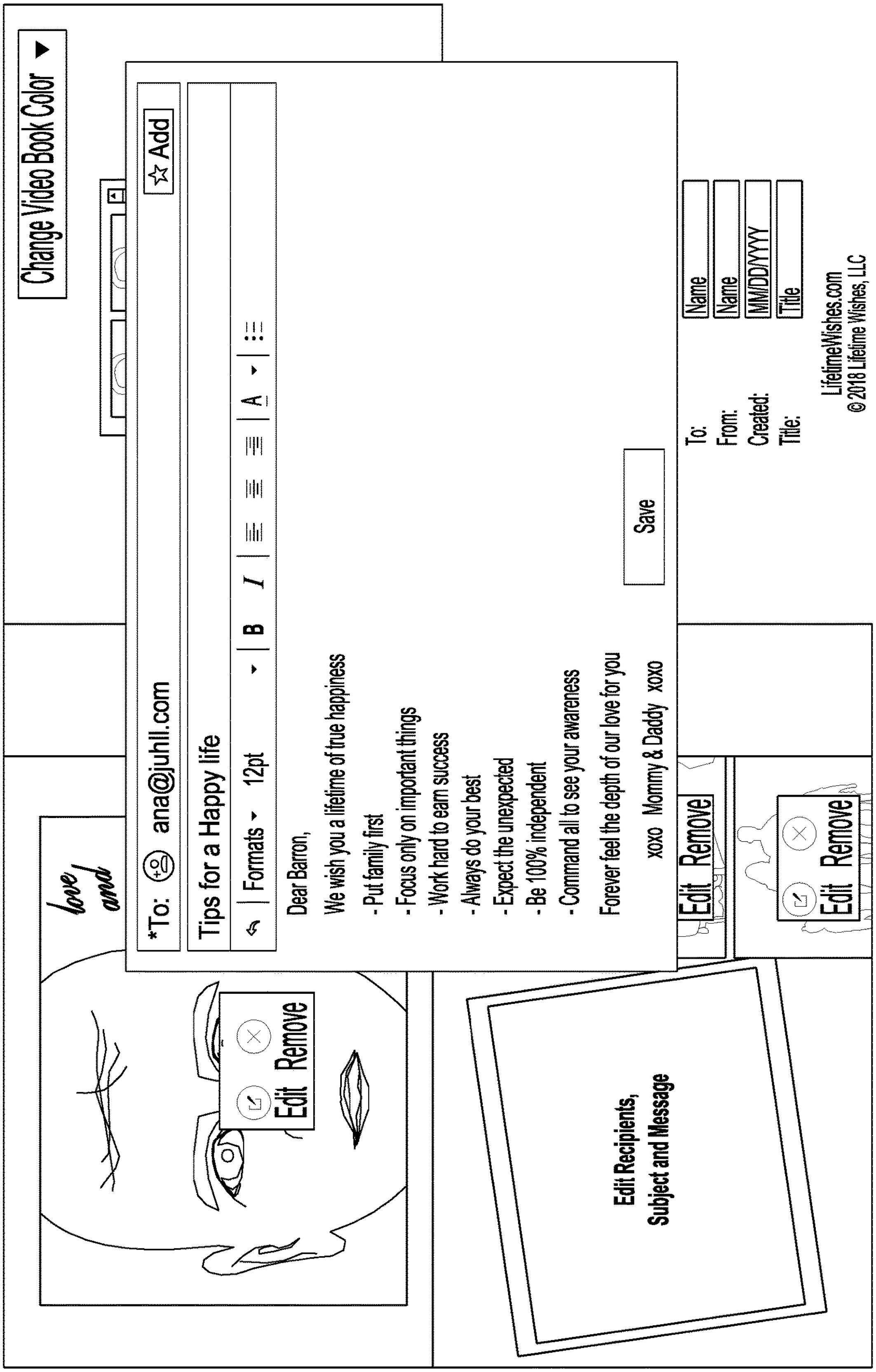
Figure 65T:
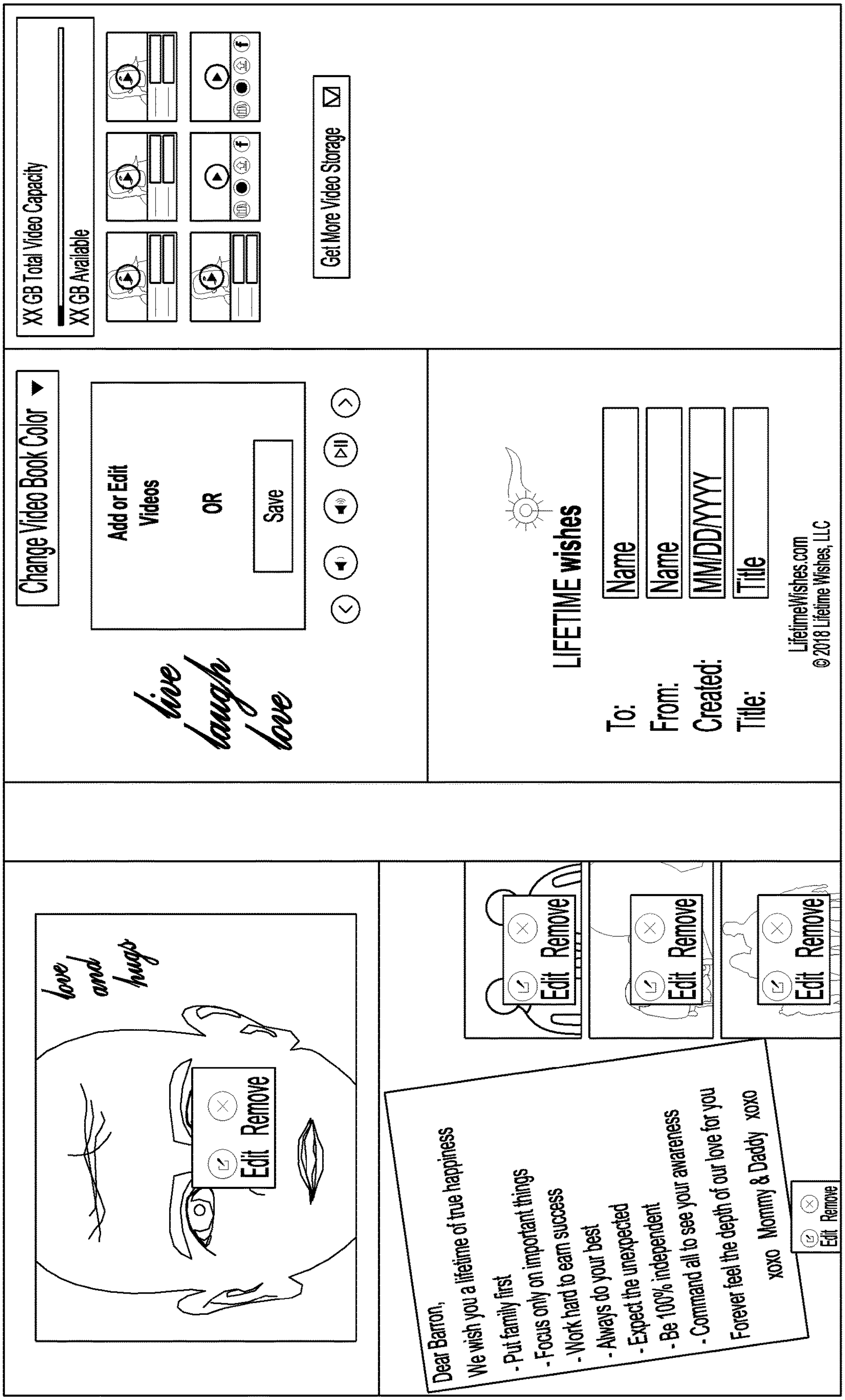
Figure 65U:
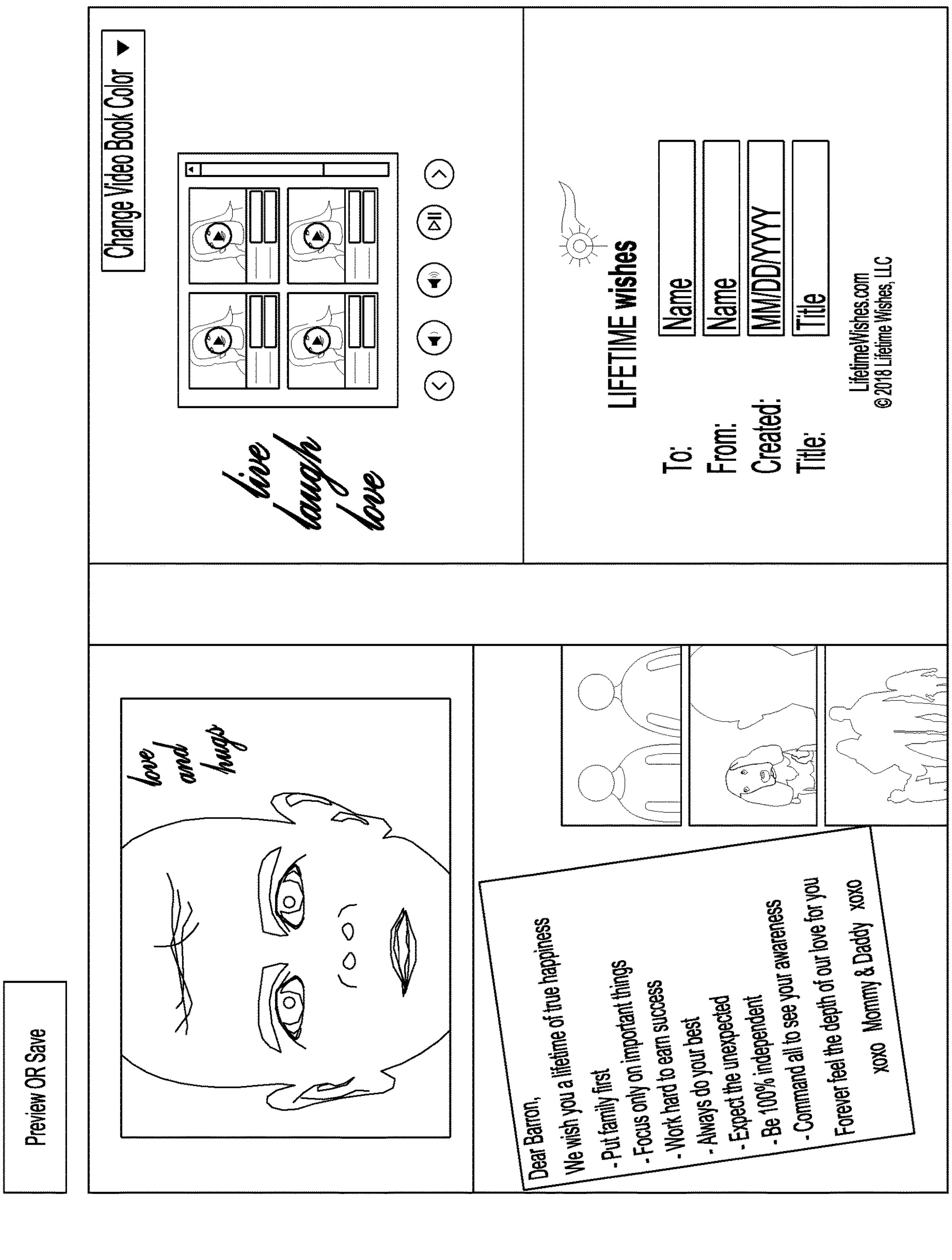
Figure 65V:
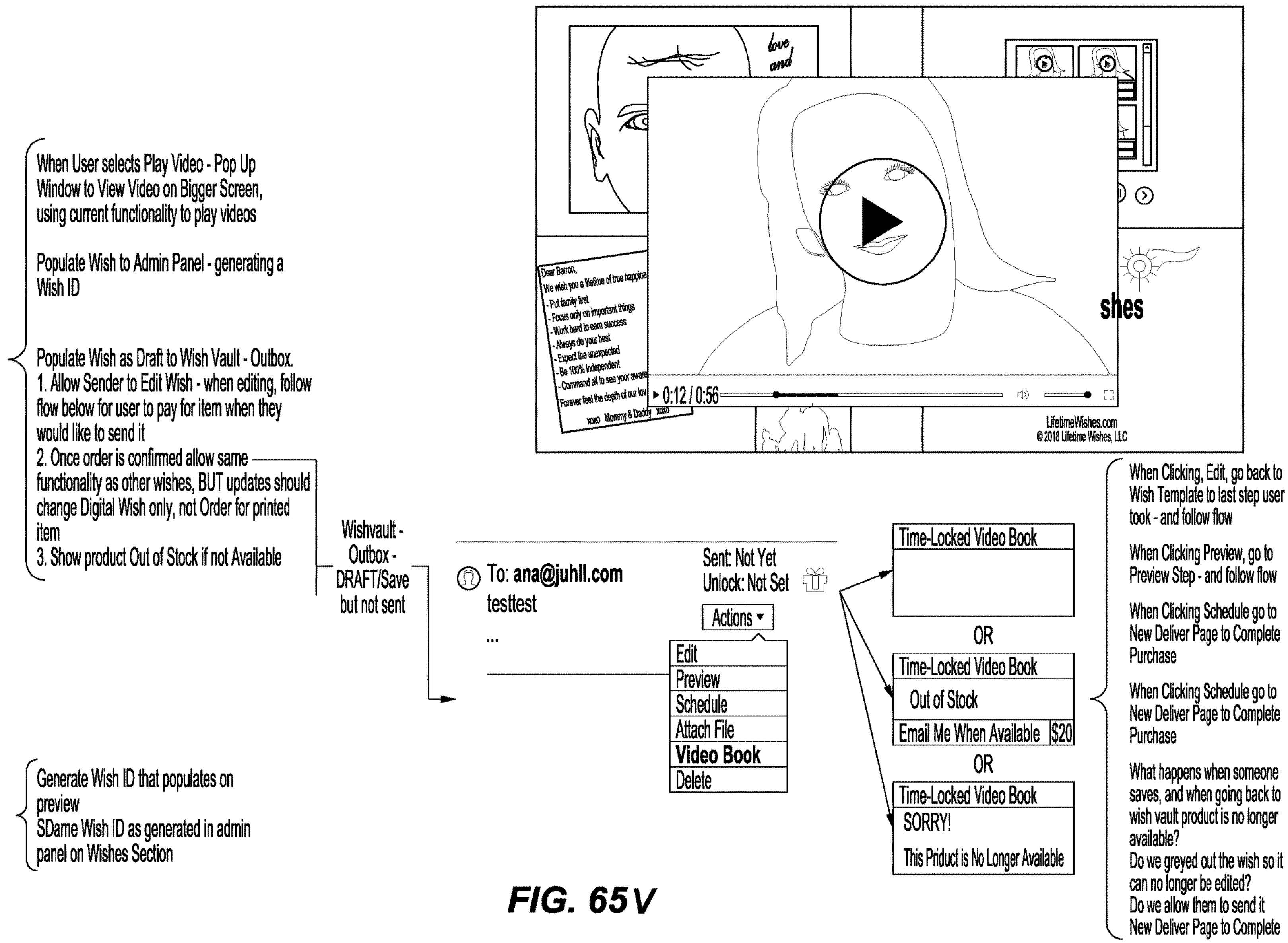
Figure 65X:
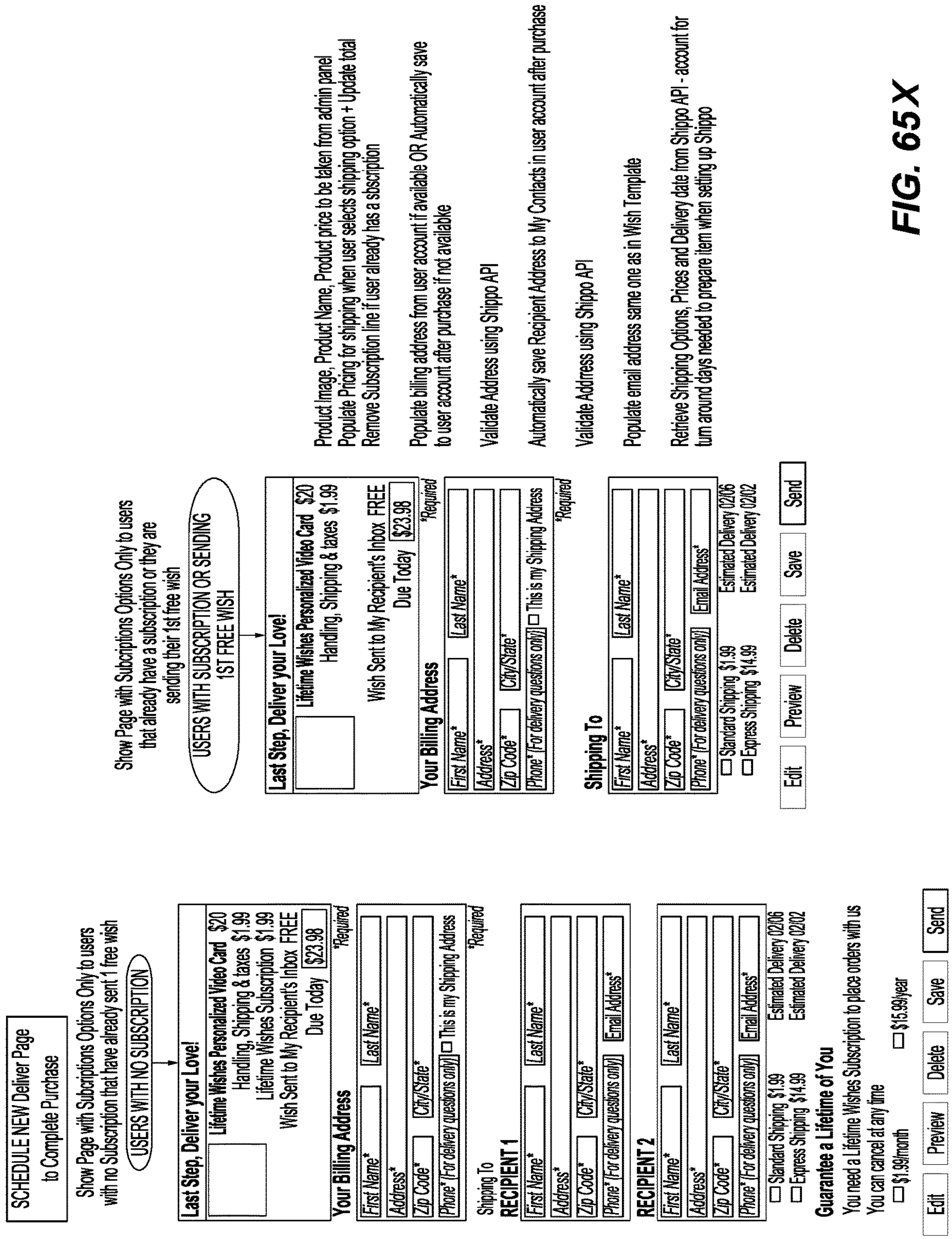
Figure 65Y:
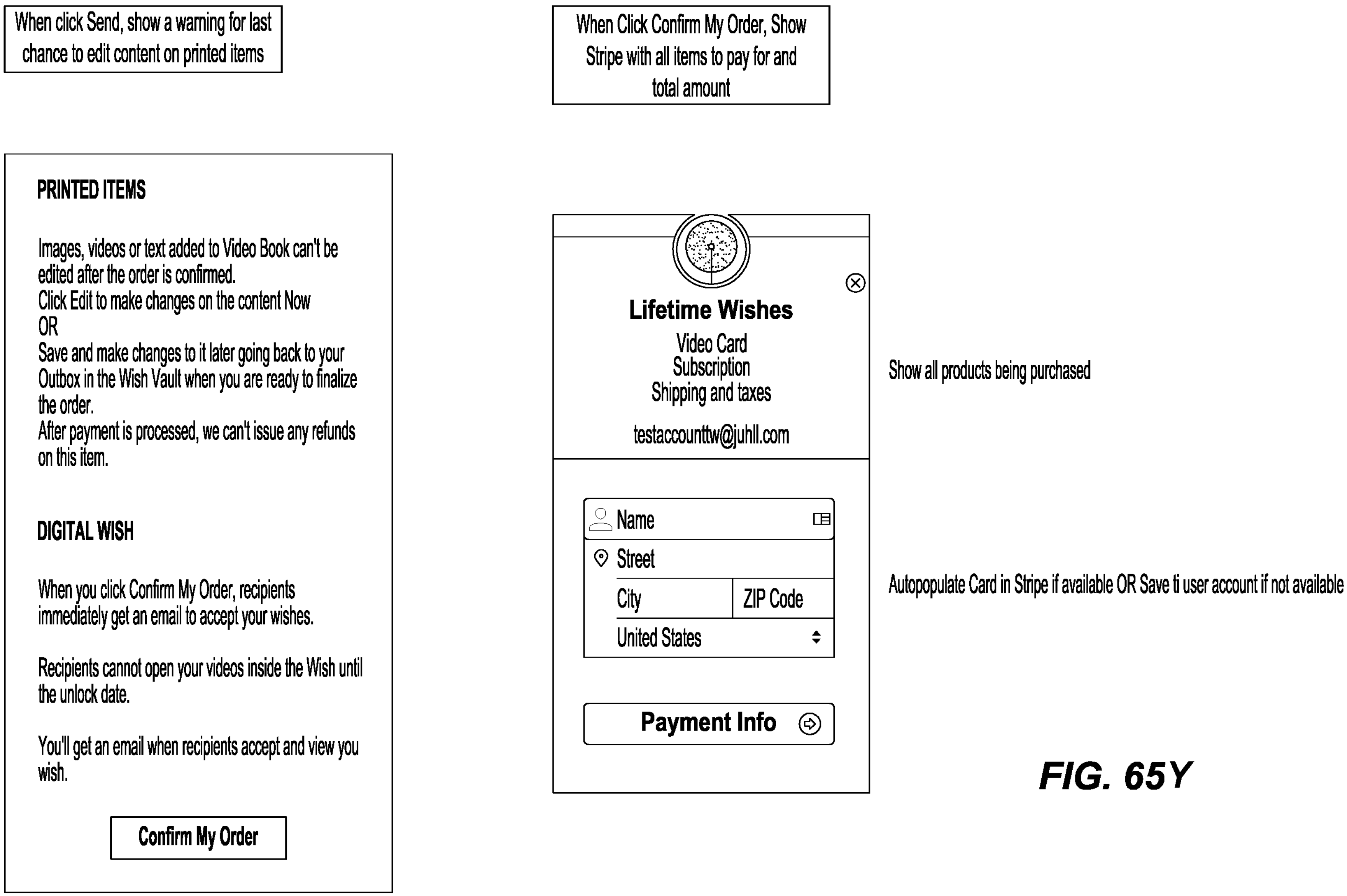
Figure 65Z:
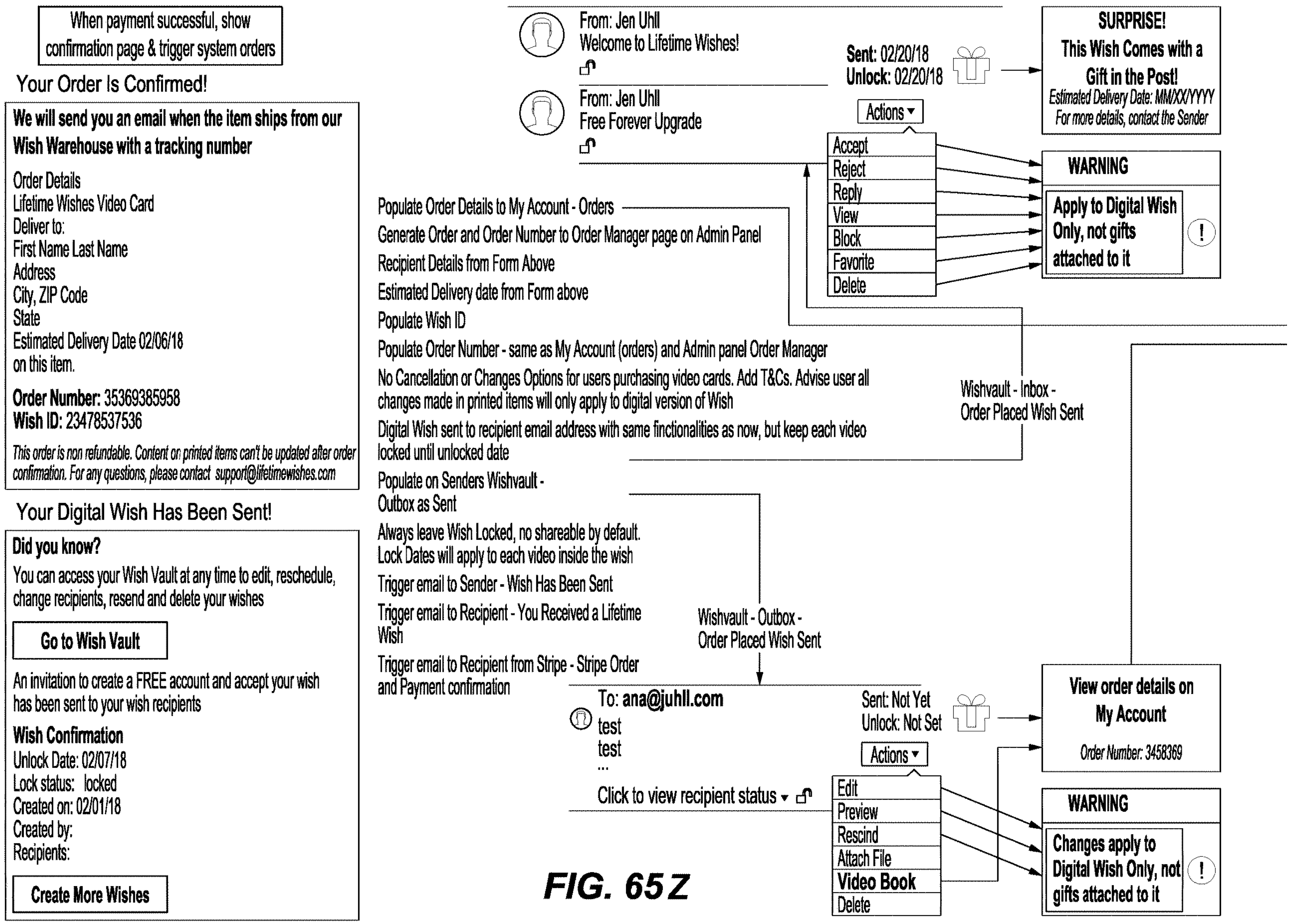
Figure 66A:
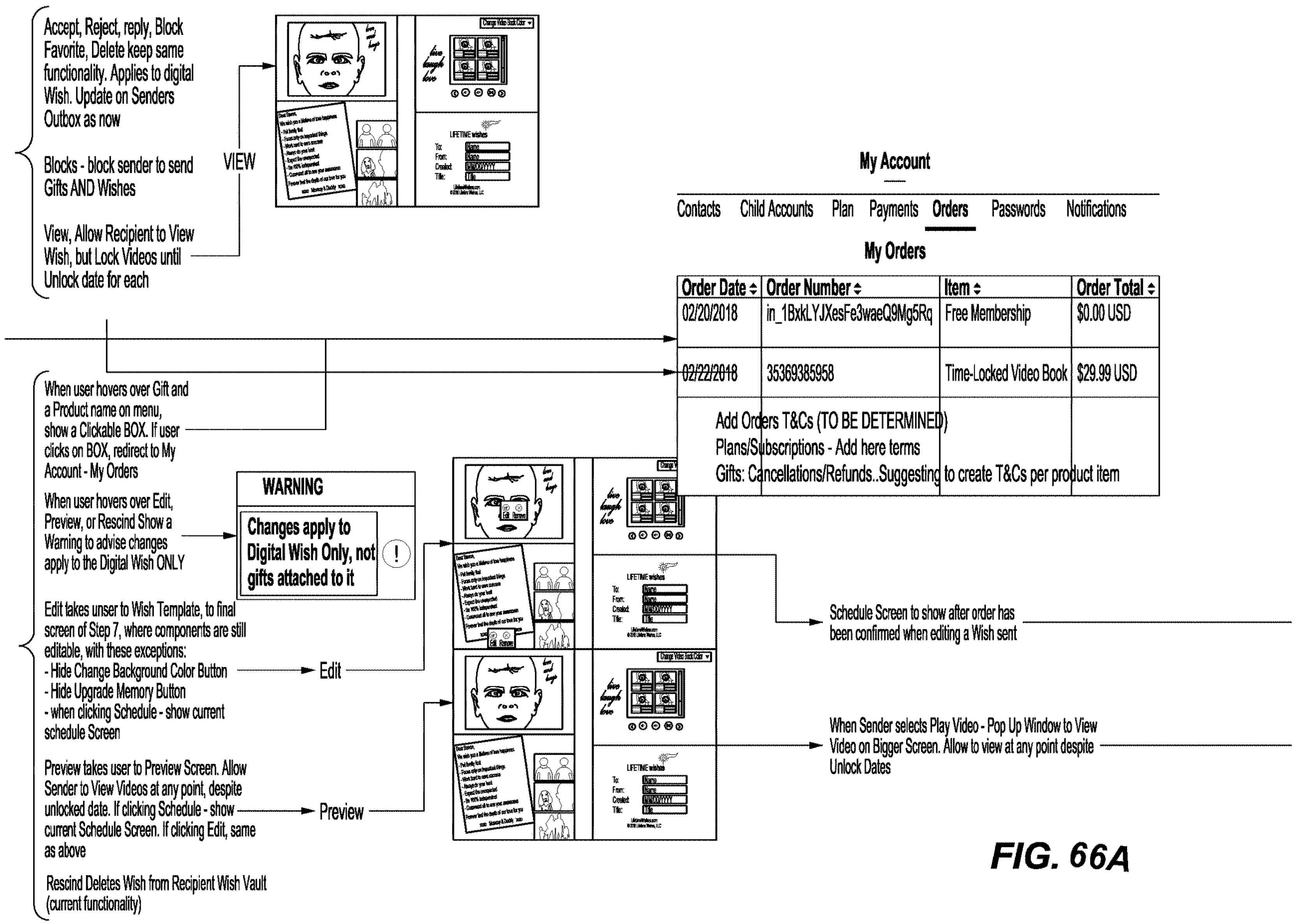
Figure 66B:
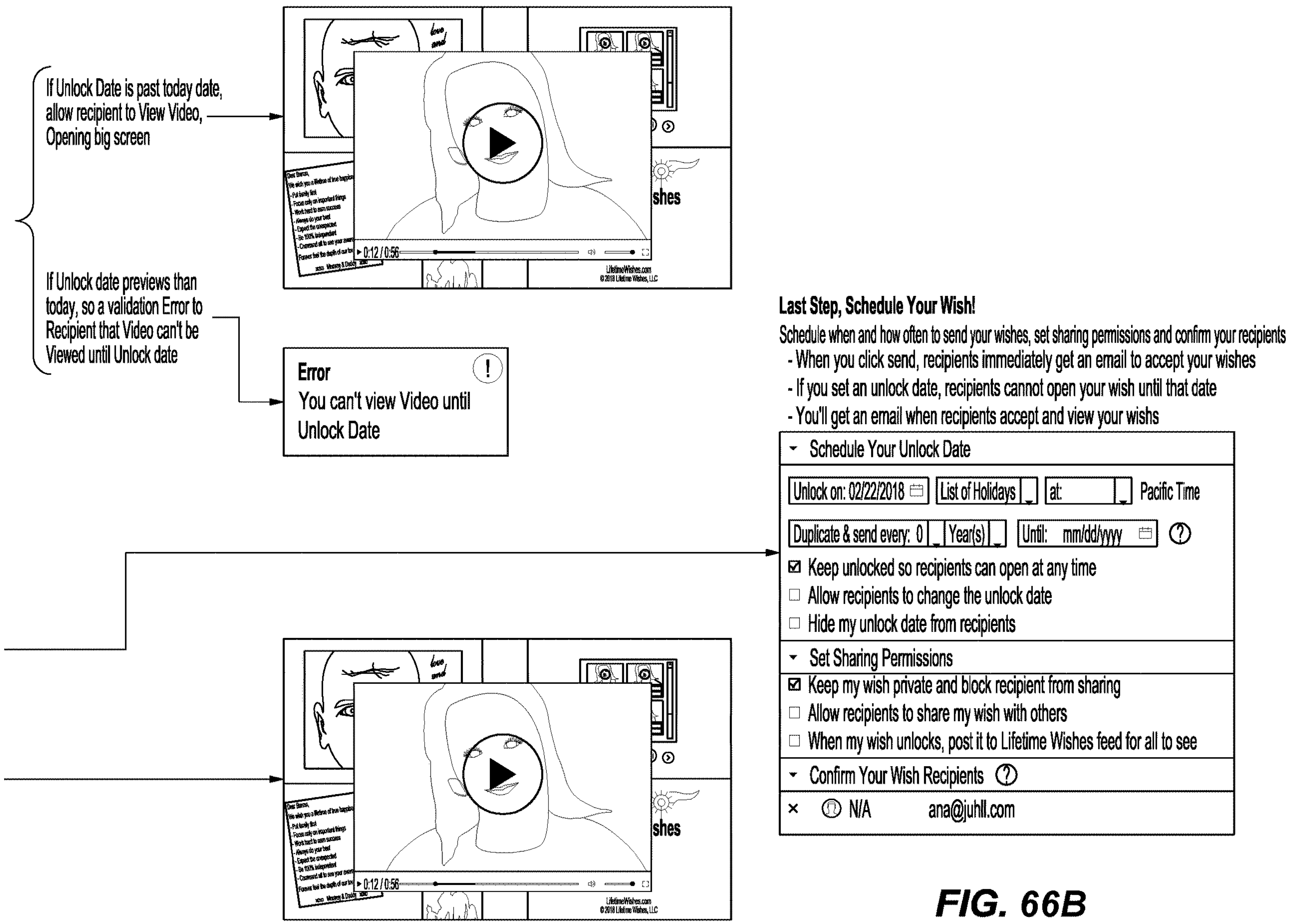
Figure 67A:
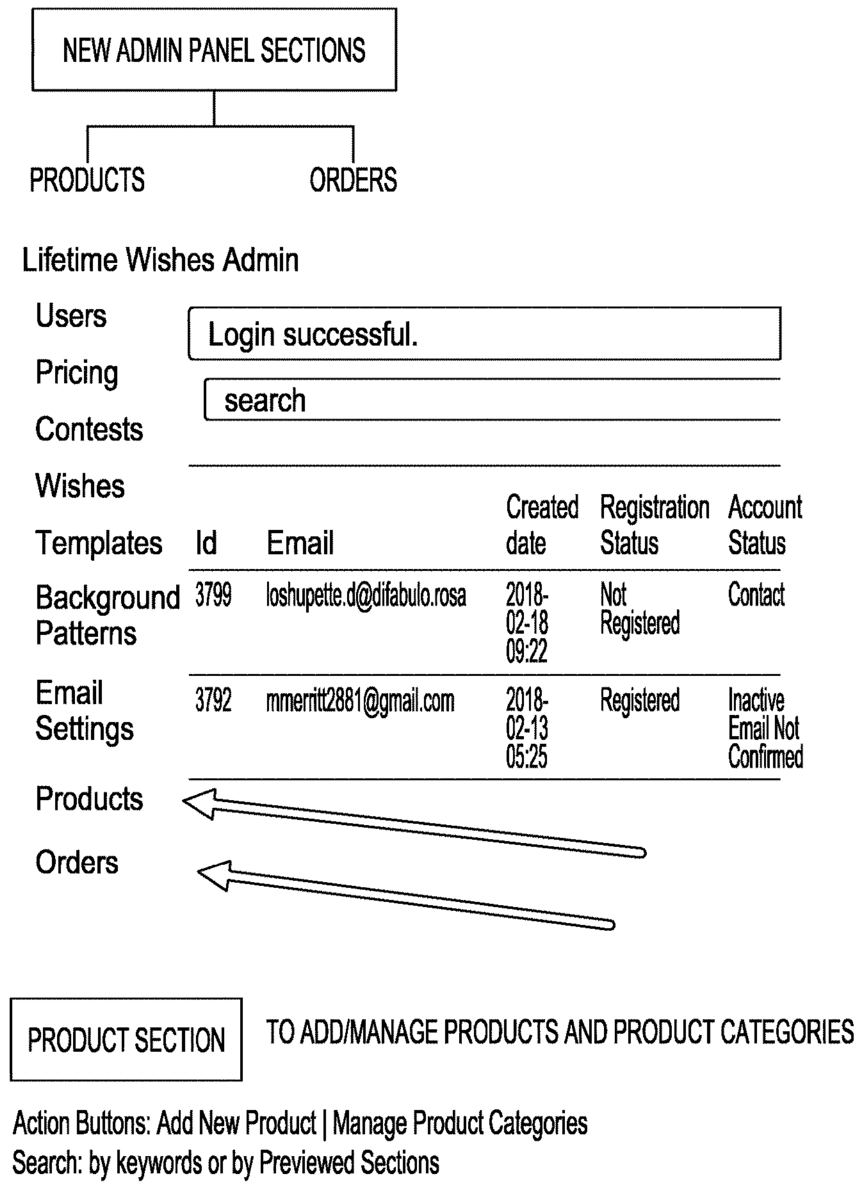
Figure 67B:
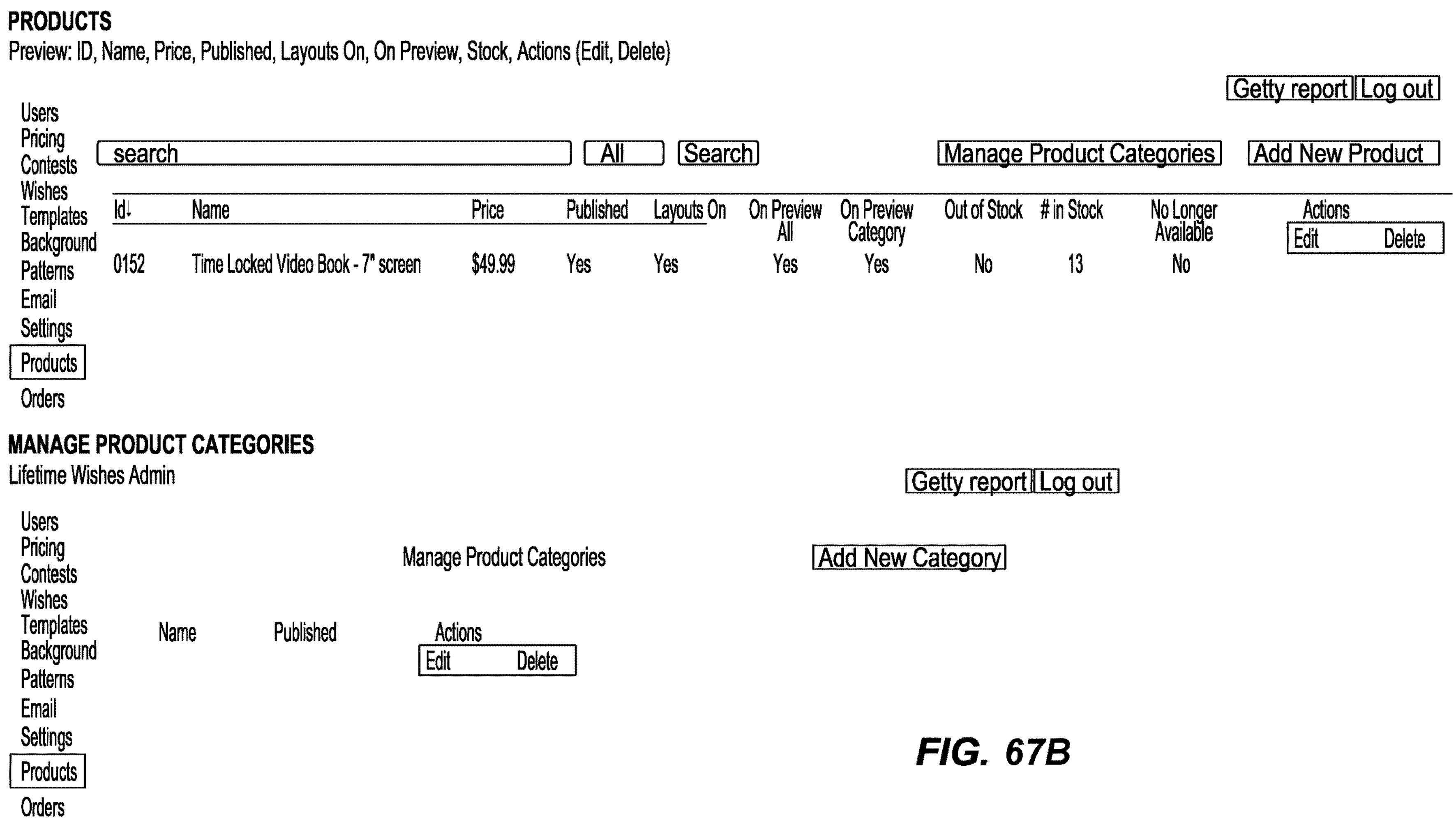
Figure 67C:
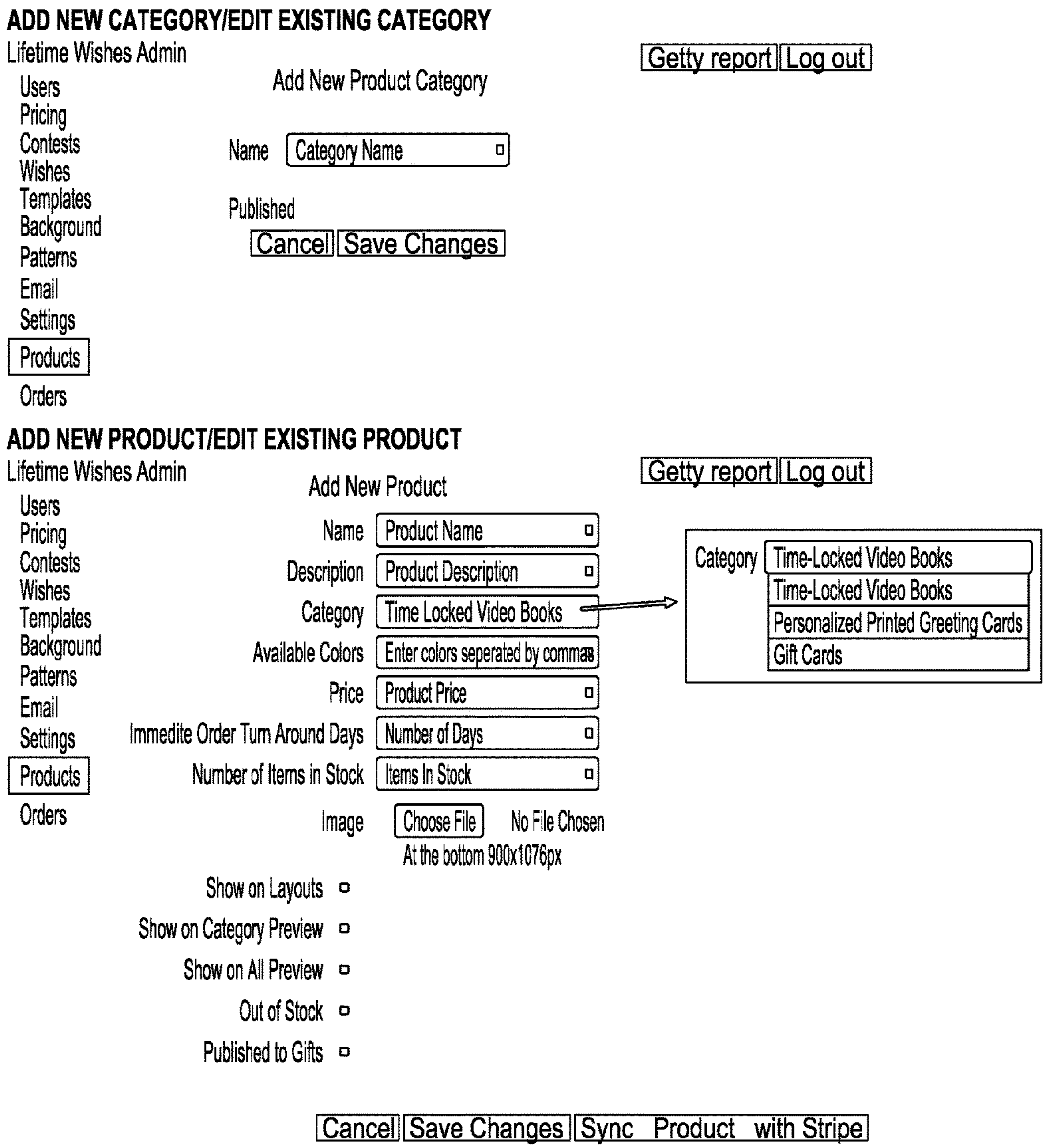
Figure 67E:
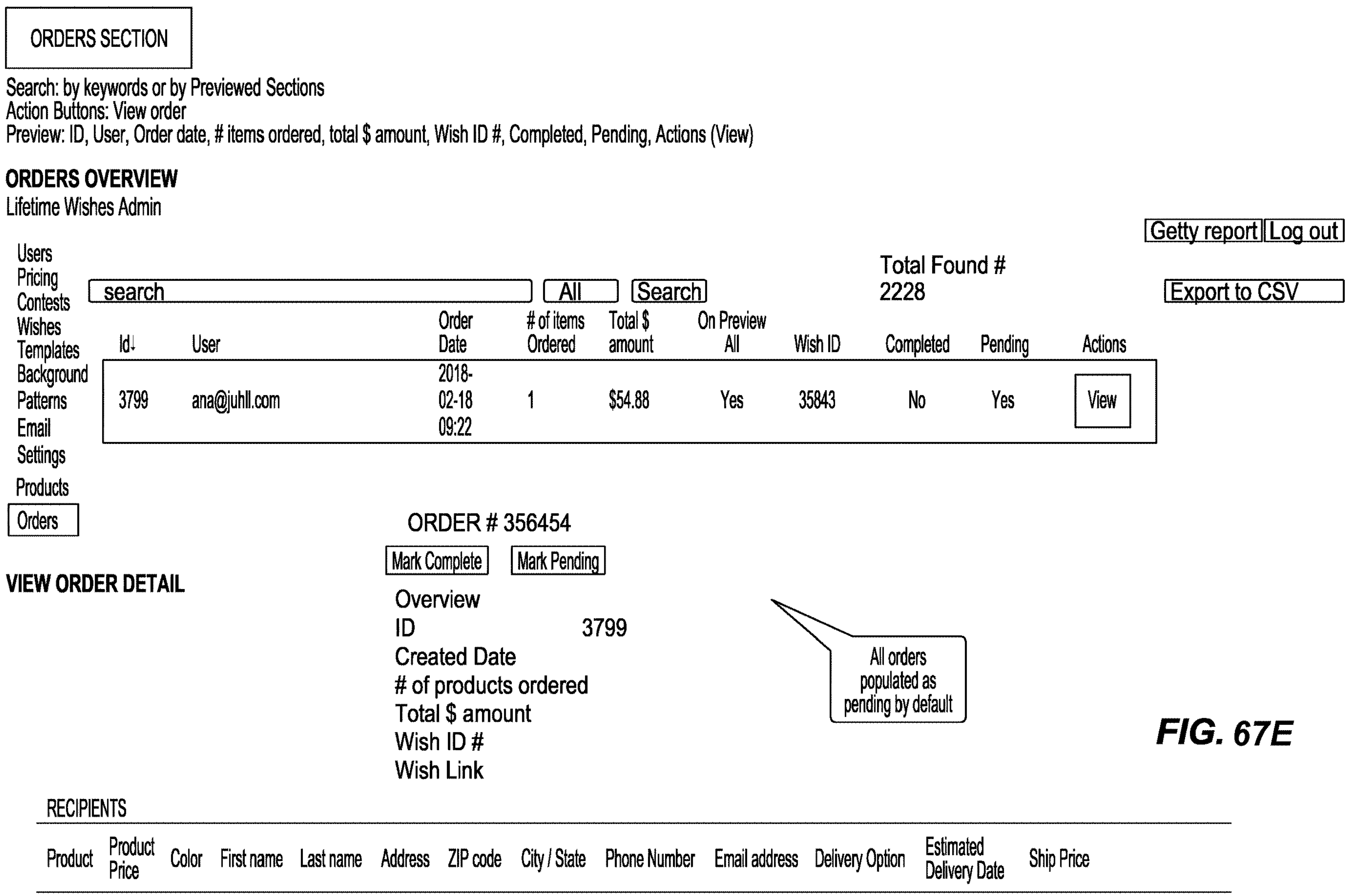

The video book may thereafter proceed to production and delivery as outlined in FIG. 64D.

Exemplary GUIs that may be associated with the above described process as well as a summary of objectives and requirements for each are shown in FIGS. 65A-Z and 66A-B and 67A-E. FIGS. 65A-Z and 66A-B show partial views of a flow diagram depicting exemplary GUIs that the system 10 may display to a user in connection with the above described process of configuring and sending a video book as well as objectives and requirements for each. FIGS. 67A-E depict exemplary GUIs that the system 10 may display to the system administrator in connection with the above described process.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. A computer-implemented message system that resides on a platform, comprising:

a plurality of graphical user interfaces that allow one or more members who are registered with the system to create a personalized message that resides on the platform and to schedule access to the personalized message by one or more recipients;

a member database that contains personal member information about the one or more members;

a contact database that contains contact information about the one or more members or the one or more recipients of the personalized message;

a contact manager that is connected to the member database and to the contact database, that permits a member to manage personal member information and contact information, and that permits the one or more recipients of the personalized message to access the personalized message on the platform and to register as a member with the system;

a message content database that contains content for use in creating the personalized message; and a message creation component that is connected to the message content database and that allows the one or more members to select the one or more recipients of the personalized message from the contact database or the member database and to select the content for use in creating the personalized message from the message content database;

a message calendar that is connected to the member database, to the contact database, to the contact manager, to the message creation component and to the message content database, that permits the one or more members to schedule automated access of the personalized message on the platform by the one or more recipients and that is configured to automatically provide access to the personalized message on the platform on at least one date in the future relative to when the personalized message is created; and a schedule lock/unlock date component that permits the one or more members who created the personalized message to control when the personalized message may be accessed by the one or more recipients, including keeping the personalized message unlocked so that the one or more recipients may open the personalized message at any time, keeping the personalized message unlocked on only certain dates so that the one or more recipients may open the personalized message on only the certain dates and keeping the personalized message locked after an end date so that the personalized message is no longer accessible to the one or more recipients after the end date;

wherein the member database, the contact database, the contact manager, the message content database, the message creation component and the message calendar are operatively associated with one another via the plurality of graphical user interfaces.

2. The system of claim 1 where the at least one date is a recurring date based on a holiday date or a date triggered by a future event relative to when the personalized message is created.

3. The system of claim 1, wherein the message calendar is configured to provide access to the personalized message at a date while the member is alive, and is configured to provide access to the personalized message or a different message at another date after the member has died.

4. The system of claim 1, wherein the message calendar allows the one or more members to set privacy settings for the personalized message, including allowing the one or more recipients to provide access to the personalized message with others and preventing the one or more recipients from providing access to the personalized message with others.

5. The system of claim 1, wherein the plurality of graphical user interfaces includes a message creation graphical user interface having a message content tool bar.

6. The system of claim 1, wherein the message creation component includes a template editor that is connected to the message content database and that allows the one or more members to select content to create the personalized message.

7. The system of claim 1, wherein the content includes content uploaded to the platform from a camera, phone, computer, tablet or from a social media account.

8. The system of claim 1, wherein the member database includes information on children members, and the system further includes a parental or guardian control component that controls access to the system by the children members.

9. The system of claim 1, further comprising a message vault that resides on the platform and that is connected to the message creation component and to the message content database, that stores information associated with the one or more members' personalized message and that provides a status on the one or more members' personalized message.

10. The system of claim 1, wherein the message creation component includes a gift manager that allows the one or more members to add a gift to the personalized message.

11. The system of claim 1, further comprising a message tracking component that permits the one or more members who are providing access to the personalized message to track whether the one or more recipients have accessed the personalized message.

12. The system of claim 11, further comprising a message recipient action component that permits the one or more recipients, after they have registered as members with the system, to track or manage message actions.

13. The system of claim 1, further comprising an invitation component that permits the one or more members to invite a non-registered intended recipient to register as a member of the system so that the non-registered intended recipient may access personalized messages on the platform.

14. The system of claim 1, wherein the system allows the one or more members to edit personalized messages that have already been accessed.

15. The system of claim 1, wherein the system allows the one or more members to rescind personalized messages already accessed.

* * * * *